(12) United States Patent
Taha et al.

(10) Patent No.: US 12,546,958 B2
(45) Date of Patent: *Feb. 10, 2026

(54) OPTICAL COUPLING

(71) Applicant: Teramount Ltd., Jerusalem (IL)

(72) Inventors: Hesham Taha, Jerusalem (IL); Abraham Israel, Jerusalem (IL)

(73) Assignee: Teramount Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,565

(22) Filed: Mar. 20, 2023

(65) Prior Publication Data

US 2023/0221507 A1 Jul. 13, 2023

Related U.S. Application Data

(63) Continuation of application No. 17/989,303, filed on Nov. 17, 2022, which is a continuation-in-part of
(Continued)

(51) Int. Cl.
*G02B 6/43* (2006.01)
*G02B 6/12* (2006.01)
(Continued)

(52) U.S. Cl.
CPC ....... *G02B 6/4214* (2013.01); *G02B 6/12002* (2013.01); *G02B 6/124* (2013.01);
(Continued)

(58) Field of Classification Search
CPC ...... G02B 6/124; G02B 6/136; G02B 6/4206; G02B 6/262; G02B 6/12002; G02B 6/43;
(Continued)

(56) References Cited

U.S. PATENT DOCUMENTS 4,744,618 A 5/1988 Mahlein
4,763,977 A 8/1988 Kawasaki et al.
(Continued)

FOREIGN PATENT DOCUMENTS

CA 1253377 A 5/1989
CN 1387626 A 12/2002
(Continued)

OTHER PUBLICATIONS

Notice of Preliminary Rejection dated Jul. 19, 2023 for KR Application No. 10-2018-7007767.
(Continued)

*Primary Examiner* — Deandra M Hughes
(74) *Attorney, Agent, or Firm* — Banner & Witcoff, Ltd.

(57) ABSTRACT

Apparatuses, systems and methods for optical coupling, optical integration, electro-optical coupling, and electro-optical packaging are described herein. Optical couplers may comprise various optical elements (e.g., mirrors as described herein) to relax optical assembly requirements and improve producibility. Optical couplers may improve fiber-to-chip, fiber-to-fiber and chip-to-chip optical connection. Optical couplers and optical components may be used to improve integration of, connection of, and/or packaging of optical systems and/or components with electrical systems and/or components.

37 Claims, 62 Drawing Sheets

Related U.S. Application Data application No. 17/674,319, filed on Feb. 17, 2022, and a continuation-in-part of application No. 17/645,673, filed on Dec. 22, 2021, and a continuation-in-part of application No. 17/645,667, filed on Dec. 22, 2021, and a continuation-in-part of application No. 17/512,200, filed on Oct. 27, 2021, and a continuation-in-part of application No. 17/120,816, filed on Dec. 14, 2020, and a continuation-in-part of application No. 16/814,401, filed on Mar. 10, 2020, and a continuation-in-part of application No. 16/801,682, filed on Feb. 26, 2020, now Pat. No. 11,585,991, said application No. 17/120,816 is a continuation of application No. 16/386,859, filed on Apr. 17, 2019, now Pat. No. 10,866,363, which is a continuation-in-part of application No. 15/797,792, filed on Oct. 30, 2017, now Pat. No. 10,481,334, which is an application for the reissue of Pat. No. 10,564,374, said application No. 15/797,792 is a continuation of application No. 14/878,591, filed on Oct. 8, 2015, now Pat. No. 9,804,334, said application No. 15/724,966 is a continuation-in-part of application No. 14/878,591, filed on Oct. 8, 2015, now Pat. No. 9,804,334.

(60) Provisional application No. 62/811,840, filed on Feb. 28, 2019, provisional application No. 62/795,837, filed on Jan. 23, 2019, provisional application No. 62/659,376, filed on Apr. 18, 2018, provisional application No. 62/405,476, filed on Oct. 7, 2016.

(51) Int. Cl.
*G02B 6/124* (2006.01)
*G02B 6/13* (2006.01)
*G02B 6/136* (2006.01)
*G02B 6/26* (2006.01)
*G02B 6/30* (2006.01)
*G02B 6/42* (2006.01)

(52) U.S. Cl.
CPC ............... *G02B 6/13* (2013.01); *G02B 6/136* (2013.01); *G02B 6/262* (2013.01); *G02B 6/30* (2013.01); *G02B 6/4206* (2013.01); *G02B 6/4228* (2013.01); *G02B 6/4292* (2013.01); *G02B 6/43* (2013.01); *G02B 6/4238* (2013.01); *G02B 6/4243* (2013.01); *G02B 6/4249* (2013.01); *G02B 6/4274* (2013.01)

(58) Field of Classification Search
CPC ...... G02B 6/4214; G02B 6/13; G02B 6/4238; G02B 6/4243; G02B 6/4274; G02B 6/4249
See application file for complete search history.

(56) References Cited

U.S. PATENT DOCUMENTS

| | | | |
|---|---|---|---|
| 5,627,931 A | 5/1997 | Ackley et al. | |
| 5,913,002 A | 6/1999 | Jiang | |
| 5,939,782 A | 8/1999 | Malladi | |
| 6,122,417 A | 9/2000 | Jayaraman et al. | |
| 6,198,864 B1 | 3/2001 | Lemoff et al. | |
| 6,253,009 B1 | 6/2001 | Lestra et al. | |
| 6,271,970 B1 | 8/2001 | Wade | |
| 6,423,956 B1 | 7/2002 | Mandella et al. | |
| 6,571,039 B1 | 5/2003 | Al-hemyari et al. | |
| 6,600,845 B1 | 7/2003 | Feldman et al. | |
| 6,654,533 B1 | 11/2003 | Koteles et al. | |
| 6,801,693 B1 | 10/2004 | Jacobowitz et al. | |
| 6,832,031 B2 | 12/2004 | Smaglinski | |
| 6,862,092 B1 | 3/2005 | Ibsen et al. | |
| 6,888,988 B2 | 5/2005 | Vancoille et al. | |
| 6,941,047 B2 | 9/2005 | Capewell et al. | |
| 6,960,031 B2 | 11/2005 | McFarland et al. | |
| 7,050,304 B2 | 5/2006 | Hsu et al. | |
| 7,058,275 B2 | 6/2006 | Sezerman et al. | |
| 7,104,703 B2 | 9/2006 | Nagasaka et al. | |
| 7,139,448 B2 * | 11/2006 | Jain .......................... | G02B 6/43 385/132 |
| 7,260,328 B2 | 8/2007 | Kropp | |
| 7,288,756 B2 | 10/2007 | Sherrer et al. | |
| 7,317,746 B2 | 1/2008 | Ericson et al. | |
| 7,358,109 B2 | 4/2008 | Gallup et al. | |
| 7,366,380 B1 | 4/2008 | Peterson et al. | |
| 7,447,404 B2 | 11/2008 | Miller | |
| 7,567,391 B1 | 7/2009 | Strauch, III et al. | |
| 7,729,581 B2 | 6/2010 | Rolston et al. | |
| 7,853,101 B2 | 12/2010 | Carothers | |
| 7,970,041 B2 | 6/2011 | Arimoto et al. | |
| 8,000,565 B2 | 8/2011 | Liu | |
| 8,117,982 B2 | 2/2012 | Gruber et al. | |
| 8,390,806 B1 | 3/2013 | Subramanian | |
| 8,422,836 B2 | 4/2013 | Riester et al. | |
| 8,471,467 B2 | 6/2013 | Boerner | |
| 8,548,287 B2 | 10/2013 | Thacker et al. | |
| 8,582,934 B2 | 11/2013 | Adler et al. | |
| 8,803,269 B2 | 8/2014 | Shastri et al. | |
| 8,834,146 B2 | 9/2014 | Saha et al. | |
| 8,836,942 B2 | 9/2014 | Quan et al. | |
| 8,929,693 B2 | 1/2015 | Shin et al. | |
| 9,039,304 B2 | 5/2015 | Ko et al. | |
| 9,099,581 B2 | 8/2015 | Na et al. | |
| 9,285,554 B2 | 3/2016 | Doany et al. | |
| 9,429,725 B2 * | 8/2016 | Shao ...................... | H04B 10/40 |
| 9,442,255 B2 | 9/2016 | Pommer et al. | |
| 9,496,248 B2 | 11/2016 | Lee et al. | |
| 9,500,821 B2 | 11/2016 | Hochberg et al. | |
| 9,563,028 B2 | 2/2017 | Contag | |
| 9,658,396 B2 * | 5/2017 | Rong ...................... | G02B 1/045 |
| 9,698,564 B1 * | 7/2017 | Shubin .................... | H01S 5/026 |
| 9,703,041 B2 | 7/2017 | Smith et al. | |
| 9,739,962 B2 | 8/2017 | Brenner et al. | |
| 9,791,645 B2 | 10/2017 | Meadowcroft et al. | |
| 9,804,334 B2 | 10/2017 | Israel et al. | |
| 9,804,348 B2 | 10/2017 | Badihi et al. | |
| 9,864,133 B2 | 1/2018 | Patel et al. | |
| 9,874,688 B2 | 1/2018 | Doerr et al. | |
| 9,946,028 B2 | 4/2018 | Chen et al. | |
| 10,054,740 B2 | 8/2018 | Chetrit et al. | |
| 10,069,279 B2 | 9/2018 | Malcolm et al. | |
| 10,222,552 B2 | 3/2019 | Djordjevic et al. | |
| 10,481,334 B2 * | 11/2019 | Israel ................... | G02B 6/4243 |
| 10,502,905 B1 | 12/2019 | Mathai et al. | |
| 10,641,953 B1 | 5/2020 | Vashishtha et al. | |
| 10,746,934 B2 | 8/2020 | Patel et al. | |
| 10,754,107 B2 * | 8/2020 | Li ......................... | G02B 6/4295 |
| 10,866,363 B2 * | 12/2020 | Israel .................... | G02B 6/305 |
| 11,394,468 B2 * | 7/2022 | Zhou ..................... | H04B 10/803 |
| 11,448,836 B2 | 9/2022 | Ji et al. | |
| 11,585,991 B2 * | 2/2023 | Israel .................... | G02B 6/305 |
| 11,863,917 B2 | 1/2024 | Meister et al. | |
| 2002/0079430 A1 | 6/2002 | Rossi | |
| 2002/0118907 A1 | 8/2002 | Sugama et al. | |
| 2002/0131180 A1 | 9/2002 | Goodman | |
| 2002/0150320 A1 | 10/2002 | Kato | |
| 2002/0164113 A1 | 11/2002 | Rensing et al. | |
| 2002/0164129 A1 | 11/2002 | Jackson | |
| 2003/0002809 A1 | 1/2003 | Jian | |
| 2003/0043157 A1 | 3/2003 | Miles | |
| 2003/0044118 A1 | 3/2003 | Zhou et al. | |
| 2003/0142896 A1 | 7/2003 | Kikuchi et al. | |
| 2003/0222282 A1 | 12/2003 | Fjelstad et al. | |
| 2004/0114869 A1 | 6/2004 | Fike et al. | |
| 2004/0144869 A1 | 7/2004 | Hennessy | |
| 2004/0184704 A1 | 9/2004 | Bakir et al. | |
| 2005/0025430 A1 | 2/2005 | Bhagavatula et al. | |
| 2005/0162853 A1 * | 7/2005 | Jain .................... | G02B 27/0927 362/301 |

(56) References Cited

U.S. PATENT DOCUMENTS

| | | | |
|---|---|---|---|
| 2005/0164131 A1* | 7/2005 | Yokouchi | G02B 6/12002 |
| | | | 385/129 |
| 2005/0276613 A1 | 12/2005 | Welch et al. | |
| 2006/0022289 A1 | 2/2006 | Badhei et al. | |
| 2006/0239605 A1 | 10/2006 | Palen et al. | |
| 2006/0251360 A1 | 11/2006 | Lu et al. | |
| 2006/0280402 A1 | 12/2006 | Xia et al. | |
| 2006/0280410 A1 | 12/2006 | Fujiwara et al. | |
| 2006/0285797 A1 | 12/2006 | Little | |
| 2007/0103682 A1 | 5/2007 | Yoo | |
| 2007/0160321 A1* | 7/2007 | Wu | G02B 6/12021 |
| | | | 385/24 |
| 2007/0223540 A1 | 9/2007 | Sudmeyer et al. | |
| 2009/0178096 A1 | 7/2009 | Menn et al. | |
| 2009/0262346 A1 | 10/2009 | Egloff et al. | |
| 2009/0297093 A1 | 12/2009 | Webster et al. | |
| 2010/0002987 A1 | 1/2010 | Hata et al. | |
| 2010/0086255 A1 | 4/2010 | Shizaka | |
| 2011/0032598 A1 | 2/2011 | Horikawa et al. | |
| 2011/0091167 A1 | 4/2011 | Nishimura | |
| 2011/0170825 A1 | 7/2011 | Spector et al. | |
| 2011/0280573 A1 | 11/2011 | Collings et al. | |
| 2011/0293281 A1 | 12/2011 | Sakurai | |
| 2012/0002284 A1 | 1/2012 | McColloch et al. | |
| 2012/0063721 A1 | 3/2012 | Chen | |
| 2012/0063729 A1 | 3/2012 | Fujiwara et al. | |
| 2012/0280344 A1 | 11/2012 | Shastri et al. | |
| 2013/0044977 A1 | 2/2013 | Amit | |
| 2013/0109083 A1 | 5/2013 | Llobera Adan | |
| 2013/0129281 A1 | 5/2013 | Son et al. | |
| 2013/0156370 A1 | 6/2013 | Kim et al. | |
| 2013/0182998 A1 | 7/2013 | Andry et al. | |
| 2013/0216180 A1 | 8/2013 | Tan et al. | |
| 2013/0230280 A1 | 9/2013 | Kadar-Kallen | |
| 2013/0343704 A1 | 12/2013 | Doerr | |
| 2014/0023098 A1 | 1/2014 | Clarkson et al. | |
| 2014/0064559 A1 | 3/2014 | Sugasawa et al. | |
| 2014/0176958 A1 | 6/2014 | Flanders et al. | |
| 2014/0203175 A1 | 7/2014 | Kobrinsky et al. | |
| 2014/0226988 A1 | 8/2014 | Shao et al. | |
| 2014/0294342 A1 | 10/2014 | Offrein et al. | |
| 2014/0363165 A1 | 12/2014 | Panotopoulos et al. | |
| 2015/0036704 A1* | 2/2015 | Daiber | H01S 5/02325 |
| | | | 372/20 |
| 2015/0050019 A1* | 2/2015 | Sengupta | G02B 6/4214 |
| | | | 398/44 |
| 2015/0124336 A1 | 5/2015 | Kaufman | |
| 2015/0125110 A1 | 5/2015 | Anderson et al. | |
| 2015/0155423 A1 | 6/2015 | Matsuoka et al. | |
| 2016/0109659 A1 | 4/2016 | Jiang | |
| 2016/0119064 A1* | 4/2016 | Yamaji | H04B 10/40 |
| | | | 385/33 |
| 2016/0131848 A1 | 5/2016 | Svilans | |
| 2016/0161686 A1 | 6/2016 | Li et al. | |
| 2016/0195677 A1 | 7/2016 | Panotopoulos et al. | |
| 2016/0225477 A1 | 8/2016 | Banine et al. | |
| 2016/0246004 A1* | 8/2016 | Kachru | G02B 6/4214 |
| 2016/0306117 A1 | 10/2016 | Middlebrook et al. | |
| 2016/0377821 A1 | 12/2016 | Vallance et al. | |
| 2017/0017042 A1* | 1/2017 | Menard | H01S 5/141 |
| 2017/0017043 A1 | 1/2017 | Menard et al. | |
| 2017/0097470 A1 | 4/2017 | Jiang | |
| 2017/0102503 A1* | 4/2017 | Israel | G02B 6/4259 |
| 2017/0131469 A1 | 5/2017 | Kobrinsky et al. | |
| 2017/0160481 A1 | 6/2017 | Ling et al. | |
| 2017/0207600 A1 | 7/2017 | Klamkin et al. | |
| 2017/0294760 A1 | 10/2017 | Shubin et al. | |
| 2018/0031791 A1 | 2/2018 | Israel et al. | |
| 2018/0045891 A1 | 2/2018 | Israel et al. | |
| 2018/0061691 A1* | 3/2018 | Jain | H01L 22/12 |
| 2018/0180829 A1 | 6/2018 | Gudeman | |
| 2018/0217341 A1 | 8/2018 | Smith et al. | |
| 2018/0259710 A1 | 9/2018 | Stabile et al. | |
| 2018/0364426 A1 | 12/2018 | ten Have et al. | |
| 2019/0146162 A1 | 5/2019 | Evans | |
| 2019/0170937 A1* | 6/2019 | Menezo | G02B 6/12004 |
| 2019/0265421 A1* | 8/2019 | Ji | G02B 6/4214 |
| 2019/0324211 A1* | 10/2019 | Israel | G02B 6/305 |
| 2019/0339450 A1 | 11/2019 | Noriki et al. | |
| 2020/0278508 A1 | 9/2020 | Israel et al. | |
| 2020/0326491 A1 | 10/2020 | Psaila et al. | |
| 2020/0357721 A1 | 11/2020 | Sankman et al. | |
| 2021/0149128 A1* | 5/2021 | Schaevitz | G02B 6/423 |
| 2021/0165165 A1* | 6/2021 | Israel | G02B 6/305 |
| 2021/0239920 A1 | 8/2021 | Vallance et al. | |
| 2021/0263216 A1 | 8/2021 | Bishop et al. | |
| 2021/0392419 A1 | 12/2021 | Meister et al. | |
| 2022/0026649 A1* | 1/2022 | Vallance | G02B 6/32 |
| 2022/0226649 A1 | 7/2022 | Shalev et al. | |
| 2022/0299705 A1* | 9/2022 | Dunphy | G02B 6/1228 |
| 2022/0390693 A1* | 12/2022 | Krähenbühl | G02B 6/30 |
| 2022/0404546 A1 | 12/2022 | Krichevsky et al. | |
| 2023/0018654 A1* | 1/2023 | Winzer | G02B 6/4268 |
| 2023/0021871 A1* | 1/2023 | Kuznia | G02B 6/4249 |
| 2023/0030105 A1* | 2/2023 | Aalto | G02B 6/1228 |
| 2023/0043794 A1* | 2/2023 | Winzer | G02B 6/0085 |
| 2023/0072926 A1* | 3/2023 | Morrison | G02B 6/4202 |
| 2023/0077979 A1* | 3/2023 | Winzer | H04B 10/801 |
| | | | 398/116 |
| 2023/0079458 A1* | 3/2023 | Debergh | A24F 40/51 |
| | | | 131/328 |
| 2023/0084003 A1* | 3/2023 | Taha | G02B 6/4214 |
| | | | 385/31 |
| 2023/0094780 A1 | 3/2023 | Testa et al. | |
| 2023/0130045 A1 | 4/2023 | Taha et al. | |
| 2023/0204876 A1* | 6/2023 | Krichevsky | G02B 6/4207 |
| | | | 385/14 |
| 2023/0288705 A1* | 9/2023 | Wang | G02B 5/1842 |

FOREIGN PATENT DOCUMENTS

| | | |
|---|---|---|
| CN | 104459890 A | 3/2015 |
| EP | 2639978 A1 | 9/2013 |
| EP | 3316012 A1 | 5/2018 |
| EP | 3495861 A1 | 6/2019 |
| EP | 3521879 A1 | 8/2019 |
| EP | 4102273 A1 | 12/2022 |
| JP | 6462596 B2 | 1/2019 |
| KR | 20050007459 A | 1/2005 |
| KR | 20170081265 A | 7/2017 |
| RU | 2438209 C1 | 12/2011 |
| RU | 2485688 C2 | 6/2013 |
| RU | 2577669 C2 | 3/2016 |
| WO | 0039620 A2 | 7/2000 |
| WO | 2001067497 A1 | 9/2001 |
| WO | 2013048730 A1 | 4/2013 |
| WO | 2018002675 A1 | 1/2018 |
| WO | 2018067703 A1 | 4/2018 |
| WO | 2018140057 A1 | 8/2018 |

OTHER PUBLICATIONS

International Search Report and Written Opinion of International Searching Authority for PCT/IB2021/062224,ISA/IL, Jerusalem, Israel, dated Mar. 17, 2022.
Tom Mitcheltree and Stephen Hardy. "Optical Connectivity Considerations for Co-Packaged Optics". Time Stamp: 23:42. May 6, 2021. https://event.webcasts.com/viewer/event.jsp?ei=1459224&tp_key=61326889cd.
Usconec. "13950, Ferrule, Prizm® LT 12F MM" https://www.usconec.com/products/ferrule-prizm-lt-12f-mm.
Usconec. "15214, Mechanical Optical Interface (MOI) 10+ Gbps, Prizm® LightTurn®". https://www.usconec.com/products/mechanical-optical-interface-moi-10plus-gbps-prizm-lightturn.
Usconec. "15215, Prizm® LightTurn® Mini HOusing" https://www.usconec.com/products/prizm-lightturn-mini-housing.
Usconec. "16349, Ferrule, Prizm® LT 8F SM" https://www.usconec.com/products/ferrule-prizm-lt-8f-sm.
Usconec. "Product Catalog" pp. 69 and 70. https://www.usconec.com/umbraco/rhythm/protectedfilesapi/download?path=%2ffiles%2fLiterature%2fUS_Conec_Product_catalog.pdf.

(56) References Cited

OTHER PUBLICATIONS

Usconec. Mechanical Optical Interface Customer Drawings. https://www.usconec.com/umbraco/rhythm/protectedfilesapi/download?path=%2ffiles%2fdrawings%2fC15214.pdf.
Barwicz, et al., "Assembly of Mechanically Compliant Interfaces Between Optical Fibers and Nanophotonic Chips", IEEE 64th Electronics Components and Technology Conference, Orlando, Fl., May 27-30, 2014.
Bogaerts, "Helios Lecture: Coupling Light to Silicon Photonic Circuits", Silicon Photonics—PhD Course prepared within FP7-224312 Helios Project, Ghent University—IMECGhent, Belgium, Nov. 2009.
Camapa, CD-ROM, pp. 58, 59, 79, Russia, 2012.
Chrical Photonics., "Fiber Coupler Overview", Pinebrook, NJ, Jan. 2013.
Cunningham, et al., "Aligning Chips Face-to-Face for Dense Capacitive and Optical Communications", IEEE Transactions on Advanced Packaging, vol. 33, No. 2, May 2010.
First Chinese Foreign Office Action for Chinese Application No. 201980025948.3, Chinese National Intellectual Property Administration (CNIPA), Beijing City, China, dated Nov. 15, 2021.
Foreign Office Action and Search Report for ROC (Taiwan) Patent Application No. 105121625 dated Sep. 5, 2017 from IPO (Intellectual Property Office) of Taiwan.
Hou, et al., "Physics of Elliptical Reflectors at Large Reflection and Divergence Angles I: Their Design for Nano-Photonic Integrated Circuits and Application to Low-loss Low-crosstalk Waveguide Crossing", Northwestern University, Evanston, IL., Apr. 2012.
International Search Report and Written Opinion of Internationl Searching Authority for PCT/US2019/027871, ISA/RU, Moscow, Russia, dated Aug. 22, 2019.
Kopp, et al., "Silicon Photonic Circuits: On-CMOS Integration, Fiber Optical Coupling, and Packaging", IEEE Journal of Selected Topics in Quantum Electronics, Aug. 2010.
Kurata, et. al., "Prospect of Chip Scale Silicon Photonics Transceiver for High Density Multi-mode Wiring System", Photonics Electronics Technology Research Association (PETRA), Japan, 2015, pp. 1-7.
Nguyen, et al., "Silicon-based Highly-efficient Fiber-to-waveguide Coupler for High Index Contrast Systems", Applied Physics Letters, American Institute of Physics, downloaded Feb. 29, 2012, published online Feb. 24, 2006.
Notice of Deficiencies for EP Application No. 16854021.9 dated Jun. 24, 2019, EPO, Rijswijk, Netherlands.
O'Brien, "Silicon Photonics Fiber Packaging Technology", Photonics Packaging Group, Tyndall National Institute, Cork, Ireland, Sep. 2012.
PCL Connections LLC, all rights reserved, "In-Line Coupling Element (ICE) for Bonded Grating Coupling to Silicon PICs", Columbus, OH., May 2013.
The European Search Report for EP Application No. 16854021.9 dated Aug. 21, 2018, EPO, The Hague.
The First Chinese Office Action for Chinese Patent Application No. 2016800557192, dated Aug. 22, 2019, China, CNIPA.
The International Search Report and The Written Opinion for PCT/US2016/038047, ISA/RU, Moscow, Russia, dated Oct. 13, 2016.
The International Search Report and The Written Opinion for PCT/US2017/055146, ISA/RU, Moscow, Russia, dated Jan. 31, 2018.
Zimmerman, "State of the Art and Trends in Silicon Photonics Packaging", Silicon Photonics Workshop, Technische Universitat Berlin, May 2011.
Second Chinese Foreign Office Action for Chinese Application No. 2019800259483, Chinese National Intellectual Property Administration (CNIPA), Beijing City, China, dated May 31, 2022.
Noriki et al., "45-degree curved micro-mirror for vertical optical I/O of silicon photonics chip," Optics Express, vol. 27, No. 14, Dated: Jul. 8, 2019.
The International Search Report and the Written Opinion for PCT Application No. PCT/IL2022/051131, ISA/IL dated Jan. 12, 2023.
Miller, David "Self-aligning optics for integrated mode separation," Standfor University, IEEE 2015.
Francis, David G. "Laser Instrumentation in AEDC Test Facilities," Arnold Engineering Development Center, Dec. 1971.
McLaughlin, Dennis K. "Laser Doppler Velocmeter Measurements in a Turbulent Jet Exiting into a Cross Flow," Arnold Engineering Development Center, Jan. 1972.
The International Search Report and the Written Opinion for PCT Application No. PCT/IL2022/051360, ISA/IL dated Mar. 5, 2023.
The International Search Report and the Written Opinion for PCT Application No. PCT/IL2022/051358, ISA/IL dated Apr. 2, 2023.
Doerr et al. Silicon photonic integrated circuit for coupling to a ring-core multimode fiber for space-division mutliplexing. Bell Laboratories. ECOC Postdeadline Papers. 2011 OSA. (Year: 2011).
The International Search Report and the Written Opinion for PCT Application No. PCT/IL2023/051163, ISA/IL dated Jan. 11, 2024.
Office Action dated Jun. 9, 2025 for CN App No. 202211580719.8.
EP Search Report dated Jul. 29, 2025 for EP App. 22886316.3.
Nov. 21, 2025—Chinese Notice of Allowance—CN App. 202211580719.8.
Wu, YF and Cheng, YJ, "Conical Conformal Shaped-Beam Substrate-Integrated Waveguide Slot Array Antenna With Conical-to-Cylindrical Transition," IEEE Transactions on Antennas and Propagation, vol. 65, No. 8, pp. 4048-4056, Aug. 2017, doi: 10.1109/TAP.2017.2716404.

\* cited by examiner

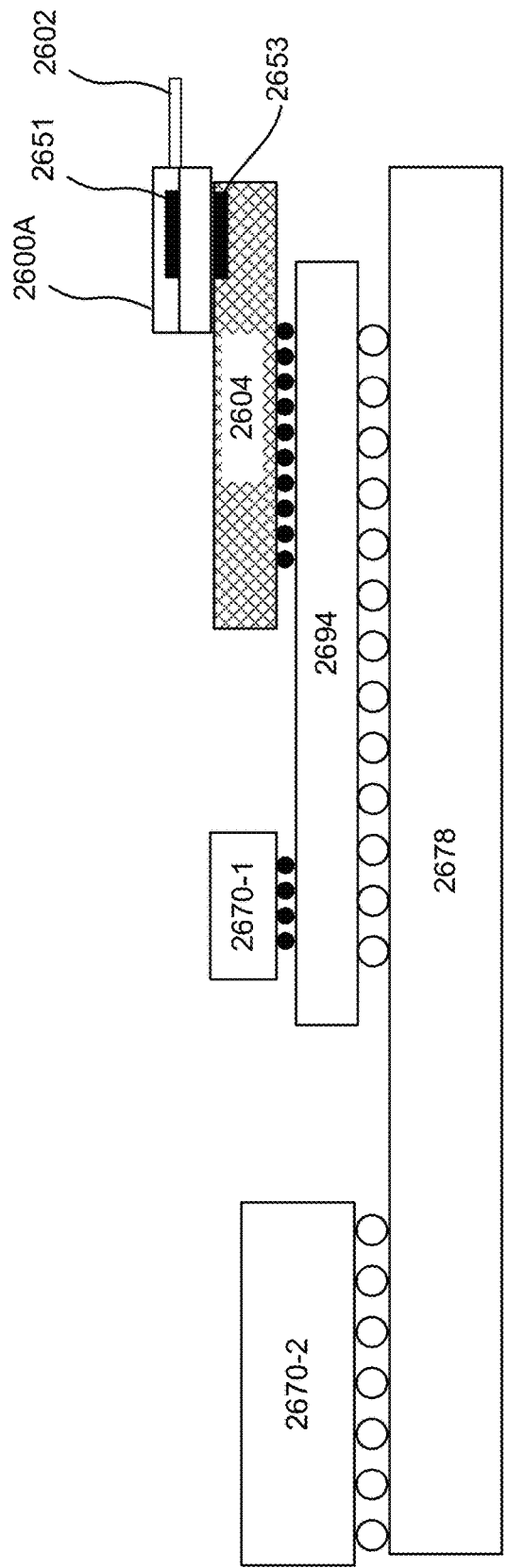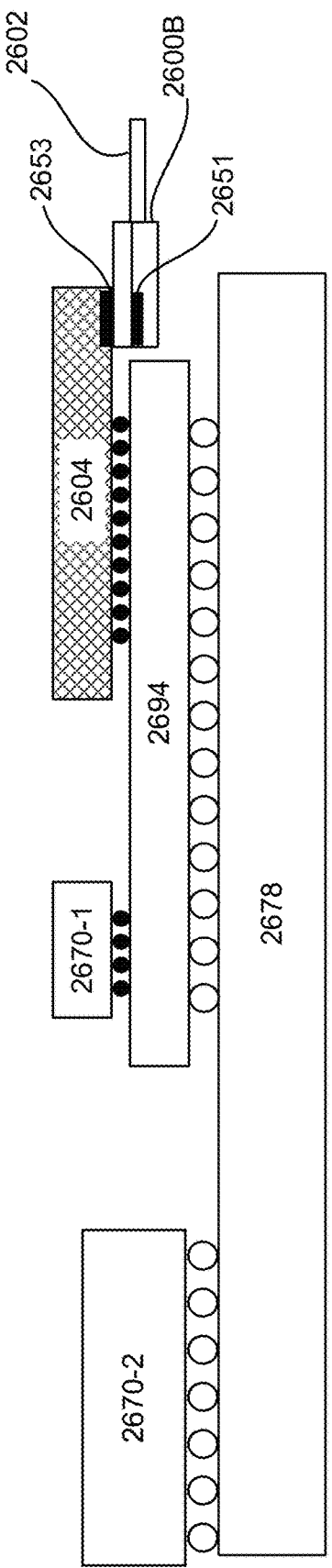
FIG. 26A
FIG. 26B

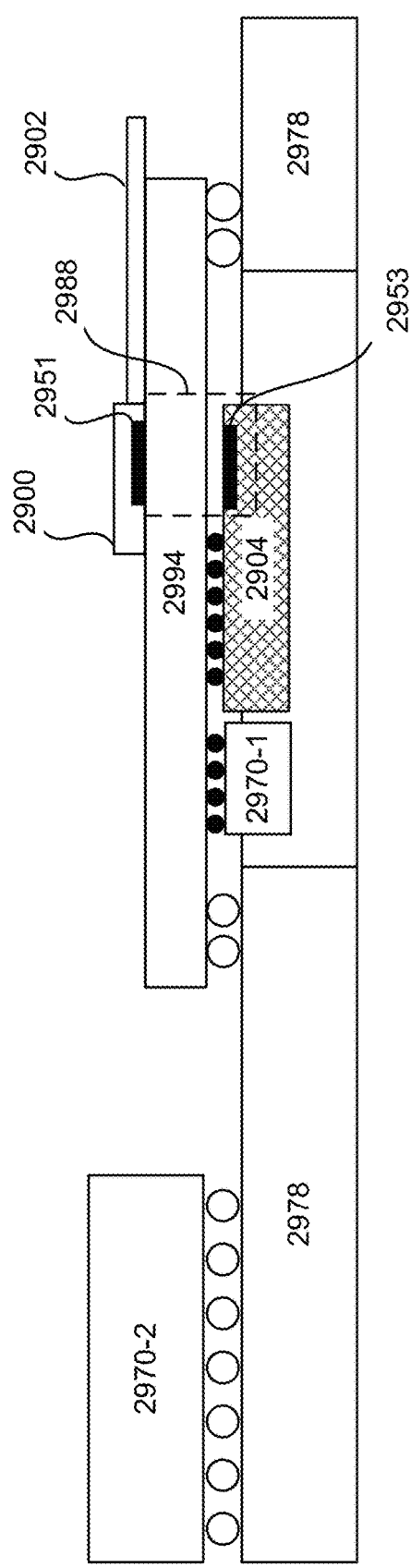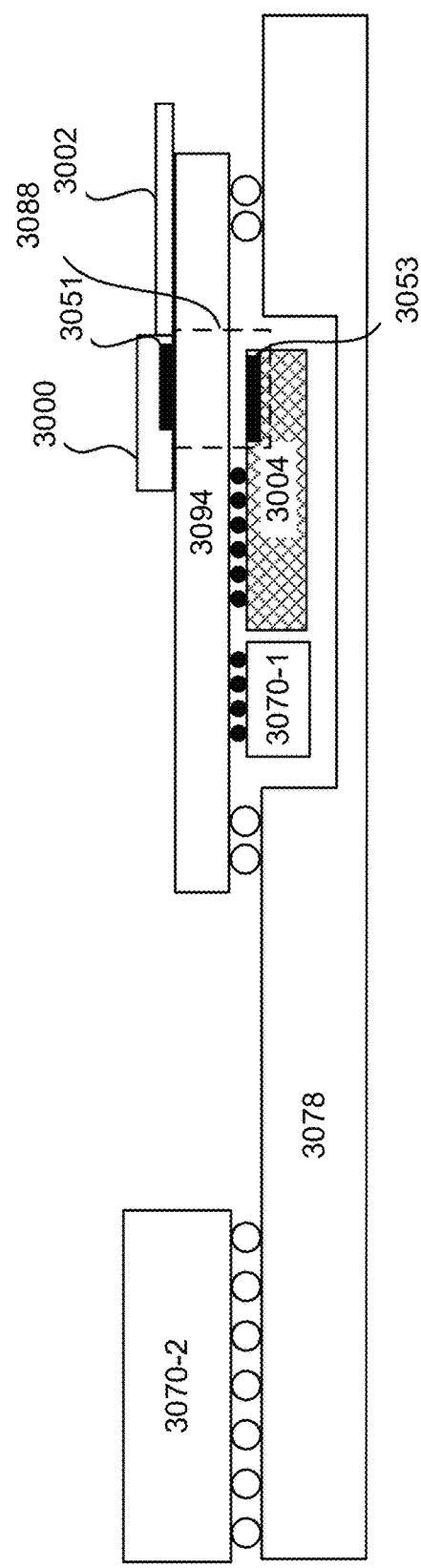

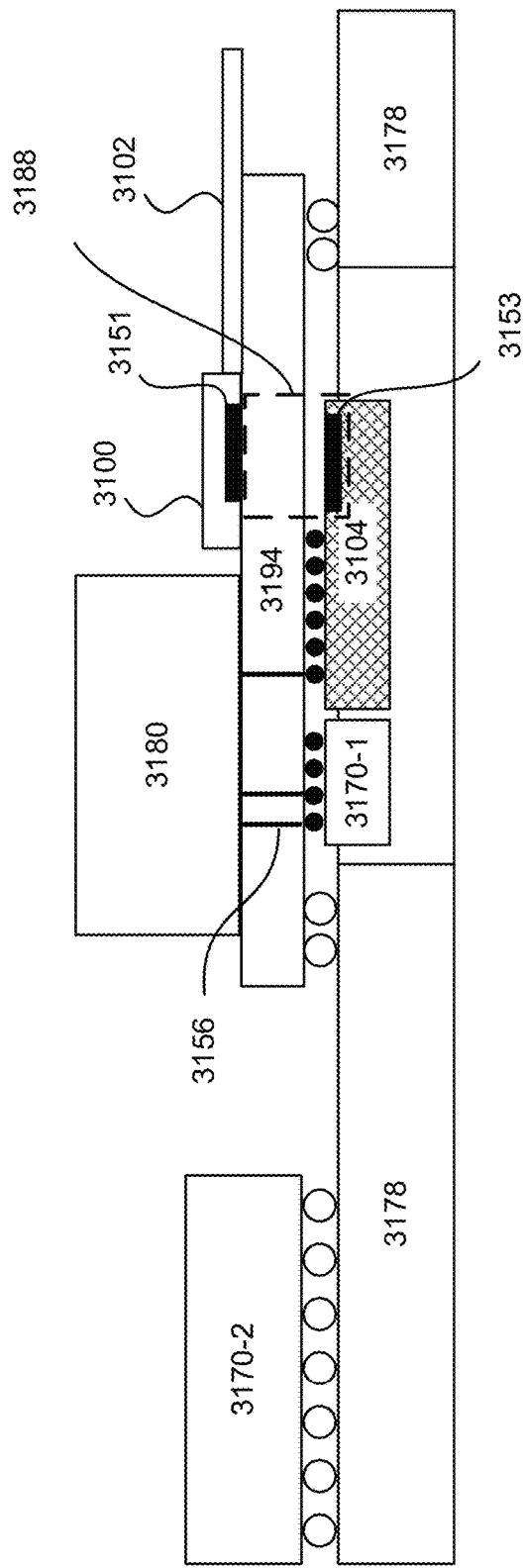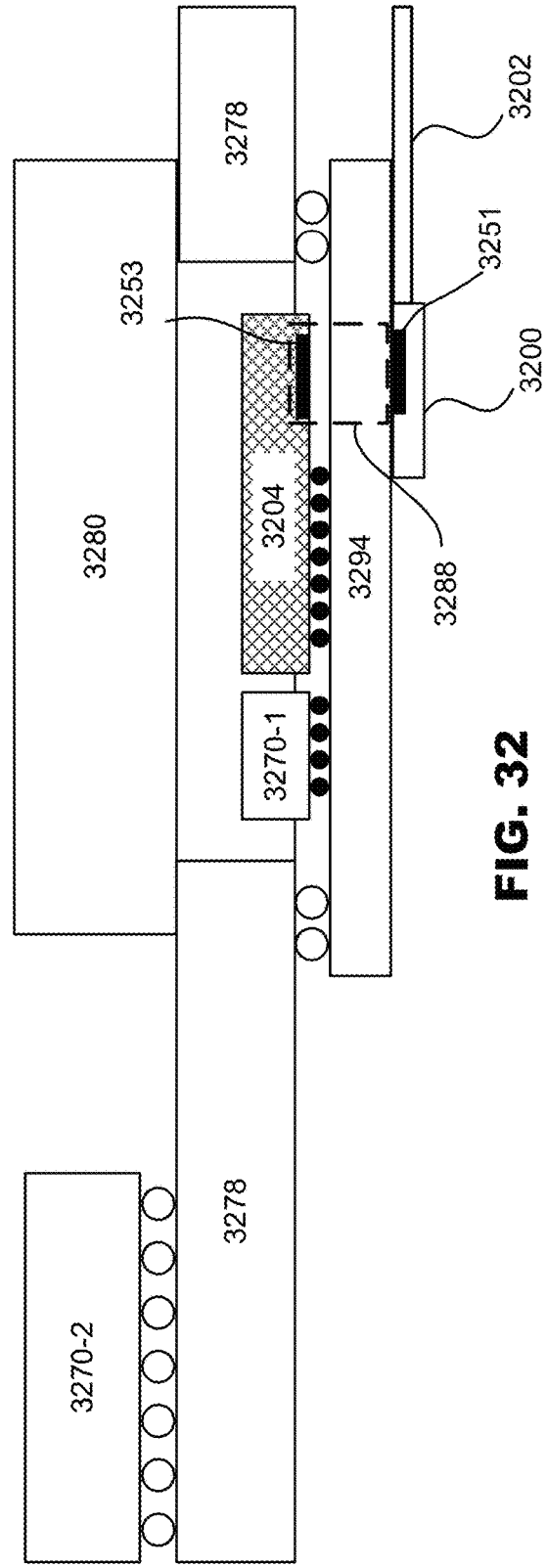

OPTICAL COUPLING

CROSS-REFERENCE TO RELATED APPLICATIONS

The present Application is a continuation of U.S. application Ser. No. 17/989,303, filed on Nov. 17, 2022, which is a continuation-in-part of U.S. application Ser. No. 17/674,319, filed on Feb. 17, 2022, which is a reissue application of U.S. application Ser. No. 15/724,966, filed on Oct. 4, 2017, which issued as U.S. Pat. No. 10,564,374, which claims priority from U.S. Provisional Application No. 62/405,476, filed on Oct. 7, 2016, U.S. application Ser. No. 15/724,966 is also a continuation-in-part of U.S. application Ser. No. 14/878,591, filed on Oct. 8, 2015, which issued as U.S. Pat. No. 9,804,334; U.S. application Ser. No. 17/989,303 is also a continuation-in-part of U.S. application Ser. No. 17/645,667, filed on Dec. 22, 2021; U.S. application Ser. No. 17/989,303 is also a continuation-in-part of U.S. application Ser. No. 17/645,673, filed on Dec. 22, 2021; U.S. application Ser. No. 17/989,303 is also a continuation-in-part of U.S. application Ser. No. 17/512,200, filed on Oct. 27, 2021; U.S. application Ser. No. 17/989,303 is also a continuation-in-part of U.S. application Ser. No. 17/120,816, filed on Dec. 14, 2020, which is a continuation of U.S. application Ser. No. 16/386,859, filed on Apr. 17, 2019, which issued as U.S. Pat. No. 10,866,363, which claims priority from U.S. Provisional Application No. 62/659,376, filed on Apr. 18, 2018, U.S. application Ser. No. 16/386,859 is also a continuation-in-part of U.S. application Ser. No. 15/797,792, filed on Oct. 30, 2017, which issued as U.S. Pat. No. 10,481,334, which is a continuation of U.S. application Ser. No. 14/878,591, filed on Oct. 8, 2015, which issued as U.S. Pat. No. 9,804,334; U.S. application Ser. No. 17/989,303 is also a continuation-in-part of U.S. application Ser. No. 16/814,401, filed on Mar. 10, 2020, which claims priority from U.S. Provisional Application No. 62/795,837, filed on Jan. 23, 2019; U.S. application Ser. No. 17/989,303 is also a continuation-in-part of U.S. application Ser. No. 16/801,682, filed on Feb. 26, 2020, which claims priority from U.S. Provisional Application No. 62/811,840, filed on Feb. 28, 2019. The contents of each of the above-referenced applications are incorporated herein by reference in their entirety for all purposes.

FIELD

Aspects described herein generally relate to optical coupling, electro-optical integration, and optical and electro-optical packaging. More specifically, one or more aspects describe herein describe optical coupling, electro-optical integration, and optical and electro-optical packaging.

BACKGROUND

Modern infrastructure relies on data, and data is ever increasing. Similarly ever increasing are the demands for improved data transfer speeds and reduced energy consumption. Optics offers an alluring solution with possible increased speed and possible decreased energy consumption. However, challenges remain when coupling optical signals, and integrating optical components with electrical components. Thus, improved solutions to the above and other problems relating to optics are desired.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards improved methods, apparatuses and systems for optical coupling and electro-optical integration. Particularly, challenges remain with coupling optical components. For example, many optical coupling schemes rely on tedious side coupling, for example, highly accurately aligning an optical fiber with another fiber or optical component. Thus, much of the accuracy required depends on the accurate assembly.

Accordingly, aspects of the present disclosure relate to "self-aligning" optical surface coupling. The surface coupling scheme of the present disclosure may be achieved with a novel mirror arrangement as described more fully herein. Additionally, utilizing aspects of the novel mirror arrangement, the optical components being coupled may be arranged in different planes. Advantages of the present disclosure are numerous and described herein below in more detail. For example, some advantages relate to transferring the accuracy and tolerance requirements from the assembly domain to the production domain where it is significantly more easily achieved. Further, the accuracy and tolerance requirements in the assembly phase may be significantly reduced. Additionally, utilizing aspects of the present disclosure, numerous novel coupling configurations, optical packaging, and electro-optical packaging may be realized.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features (e.g., numbers that end in the same two digits may indicate like features) and/or like named features may indicate like features, and wherein:

FIGS. 26A-26B depict example electro-optical packages according to one or more aspects of the present disclosure.

FIG. 29 depicts a side view of an example alternative configuration of an electro-optical package with a slotted package substrate according to one or more aspects of the present disclosure.

FIG. 30 depicts an example electro-optical package with a partially slotted package substrate according to one or more aspects of the present disclosure.

FIG. 31 depicts an example electro-optical package with a slotted package substrate according to one or more aspects of the present disclosure.

FIG. 32 depicts an example electro-optical package with a slotted package substrate 3278 according to one or more aspects of the present disclosure.

DETAILED DESCRIPTION

Figure 1:
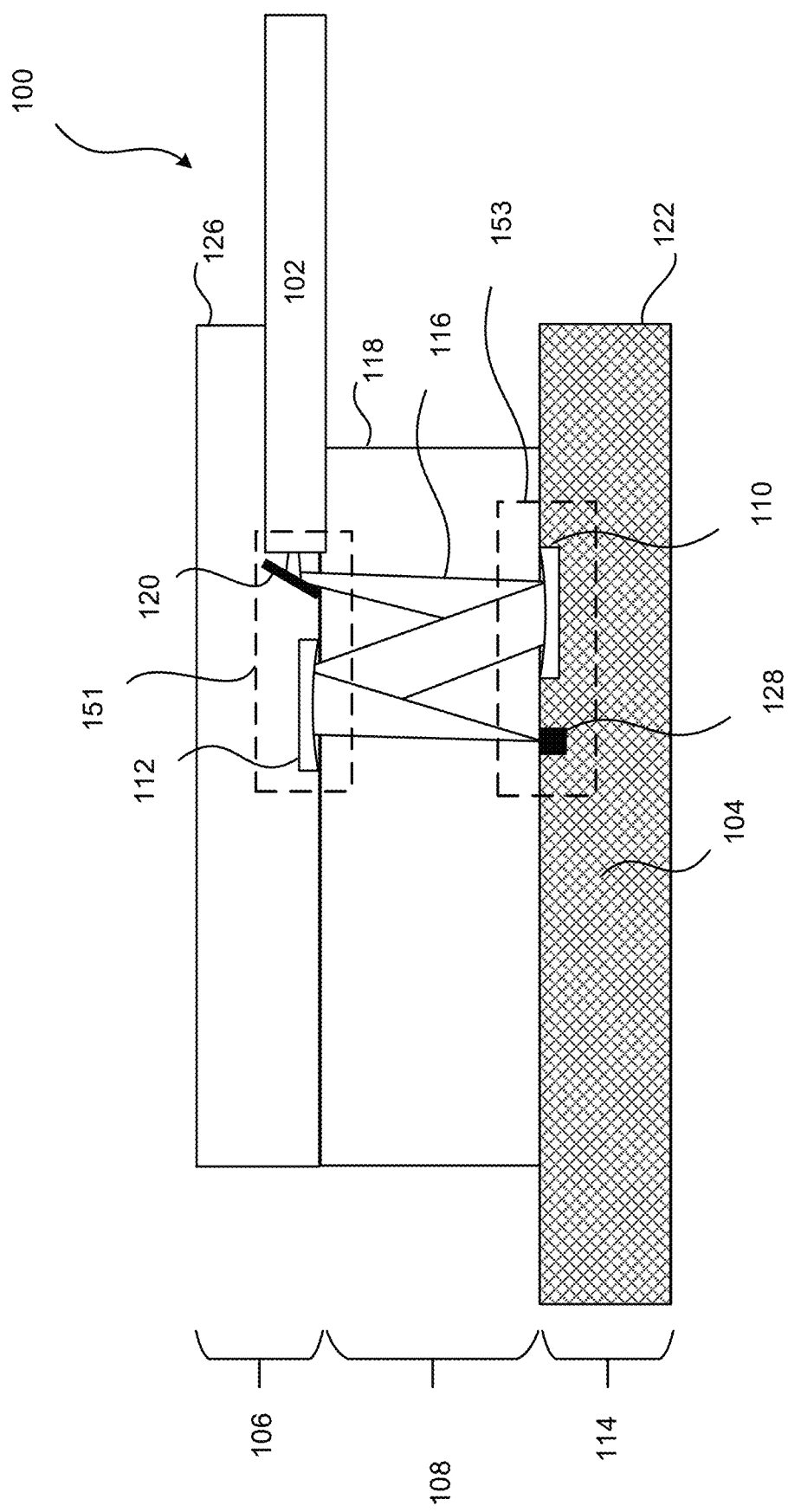
FIG. 1 depicts an example optical coupler according to one or more aspects of the present disclosure.

The accompanying drawings, which form a part hereof, show examples of the disclosure. It is to be understood that the examples shown in the drawings and/or discussed herein are non-exclusive and that there are other examples of how the disclosure may be practiced. It is to be understood that structural and functional modifications may be made without departing from the scope described herein.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

According to aspects of the present disclosure, the optical couplers disclosed herein may be used and configured to optically connect two or more optical components. Additionally, the optical couplers of the present disclosure may facilitate electrical connection of electrical components, photonic components, and/or optoelectrical components. Optical components may comprise, for example, optical only components, optical-electrical components, photonic components, etc. Optical couplers may couple a light beam, referred to herein as beam, light beam, signal, an optical signal, signal beam, etc., between a source optical component and a drain optical component (e.g., destination, or target, etc.). As will be appreciated from the present disclosure, optical signals may propagate through the coupler in multiple directions. As such a source optical component in one application may be the drain optical component in a subsequent application. Thus, unless expressly stated otherwise, it is to be assumed that every optical connection described in the present disclosure may operate in the reverse from that which is expressly stated. Similarly, unless expressly stated otherwise, a component described as an "optical source component" may be the "optical drain component" in a reversed connection direction, and vice versa. Thus, unless expressly stated otherwise herein, optical source components and optical drain components may be referred to as optical source/drain components.

Examples of optical components, which may act as and/or be configured similarly to source/drain optical components, may comprise, but are not limited to, optical waveguides, optical fibers (e.g., any type of optical fiber), grating couplers, photonic integrated circuits (PICs), lasers, mirrors, amplifiers, multiplexers, demultiplexers, splitters, mode adapters, etc. For example, according to aspects of the present disclosure, an optical coupler may be configured and implemented to optically connect one or more optical fibers (e.g., optical components) to a photonic integrated circuit (PIC) (e.g., integrated optical circuit optical component). The PIC may be optically and/or electrically coupled to further components (e.g., electrical circuits, optical circuits, etc.) as will be described in more detail herein. According to aspects where an optical coupler couples a PIC to an optical fiber, both the PIC and the optical fiber may be the source optical component or the drain optical component.

Many advantages of the present disclosure may be appreciated. For example, aspects of the present disclosure may take advantage of optical elements (e.g., turning mirrors, curved mirrors, etc.) to perform optical signal manipulation and facilitate optical connection of optical components. Aspects of the present disclosure may enable high volume packaging of photonic devices. Additionally, aspects of the present disclosure may allow for simplified assembly optical connection of a large number of optical components (e.g., optical fibers and PICs). Utilizing aspects of the present disclosure, the efficient integration of optical and electrical components may additionally be realized.

Further still, aspects of the present disclosure may take advantage of the optical scheme herein to enable large assembly tolerances when connecting optical components. The optical scheme may take advantage of wafer level processes for accurate placement of optical elements on separate planes. Such processes may relax the assembly tolerance for optical systems. Further still, aspects of the present disclosure allow for optical surface coupling and/or optical interconnection of components that are out of plane with one another, further realizing relaxed assembly tolerances and enabling great configurability. Further still, some aspects of the present disclosure may be fabricated at volume that may leverage existing ecosystems and workflows, for example, using complementary metal-oxide-semiconductor (CMOS) processes, silicon-on-insulator (SOI) processes, nanoimprint lithography (NIL), grayscale lithography, hot embossing, photoresist additive manufacturing, etc. In addition to front-end processes, aspects of the present disclosure may benefit from improved back-end processes (e.g., improved wafer level testing). The above advantages, and more, may be appreciated and further discussed in context hereinbelow.

FIG. 1 depicts an example optical coupler 100 according to one or more aspects of the present disclosure. Referring to FIG. 1, optical coupler 100 may optically couple an optical fiber 102 (e.g., optical source/drain component) and a PIC 104 (e.g., optical source/drain component) (PIC as described herein may be understood as a standalone photonic integrated circuit or as a chiplet, and may comprise an optical engine, an optical engine and a PIC, and/or an optical engine and/or a PIC packaged with additional components (e.g., package substrates, electrical components, optical components, etc.)). Such an arrangement may be considered a fiber-to-chip optical connection. As will be appreciated by persons of ordinary skill, optical coupler 100 may be configured to optically couple various optical components, for example, fiber-to-fiber, and chip-to-chip, and other connections that will be understood from the present disclosure.

Referring to FIG. 1, as an overview, the optical coupler 100 may comprise Photonic Plug layer 106, spacer layer 108, PIC layer 114, and one or more mirrors that may comprise one or more of first curved mirror 110, second curved mirror 112, first turning mirror 120. According to aspects, optical coupler 100 may comprise one or more additional components and/or layers, and one or more depicted components and/or layers may be omitted from optical coupler 100. The description of "layers" in the preset disclosure is meant for purposes of illustration only in order to more readily understand aspects and benefits of the present disclosure. It should be understood that an optical coupler described herein, or optical interconnection scheme described herein, may comprise one or more additional "layers." Additionally, one or more of the described "layers" may be omitted. For example, the optical coupler may only comprise PhotonicPlug layer 106 and spacer layer 108.

Further still, any illustrated "layer" may comprise any number of substrates as will be understood from the present disclosure. "PhotonicPlug" may be referred to herein as a Photonic Plug, PP, photonic plug, or similar.

Referring to FIG. 1, optical signal 116 may enter and exit the optical coupler 100 via optical fiber 102 (e.g., optical source/drain component). Optical fiber 102 may be coupled with the PhotonicPlug layer 106. As will become clear from the present disclosure, optical fiber 102 may be coupled to PhotonicPlug layer 106. Accordingly, optical signal 116 may propagate through the optical coupler 100 between the optical fiber 102 and the PIC 104. Optical signal 116 may propagate through the optical coupler 100 from the optical source (e.g., optical fiber 102) to the optical drain (e.g., PIC 104), via the series of mirrors (e.g., reflectors). One or more mirrors may be comprised in the PhotonicPlug layer 106. Referring to FIG. 1 second curved mirror 112 may be fabricated on, added to, manufactured in, or otherwise integrated with PhotonicPlug layer 106. Optical fiber 102, and other optical components, may be variously coupled to, and retained in or on PhotonicPlug layer 106. According to further aspects, optical source/drain components (e.g., optical fiber 102) may not be attached to the optical coupler at PhotonicPlug layer 106 but at a different layer or component (e.g., attached to spacer 118, PIC layer 114). Additional details and aspects of the PhotonicPlug layer 106 will be described herein below.

Optical coupler 100 may comprise spacer layer 108 between first curved mirror 110 and second curved mirror 112. Spacer layer 108 may operate and/or be configured to suitably space the first curved mirror 110 from the second curved mirror 112 according to design considerations (e.g., desired vertical distance between first curved mirror 110 and second curved mirror 112). Spacer layer 108 may comprise one or more substrates. Spacer layer 108 may comprise, for example, one or more of the substrate spacer 118. Spacer 118 may comprise and/or be comprised of a material that is substantially transparent to the wavelength of the optical signal, and may be substantially non-conductive such that optical signals may propagate through spacer 118 with sufficient lack of attenuation. Spacer 118 may be fabricated from, for example, glass, polydimethylsiloxane, epoxy, resin, silicon, or any material with a suitable index of refraction as would be understood by persons of ordinary skill in the art. According to other aspects, spacer layer 108 may be an empty space (e.g., an air gap between first curved mirror 110 and second curved mirror 112). According to such aspects, additional features may be used to appropriately space first curved mirror 110 from second curved mirror 112 (as described in more detail herein). According to yet further aspects, spacer layer 108 may comprise spacer 118 in conjunction with an air gap as will be understood from the present disclosure. Spacer layer 108 may additionally comprise an interposer spacer that may further act as and/or be configured similarly to a passive electrical component to facilitate various electrical and optical connections between various circuits and components as will be described in more detail herein. While spacer 118 is depicted in FIG. 1 as being formed of one substrate, spacer layer 108 may comprise any number of substrates. The spacer layer 108 and/or spacer substrate 118 may act as and/or be configured as an encapsulant which may assist in protecting optical elements and/or components herein (e.g., first curved mirror 110, second curve mirror 112, first turning mirror 120, and/or optical fiber 102). Additional details and aspects of the spacer 118 and/or spacer layer 108 are described hereinbelow.

Optical coupler 100 may couple an optical signal 116 between an optical source component and an optical drain component. Such components may comprise, for example, optical fiber 102 (e.g., optical source/drain component) and PIC 104 (e.g., optical source/drain component). The PIC 104 may be comprised in PIC layer 114. PIC layer 114 may comprise a single substrate or any number of substrates as will be described herein. For example, PIC layer 114 may comprise PIC substrate 122. PIC substrate 122 may be fabricated from and/or comprise, for example, a silicon photonic (SiPh) chip. Additionally or alternatively, PIC substrate 122 may be fabricated from and/or comprise, for example, silicon, silica, lithium niobite, indium phosphide (InP), silicon nitride ($Si_3N_4$), or any other material suitable to fabricate photonic circuits. PIC 104 may be fabricated in PIC substrate 122. Alternatively, PIC 104 may be added as an additional component to PIC substrate 122 and/or one or more additional substrates of PIC layer 114. According to aspects, as will be understood herein, PIC layer 114 may comprise any number of substrates. PIC 104 may comprise PIC I/O interface 128 (described in more detail herein) interface and, optionally manipulate, received and/or transmitted optical signals with PIC 104. Accordingly PIC 104 (via, for example, PIC I/O interface 128) may act as and/or be configured similarly to an optical source and/or an optical drain component.

PIC layer 114 may comprise one or more additional components or elements. Accordingly, first curved mirror 110 may be fabricated on, added to, manufactured in, or otherwise integrated with PIC 104. First curved mirror 110 may be integrated with PIC layer 114 in numerous different manners as described in more detail herein. According to aspects, PIC layer 114 may be viewed as a component that is separate from the optical coupler, and to which an optical coupler may be coupled. According to such aspects, optical coupler (comprising, e.g., PhotonicPlug layer 106 and spacer layer 108) may be added to an existing PIC 104 and/or PIC layer 114 to facilitate optical connection between an optical component attached to the optical coupler (e.g., an optical fiber at the PhotonicPlug layer) and the separate PIC layer 114. According to such aspects and other aspects described herein, optical elements (e.g., first curved mirror 110) may be added to an existing PIC layer 114 to facilitate optical connection to/from the PIC 104 (in PIC layer 114) according to the schemes of the present disclosure. Alternatively, PIC layer 114 may be understood as a part of the optical coupler 100. Additional details and aspects of the PIC layer 114 and PIC 104 are described herein.

As briefly described, referring to FIG. 1, optical coupler 100 may use one or more mirrors to couple optical signals 116 between an optical source component and an optical drain component. Accordingly, optical coupler 100 may comprise first curved mirror 110 and second curved mirror 112. According to aspects, curved mirrors 110 and 112 may be considered, for example concave mirrors. The curved mirrors 110 and 112, arranged according to the present disclosure, may facilitate the advantageous optical interconnection schemes described herein. Curved mirrors (e.g., first curved mirror 110 and second curved mirror 112) may provide multiple functions. The curved mirrors 110 and 112 may manipulate (e.g., collimate, parallelize, redirect, and/or focus) optical signal 116. The curved mirrors 110 and 112 may additionally reflect direct, and/or redirect the manipulated optical signal 116 through the optical coupler 100. For example, referring to FIG. 1, assuming the optical signal 116 propagates in the direction from first curved mirror 110 to second curved mirror 112, optical signal 116 may be incident on first curved mirror 110 where first curved mirror 110 may receive optical signal from the optical source. The first curved mirror 110 may receive the optical signal 116, substantially collimate (e.g., substantially parallelize) the optical signal, and reflect the substantially collimated optical signal in the direction of the second curved mirror 112. Alternatively, in some configurations the first curved mirror 110 may not collimate the optical signal 116. In such configurations, the first curved mirror 110 may otherwise manipulate the optical signal 116 (e.g., redirect the optical signal). The second curved mirror 112 may receive the optical signal 116, may substantially focus the optical signal 116, and reflect the substantially focusing optical signal toward the optical drain.

As will be appreciated from the present disclosure, additional mirrors may be used in an optical coupler to facilitate the optical interconnection between source and drain. Referring to FIG. 1, optical coupler may further comprise first turning mirror 120. First turning mirror 120 may interface the optical signal 116 with the remainder of the optical coupler 100. For example, first turning mirror 120 may relay, or receive and reflect the optical signal 116 from the optical fiber 102 toward the first curved mirror 110. Thus, as is described in more detail herein, the first turning mirror 120 may allow for various placement and alignment of the optical fiber 102 (e.g., parallel to PhotonicPlug layer surface) with respect to the rest of the optical coupler 100 and optical components. First turning mirror 120 may be configured as a substantially flat mirror. First turning mirror 120 may be variously angled with respects to the optical source (e.g., optical fiber 102) to turn, direct, and/or re-direct optical signal 116. According to additional aspects, the first turning mirror 120 may also be a curved mirror, to variously manipulate optical signals in an optical coupler (e.g., to achieve optical signal mode size conversion). Additional details and aspects of the first turning mirror 120 are described herein.

Some of optical interconnection schemes of the present disclosure are illustrated and described with respect to mirrors only. However, it will be understood by persons of ordinary skill in the art, that the optical interconnection schemes herein may be practiced with alternative optical elements. For example, instead of one or more of the curved mirrors, the present scheme may be practiced with a combination of lenses and mirrors. For example, in place of first curved mirror 110 and/or second curved mirror 112, lenses may be paired with flat mirrors to achieve a similar interconnection scheme (as described in more detail herein). Additionally, the term "mirror" is used to describe a reflective surface that may reflect at least some wavelengths of light. The term "mirror" may be understood to comprise reflector, reflective surface, diffractive lensing mirror, etc., or the like.

Figure 2:
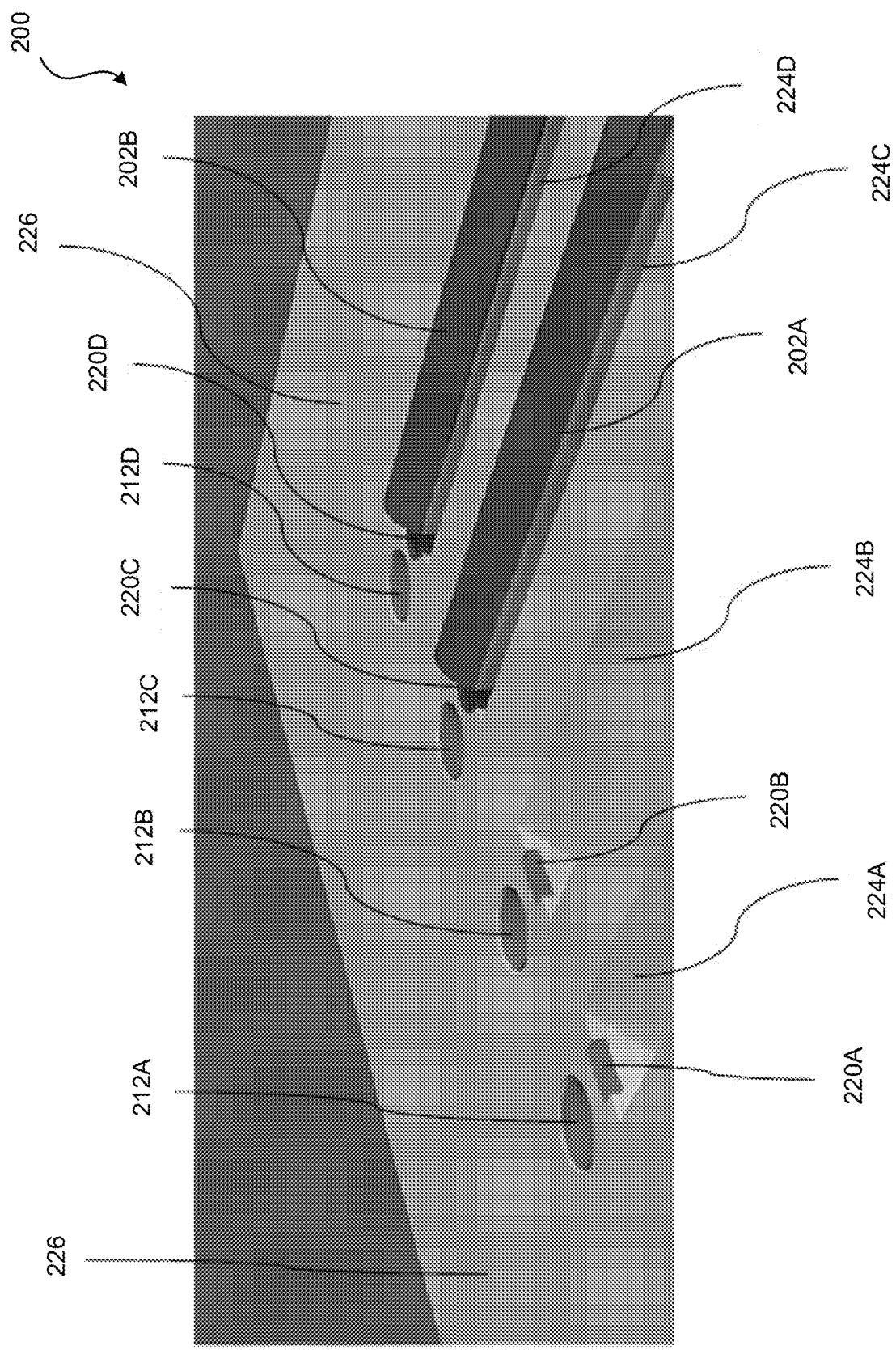
FIG. 2 is a perspective view of an example PhotonicPlug layer comprising receiving features to accommodate a plurality of optical fibers according to one or more aspects of the present disclosure.

It should be understood that, although a some of the FIGS. are illustrated in two dimensions (e.g., a two dimensional-cross section), and therefore only depict a cross-section of single optical fiber, aspects of the present disclosure may be practiced with numerous optical fibers per single optical coupler. FIG. 2 is a perspective view of an example PhotonicPlug substrate 226 comprising receiving features 224A-224D (generally receiving feature 224) to accommodate a plurality of optical fibers 202 (e.g., optical fiber 202A and optical fiber 202B) according to one or more aspects of the present disclosure. Referring to FIG. 2, PhotonicPlug substrate 226 may comprise a plurality of receiving features 224 for a plurality of optical fibers 202 (e.g., to receive an optical fiber ribbon). Similarly, PhotonicPlug substrate 226 may comprise a plurality of first turning mirrors 220A-220D (generally first turning mirror 220), one for each, or some, of the optical fiber connections. Similarly, the PhotonicPlug substrate 226 may comprise a plurality of second curved mirrors 212A-212D (generally second curved mirror 212) for each, or some, of optical fiber connections. While FIG. 2 depicts the receiving features 224, the first turning mirrors 220, and second curved mirrors 212 as being integrated within a single substrate (e.g., PhotonicPlug substrate 226), these features may be incorporated in any combination of different substrates. While FIG. 2, shows an example of a portion of an optical coupler comprising four receiving features 224, optical couplers are contemplated herein to comprise any number of receiving features (and additional elements, e.g., first turning mirror, second curved mirror, etc.) to connect any number of optical fibers. Additionally, only two fibers are depicted for ease of illustration, however any number of fibers are contemplated.

Figure 3:
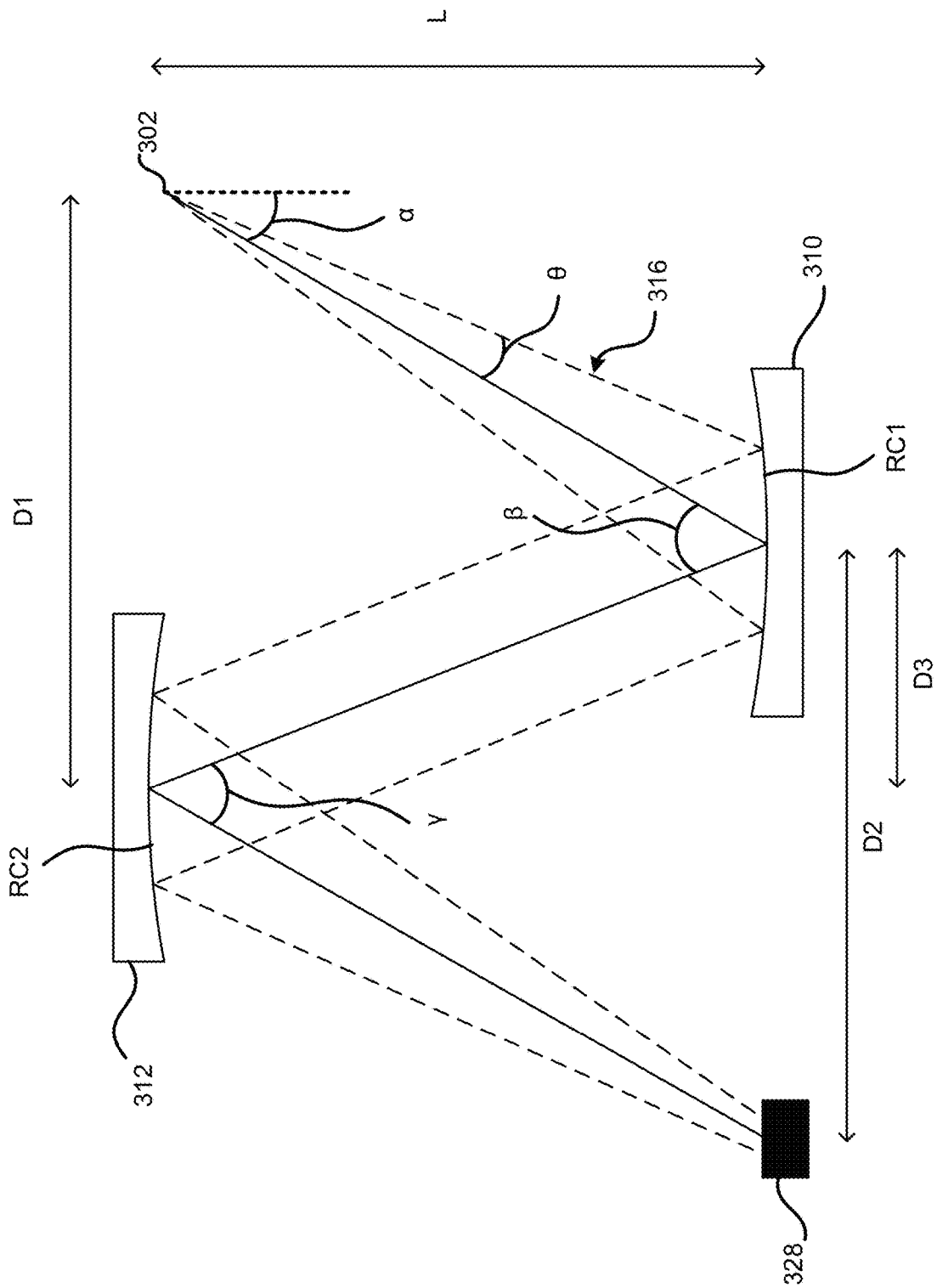
FIG. 3 depicts an example signal diagram according to one or more aspects of the present disclosure.

Aspects of the present disclosure relate to the curved mirrors and how they may be leveraged to optically connect components. FIG. 3 depicts an example signal diagram according to one or more aspects of the present disclosure. The signal diagram may be understood as depicting an example path of a light beam or optical signal 316 in an optical coupler (e.g., optical coupler 100) as well as depicting example optical manipulation associated with optical elements and aspects of the present interconnection scheme. Referring to FIG. 3, first curved mirror 310 and second curved mirror 312 may be oriented in substantially opposing directions. Thus, the reflective surfaces (or the vertex of the curved mirrors 310 and 312) may be facing substantially opposing directions. According to aspects, as will be described herein, one or more of the curved mirrors 310 and/or 312 may be oriented variously (e.g., not substantially opposed, see for example FIG. 7B). According to design considerations, first and second curved mirrors 310 and 312 may be variously oriented in relation to one another. First and second curved mirrors 310 and 312 may be facially spaced from one another by distance L. Facial spacing may be considered the space or distance between the vertexes of the first and second curved mirrors 310 and 312. While this spacing is illustrated as a vertical spacing in FIG. 3, according to aspects wherein the optical coupler is oriented differently, facial spacing may be achieved in any direction (e.g., facial spacing may be in the horizontal direction where the orientation of the coupler is rotated 90° from the example orientation in FIG. 3). Additionally, first and second curved mirrors 310 and 312 may be laterally distanced from one another. Lateral spacing may be considered the lateral distance between the vertices of the first and second curved mirrors 310 and 312. In addition to the relative spacing between curved mirrors, design considerations may comprise the distance between the curved mirrors and source, and the curved mirrors and drain (e.g., D1 and D2 in FIG. 3).

Some design parameters may be further understood with reference to the example signal diagram in FIG. 3. The optical signal 316 may be understood as propagating through an optical coupler at main propagation angles: first propagation angle, $\alpha$; second propagation angle, $\beta$; and third propagation angle, $\gamma$. Assuming, for purposes of illustration that optical source/drain component 302 (e.g., optical fiber, PIC I/O interface, laser, photonic bump, etc.) is a point (a point is an idealized case for ease of description and understanding, the optical source/drain component 302 may not be a point but may have dimension (e.g., the optical source/rain component may have a beam waist, for example, in the range of 1-10 µm)). First propagation angle, $\alpha$, may be defined as the angle of propagation of the optical signal 316 from a plane that intersects the optical source/drain component 302 in a vertical direction to the center axis of the optical signal 316 propagating from (or to) the optical source/drain component 302. The optical signal 316 may diverge as it propagates from optical source/drain component 302 (or converge toward optical source drain 302). The angle of divergence, $\theta$, may be defined as the angle from the center axis of the optical signal 316 to where the intensity of the optical signal 316 is 1% of the intensity at the center of the optical signal 316 (angle of divergence may be defined to different intensities depending on design considerations). Second propagation angle $\beta$, may be, for example, the angle between the center axis of the optical signal 316 approaching first curved mirror 310, and the center of the optical signal 316 receding from first curved mirror 310. Third propagation angle, $\gamma$, may be, for example, the angle between the center axis of the optical signal 316 approaching second curved mirror 312 and the center of the optical signal 316 receding from second curved mirror 312.

According to examples, the propagation angles may be designed where:

$\alpha+\beta>0$; and $2\alpha=\beta=\gamma$

The value of $\alpha$ may range from 0°, or just above 0°, to about 45° or even 60°. Potentially some situations may call for a narrower range, for example, 8° to 12° which in some circumstance can provide improved efficiency. According to some configurations, the angle of $\alpha$ may be selected to reduce back reflections (for example, to the optical source and/or drain components). According to aspects, different design constraints may be used depending on design considerations.

According to aspects, the first and second mirrors 310 and 312 may be configured and arranged such that the center axis of the optical signal 316 intersects each mirror 310 and 312 substantially near the vertex of each of the mirrors. For example, the mirrors may be arranged such that the vertex of the second curved mirror 312 may be disposed at a lateral distance D1 from the optical source component 302. According to example aspects, the distance D1 may be calculated as follows:

$$D_1 = L*\tan(\alpha) + L*\tan\left(\frac{\beta}{2}\right).$$

Additionally, according to example aspects, the vertex of the first curved mirror 310 may be disposed at a distance D2 from the optical drain component 328 (e.g., optical fiber, PIC I/O interface, laser, photonic bump). According to example aspects, the distance D2 may be calculated as follows:

$$D_2 = L*\tan\left(\frac{\gamma}{2}\right) + L*\tan\left(\frac{\beta}{2}\right).$$

Further, the lateral distance D3 between the vertex of the first mirror 310 and the vertex of the second mirror 312 may be computed as:

$D_3 = L*\tan(\beta).$

The above example design calculations may be considered according to aspects having zero misalignment.

Each curved mirror may have a radius of curvature and an associated focal length. Referring to FIG. 3, the first curved mirror 310 may have a first radius of curvature RC1 and the second curved mirror 312 may have a second radius of curvature RC2. It should be understood from the above that the design and/or configuration of the optical coupler may be adjusted by adjusting one or more parameters, for example, one or more of distances, L, D1, D2, and/or D3, and/or radius of curvatures RC1 and/or RC2. Thus, it should be appreciated that many configurations of the optical coupler may be achieved by varying the above parameters.

The above described angles and calculations describe a specific configuration and use. Different configurations are described herein (e.g., a spacer with an air gap, a silicon spacer, an air gap an no physical spacer, different spacer heights, etc.). Different configurations, for example, having a spacer with a different index of refraction, may comprise different distances D1 and D2, and D3, different angles: θ, α, β, and γ, and different radii of curvature RC1 and RC2, and may be defined by different equations.

Figure 4A:
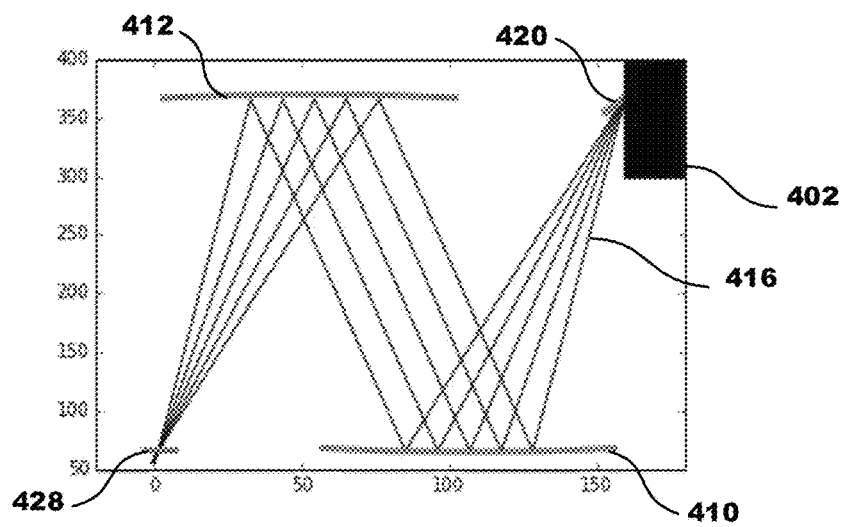
FIGS. 4A-4C illustrate example signal diagrams having different alignments according to one or more aspects of the present disclosure.

In view of the above, and considering FIGS. 4A-5C, some advantages of the present disclosure may be understood. FIGS. 4A-4C depict example signal diagrams having different alignments according to one or more aspects of the present disclosure. In optical coupling, high accuracy is desired between the two optical components being coupled. According to the present disclosure, the accuracy desired for connecting optical components may be transferred from the assembly domain to the fabrication domain (where high accuracy is more easily achieved). Accordingly, the accuracy required for optical assembly may be more easily achieved as the accuracy may be achieved by wafer level processes and other manufacturing techniques as opposed to assembly processes. These large assembly tolerances (e.g., 10's of microns per 1 dB of insertion loss in X, Y, and Z axes) solve a major packaging problem in photonic integrates circuits, e.g., fiber to chip, laser to chip, and/or chip to chip connectivity.

Figure 4B:
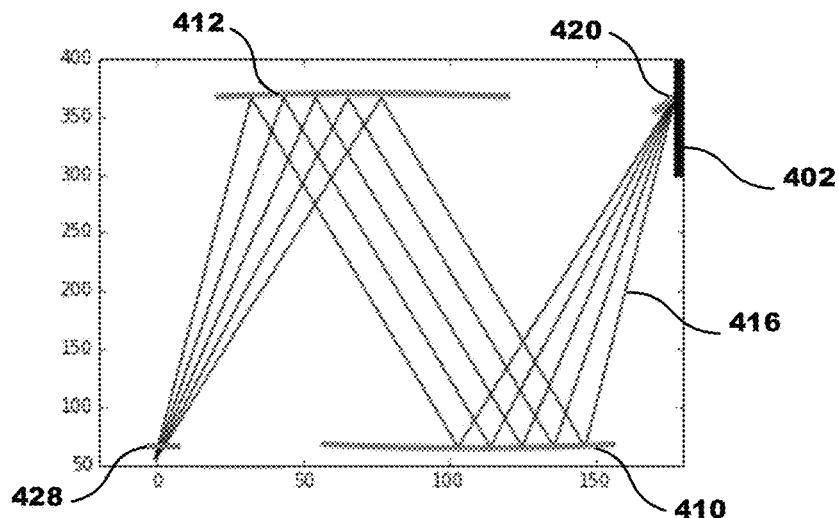
Figure 4C:
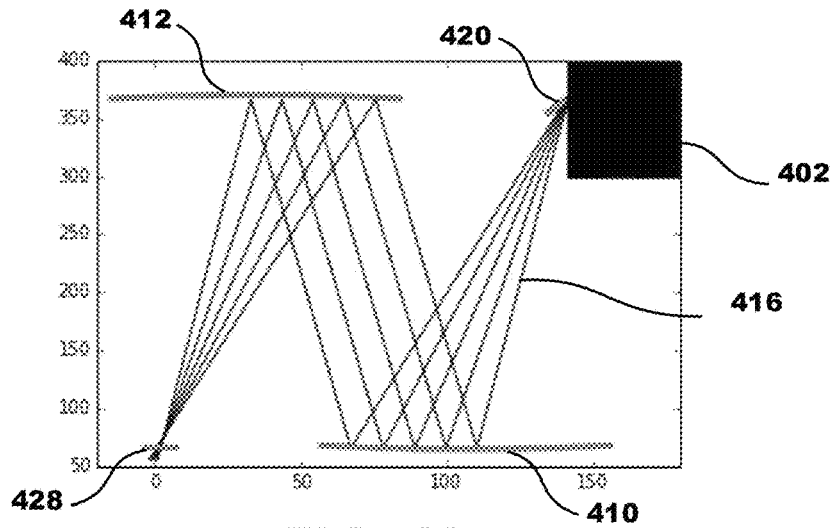

FIGS. 4A-4C each depict an optical component 402 (e.g., an optical fiber) a turning mirror 420, a first curved mirror 410, a second curved mirror 412, a PIC I/O interface 428, and an optical beam 416 (e.g., optical signal). As it can be seen from FIGS. 4A-4C, the turning mirror 420 and the second curved mirror 412 may be spaced a distance from each other. The distance may be set to achieve the optical coupling scheme according to the present disclosure. This distance may be accurately achieved during fabrication of the turning mirror 420 and/or the second curved mirror 412. Similarly, the first curved mirror 410 and the PIC I/O interface 428 may be distanced from each other. This distance may be similarly accurately achieved during fabrication of the first curved mirror 410 and/or the PIC I/O interface. In addition, utilizing aspects of the present disclosure, it may be appreciated that different elements may be located on different planes. For example, the first turning mirror 420 may be located in a first plane, and the corresponding PIC (e.g., to which optical component 402 may be optically coupled) may be located in a second plane that is different from the first plane. Additionally, the second curved mirror 412 and/or the optical component 402 may be located in the first plane, and the first curved mirror 410 and/or the PIC I/O interface 428 may be located in the second plane. Accordingly, elements may be located in two (or more) planes. Additionally, elements may, for purposes of depiction, be considered in an upper plane (e.g., elements in PhotonicPlug layer 106 of FIG. 1) and a lower plane (e.g., elements in PIC layer 114 of FIG. 1). With the relative distance of the optical elements accurately achieved during fabrication, assembly tolerances of the two planes (e.g., PhotonicPlug substrate 126 with PIC 104) may be relaxed. For instance, FIGS. 4A-4C depict various optical element and optical component assembly alignments (e.g., some misaligned) and the effects the alignment may have (or not have) on the optical connection.

As will be understood from the present disclosure, in order to assemble the optical coupler to effect an optical connection, the elements in an upper plane (e.g., the optical component 420, the first turning mirror 420 and the second curved mirror 412) (e.g., where the elements in the upper plane are installed to and/or fabricated in a PhotonicPlug layer and/or a spacer layer) are installed to and/or with elements in a lower plane (e.g., first curved mirror 410, PIC I/O interface) (e.g., where the elements in the lower plane are installed to and/or fabricated in a PIC layer). FIG. 4A depicts an example installation where the upper plane and lower plane are illustrated as perfectly aligned (e.g., zero misalignment). Accordingly, it can be seen that the optical beam 416 may propagates from the turning mirror 420 and may be incident upon the first curved mirror 410. The first curved mirror 410 may substantially collimate the beam 416 and reflect the beam 416 toward the second curved mirror 412. The substantially collimated beam 416 may be incident upon the second curved mirror 412. The second curved mirror 412 may substantially focus the beam 416 and reflect the beam 416 toward the PIC I/O interface 428. FIG. 4B depicts an example installation where the upper plane and lower plane are illustrated as positively misaligned in the X direction. However, due to the novel scheme of the present disclosure, the optical beam may still propagate as described with respect to FIG. 4A, and the optical component 402 may still be connected to the PIC I/O interface without significant attenuation. Thus, it can be appreciated that the accurate placement, during fabrication, of the turning mirror 420 with respect to the second curved mirror 412, and of the first curved mirror 410 with respect to the PIC I/O interface 428, allows for relaxed assembly tolerance requirements and may allow for improved reliability of the optical connection, even with some assembly misalignment. Similarly, FIG. 4C depicts an example installation where the upper plane and lower plane are illustrated as negatively misaligned in the X direction. Like the zero-misalignment case and the positive misalignment case, it can be seen from FIG. 4C that an effective optical connection may be achieved using the present disclosure even with some negative misalignment. Accordingly, it will be appreciated that by shifting the accuracy requirement to the fabrication domain (where higher accuracy is more easily achieved), accuracy requirements and/or tolerance requirements for assembly may be relaxed and overall accuracy may be more easily achieved.

While FIGS. 4A-4C, have been discussed for purposes of illustration as misalignment in the X direction, it should be understood that the same figures (FIGS. 4A-4C) also depict the principles of the present disclosure in the Y direction. Thus, it should be understood that utilizing the present disclosure, assembly misalignment in the Y direction may be similarly relaxed based on the same principals.

Figure 5A:
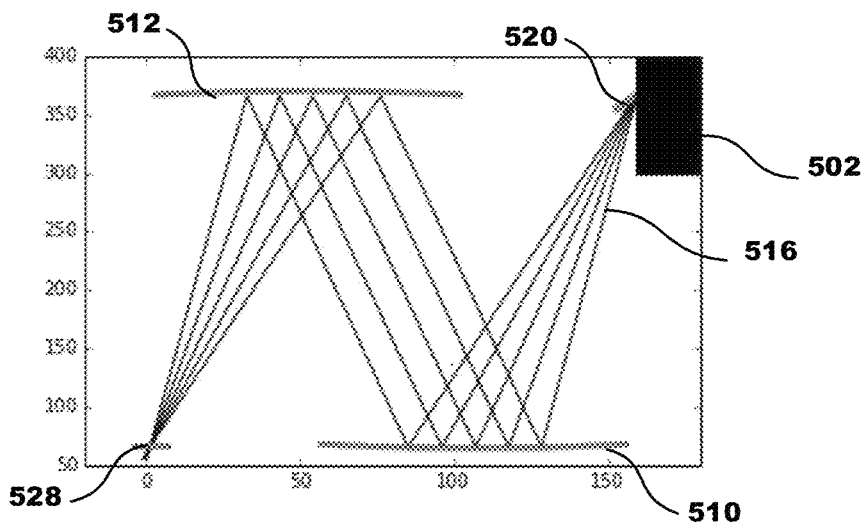
FIG. 5A-5C illustrate example signal diagrams having different alignments according to one or more aspects of the present disclosure.
Figure 5B:
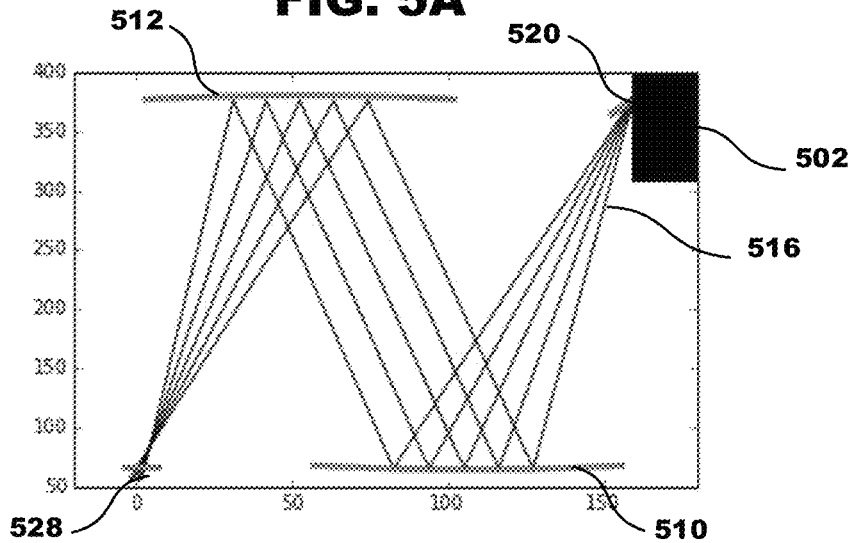
Figure 5C:
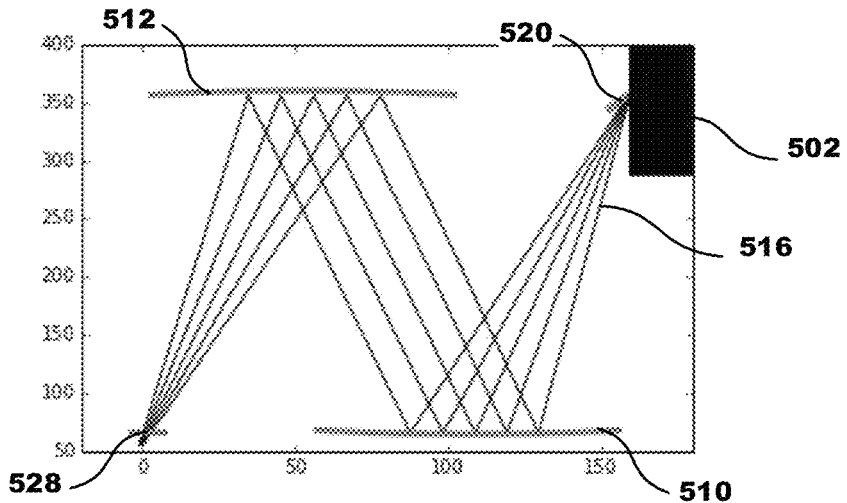

FIG. 5A-5C illustrate example signal diagrams having different alignments according to one or more aspects of the present disclosure. Referring to FIGS. 5A-5C, it may be understood that misalignment in the Z direction may similarly be mitigated utilizing the principals of the present disclosure. FIG. 5A depicts a perfectly aligned (zero Z-misalignment) case. FIGS. 5B and 5C illustrate a positive Z-misalignment (planes spaced further) and negative Z-misalignment (planes spaced closer) respectively. As can be seen from FIGS. 5A and 5B, similar to the principles discussed above with respect to FIGS. 4A-4C, the schemes of the present disclosure may mitigate some of the effects of Z assembly misalignment. Referring to FIG. 5B it can be seen that where the two planes (e.g., the plane with the turning mirror 520 and second curved mirror 512 and the plane with the first curved mirror 510 and the optical drain 528) are positively misaligned in the Z direction, the signal diagram is still achieved, and the optical source 502 may be efficiently coupled to the optical drain 528. Additionally, referring to FIG. 5C, it can be seen that where the two planes are negatively misaligned in the Z direction, the signal diagram is still achieved and the optical source 502 may be efficiently coupled to the optical drain. Accordingly, at least in view of FIGS. 4A-5C it may be appreciated that the tolerance requirements classically required in the assembly domain may be shifted to the fabrication domain where such tolerances are more easily achieved (e.g., by production machines) in volume. Subsequently, assembly tolerances in the X, Y, and Z directions may be relaxed. Similarly, tilt and rotation misalignment may be more controlled via the fabrication domain (e.g., wafer level mechanical structures) using the couplers of the present disclosure.

Some details of the "self-aligning" optics of the present disclosure have been described with respect to FIGS. 3-5C. Referring to FIGS. 3-5C, following is a description of example equations that may define an example tolerance map relating to the present disclosure:

$$d = d(h, \alpha) < 4*h*\tan(\alpha);$$

$$\Omega = f(h, n, \Omega_0, \alpha) > \Omega_0, \propto h;$$

$$T(x, y) \propto \text{Convolution}\left(\text{Circ}\left(\frac{x}{\left(\frac{d}{2}\right)}, \frac{y}{\left(\frac{d}{2}\right)}\right), \text{field}\right) = \text{Circ}\left(\frac{x}{\left(\frac{d}{2}\right)}, \frac{y}{\left(\frac{d}{2}\right)}\right) * \Omega;$$

Where T may be understood as the tolerance width, $\Omega$, may be understood as the beam spot distribution on the curved mirror (e.g., first curved mirror 310 and second curved mirror 312), $\Omega_0$ may be understood as the distribution of the field on an element of the PIC I/O interface (e.g., distribution of the field on the TCM 1660, the grating coupler 1755 or the photonic bump turning mirror 1850, etc.), d may be understood as the aperture, n, may be understood as the index of refraction of the propagation medium, h may be understood as the height of the spacer (e.g., L in FIG. 3), and $\alpha$ may be understood as the angle of incidence.

Referring to FIG. 1, according to aspects herein, first curved mirror 110 may be fabricated on, added to, manufactured in, or otherwise integrated with, PIC layer 114. For example, PIC layer 114 may comprise at least one PIC substrate 122 of a semiconductor material, for example, indium phosphide, silicon oxide ($SiO_2$), silica, or the like. According to aspects, such a PIC substrate 122 may be arranged adjacent to spacer layer 108. Accordingly, first curved mirror 110 may be fabricated on the surface of PIC substrate 122 which may be adjacent to spacer layer 108. The first curved mirror 110 may be fabricated on the surface of such a substrate in different ways. For example, first curved mirror 110 may be fabricated using, for example, nanoimprint lithography (NIL), Silicon-On-Insulator (SOI) processes, complementary metal-oxide semiconductor (CMOS) processes, grayscale lithography, and similar, and/or other process as described herein. Additional processes are considered herein, for example, the first curved mirror 110 may be added to the PIC as a separate mirror substrate (e.g., a carrier placed accurately on the PIC substrate 122). For example, a glass substrate may comprise a curved mirror (e.g., the first curved mirror 110). The glass substrate be accurately placed on and attached to the PIC substrate 122. The glass substrate and/or the PIC substrate 122 may have alignment marks to assist in accurate placement of the glass substrate on the PIC substrate 122. Thus, it may be appreciated that one possible advantage of the present disclosure is the ability to fabricate aspects herein, in volume, using existing eco-systems and fabrication processes. Additionally, novel eco-systems and fabrication process for some optical elements are also described herein. Any fabrication method and/or process may be used in which accurate placement of the components may be achieved. According to aspects, first curved mirror 110 may be coated with a dielectric layer to improve reflectivity (e.g., for specific optical signal wavelengths). Such layers may comprise, but are not limited to, a metal (e.g., aluminum, chromium, gold, silver, etc.) layer. Additionally, it may be appreciated that an advantage of the present disclosure is to shift the tolerance requirements for optical connection from the assembly phase to the production phase where higher accuracy is more simply achieved. While some aspects of the present disclosure may be produced using existing methods, some aspects of the present disclosure relate to novel methods of production (for example one or more aspects described in relation to backside coupling with reference to FIGS. 37-45) as will be described in more detail.

According to aspects, the PIC layer substrate (e.g., upon which first curved mirror 110 may be fabricated), may or may not be the same substrate in which PIC 104 is comprised. Therefore, it is contemplated that according to aspects where PIC 104 and first curved mirror 110 are included in the same substrate, the first curved mirror 110 may be fabricated at the same time, and using the same facilities in which, PIC 104 is fabricated. Alternatively, even though PIC 104 and first curved mirror 110 may be included in the same substrate, PIC 104 and first curved mirror may be fabricated at different times in the same facility or different facilities. It is contemplated that first curved mirror 110 and PIC 104 may be comprised in separate substrates of PIC layer 114. Referring to FIG. 1, PIC 104 may be comprised in first PIC layer substrate 122. First curved mirror 104 may be comprised in second PIC layer substrate 122. According to such aspects, second PIC layer substrate 122 may be fabricated from a semiconductor material or may comprise a layer of semiconductor material. First curved mirror 110 may be formed on the semiconductor layer of second PIC layer substrate 122 using substantially the same fabrication methods (e.g., CMOS, SOI, grayscale lithography, etc.) as described above. Alternatively, first curved mirror 110 may be formed on, or in, alternative materials that may be added to PIC layer 114 for example, second PIC layer substrate 122 may be substantially transparent and first curved mirror 110 may be formed according to aspects described herein with respect to transparent substrates. Additionally or alternatively, as another example, second curved mirror 112 may be formed substantially according to backside coupling methods as described herein. Further, according to aspects, it is contemplated that first curved mirror 110 may be added to an already existing PIC substrate. Aspects where the first curved mirror 110 is added to an existing PIC substrate or PIC layer 114 may be described in more detail herein with relation to photonic bumps (e.g., with reference to FIGS. 16-18C).

As described herein, PIC layer may comprise any number of substrates, first curved mirror may be fabricated in, on, or added to, any of the substrates of PIC layer. Further, as is described below in more detail, the first curved mirror may be disposed on the backside of any of the substrates of the PIC layer. The method of producing such back-side mirrors, advantages of such backside mirrors, and operation of such backside mirrors, is discussed below in more detail.

According to aspects herein, curved mirrors may be fabricated on, added to, or otherwise integrated with PhotonicPlug layer variously. Referring to FIG. 1, PhotonicPlug layer 106 may comprise one or more substrates. PhotonicPlug layer 106 may comprise PhotonicPlug substrate 126. PhotonicPlug substrate 126 may be arranged proximate to spacer layer 108. Second curved mirror 112 may be fabricated in, fabricated on, or otherwise added to the surface of PhotonicPlug substrate 126, proximate to spacer layer 108.

According to aspects herein, curved mirrors may be fabricated on, added to, manufactured in, or otherwise integrated with PhotonicPlug layer 106. For example, referring to FIG. 1 PhotonicPlug layer 106 may comprise at least one substrate. The at least one substrate may be, for example a semiconductor material, for example, silicon dioxide ($SiO_2$), silica, silicon, or the like, a metal, plastic, and/or polymer, etc. Additionally or alternative, PhotonicPlug layer 106 may comprise multiple substrates of any number of materials. The substrate may be arranged adjacent to spacer layer 108. Accordingly, second curved mirror 112 may be fabricated on the surface of PhotonicPlug substrate 126. The second curved mirror 112 may be fabricated on the surface of PhotonicPlug substrate variously. For example, second curved mirror 112 may be fabricated using, for example, CMOS, SOI, NIL, grayscale lithography, plastic injection, stamping, etc. SOI may be advantageous for some applications, for example, SOI may be ideal for certain types of mirrors, though all methods are contemplated. Additionally, according to aspects, like first mirror (and first turning mirror) second mirror may be coated with a layer of dielectric (e.g., metal) to improve reflectivity for specific signal wavelengths.

As described in more detail herein, PhotonicPlug layer 106 may comprise additional features (e.g., fiber receiving features, below). Thus, it is contemplated that such features may be fabricated in the same substrate as the second curved mirror 112. Therefore, according to such aspects, the second curved mirror 112 may be fabricated in a substrate of PhotonicPlug layer 106 at the same time, and using similar processes, that other features are fabricated in the PhotonicPlug layer substrate (e.g., PhotonicPlug substrate 126). Additionally or alternatively, other fabrication process, methods, and/or techniques (e.g., plastic injection) may not require or be associated with fabrication at the same time. Additionally, some fabrication processes, methods, and/or techniques may use different tooling for the different optical elements (e.g., different tooling for second curved mirror 112 and the turning mirrors 120).

Figure 6:
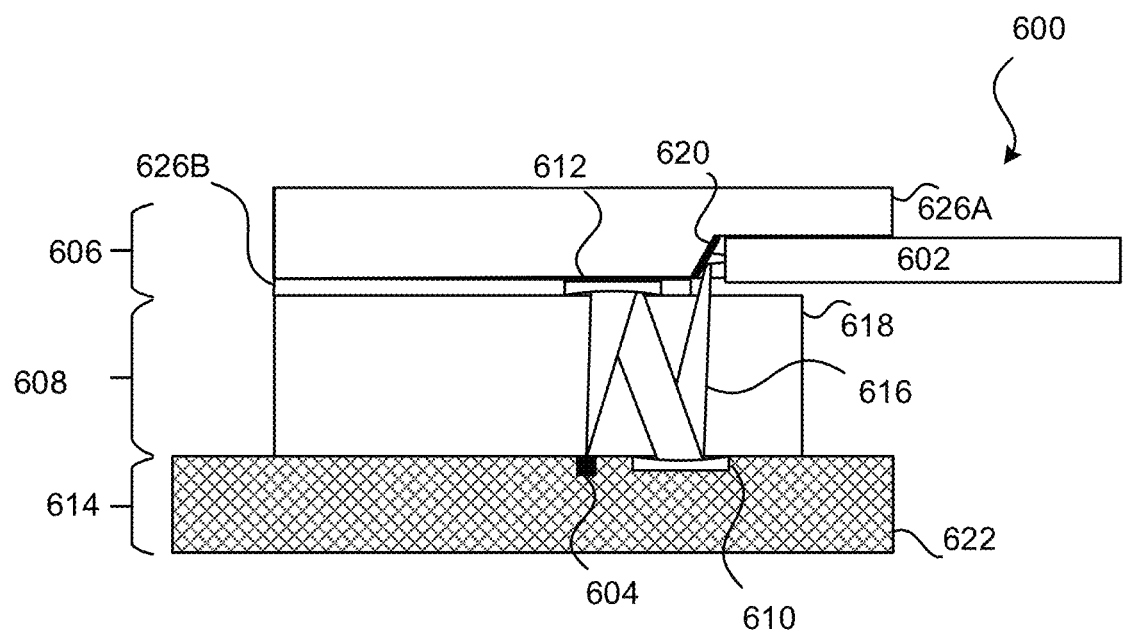
FIG. 6 depicts an example optical coupler according to one or more aspects of the present disclosure.

FIG. 6 depicts an example optical coupler 600 according to one or more aspects of the present disclosure. Referring to FIG. 6, PhotonicPlug layer 606 may comprise various substrates of varying materials (described below in more detail). Therefore, it is contemplated that the second curved mirror 612 may be fabricated in, added to, or otherwise integrated with various substrates of the PhotonicPlug layer 606. For example, PhotonicPlug layer 606 may comprise two substrates, first PhotonicPlug substrate 626A and second PhotonicPlug substrate 626B, according to aspects, the first PhotonicPlug substrate 626A may be of a first material (e.g., metal, or plastic) and may comprise fiber receiving features to receive optical fibers. Second PhotonicPlug substrate 626B may be fabricated of a second material (e.g., silicon semiconductor material, glass, polymer, etc.) and may be variously assembled with, manufactured with, and/or installed with first PhotonicPlug substrate 626A. Accordingly, second curved mirror 612 may be fabricated in second PhotonicPlug substrate 626B. The two substrates 626A and 626B may be attached to one another using known methods of attachment (e.g., adhesives, fasteners, clips, NIL, etc.) to provide the functionality of the optical coupler. Further, the first PhotonicPlug substrate 626A and second PhotonicPlug substrate 626B may comprise mechanical alignment features to ensure proper alignment of the two substrates for working conditions (see, for example, mechanical alignment features of FIGS. 33A-33B).

As described herein, PhotonicPlug layer 606 may comprise any number of substrates, second curved mirror 612 may be fabricated in, on, added to, or otherwise integrated with any of the substrates of PhotonicPlug layer 606. Further as described herein, the second curved mirror may be disposed on the backside of any of the substrates of the PhotonicPlug layer (see, e.g., FIGS. 37-45 describing backside coupling below). The method of producing such back-side mirrors, advantages of such back-side mirrors, and operation of such back-side mirrors, are discussed below in more detail.

Figure 7A:
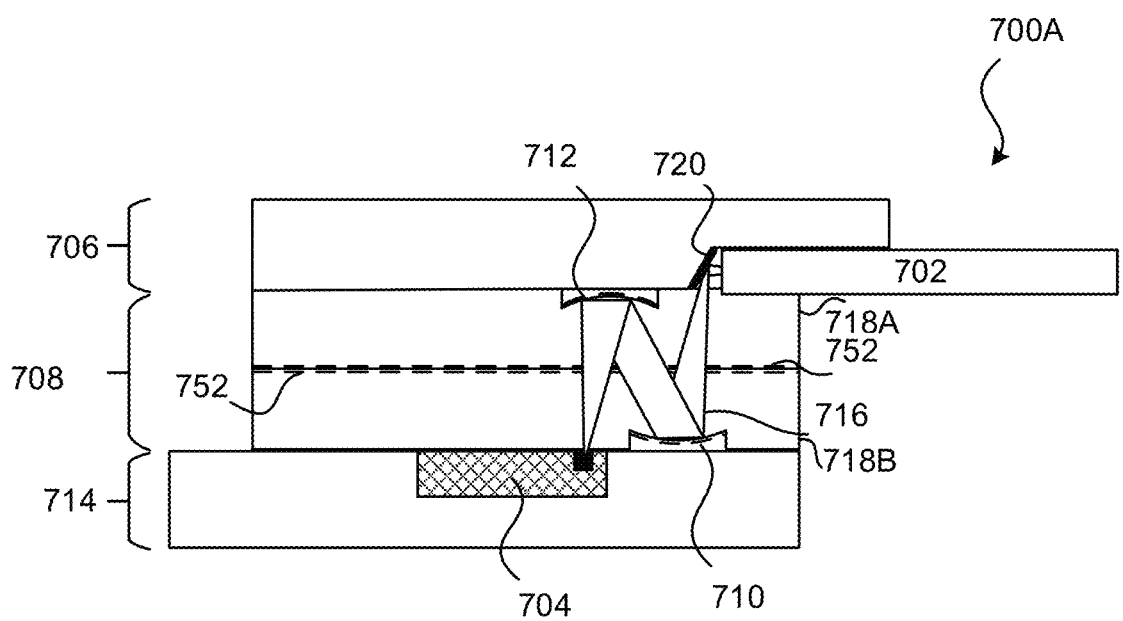
FIG. 7A depicts an example optical coupler according to one or more aspects of the present disclosure.

FIG. 7A depicts an example optical coupler according to one or more aspects of the present disclosure. Referring to FIG. 7A, one or both of the first curved mirror 710 and second curved mirror 712 may be fabricated in the spacer layer 708. Spacer layer 708 may comprise first spacer substrate 718A and second spacer substrate 718B (generally spacer substrate 718) (alternatively first and second spacer substrates 718A and 718B may be combined into singe spacer substrate). Alternatively, as described spacer layer 708 may comprise no substrates or any number of substrates. As described herein, one or more of the one or more spacer substrates may be made of a material that is substantially transparent to the wavelength of the optical signal. First and second curved mirrors 710 and 712 may be integrated with first and second spacer substrates 718A and 718B. For example. Material may be removed from a surface of first and second spacer substrates 718A and 718B. The material may be removed such that the desired shape of the first and/or second curved mirrors 718A and 718B remain. Following material removal, a reflective layer (for example illustrated as dashed line by first curved mirror 710 and second curved mirror 712), for example a layer of metal, may be added to (e.g., deposited on) the curved mirror shape, resulting in first and second curved mirrors 710 and 712 formed in the substantially transparent spacer substrate. Alternatively, the shape of first and second curved mirrors 710 and 712 may be formed into the spacer substrates 718A and 718B when the spacer substrates are produced. For example, the spacer may be formed with a mold or a stamp. The mold or stamp may comprise the shape of first curved mirror 710 and/or second curved mirror 710 in it. After the spacer substrate is molder or stamped, a reflective layer, for example a layer of metal (illustrated as dashed line), may be added to the curved mirror shape resulting in a curved mirror in the spacer substrate. In yet another alternative, one or more of the spacer substrates may comprise voids. A separate curved mirror (e.g., metal mirror, semiconductor mirror, etc.) may be disposed in the voids. The separate curved mirrors may be retained in the voids variously, including for example being set in epoxy resin or similar with suitable index of refraction. Additionally, first curved mirror 710 and second curved mirror 712 may be fabricated in spacer substrates 718 substantially as described herein with respect to backside coupling methods (see e.g., FIGS. 37-45). Curved mirror on glass spacer may be fabricated via wafer lithographic processes or via NIL wafer level optics process. Spacer substrates 718 may comprise additional features such as addition optical elements or mechanical elements to be mated with the substrates above and below for accurate placement relative to the other substrates.

FIGS. 1 and 6 illustrate first curved mirror (e.g., 110 and 610) as being integrated with the PIC layer, and second curved mirror (e.g., 112 and 612) as being integrated with the PhotonicPlug layer. Such arrangements are for purposes of illustration only. According to aspects, as will be appreciated in view of the present disclosure, the curved mirrors may be disposed variously. For example, the first curved mirror may be integrated with the PIC layer and the second curved mirror may be integrated with the PhotonicPlug layer. Alternatively, the first curved mirror may be integrated with the PhotonicPlug layer and the second curved mirror may be integrated with the PIC layer. Alternatively, the first and second curved mirrors may be integrated in the PIC layer or the first and second curved mirrors may be integrated with the PhotonicPlug layer. In yet further alternatives, one or both of the first and second mirrors may be integrated with the spacer layer. All combinations of the first and second mirror being disposed in a combination of the PhotonicPlug layer, the spacer layer, and the PIC layer are contemplated herein. As described above the discussion of "layers" may be understood to help illustrate aspects of the present disclosure.

To facilitate optical interconnection, and desired configurations, additional mirrors may be comprised in optical couplers according to the present disclosure. Referring again to FIG. 1, optical coupler 100 may comprise a first turning mirror 120. First turning mirror 120 may also be referred to as tilted flat mirror herein. The first turning mirror 120 may be disposed adjacent to the optical source/drain component (e.g., optical fiber 102). According to aspects herein, the optical source/drain component (e.g., optical fiber 102) in conjunction with the first turning mirror 120 may be referred to herein as the optical source/drain component. The first turning mirror 120 may be positioned to reflect the optical signal 116 such that the signal 116 may propagate away from the first turning mirror 120 at a predefined angle (e.g., the center of the signal may propagate away from the first turning mirror 120 at a predefined angle from the center of the signal approaching the first turning mirror 120), or toward a predefined spot (e.g., the first curved mirror 110). Use of such a first turning mirror 120 may prove advantageous for a number of reasons. One such advantage may comprise that ability to variously position the optical source/drain component with respect to the curved mirrors. For example, referring to FIG. 1, optical fiber 102 may be disposed in a plane that is substantially parallel to the planes in which the curved mirrors 110 and 112 are disposed. Additionally, the optical fiber 102 may be in the same (or different) plane from the second curved mirror 112 and may be in a different plane from the first curved mirror 110. This arrangement may enable many advantages as described herein. The first turning mirror 120 may be angled such that it may relay the optical signal 116 between the optical fiber 102 and the first curved mirror 110. For example, assuming optical fiber 102 is the source component, the first turning mirror 120 may receive (e.g., by light being incent thereupon) the optical signal 116 from the optical fiber 102 and direct and reflect the optical signal 116 toward the first curved mirror 110. Alternatively, assuming the optical signal 116 is the drain component, the first turning mirror 120 may receive the optical signal 116 from the first curved mirror 110 and direct and reflect the optical signal 116 toward (e.g., into) the optical fiber 102. Thus, it may be appreciated that when configuring an implementation of an optical coupler, it may be advantageous to configure the mirrors such that the optical signal 116, propagating from the first curved mirror 110 to the first turning mirror 120, may be focused toward the first turning mirror 120.

According to the present disclosure, it may be appreciated that the optical source/drain may be positioned variously with respect to the remainder of the optical coupler. For instance, in the examples of FIGS. 1, 6, and 7, the optical component (e.g., optical fiber) is depicted as being placed in a plane that is parallel to the planes of both the first curved mirror and the second curved mirror. However, utilizing the first turning mirror, such optical fibers may be positioned variously. FIG. 8 depicts an example optical coupler according to one or more aspects of the present disclosure. Referring to FIG. 8, optical fiber 802A may be placed at any angle with respect to the vertical plane. First turning mirror 820 may compensate for the angle of the optical fiber 802. Accordingly, the first turning mirror 820 may be oriented for each application, to consider the angle of the optical fiber 802, such that the optical signal 816 may be directed at the first first curved mirror 810A as desired. Thus, any arrangement of fiber angle 802A and first turning mirror angle 820 are contemplated herein. Further advantages of the present aspects may be appreciated as well. For example, according to aspects comprising fiber receiving feature 824A and a first turning mirror 820, these features may be fabricated in a PhotonicPlug substrate 826 of PhotonicPlug layer 106 using similar production processes (e.g., CMOS, NIL, grayscale lithography, etc.). Therefore, these features may be easily manufactured with accuracy allowing for simplified accurate placement of the optical fiber 802A with respect to the rest of the components and elements of the optical coupler 800.

Similar to the curved mirrors, the turning mirror may be fabricated on, added to, disposed on, or otherwise integrated with the optical coupler variously. Referring to FIG. 1, the first turning mirror 120 may be fabricated in the PhotonicPlug layer, near the surface of the substrate that is disposed adjacent to the spacer layer 108. The first turning mirror 120 may be fabricated variously. For example, the substrate in which the first turning mirror 120 may be fabricated may be a semiconductor material substrate (as described herein). Accordingly, the first turning mirror 120 may be fabricated according to the processes described herein (e.g., NIL, SOI, CMOS, etc.). The first turning mirror 120 may similarly be coated with a dielectric material, e.g., metal. The turning mirror may be fabricated at the time of manufacture of the PhotonicPlug substrate 126 or the turning mirror 120 may be added at a later time. Like the curved mirrors, the first turning mirror 120 may be disposed in any substrate of any layer of the optical coupler. Additionally, although the first turning mirror may interface the optical signals with the optical source/drain component (e.g., optical fiber 102), the first turning mirror 120 may be integrated with the same substrate as the substrate to which the optical source/drain component may be attached, or, alternatively, the first turning mirror 120 may be integrated with a different substrate, comprising a substrate of a different material than the substrate to which the optical source/drain component may be attached.

For discussion purposes and/or for purposes of illustration, the optical elements may be grouped. First optical elements 151 may comprise first turning mirror 120 and second curved mirror 112. Alternatively, as will become clear from the present disclosure, first optical elements 151 may, alternatively, only comprise second curved mirror 112. Second optical elements 153 may comprise one or more of first curved mirror 110 and/or PIC I/O interface elements 128 (e.g., one or more of tapered photonic bump, turning curved mirror (TCM) photonic bump, PIC I/O waveguide, grating coupler, etc.).

As described herein, the mirrors of the present disclosure may be fabricated in the back-side of a substrate. Such features, and methods for producing the same, are described in more detail below with reference to FIGS. 37-45, and are described in commonly assigned U.S. patent application Ser. No. 17/645,667, and U.S. patent application Ser. No. 17/645,673, both of these applications are herein incorporated by reference in their entireties.

Figure 9A:
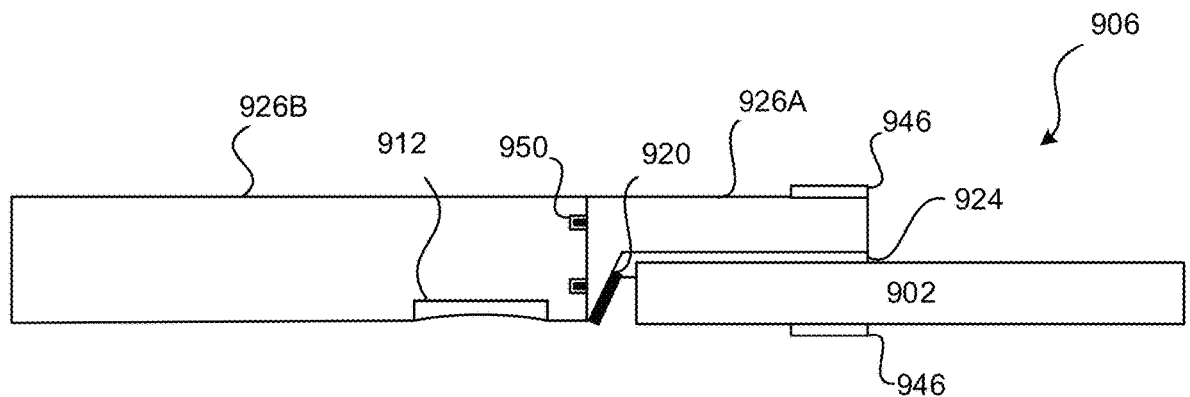
FIG. 9A, depicts a side cross-section view of an example PhotonicPlug layer according to one or more aspects of the present disclosure.

FIG. 9A, depicts a side cross-section view of an example PhotonicPlug layer according to one or more aspects of the present disclosure. Referring to FIG. 9A, PhotonicPlug layer 906 may comprise one or more substrates and numerous features. According to aspects, PhotonicPlug layers may have all some or none of the below described features, for example, some or all of the features described below may be disposed in one or more other layers of an optical coupler. Optical source/drain components (e.g., optical fiber 902) may be attached to the optical coupler at the PhotonicPlug layer 906. Accordingly, PhotonicPlug layer 906 may comprise features to receive, and optionally, retain such optical source/drain components.

Referring to FIG. 9A, PhotonicPlug layer 906 may comprise a receiving substrate 926A. Receiving substrate 926A may comprise one or more fiber receiving features 924. Fiber receiving features 924 may comprise one or more geometric features, for example, V-shaped trenches (e.g., V-grooves), U-shaped trenches (e.g., U-grooves), through holes, etc. Fiber receiving features 924 may further act as and/or be configured similarly to fiber alignment features, facilitating alignment of the optical fiber 902 in relation to the first turning mirror 920. According to aspects without the first turning mirror 920, fiber receiving features 924 (e.g., V-groove) may facilitate alignment of the optical fiber 902 with another optical element (e.g., a first curved mirror in another component (e.g., a package substrate) or layer of the optical coupler). According to aspects, receiving substrate 926A may comprise various fiber receiving features 924 and fiber alignment features. According to aspects, fiber receiving features 924 and fiber alignment features may be considered a void or trench in the receiving substrate 926A. Fiber receiving features 924 may be patterned and configured variously. For example, fiber receiving features 924 may be patterned and configured as V-grooves, U-grooves, holes, or as other features as would be understood by persons of ordinary skill in the art. Different receiving features 924 may be associated with different advantages. For example, V-groove receiving features 924 may additionally set the depth and/or Z-height of the fiber therein with respect to the optical elements (e.g., turning mirror 920) of the optical coupler. Additionally or alternatively, once the depth and/or Z-height of the fibers are set by the receiving feature 924 (e.g., V-groove), the spacer (e.g., spacer substrate 118) may be positioned and/or variously mounted on the fibers. In certain configurations, V-grooves may be advantageously combined with open receiving feature 924 (e.g., V-grooves). Other features (e.g., through-holes) may, in certain configurations be advantageously achieved with closed features. V-grooves (and other receiving features) may additionally be achieved with closed receiving features which may be advantageous for certain configurations as would be understood from the present disclosure. Different features may be differently advantageous depending on configuration considerations and constraints.

Figure 9B:
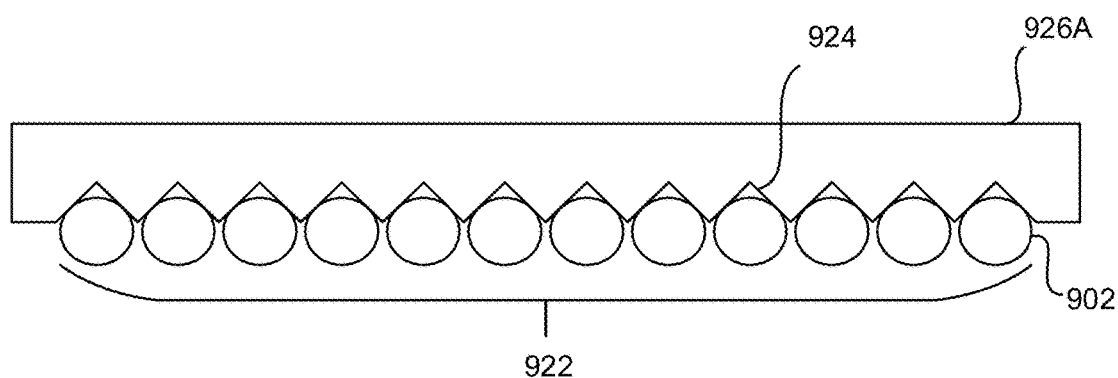
FIG. 9B depicts a front cross-section of the example fiber receiving substrate of FIG. 9A according to one or more aspects of the present disclosure.
Figure 9C:
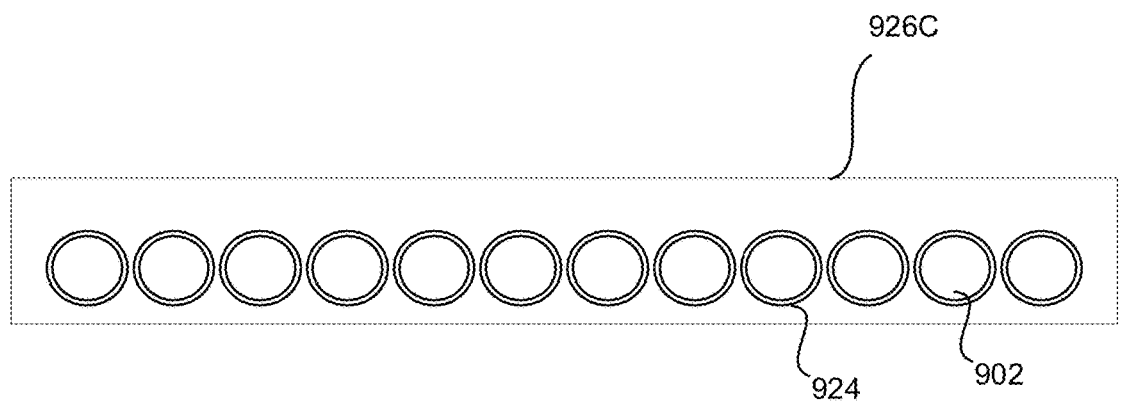
FIG. 9C depicts a front cross-section of an example fiber receiving substrate according to one or more aspects of the present disclosure.

FIG. 9B depicts a front cross-section of the example fiber receiving substrate 926A of FIG. 9A according to one or more aspects of the present disclosure. Referring to FIG. 9B, as discussed herein, PhotonicPlug layer 906 and fiber receiving substrate 926A may comprise one or more fiber receiving features 924 to accept one or more optical fibers 902. fiber receiving features 924 may be open features wherein the feature does not entirely enclose the circumference of the optical fibers therein. FIG. 9C depicts a front cross-section of an example fiber receiving substrate 926C according to one or more aspects of the present disclosure. As an alternative to open receiving features (e.g., as illustrated in FIG. 9B) referring to FIG. 9C, fiber receiving features 924 may be closed receiving features, wherein the receiving feature entirely surrounds a circumference of the optical fibers 902. FIG. 9C depicts the closed receiving features as round holes, however, closed receiving features may be variously shaped. For example, closed receiving features may be V-grooved on one side (e.g., a bottom of the optical fiber) and rounded on the opposing side (e.g., top of the optical fiber), V-groove on both sides, diamond shaped, square shaped, triangular shaped, etc.

Referring to FIG. 9A, the fiber receiving features 924 may be fabricated in the PhotonicPlug layer 906 variously. For example, according to aspects, the fiber receiving features 924 may be fabricated by removing material (e.g., etched) from receiving substrate 926A in the desired pattern. Alternatively, the fiber receiving features 924 may be fabricated by adding material (e.g., via additive manufacturing techniques, e.g., material deposition) to the receiving substrate in the desired pattern. If the receiving substrate is a semiconductor material, the fiber receiving features may be fabricated using any of the methods disclosed herein, for example, NIL, SOI, CMOS, grayscale lithography, etc. According to alternative aspects, the receiving substrate 926A may be fabricated and composed of various materials, and may be composed of more than one material. For example, fiber receiving substrate 926A may be composed of metal (e.g., aluminum, steel, copper, alloys, etc.) plastic, other polymers, epoxies, photoresist materials, and the like. Accordingly, the fiber receiving features 924 may be fabricated in receiving substrate 926A according to methods known to those of ordinary skill in the art (e.g., milling, stamping, molding, drilling, etching, embossing, cutting, plastic injection etc.) according to the material used.

As described, receiving substrate 926A and/or fiber receiving features 924 may be fabricated of various materials using various processes. For example, according to aspects, fiber receiving features 924 may be additively produced using photoresist materials, for example, epoxy-based photoresist materials (e.g., SU-8). Such additive materials may be deposited on one or more different underlying materials, e.g., silicon, to produce the receiving substrate 926A. Alternatively, the entire receiving substrate 926A, or portions thereof, may be produced of such additive materials (e.g., SU-8). Such additive materials may be layer deposited (e.g., UV positive or negative photoresist). Alternatively, the fiber receiving features 924 may be produced variously. For example, fiber receiving features 924 may be produced utilizing hot-embossing. For example, a material (e.g., thermoplastic, or other polymers) may be deposited. A stamp with the inverse of the desired receiving feature 924 may be applied to the surface of the material (e.g., thermoplastic). Pressure and heat may be applied to the stamp followed by a cooling step producing the desired receiving feature 924. Alternatively, fiber receiving features 924 may be produced utilizing metal stamping or similar processes.

Optical fibers 902 may be retained in receiving features 924 variously. For example, the optical fibers 902 may be retained in the receiving features with adhesive, epoxy, resins, etc. According to such aspects, it may be advantageous to use an epoxy, resin or adhesive with certain optical properties (e.g., index matching, as described herein). For example, an epoxy or resin may be selected based on its index of refraction to allow light to propagate from the optical fiber into the coupler as would be understood by a person of ordinary skill in the art (as described in more detail herein). According to aspects comprising open receiving features 924, a portion of the circumference of the optical fibers 902 may extend beyond the surface of the receiving substrate 926A. Accordingly, the fibers may be retained in place by applying pressure to the exposed circumference of the optical fibers 902 and the top surface of the receiving substrate 926A in opposing directions. For example, as described in more detail herein, clip 946 (or other retaining structure) may be affixed to the receiving substrate 926A around the optical fibers 902. Clip 946 may apply a force to the optical fiber toward the top of receiving substrate 926A, and may apply a force to the top of receiving substrate 926A in an opposing direction which may assist retention of the optical fibers 902 in the receiving substrate 926A.

Referring to FIG. 9C, according to further aspects, the optical fibers 902 may be inserted into receiving features 924 that are closed (e.g., holes). According to such aspects, optical fibers 902 may similarly be retained within the receiving substrate 926C variously. For example, like the open receiving features, adhesives, epoxies, resins, etc. (with appropriate indices of refraction) may be similarly used to retain optical fibers 902 in the closed receiving features. Additionally or alternatively, according to such aspects, retaining members (e.g., clips) may be used that apply a force to the optical fibers 902 along the axis of the optical fiber 902 and into the receiving feature 924. Thereby, the optical fibers 902 may be retained in the closed receiving features 924 (such a method may be employed in open receiving features as well). The optical fibers 902 may be retained in the receiving features 924 variously as would be understood by persons of ordinary skill in the art.

Referring to FIG. 9A, PhotonicPlug layer 906 may comprise receiving substrate 926A and second PhotonicPlug layer substrate 926B. Second PhotonicPlug layer substrate 926B may comprise the second curved mirror 912. According to alternative aspects, PhotonicPlug layer 906 may only comprise one substrate which may comprise receiving features 924 and second curved mirror 912. PhotonicPlug layer 906 of FIG. 9A is illustrated has having multiple substrates that are vertically cut and horizontally separable. According to alternative aspects however, various substrates of PhotonicPlug layer (and spacer layer, and PIC layer) may be variously cut and variously separable (e.g., horizontally cut and vertically separable). Any combination of cut and separability between substrates of an optical coupler layer is contemplated herein. According to aspects comprising a plurality of substrates in PhotonicPlug layer 906, the substrates may be oriented and packaged variously as would be understood by persons of ordinary skill in the art and as may be appreciated from the present disclosure. Additionally, substrates may comprise alignment features 950 to assist in aligning substrates during assembly and/or installation (as described in more detail herein).

Figure 10A:
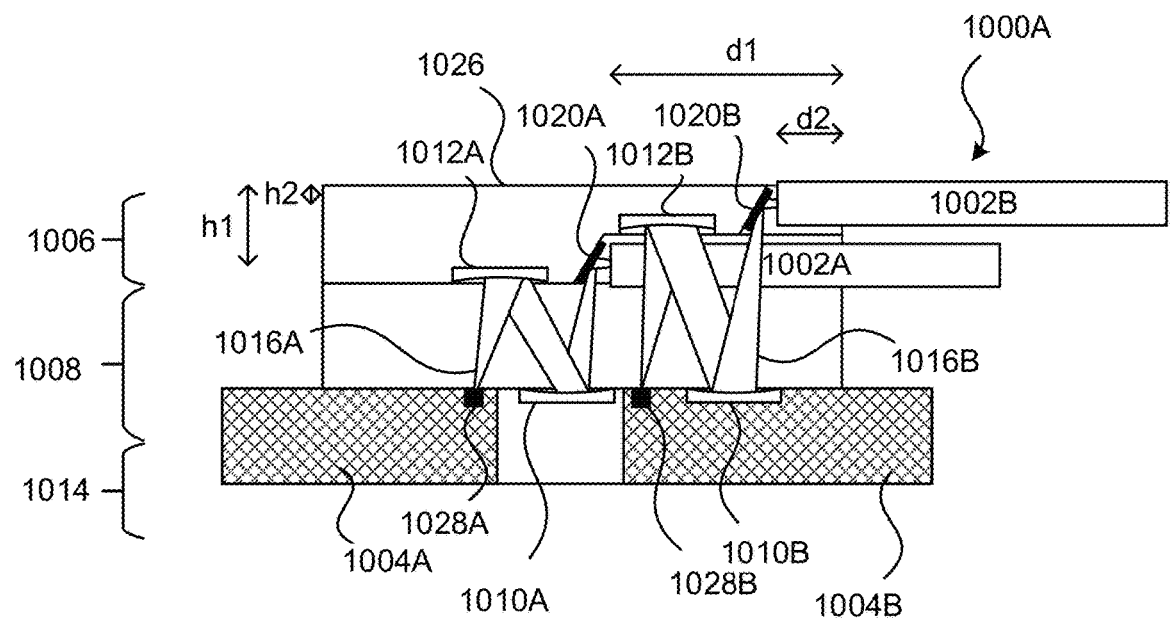
FIG. 10A depicts a cross section of an example stacked optical coupler according to one or more aspects of the present disclosure.

While the accommodation for multiple fibers in a side-by-side (e.g., lateral) arrangement has been illustrated (see, e.g., FIGS. 2, 9B, and 9C) it is also contemplated herein that PhotonicPlug layers may comprise stacked fibers (e.g., vertically arranged). FIG. 10A depicts a cross section of an example stacked optical coupler 1000A according to one or more aspects of the present disclosure. The example stacked optical coupler 100A may comprise optical fibers arranged in a stacked (e.g., vertical) configuration. The terms "side-by-side," "lateral," "stacked," and "vertical" are for purposes of illustration only. It should be understood that the stacked optical couplers may be used and oriented variously in use, as such, that which is described as vertical in relation to the present FIGS. may be arranged variously in use (e.g., the configuration of FIG. 10A may be rotated 90° in use such that the "stacked" configuration becomes a "lateral" or "side-by-side" configuration. Therefore, these terms (e.g., "side-by-side," "lateral," "stacked," and "vertical") are not intended to be limiting but are comprised for purposes of illustration only.

Referring to FIG. 10A, stacked optical coupler 1000A may optically connect first optical fiber 1002A and second optical fiber 1002B to first PIC 1004A and second PIC 1004B respectively. first optical fiber 1002A may be set at a first height h1 in the receiving substrate. Second optical fiber may be disposed at a second height h2 in the receiving substrate 1026. Additionally, the first and second optical fibers 1002A and 1002B may be stepped from one another. The optical fibers 1002 may be stepped, e.g., first optical fiber 1002A may be set at a first depth d1 in receiving substrate 1026 and second optical fiber 1002B may be set at second depth d2 in receiving substrate 1026. (First and second optical fibers may be disposed in a single substrate or multiple separate substrates). First first turning mirror 1020A may be disposed proximate to first optical fiber 1002A and second first turning mirror 1020B may be disposed proximate to second optical fiber 1002B. Further, each optical fiber 1002A and 1002B may comprise an associated first curved mirror 1010A and 1010B, and associated second curved mirror 1012A and 1012B. While FIG. 10A depicts the optical fibers 1002A and 1002B, first turning mirrors 1020A and 1020B, and second curved mirrors 1012A and 1012B as all being disposed in the same substrate, it is contemplated that each of these elements may be disposed in their own substrates or may be disposed in any combination in any combination of substrates. Further, while FIG. 10A shows a PhotonicPlug layer 1006 and receiving substrate 1026 that includes two stacked optical fibers 1002, it is contemplated herein that PhotonicPlug layer 1006 and/or receiving substrate 1026 may comprise any number of stacked optical fibers 1002. Additionally, FIG. 10A depicts optical fibers 1002 as the source/drain optical component, however, it is contemplated herein that optical couplers (e.g., stacked optical coupler 1000A) may optically couple any source/drain optical components in any combination (e.g., PIC-to-PIC, PIC-to-waveguide, etc.). Additionally, FIG. 10A depicts two PICs as source/drain optical components, however, it is contemplated herein that optical couplers may optically couple any optical components.

Figure 10B:
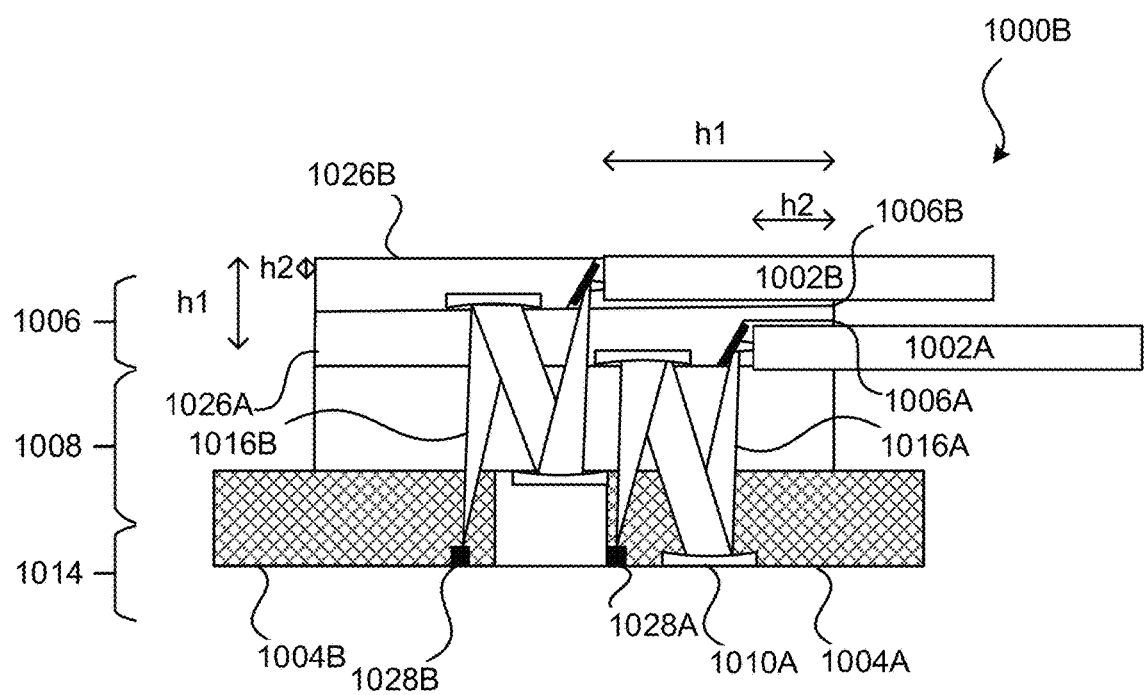
FIG. 10B depicts an example alternative stacked optical coupler according to one or more aspects of the present disclosure.

Referring to FIG. 10A, the second optical signal 1016B, (e.g., coupled between the second optical fiber 1002B and second PIC 1004B), taken in the fiber-to-PIC direction, may enter the stacked optical coupler 1000A from the second optical fiber 1002B. The second optical signal 1016B may be interfaced by the second first turning mirror 1020B, and may be directed from, and reflected by, the second first turning mirror 1020B, to the second first curved mirror 1010B. Accordingly, the second optical signal 1016B may propagate through (e.g., traverse) the first optical fiber 1002A (and any additional optical fibers) disposed relatively below the second optical fiber 1002B. Further, according to aspects, the optical signal may propagate through a portion of the substrate(s) of the PhotonicPlug layer. Subsequently, the second optical signal 1016B may propagate through the stacked optical coupler 1000A substantially as described in relation to the signal diagrams herein. For example, the signal may propagate through the spacer layer 1008 to second first curved mirror 1010A, second first curved mirror 1010A may substantially collimate, reflect the second optical signal 1016B and direct the substantially collimated optical signal to the second second curved mirror 1012B. The second second curved mirror 1012B may substantially focus the second optical signal 1016B, may reflect the second optical signal 1016B, and may direct the substantially focused optical signal at the second PIC I/O interface 1028B. The first optical signal 1016A may propagate similar to the above, though the first optical signal 1016A may not propagate through (e.g., traverse) another optical fiber. However, as described above, it is contemplated that stacked optical coupler may comprise any number of stacked source/drain optical components (e.g., optical fibers), therefore, the optical signals to and from a higher optical component, may propagate through all lower optical components. Additionally, FIG. 10B shows an example configuration with two separate PICs 1004A and 1004B. Alternative configurations may comprise a single PIC. The single PIC may comprise multiple PIC I/O interfaces (e.g., first and second PIC I/O interfaces 1028A and 1028B).

FIG. 10A, depicts an example stacked optical coupler for stacked optical fibers with a shallower depth of the second optical fiber (e.g., the higher optical fiber) than the first optical fiber (e.g., lower optical fiber). However, it is contemplated herein that the step of the optical fibers may be inverted. FIG. 10B depicts an example alternative stacked optical coupler 1000B according to one or more aspects herein. Referring to FIG. 10B, the first optical fiber may be disposed at a depth d1 and second optical fiber may be disposed at a depth d2, where d2 is deeper than d1. Accordingly, the higher optical fibers of the stacked optical fibers may overhang the lower optical fibers. Thus, FIG. 10B, depicts an example stacked optical coupler 1000B wherein the optical signal to and from the higher optical fiber (e.g., second optical fiber 1002B) may not propagate through, or traverse, the lower optical fiber (e.g., first optical fiber 1002A). According to such aspects, the optical signals may propagate through the stacked optical coupler substantially as illustrated and described with respect to FIG. 10A but may not propagate through lower optical fibers.

Still referring to FIG. 10B, an inverse stepped stacked optical fiber arrangement may use a first receiving substrate 1004A and a second receiving substrate 1004B substrate. Accordingly, first receiving substrate 1004A may comprise first fiber receiving feature 1006A to receive and align the first optical fiber 1002A. Additionally, the second receiving substrate 1004B may comprise a second receiving feature 1006B to receive and align the second optical fiber 1002B.

According to aspects, the first receiving substrate 1004A, or a portion thereof, as well as spacer of spacer layer 1008 may be substantially transparent to at least a range of wavelengths of light (e.g., the wavelength of the optical signal).

Figure 10C:
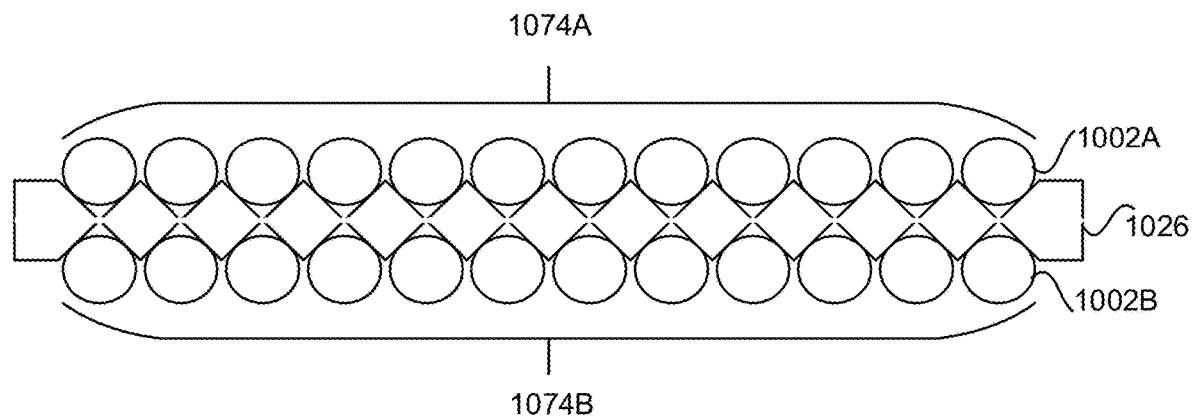
FIG. 10C depicts a front cross-section view of an example receiving substrate for a stacked optical fiber coupler according to one or more aspects of the present disclosure.

FIGS. 10A and 10B are two-dimensional, cross-sectional illustrations of example stacked optical couplers. However, in three dimensions, example stacked optical couplers may also comprise side-by-side optical fibers. Accordingly, FIG. 10C depicts a front cross-section view of an example receiving substrate for a stacked optical fiber coupler. Referring to FIG. 10C. stacked receiving substrate 1026 may accommodate first row of optical fibers (e.g., first optical fiber ribbon 1074A) and second row of optical fibers (e.g., second optical fiber ribbon 1074B). According to such aspects, the multiple ribbons may be stacked directly on top of one another (e.g., the optical fiber ribbon 1074A may be disposed substantially directly above second optical fiber ribbon 1074B). Alternatively, the multiple optical fiber ribbons 1074A and 1074B may be laterally off-set from one another (e.g., each optical fiber of first optical fiber ribbon 1074A may be disposed substantially above in in between each optical fiber of second optical fiber ribbon 1074B). Optical couplers (e.g., stacked optical couplers 1080A and 1000B) may incorporate any number of optical fiber ribbons. The optical fiber ribbons may be positioned variously in relation to one another as would be understood by persons of ordinary skilled in the art considering the present disclosure. FIGS. 10A-10B depicts first and second optical fibers 1002A and 1002B as being coupled to two different PICs 1004A and 1004B, respectively. Accordingly, each PIC is depicted as comprising a PIC I/O interface 1028A and 1028B (which may comprise, for example, amongst other things, PIC I/O waveguides). It is also contemplated herein that first and second optical fibers 1002A and 1002B may be connecter to two different PIC I/O interfaces of the same PIC (for example one for transmission of optical signals and one for reception of optical signals).

Figure 11:
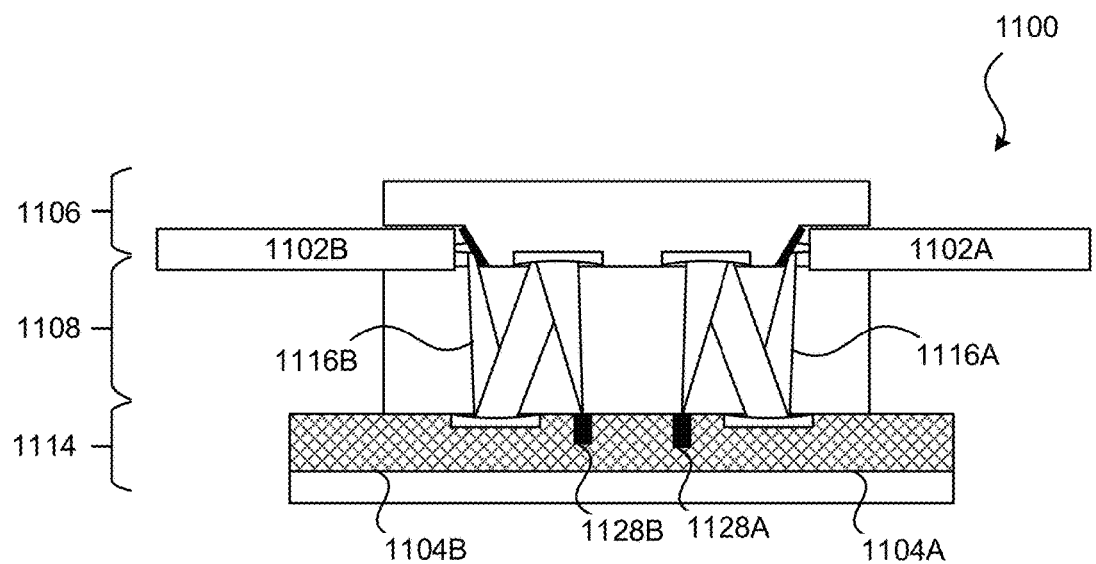
FIG. 11 depicts an example dual-sided optical coupler according to one or more aspects of the present disclosure.

FIG. 11 depicts an example dual-sided optical coupler. Referring to FIG. 11, PhotonicPlug layer 1106 may accept optical source/drain components from opposing directions. First optical fiber 1102A may be coupled to, and enter at, a first side of the optical coupler 1100. Second optical fiber 1102B may be coupled to, and enter at, a second side of the optical coupler, from a second direction that is substantially opposed to the first direction. First optical signal 1116A and second optical signal 1116B may propagate through the optical coupler substantially as described with relation to optical couplers (e.g., with relation to FIGS. 1-5C). FIG. 11 depicts the optical coupler 1100 as accepting a single optical fiber 1102 (e.g., single row of optical fibers in three dimensions) on either side. However, it is contemplated herein that the optical coupler can be a stacked optical coupler (as described in relation to FIGS. 10A-10C) as well. Thus, it is contemplated that optical coupler may comprise two or more optical fiber ribbons stacked per side of the coupler. Additionally, FIG. 11 depicts a two-dimensional cross-section of dual-sided optical coupler 1100. Additionally or alternatively, dual-sided optical coupler 1100 may also comprise a plurality of optical fibers in a side-by-side arrangement on multiple-sides of the dual-sided optical coupler 1100. Any number of optical fiber ribbons per side is contemplated herein, and the opposing sides may or may not comprise the same number of optical fiber and may or may not comprise the same number of optical fiber ribbons. Additionally, FIG. 11 depicts first and second optical fibers 1102A and 1102B as being coupled to two different PICs 1104A and 1104B, respectively. Accordingly, each PIC is depicted as comprising a PIC I/O interface 1128A and 1128B (which may comprise, for example, amongst other things, PIC I/O waveguides). It is also contemplated herein that first and second optical fibers 1102A and 1102B may be connecter to two different PIC I/O interfaces of the same PIC (for example one for transmission of optical signals and one for reception of optical signals).

Figure 12A:
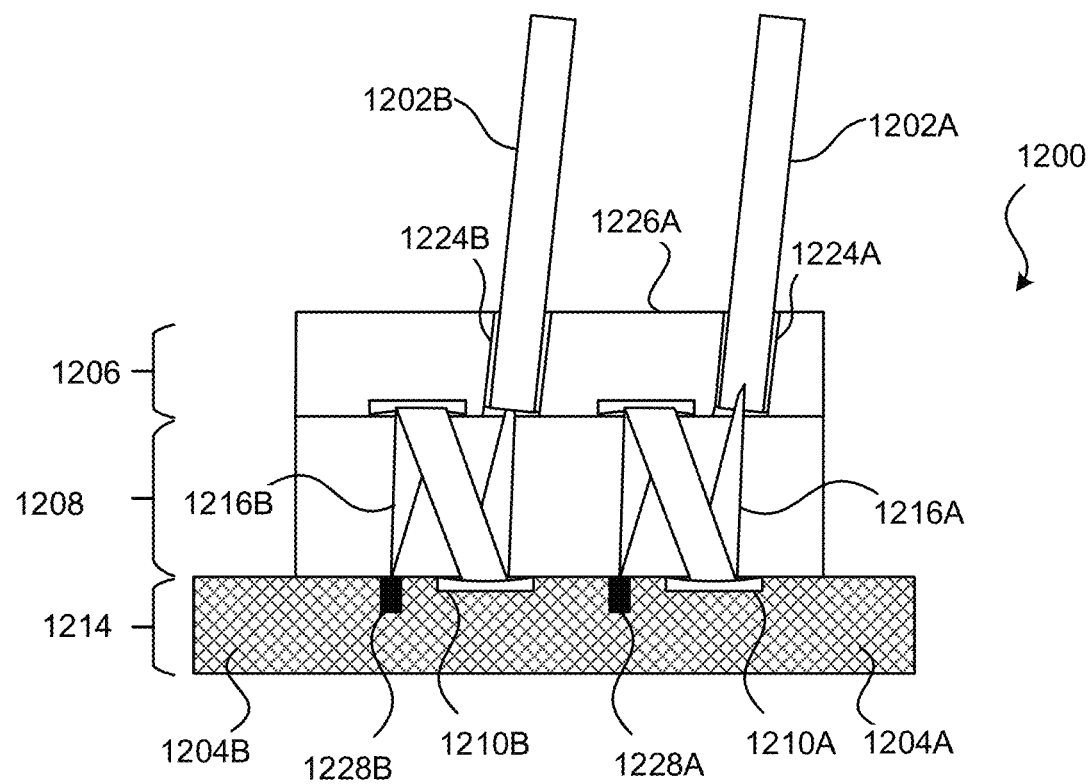
FIG. 12A depicts an example optical coupler according to one or more aspects of the present disclosure.

Example optical couplers have been illustrated herein (e.g., with reference to FIGS. 1, 2, 9, 10A-10B, and 11) with optical fibers arranged substantially parallel with the substrates of the underlying layers. FIG. 12A depicts an example optical coupler 1200 according to one or more aspects of the present disclosure. Referring to FIG. 12A, optical couplers may accept optical fibers 1002 at varying angles with respect to the underlying substrates. Referring to FIG. 12A, receiving substrate 1226A may receive optical fibers 1202 at an angle relative to the receiving substrate 1226A and/or PhotonicPlug layer 1206. Fiber receiving features 1224A and 1224B may be fabricated in receiving substrate 1226A at angles with respect to the receiving substrate 1226A. Optical fibers 1202 may be placed, and secured, in the receiving features 1224 at the predefined angles of the receiving features 1224. The angle of the optical fibers 1202 may be selected based on the desired angles of propagation of the signal path. For example, assuming an example first angle of propagation, α, (e.g., as illustrated in FIG. 3) is to be set at 8° from a vertical plane. Accordingly, receiving features 1224 may be fabricated in, and optical fibers 1202 may be received in, the receiving substrate 1226A at the desired first angle of propagation, a. First curved mirrors 1210 may be situated in direct lines from the angled optical fibers 1202. Thus, according to such aspects, first turning mirrors may be omitted from the optical coupler 1200.

Figure 12B:
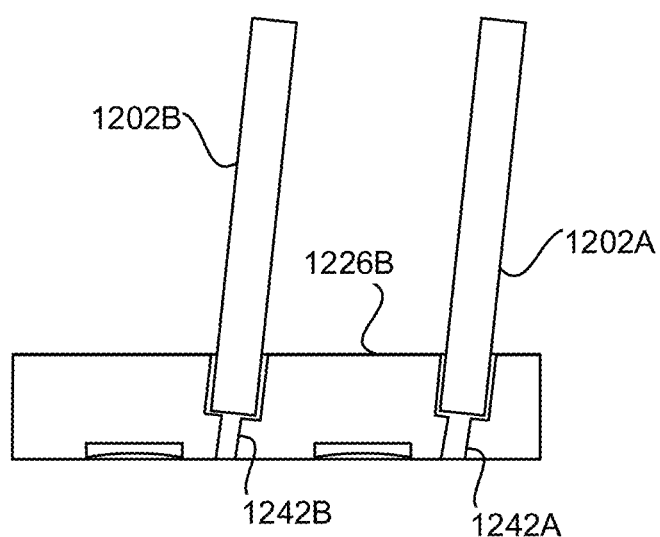
FIG. 12B depicts an example receiving substrate according to one or more aspects of the present disclosure.

Referring to FIG. 12A, angled fiber receiving features 1224 may be fabricated through substantially all of the receiving substrate 1226A such that the ends of the optical fibers 1202 may terminate near, practically abut, or abut, the spacer below. Additionally or alternatively, fiber receiving features 1224 may be fabricated through only a portion of the receiving substrate 1226A. According to such aspects, the optical signals 1216 may propagate through the receiving substrate 1226A as described herein. Such receiving substrates may comprise, for example, silicon material through which optical signals may propagate (e.g., silicon materials that are substantially transparent to the optical signal wavelength). Accordingly, one or more anti-reflective layers may be deposited (e.g., coated) or otherwise placed on one or more surfaces of the receiving substrate to ensure proper index matching and/or to avoid increased scattering and/or increased signal attenuation. FIG. 12B depicts an example receiving substrate 1226B according to one or more aspects of the present disclosure. Referring to FIG. 12B, some or all of the fiber receiving features 1224 may stop at a specified depth in the receiving substrate 1226B, and a through hole 1242 may continue through the rest of the receiving substrate 1226B in which optical signal may propagate. According to aspects, the through holes 1242A and 1242B may be filled with a substance (e.g., epoxy) with a suitable index of refraction (e.g., an index of refraction substantially similar to that of the spacer, according to aspects comprising a spacer). Additionally, FIG. 12B depicts first and second optical fibers 1202A and 1202B as being coupled to two different PICs 1204A and 1204B, respectively. Accordingly, each PIC is depicted as comprising a PIC I/O interface 1228A and 1228B (which may comprise, for example, amongst other things, PIC I/O waveguides). It is also contemplated herein that first and second optical fibers 1202A and 1202B may be connecter to two different PIC I/O interfaces of the same PIC (for example one for transmission of optical signals and one for reception of optical signals).

Referring to FIG. 8, as described optical fibers 802 may be placed at an angle relative to the PIC 804 and underlying substrates, and according to aspects, optical fibers 802 may be placed at an angle that is different from the first angle of propagation, a. For example, assume that the example desired first angle of propagation is 8° from the normal. The optical fibers 802 may be secured to the receiving substrate 826 at an angle different from 8° (e.g., 45 degrees from the vertical). Accordingly, turning elements (e.g., first turning mirror 820, turning lenses) may be implemented to achieve the example desired angle of propagation (e.g., 8° from a vertical plane). Thus, it can be seen that according to the present disclosure, optical fibers 802 may be angled variously with respect to the remainder of the optical coupler.

Referring again to FIG. 12A, as can be appreciated from the present disclosure, such an example configuration may allow for dense packing of optical fibers and an increase in optical I/O connections. While FIG. 12A depicts a plurality of optical fibers 1202 in a two-dimensional cross-sectional plane, it is contemplated herein that the same coupler may allow for a plurality of fibers in a plane that is transverse to the cross-sectional plane depicted in FIG. 12A. For example, each of first optical fiber 1202A and second optical fiber 1202B may be one fiber in a ribbon of optical fibers connected to optical coupler 1200. Therefore, similar to that which is illustrated in FIGS. 8A-8C, optical coupler may accommodate multiple rows of optical fiber ribbon that may be incorporated with optical coupler 1200 at an angle with respect to the underlying substrates. Additionally, such an arrangement may be understood as a two-dimensional matrix of optical fibers connected to the optical coupler (as seen from a view above the optical coupler). While FIG. 12A depicts two optical fibers (e.g., first and second optical fibers 1202A and 1202B) in the same cross-sectional plane (e.g., two optical fiber ribbons connected to optical coupler), optical coupler may be configured to accommodate any number of optical fibers in the same cross-sectional plane (e.g., 6 optical fiber ribbons connected to the optical coupler).

As described above, it is contemplated herein that the PhotonicPlug layer 1206 may comprise any number of substrates and may be fabricated of a combination of multiple materials (silicon, silicon oxide, metal, plastic, etc.). Where the PhotonicPlug layer 1206 is made of certain materials of lower thermal conductivity (e.g., silicon) external heat sinks may be desired according to configurations as described in more detail hereinbelow. However, where the PhotonicPlug layer 1206 comprises, or is fabricated of, material with a requisite thermal conductivity (e.g., metal, aluminum, steel, etc.), the PhotonicPlug layer itself may act as and/or be configured similarly to a thermal heat sink. Accordingly, an external heatsink may be forgone according to such aspects resulting in a reduced size of the optical coupler package. For example, referring to FIG. 12A, the receiving substrate 1226A may be constructed of aluminum, as such, the receiving substrate 1226A may be of sufficient thermal conductivity such that an additional separate heat sink may not be required. Further yet, heat sink fins (e.g., pin fins, louvered fins, perforated fins, etc.) may be integrated with the PhotonicPlug layer 12026 (either as apart of receiving substrate 1226 or separate from receiving substrate 1226) to further improve the thermal management at the PhotonicPlug layer 1206. For example, receiving substrate 1226A may comprise heat exchange features (e.g., fins) in the space between the first optical fiber 1202A and second optical fiber 1202B (and in three dimensions, in between the first row of optical fibers (first optical fiber ribbon) and second row of optical fibers (second optical fiber ribbon)). Thus, dense optical I/O may be realized and improved with a single optical coupler.

As described herein, optical coupler may comprise a spacer layer. Referring to FIG. 1, spacer layer 108 may be implemented to realize one or more of numerous functions. For example, spacer layer 108 may be implemented to space (e.g., distance) optical coupler components and/or elements as desired. For example, it may desirous to space first curved mirror 110 from second curved mirror 112 according to example design specifications. Additionally, it may be desirous for optical signal 116 to propagate through optical coupler while minimizing optical losses. To that end, according to aspects, spacer layer 108 may comprise one or more spacer substrates 118 of material that is substantially transparent to the wavelength of the optical signal (e.g., glass, epoxy, silicon, etc.). Additionally, it may be advantageous to fabricate spacer substrate 118 out of substantially non-conductive materials. Such highly transparent and substantially non-conductive materials may comprise, for example, glass, polymethylsiloxane, epoxy, or other similar index-matching materials etc. As will be described herein in more detail (e.g., with respect to FIG. 34B), electrical elements, for example, electrical pads, electrical traces, electrical through vias, etc. may be added to the spacer 118 that may be substantially non-conductive. Additionally, the spacer substrate 118 may be a semiconductor material as will be described herein in more detail.

It should be noted that layers of the optical coupler may not be uniform and may not have uniform interfaces. For example, substrates of the PhotonicPlug layer 106 may extend into the spacer layer 108, and substrates of the spacer layer 108 may extend into either the PhotonicPlug layer 106 and/or the PIC layer 114. The description of PhotonicPlug layer 106, spacer layer 108, and PIC layer 114 is intended for purposes of illustration only and is described as such only for clarity of discussion. PhotonicPlug layer 106, spacer layer 108, and PIC layer 114 are not considered discrete layers with discrete elements and functionality, rather, the functionality as described herein with relation to one layer (e.g., receiving substrate in the PhotonicPlug layer), may similarly be accomplished by another layer (e.g., spacer layer and/or PIC layer may comprise fiber receiving features to receive optical fibers).

Spacer substrate 118 may be variously attached to the PhotonicPlug layer 106 substrates and/or the PIC layer 114 substrates according to aspects. Accordingly, spacer 118 may be coupled to PhotonicPlug layer substrates and/or PIC layer substrates with bonding agents, for example adhesives, epoxies, resins, etc. Accordingly, it may be advantageous to select bonding agents with suitable optical characteristics (e.g., index of refraction), and mechanical characteristics as would be understood by a person of ordinary skill in the art and as described herein in more detail. For example, when selecting a material to be used for the spacer substrates, it may be advantageous to select a bonding agent with desirable thermal characteristics (e.g., thermal expansion) to retain operability and longevity of the optical coupler elements and components.

Figure 13:
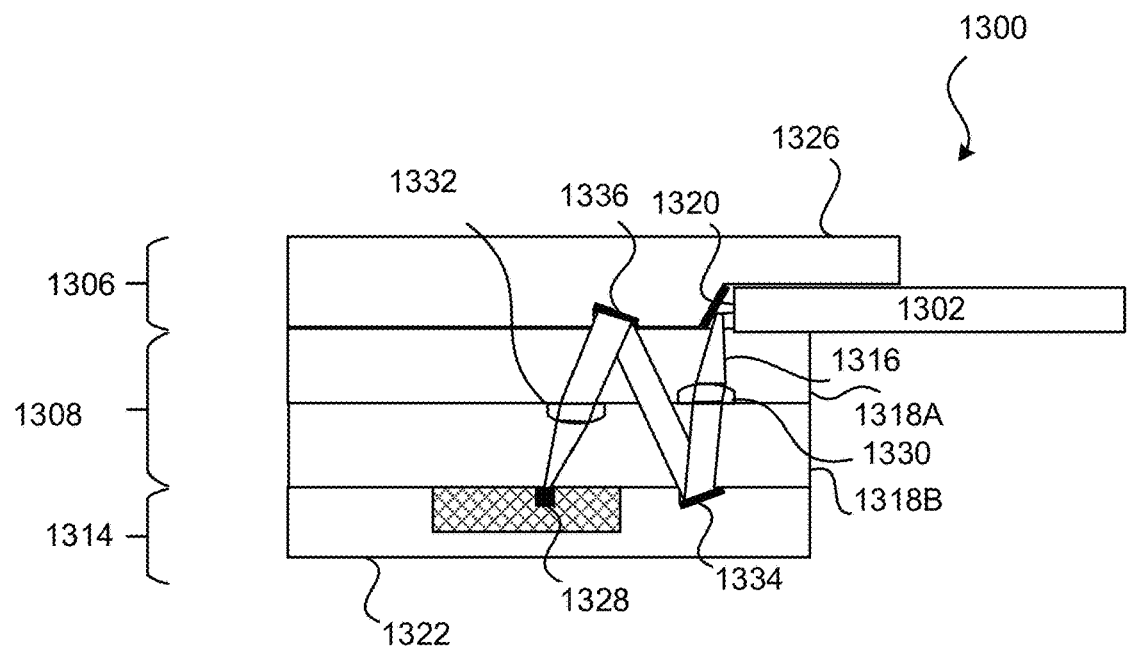
FIG. 13 depicts an example lensed optical coupler according to one or more aspects of the present disclosure.

FIG. 13 depicts an example lensed optical coupler 1300 according to one or more aspects of the present disclosure. As will be appreciated by persons of ordinary skill in the art, aspects of the preset disclosure may be practiced with lenses. For example, the collimation and focusing of the optical signal may, like curved mirrors, similarly be achieved with lenses, for example, a Fresnel lens, convex lens, or silicon lens. Thus, such lenses may be implemented in conjunction with mirrors (e.g., flat mirrors) to achieve similar results to those which may be achieved with curved mirrors. According to such aspects, the lenses may be implemented to transform the optical signal, for example, to collimate and focus the optical signal, and the mirrors may be used to reflect and direct the optical signal. Referring to FIG. 13, lensed optical coupler 1300 may comprise first collimating/focusing lens 1330 and second collimating/focusing lens 1332. The first and second collimating/focusing lenses 1330 and 1332 may be formed in spacer 1318 of spacer layer 1308. Additionally, lensed optical coupler 1300 may further comprise first directing mirror 1334 and second directing mirror 1336. First and second directing mirrors 1334 and 1336 may be substantially flat mirrors. Additionally, first and second directing mirrors 1334 and 1336 may be disposed at predefined angles with respect to the underlying substrate in order to direct the optical signal 1316 along the signal path as desired according to example configurations.

The optical signal 1316 may propagate through the lensed optical coupler 1300, and may be manipulated/transformed by the optical couple coupler 1300, as follows. Assuming the optical signal 1316 originates in the lensed optical coupler 1300 from the optical fiber 1302 (e.g., the optical fiber acts as the source), the optical signal 1316 may enter the lensed optical coupler 1300 from the optical fiber 1302 toward the first turning mirror 1320. First turning mirror 1320 may reflect the optical signal 1316 toward the first collimating/focusing lens 1330 and the first directing mirror 1334. The first collimating/focusing lens 1330 may substantially collimate the optical signal 1316. The first directing mirror 1334 may receive and reflect the substantially collimated optical signal 1316 toward the second directing mirror 1336. The second directing mirror may receive the substantially collimated optical signal 1316 from the first directing mirror 1334 and may reflect the substantially collimated optical signal 1316 toward the second collimating/focusing lens 1332 and the PIC I/O interface 1328. The second collimating/focusing lens 1332 may focus the optical signal 1316 toward the PIC I/O interface 1328. The PIC I/O interface 1328 may receive the focusing optical signal 1316. As will be appreciated, the same scheme may operate in reverse (e.g., where the PIC I/O interface 1328 acts as the source and the optical fiber 1302 acts as the drain). Thus, it can be appreciated that the interconnection schemes of the present disclosure may be accomplished with a combination of lenses and mirrors.

Collimating/focusing lenses 1330 and 1332 may be disposed in the spacer layer 1308. This may be advantageous because, as described above, the spacer substrate 1318 of spacer layer may be fabricated of substantially transparent materials. As such, spacer layer 1308 may lend itself to the incorporation of optical lenses. For example, first collimating/focusing lens 1330 may be formed in first spacer substrate 1318A and second collimating/focusing lens 1332 may be fabricated in second spacer substrate 1318B. Each of the first and second collimating/focusing lenses 1330 and 1332 may be formed as a part of the spacer substrates 1318A and 1318B (e.g., via NIL, CMOS, etc.). Alternatively, first and second collimating/focusing lenses 1330 and 1332 may be fabricated separately from the spacer substrates 1318A and/or 1318B and may be added to the spacer substrates 1318A and/or 1318B. While FIG. 13 depicts both collimating/focusing lenses 1330 and 1332 as being incorporated with spacer layer 1308, one or both of the collimating/focusing lenses 1330 and 1332 may be incorporated with any layer of the lensed optical coupler 1300. For example, according to aspects, first and/or second collimating/focusing lenses 1330 and 1332 may be incorporated with PhotonicPlug layer 1306. Alternatively, first and/or second collimating/focusing lenses 1330 and 1332 may be incorporated with PIC layer 1314. Any combination of the above is considered herein. Additionally, any or all of the PhotonicPlug substrate 1326, the first spacer substrate 1318A, the second spacer substrate 1318B, and/or the PIC substrate 1322 may comprise alignment marks and/or features to ensure proper alignment of the optical elements of the different substrates. Additionally, any or all of the PhotonicPlug substrate 1326, the first spacer substrate 1318A, the second spacer substrate 1318B, and/or the PIC substrate 1322 may comprise mechanical alignment features (e.g., as described herein with respect to FIGS. 33A and 33B) (e.g., pillars, and holes, plugs and sockets, etc.) to assist mechanical assembly and accuracy of the substrates of the optical coupler 1300.

FIG. 13 depicts first collimating/focusing lens 1330 as being disposed upstream from the first directing mirror 1334 and the second collimating/focusing lens 1332 as being disposed downstream from the second directing mirror 1336. However, according to aspects, first collimating/focusing lens 1330 may be disposed upstream or downstream from the first directing mirror 1334, and second collimating/focusing lens 1332 may be disposed upstream or downstream from the second directing mirror 1336 without changing the principles of operation herein. Thus, any combination of collimating/focusing lenses 1330 and 1332 either upstream or downstream from first and second directing mirrors 1334 and 1336 is contemplated herein.

FIG. 13 depicts a lensed optical coupler 1300 with two collimating/focusing lenses 1330 and 1332 and two directing mirrors 1334 and 1336. However, according to aspects, lenses and directing mirrors may be used in conjunction with curved mirrors. Thus, in FIG. 13, either first collimating/focusing lens 1330 and first directing mirror 1334 may be replaced by a curved mirror, or second collimating/focusing lens 1332 and second directing mirror 1336 may be replaced by a curved mirror. The curved mirror may be disposed in any layer as described elsewhere herein. Additionally, FIG. 13 depicts the lensed optical coupler 1300 as having a first turning mirror 1320. However, as described herein, according to aspects, the optical coupler may not comprise a first turning mirror 1320.

Referring to FIG. 7A, as described, spacer layer 708 may comprise one or multiple substrates (e.g., spacer substrates 718A and 718B). Alternatively, substrates of spacer layer 708 may be omitted for empty space in place of one or more substrates. An anti-reflective layer 752 (e.g., coating) may be used at some or all spacer layer substrate interfaces. Such anti-reflective layers 752 may alleviate issues concerning mismatch in the index of refraction of material as the optical signal propagates from one medium to another and may alleviate reflection, attenuation, and/or scattering of the optical signal at such interfaces. Anti-reflective layer 752 may comprise single-layer or multi-layer applications. Examples of anti-reflective layer 752 may include Magnesium Fluoride, other fluoropolymers, Silicon Nitride, Titanium Dioxide or any other suitable anti-reflective layers 752 known to persons of ordinary skill in the art. Additionally, anti-reflective layers may be applied to any substrate interface of the optical couplers herein. As an example, assume the spacer layer comprises two substrates 718A and 718B. According to such aspects, an anti-reflective layer 752 may be applied to the PhotonicPlug layer-first spacer substrate interface. Additionally or alternatively, anti-reflective layer(s) may be applied to the first spacer substrate-second spacer substrate interface. Anti-reflective layers may be applied either to one substrate at an interface or to multiple substrates at an interface. Additionally, it should be appreciated that alignment features may be added at one or more of all substrate interfaces. For example, alignment marks may be added to one or more of the substrates for assembly machine visual alignment. Additionally, as described hereinbelow (e.g., with respect to FIGS. 33A-33B) mechanical alignment features (e.g., pillars and holes, plugs and sockets, etc.) may be added to one or more of the substrates of the optical coupler 700A to ensure mechanical alignment of the substrates and optical elements.

Figure 7B:
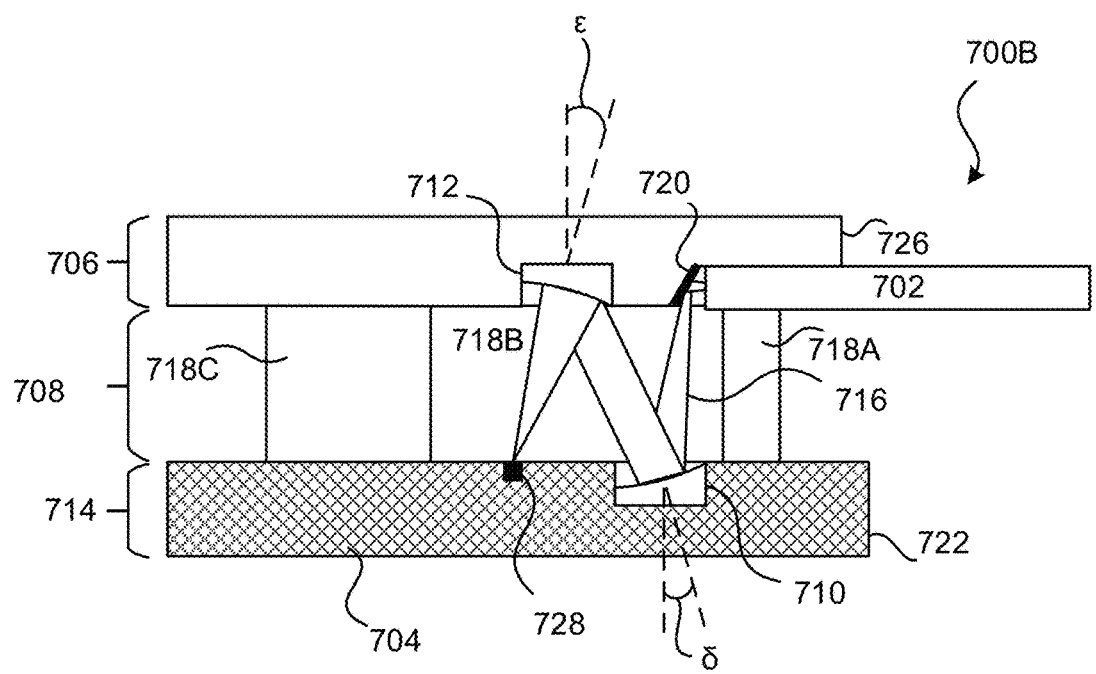
FIG. 7B shows an example optical coupler 700B according to one or more aspects of the present disclosure.
Figure 8:
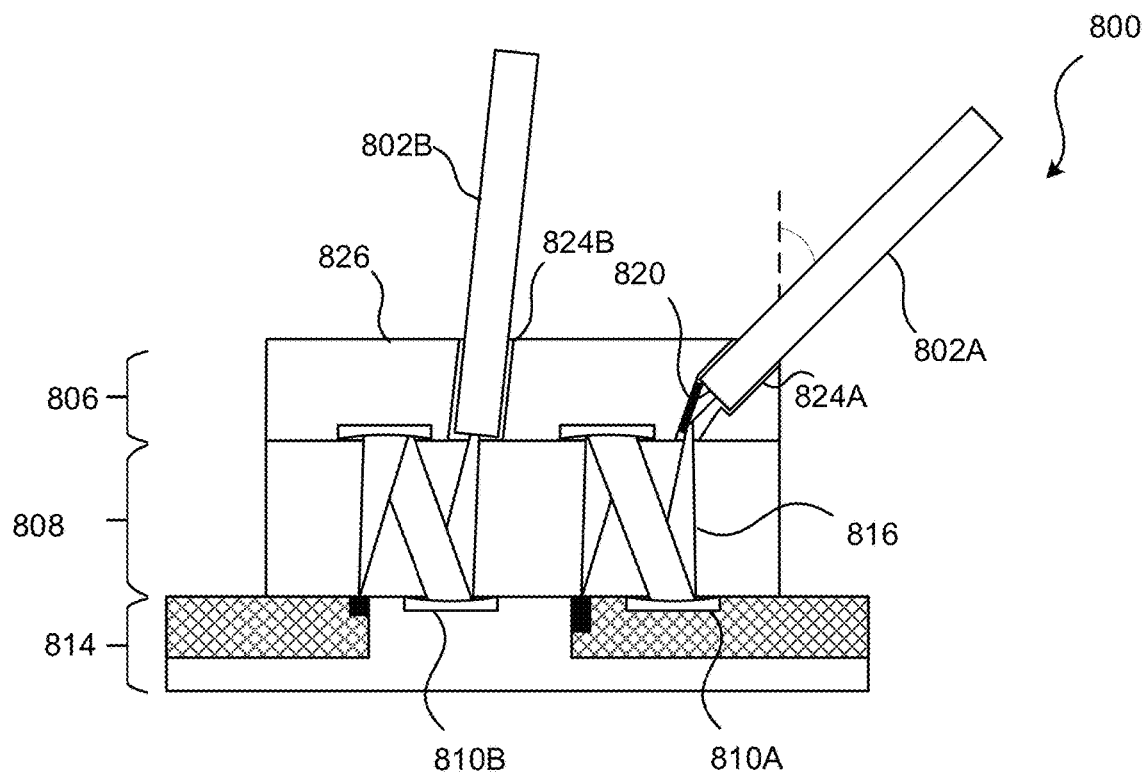
FIG. 8 depicts an example optical coupler according to one or more aspects of the present disclosure.

FIG. 7B shows an example optical coupler 700B according to one or more aspects of the present disclosure. FIG. 7A depicts an example optical coupler 700B with a split spacer being split in the horizontal direction. It should be understood that the spacer 718 (and all other substrates) may be similarly split in the vertical direction. For example, FIG. 7B depicts an optical coupler 700B with a spacer 718 that is split into three portions (e.g., 718A, 718B, and 718C). spacers and other substrates may be split for various purposes as would be understood by persons of ordinary skill in the art. For example, spacer may be split into multiple parts having multiple materials. For example, spacer parts 718A and 718C may be one material (e.g., silicon) while spacer part 718B may be another material (e.g., glass). Additionally, spacer 718 and other substrates may be variously split to facilitate assembly. As described above, alignment features are contemplated at all substrate interfaces.

Additionally, referring to FIG. 7B, the first curved mirror 710 and/or the second curved mirror 712 may be angled with respect to the respective underlying substrate. For example, the first curved mirror 710 may be at a first angle, $\delta$, with respect to the PIC substrate 722. The first angle, $\delta$, may be any angle, for example, from 0° to 90°. Additionally or alternatively, the second curved mirror 712 may be at a second angle, $\varepsilon$, with respect to the PhotonicPlug substrate 726. The second angle, $\varepsilon$, may be any angle, for example, from 0° to 90°. Depending on the configuration of the optical coupler 700B, the first angle, $\delta$, may be the same as the second angle, $\varepsilon$. Alternatively, the first angle, $\delta$, and the second angle, $\varepsilon$, may be different. Accordingly, different coupler configurations may be achieved considering different design parameters.

Figure 14:
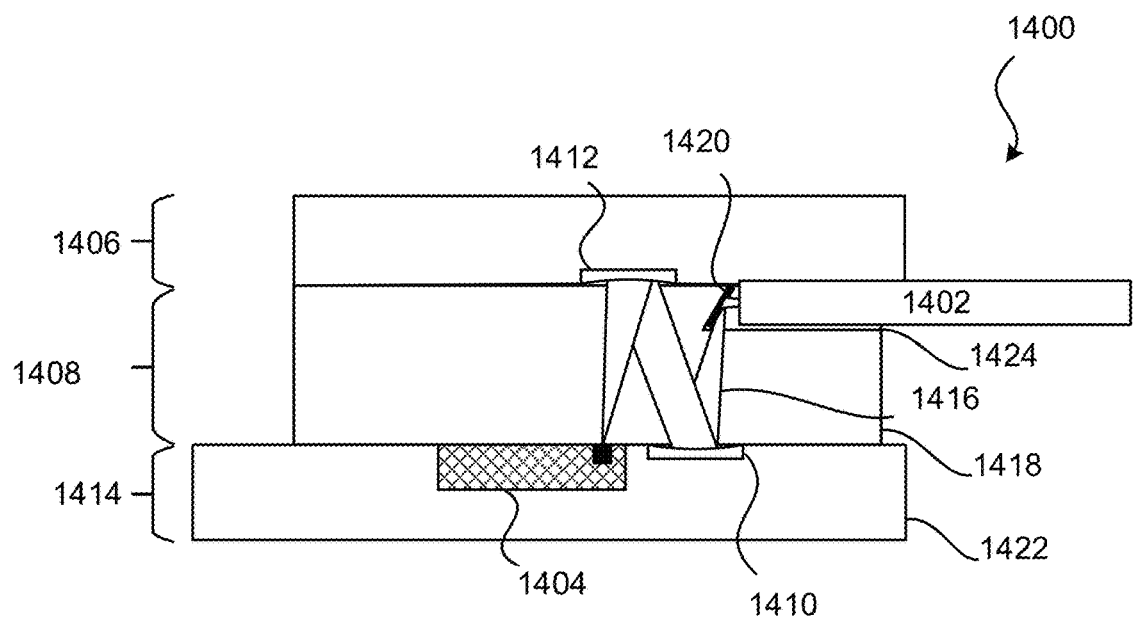
FIG. 14 depicts an example optical coupler according to one or more aspects of the present disclosure.

FIG. 14 depicts an example optical coupler 1400 according to one or more aspects of the present disclosure. Referring to FIG. 14, optical source/drain component may be connected to, or otherwise integrated with, the optical coupler 1400 at the spacer layer 1408. Accordingly, optical fiber 1402 may be coupled to the optical coupler 1400 at the spacer layer 1408. Spacer substrate 1418 may comprise fiber receiving features 1424 substantially as described with respect to receiving features of FIGS. 9A-9C. The methods of coupling may substantially comply with the methods of coupling optical fibers to the optical coupler described elsewhere herein. Referring to FIG. 14, where optical fiber 1402 is coupled to the optical coupler 1400 at the spacer layer 1408, the spacer substrate 1418 may further comprise first turning mirror 1420 (according to aspects comprising first turning mirror). Additionally, first curved mirror 1410 and/or second curved mirror 412 may additionally or alternatively be incorporated with the spacer substrate 1418 and/or the spacer layer 1408.

Similar to that which is described with respect to FIGS. 7A and 7B, first turning mirror 1420 in spacer substrate 1418 may be fabricated variously. According to aspects, spacer substrate 1418 may be fabricated of substantially transparent materials (or material that is substantially transparent to the optical signal 1416). Such materials may be formed variously depending on the material chosen, as would be appreciated by those of ordinary skill in the art. For example, a spacer substrate 1418 of a polymer may be hot embossed or additively manufactured as described elsewhere herein. Additionally or alternatively, spacer substrate 1418 may be fabricated of glass. As such, spacer substrate 1418 may be molded, slumped, ground, polished, etc. to create the desired spacer substrate 1418 shape. Accordingly, the shape for fiber receiving feature 1424 may be fabricated in substantially transparent spacer substrate 1418. Similarly, the shape of first turning mirror 1420 may be produced in substantially transparent substrate. Subsequently, a reflective layer may be added (e.g., deposited, coated, etc.) on the spacer substrate 1418 in the area of the first turning mirror 1420 to create the first turning mirror 1420 as desired. Optical signals 1416 may then propagate through the optical coupler 1400, from fiber-to-PIC and from PIC-to-fiber substantially as described elsewhere herein. Additionally or alternatively, spacer substrate may be fabricated of silicon. Accordingly, first turning mirror 1420, first curved mirror 1410, and second curved mirror 1412 may be fabricated substantially as described elsewhere herein.

Figure 15:
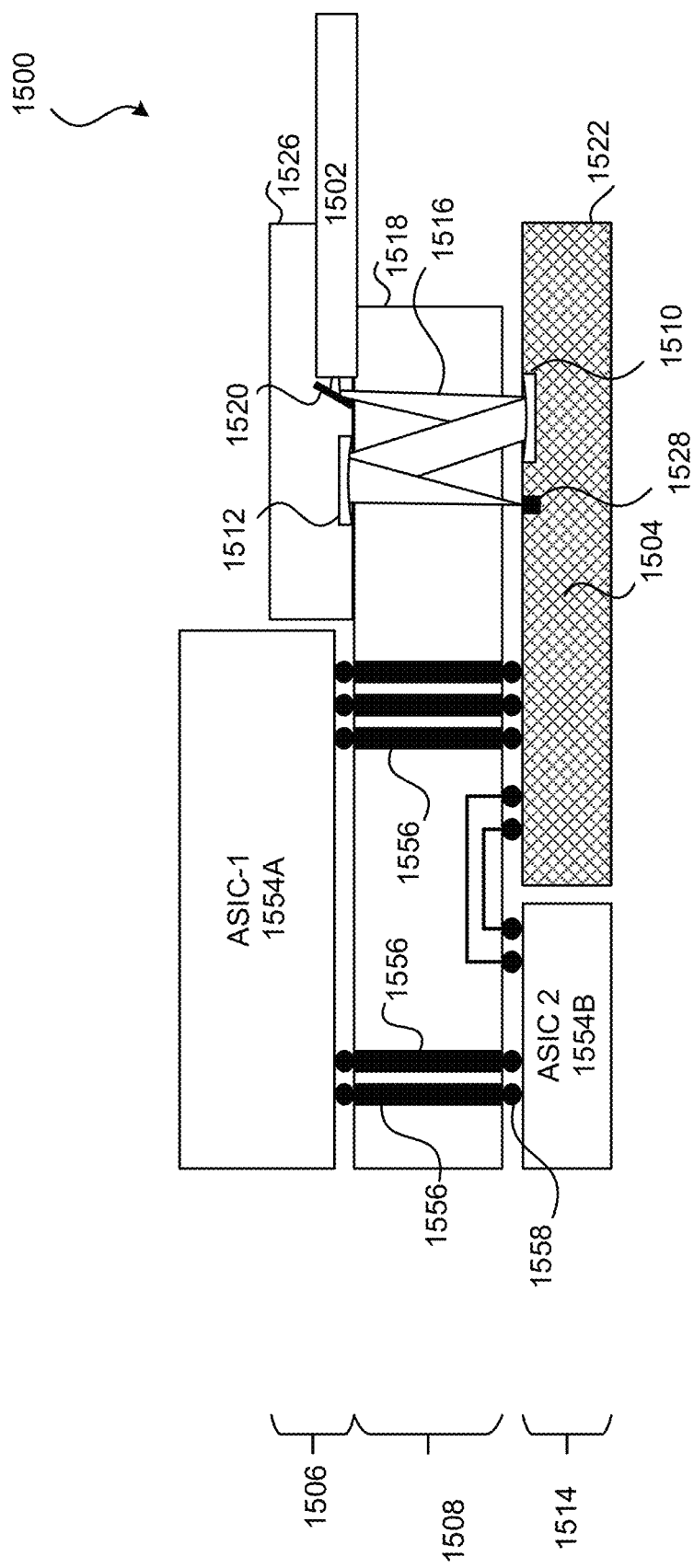
FIG. 15 depicts an example optical coupler with a spacer adapted as an interposer according to one or more aspects of the present disclosure.

Referring to FIG. 15, the optical coupler of the present disclosure may additionally be connected to, or otherwise facilitate connection to one or more additional electrical and/or optical components. For example, the optical coupler 1500 may facilitate connection to various electrical components, for example, electronic integrated circuits (EIC), application-specific integrated circuits (ASIC), application-specific standard products (ASSP), a system-on-a-chip (SOC), microprocessors, microcontrollers, GPUs, digital signal processors (DSP), switches, and the like. Interposer spacer substrate 1518 may comprise one or more electrical through-hole vias (e.g., through glass vias (TGVs), through silicon vias (TSVs)). Electrical through-hole vias (e.g., TGVs and/or TSVs) may be considered passive electrical elements for facilitating connection of electrical components. And interposer spacer substrate 1518 may additionally or alternatively comprise one or more optical through-die vias (OTDVs) (which may be referred to herein, for example, as Optical Through Glass Vias and/or Silicon Optical Vias). OTDVs may be considered optical components for facilitating connection of optical components. For example, as described in more detail herein, it may be advantageous to package optical components with electrical components, in the same system as electrical components, in proximity to electrical components, and/or on the same substrate as electrical components. For example, such arrangements may be advantageous where high-speed optical connections are connected to electrical computing elements (e.g., electrical ASICs, electrical processors, electrical memories, electrical switches, etc.). Accordingly, a single spacer may facilitate optical and electrical connection.

For example, referring to FIG. 15, the optical coupler may optically connect one or more optical components (e.g., optical fiber 1502) to one or more PICs 1504. PICs may comprise optical-to-electrical conversion elements to convert optical signals to electrical signals, and/or electrical signals to optical signals. PIC 1504 may be additionally be in electrical communication with one or more electrical components (e.g., ASIC-1 1554A, and ASIC-2 1554B). Accordingly, interposer spacer substrate 1518 may comprise one or more electrical through-hole vias 1556. Electrical through-hole vias 1556 may electrically connected components electrically contacted thereto. For example, PIC 1504 may comprise any number of features for electrical connection, for example, solder bumps and/or micro-bumps 1558, etc. Similarly, ASIC-1 1554A and/or ASIC-2 1554B may comprise any number of features for electrical connection, for example, solder bumps and/or micro-bumps 1558. The features for electrical connection may be in electrical contact with the corresponding component (e.g., PIC 1504, ASIC-1 1554A, ASIC-2 1554B). The features for electrical connection may additionally be electrically connected to through-hole vias 1556 to effect electrical connection between components (e.g., PIC 1504 and ASIC-1 1554A). In addition to facilitating electrical connection, interposer spacer substrate 1518 may comprise features to facilitate optical connection. Such features may comprise optical features as described herein, for example, one or more curved mirrors, one or more optical mirrors, features of photonic bumps (as described below), materials and/or layers to facilitate optical connection.

As described, the optical couplers herein may couple an optical signal between an optical source and an optical drain. According to aspects, the optical source components or the optical drain components may be a PIC (which may further be variously optically and/or electrically connected to additional components). Accordingly, aspects of the present disclosure relate to optical component and/or elements (e.g., PIC I/O interfaces) for interfacing optical signals with PICs. Often, PICs may have one or more PIC I/O waveguides. PIC I/O waveguides may be the element through which the PIC optically communicates with other components and may receive incoming optical signals and may transmit outgoing optical signals. As described, present solutions to optical coupling with a PIC may comprise side coupling to the PIC (e.g., where the optical source/drain component is placed in the same plane as the PIC). Such side coupling may be associated with burdensome assembly tolerances and may not result in high yield with fiber assembly. Accordingly, the present disclosure discloses systems, methods, and apparatuses that, amongst other advantages, removes the optical component (e.g., optical source/drain) (e.g., optical fiber, laser) from the plane of the PIC (e.g., optical source/drain) with relaxed assembly tolerances. Accordingly, one or more elements and/or components may be used to direct (e.g., reflect, propagate, redirect) the optical signal into/out of the plane of the PIC (and/or PIC I/O waveguide). Additionally, optical coupling is often associated with coupling of one or more optical components being associated with (may be referred to herein as "having") different mode diameters (e.g., beam waist). For example, it is often desirable to optically couple a single mode fiber (SMF) and/or a laser to a PIC. SMFs may have example core diameters in the range of about 8 micrometer to about 10.5 micrometer. Accordingly, the mode diameter of an optical signal for these typical SMFs may be in a similar range (note, mode diameter may deviate from (e.g., be larger than) SMF core diameter). However, PIC I/O waveguides (to which it may desirable to optically connect a SMF) may be differently sized. For example, PIC I/O waveguides may be in the example range of 3-5 micron. Therefore, it may be desirable to substantially match the modes (e.g., via expansion elements, contraction elements, etc.) to efficiently connect optical components (e.g., lasers, optical fibers) requiring different mode sizes. Accordingly, one or more aspects of the present disclosure relate to mode matching for effective and efficient optical coupling between optical components having, requiring, and/or being associated with different mode diameters. Note, while the example SMF having an example core diameter of about 8-10 micron, and example PICs having example PIC I/O waveguides of an example range of about 3-5 micron, have been described, such description is intended for purposes of illustration only. Accordingly, aspects of the present disclosure relate to optically coupling any components requiring and/or being associated with different mode diameters (or the same mode diameters). Accordingly, aspects of the present disclosure relate to PIC I/O interfacing and/or PIC I/O interface elements that may perform one or both mode matching and/or signal direction. Some or all of such PIC I/O interfacing may be referred to herein and Photonic Bumps.

Figure 16A:
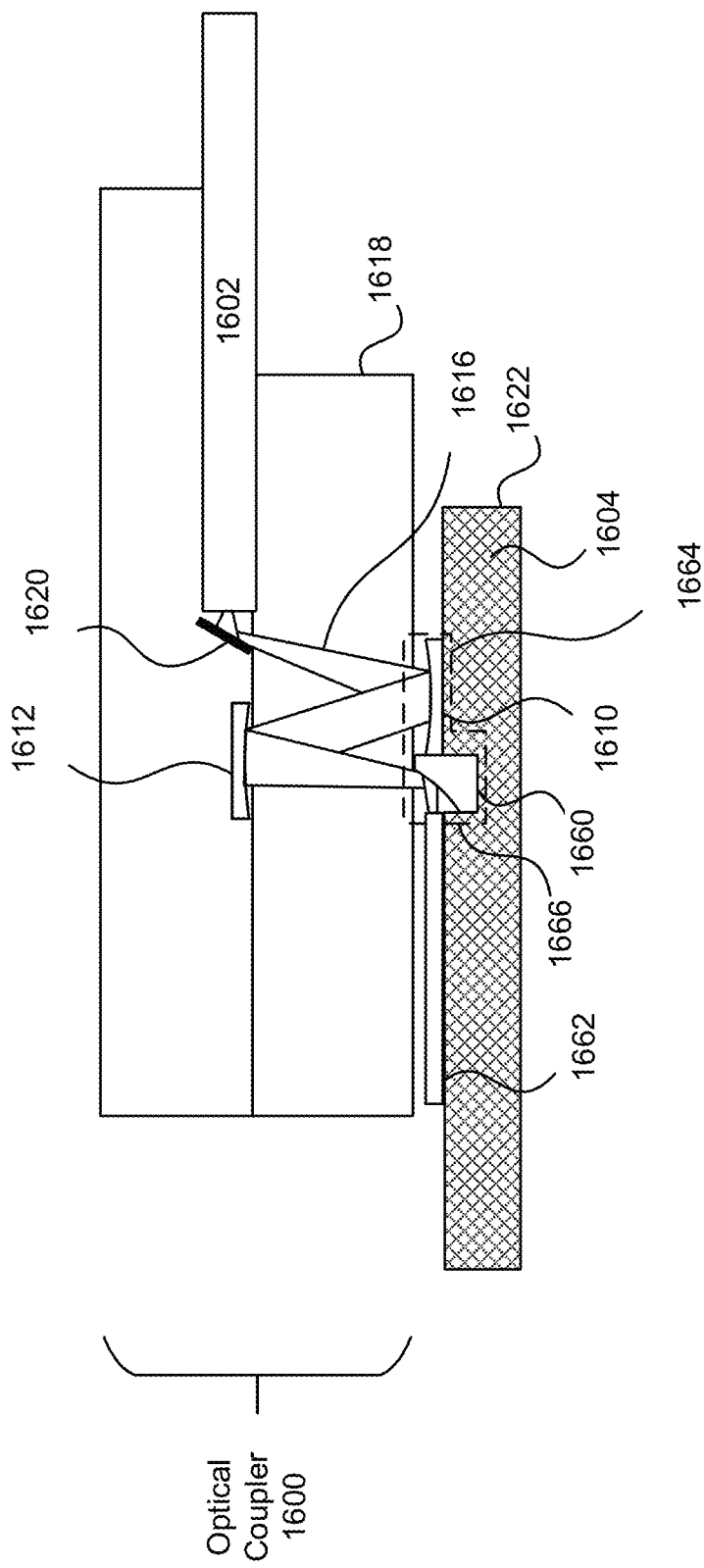
FIG. 16A depicts an example turning curved mirror PIC I/O interface (also referred to as a photonic bump and/or a TCM photonic bump) according to one or more aspects of the present disclosure.

FIG. 16A depicts an example turning curved mirror PIC I/O interface (also referred to as a photonic bump and/or a TCM photonic bump) according to one or more aspects of the present disclosure. Referring to FIG. 15, turning curved mirror (TCM) 1660 may allow efficient wide-band surface optical coupling. Further, TCM 1660 may allow for mode conversion (e.g., mode matching) of an optical signal to facilitate efficient coupling of optical components having different mode diameters (e.g., different mode size requirements) (e.g., PIC (e.g., with a PIC I/O waveguide) to an optical fiber having a different mode size requirement). Additionally, according to aspects, such mode conversion may be substantially accomplished by the TCM 1660. Further still, the TCM may allow for further alignment relaxation when optically connecting optical components (e.g., PIC to optical fiber). Additionally, the TCM 1660 may be fabricated with high volume semiconductor manufacturing (e.g., SOI, CMOS, grayscale lithography, nanoimprint lithography, etc.). The TCM 1660 may additionally enable improved wafer level testing. For example, in side-coupling optical solutions, the wafer may require dicing prior to full testing. Whereas, with optical couplers comprising a TCM 1660 (e.g., enabling surface coupling), the full wafer may be tested prior to dicing and further packaging with other components. As a result, in addition the other advantages described herein, manufacturing yield may be significantly improved. A layer of dielectric material, for example, metal (e.g., aluminum, chromium, gold, silver, etc.) may be deposited (e.g., coated on) the TCM 1660. Alternatively, TCM 1660 may be fabricated variously and may be incorporated with PICs and/or substrates variously. Additionally, the TCM 1660 may interface with optical couplers of the present disclosure to allow for the optical coupling of optical components (e.g., PIC to optical fiber).

Referring to FIG. 16A, PIC 1604 may comprise PIC I/O waveguide 1662 for the input and output of optical signals to/from the PIC 1604. The TCM may be placed and arranged such that the beams entering and exiting the PIC I/O waveguide may be interfaced with the TCM 1660. The TCM 1660 may manipulate (e.g., expand and/or contract) the optical signal 1616 and direct and reflect the optical signal 1616 to additional optical elements. As an example, assuming the PIC 1604 acts as the optical source component, an optical signal 1616 may exit the PIC I/O waveguide 1662 as a divergent beam propagating toward the TCM 1660. The optical signal may be incident upon the TCM 1660. The TCM 1660 may redirect the beam (e.g., turn the beam) and reflect the beam toward an additional optical element (e.g., the optical coupler curved mirror 1612). The TCM 1660 may, in addition to redirecting the beam (e.g., optical signal), perform beam manipulation. Such beam manipulation may expand or contract the beam to match the mode of the optical component to which the PIC 1604 is coupled. For example, if the PIC 1604 is coupled to an optical fiber 1602 (e.g., a SMF) having a larger mode diameter than the PIC I/O waveguide 1662, the TCM 1660 may expand the beam to match the mode diameter of the optical fiber 1602. Thus, it can be appreciated that the TCM 1660 may achieve beam direction/redirection, beam manipulation (e.g., mode matching), and may allow for wideband coupling (as it is a reflective element).

While the above is described in terms of the PIC 1604 acting as the source component, the same may apply in reverse, where the PIC 1604 may acts as the optical drain component. If the PIC 1604 acts as the drain component, the TCM 1660 may receive the optical signal 1616 (e.g., from the optical coupler) that may originate from an optical source (e.g., optical fiber 1602, laser, etc.) that may have a larger mode diameter. The TCM 1660 may then: 1) direct the optical signal toward the PIC I/O waveguide 1662; and 2) accomplish mode matching by reducing the mode diameter of the optical signal to match the mode diameter requirements of the PIC I/O waveguide 1662. While the above is described with respect to a PIC 1604 having a PIC I/O waveguide 1662 with smaller mode diameter requirements than the optically connected optical component, the present may similarly operate where the PIC I/O waveguide 1662 has larger mode field requirements than the optically connected optical component.

According to aspects, the TCM 1660 may be incorporated in a photonic bump 1664. The photonic bump 1664 may further comprise a photonic bump curved mirror (PB curved mirror) 1610. The PB curved mirror 1610 may interface the optical signal 1616 between multiple optical elements and/or optical components (e.g., an optical coupler curved mirror, and optical coupler tilted mirror, and optical fiber, etc.). If implemented with an optical coupler, PB curved mirror 1612 may interface an optical signal 1616 with the curved mirror of the optical coupler 1612 (e.g., curved mirror in the PhotonicPlug layer of the optical coupler), and a turning mirror of the optical coupler 1600 (e.g., turning mirror in the PhotonicPlug layer of the optical coupler). The PB curved mirror 1610 may interface an optical signal variously.

The photonic bump 1664 may be fabricated variously. For example, the photonic bump 1664 may be fabricated on a PIC. Alternatively, the photonic bump 1664 may be fabricated on a substrate (e.g., a PIC substrate 1622, e.g., SiPh substrate). The substrate may be the same substrate or a different substrate from the substrate in which the PIC is fabricated. The photonic bump 1664 may be fabricated around the time the PIC is fabricated. Alternatively, the photonic bump 1664 may be added to a substrate comprising a PIC at a later time. For example, a cavity 1666 may be formed in PIC substrate 1622. The TCM 1660 may be fabricated in the cavity 1666 using, for example, wafer level processes. Additionally or alternatively, the TCM 1660 may be variously added to the PIC substrate 1622, via, for example, additive manufacturing, deposition manufacturing. Additionally or alternatively, the TCM 1660 may be variously placed in the cavity 1666 and variously attached to the PIC substrate 122. The PB curved mirror 1610 may similarly be added to PIC substrate 122 using, for example, wafer level manufacturing processes and/or other processes of mirror fabrication described herein. The photonic bump 1664 may be fabricated using any one of numerous methods identifier herein (e.g., CMOS, NIL, greyscale lithography, etc.). For example, alternatively, the TCM 1660 and/or the photonic bump 1664 may be formed on the spacer 1618. The spacer 1618 comprising the TCM 1660 and/or the photonic bump 1664, may be added (e.g., assembled with, attached, etc.) to the PIC substrate 1622. As described herein, such assembly may use, for example, alignment marks on one or more of the assembled substrates (e.g., the spacer 1618 and/or the PIC substrate 1622) to facilitate accurate assembly of the substrates and optical elements. The PIC substrate 1622 and/or the spacer substrate 1618 may further comprise physical alignment features as described herein.

The photonic bump 1664 may be used in conjunction with an optical coupler (e.g., PhotonicPlug layer and spacer layer) to optically couple optical components (e.g., PIC to optical fiber). Accordingly, if in use in conjunction with an optical coupler, the beam may propagate through the optical coupler and photonic bump 1664. The optical signal 1616 may enter/exit the optical coupler at the optical component (e.g., optical fiber 1602). A first turning mirror 1620 may interface the optical signal between the optical component (e.g., optical fiber 1602, laser) and the PB curved mirror 1610. The PB curved mirror 1610 may interface the optical signal 1616 between the optical coupler curved mirror 1612 and the first turning mirror 1620. Depending on direction of optical signal propagation, the PB curved mirror 1610 may either substantially collimate the optical signal 1616 (e.g., toward the optical coupler curved mirror 1612) or substantially focus the optical signal 1616 (e.g., toward the first turning mirror 1620). The optical coupler turning mirror 1612 may interface the optical signal between the PB curved mirror 1610 and the TCM 1660. The TCM 1660 may interface the optical signal between the optical coupler curved mirror 1612 and the PIC I/O waveguide 1662. The TCM 1660 may, in addition to interfacing the optical signal as described, provide mode matching beam manipulation to transform the optical signal 1616 (e.g., optical beam) from a first mode diameter to a second mode diameter (e.g., expand or contrast the mode diameter of the optical signal).

Figure 16B:
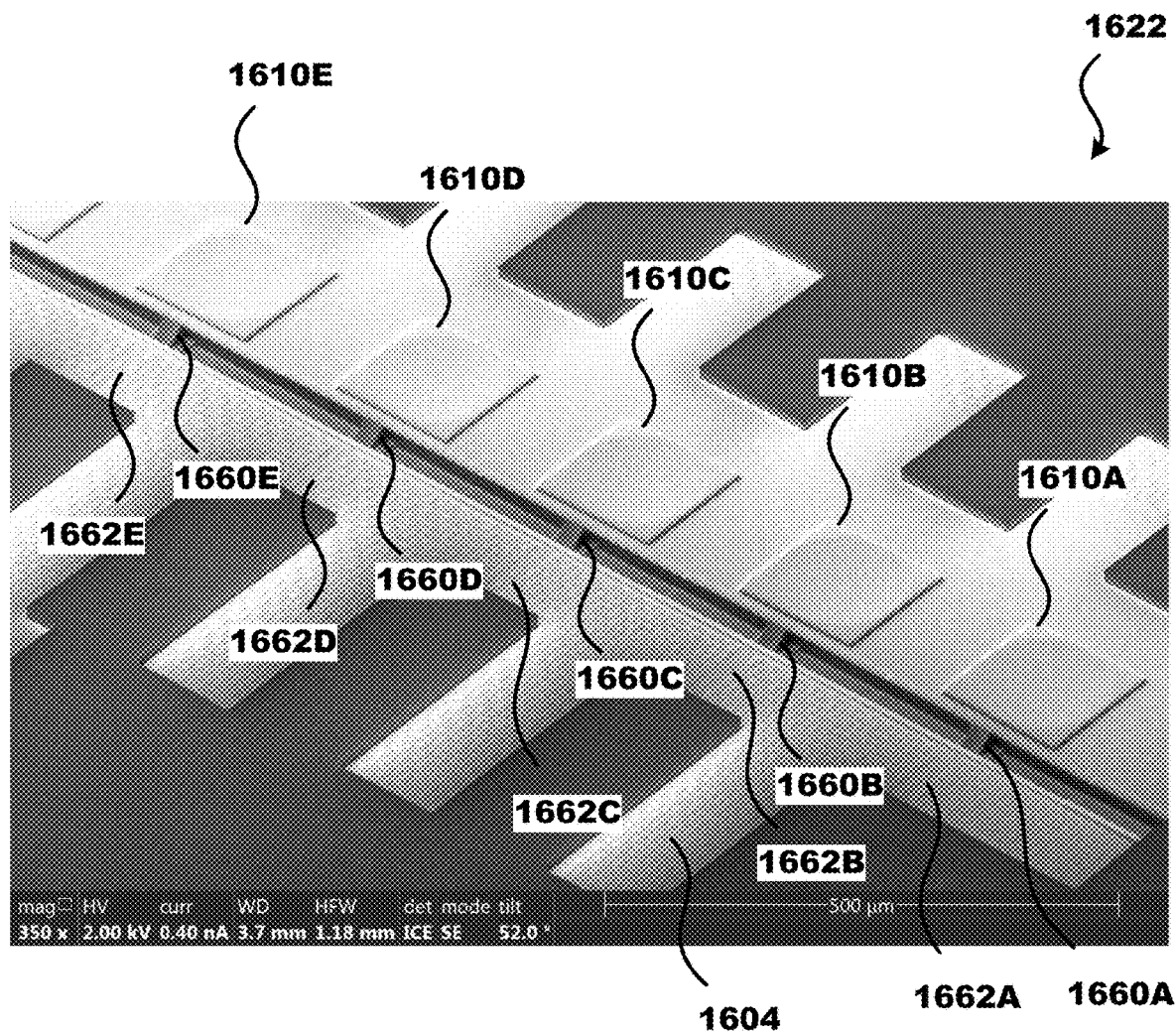
FIG. 16B depicts a plurality of example TCM photonic bumps on a PIC substrate according to one or more aspects of the present disclosure.

FIG. 16B depicts a plurality of example TCM photonic bumps on a PIC substrate 1622. Referring to FIG. 16B, PIC substrate 1622 may comprise one or more PICs 1604. The PIC substrate may be, for example a SiPh substrate. The one or more PICs 1604 may comprise one or more PIC I/O waveguides 1622 (FIG. 16B depicts an example five PIC I/O waveguides 1662A-1662E (generally PIC I/O waveguide 1622)). In order to facilitate optical connection of the PIC I/O waveguides 1662 to other optical components (e.g., optical fibers, lasers, etc.) the PIC substrate may comprise a TCM photonic bump for some of or each PIC I/O waveguide. Each TCM photonic bump may comprise a TCM 1660 (FIG. 6B depicts five example TCMs 1660A-1660E (generally TCM 1660)). Each TCM 1660 may be oriented such that it may interface an optical signal with its corresponding PIC I/O waveguide 1662 (e.g., an optical signal from the corresponding PIC I/O waveguide 1662 may be incident upon the TCM 1660, and an optical signal from the TCM may enter the PIC I/O waveguide 1662). Each TCM 1660 may redirect an optical signal that is incident thereupon, and may alter the optical signal (e.g., alter and/or transform the mode diameter of the optical signal) to match a desired mode diameter. Additionally, each TCM photonic bump may further comprise a PB curved mirror 1610 (FIG. 6B depicts five example PB curved mirrors 1610A-1610E (generally PB curved mirror 1610)).

The TCM photonic bumps of FIG. 16B may, for example, facilitate optical connection of the PIC I/O waveguides to additional optical components (e.g., optical fibers, lasers, other PICs) via for example, one or more optical couplers of the present disclosure. For example, an optical fiber corresponding to each PIC I/O waveguide may be connected to an optical coupler (e.g., at the PhotonicPlug layer). The optical coupler may comprise a first turning mirror and an optical coupler curved mirror for each connected optical fiber. The optical coupler may be aligned with and installed to PIC substrate 1622 such that each PIC I/O waveguide is optically coupled to each optical fiber via each corresponding TCM photonic bump and optical coupler curved mirror and first turning mirror. Example TCM photonic bump is illustrated in FIG. 16A as connecting a PIC to an optical fiber, and example TCM photonic bump is illustrated as interfacing one or more PICs. It should be appreciated that TCM photonic bumps may be used to optically connect any combination of optical components e.g., optical chips (e.g., PICs), optical fibers (e.g., SMF, polarization maintaining fibers (PM fibers), few mode fibers, multi-mode fibers), lasers, etc.).

Figure 16C:
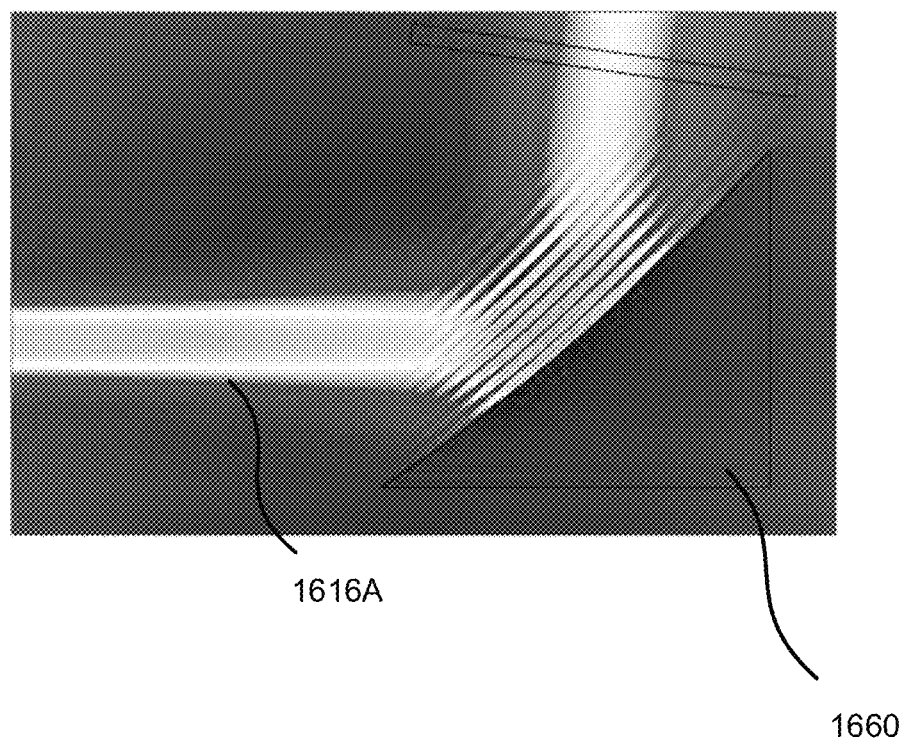
FIGS. 16C and 16D depict example TCMs executing optical signal redirection and mode conversion according to one or more aspects of the present disclosure.
Figure 16D:
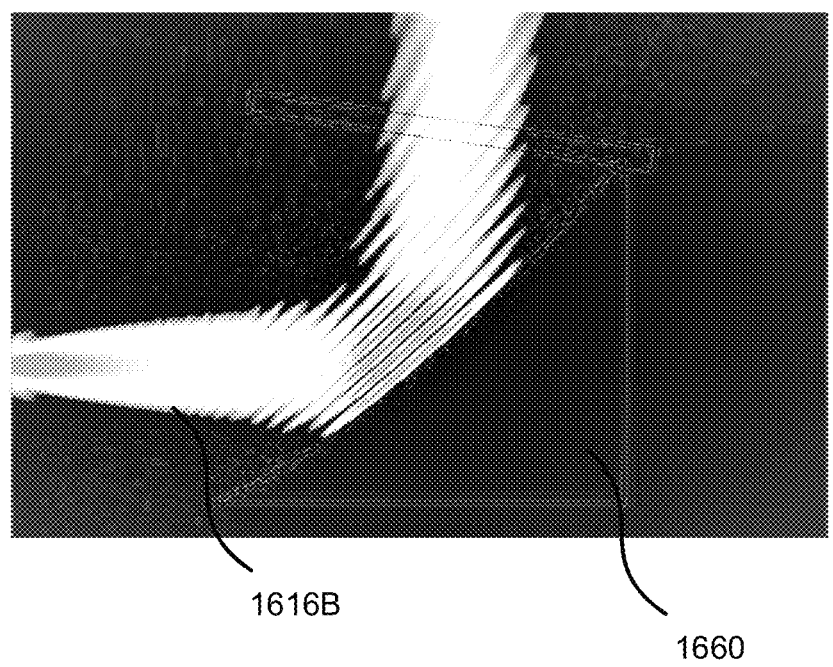

FIGS. 16C and 16D depict example TCMs executing optical signal redirection and mode conversion according to one or more aspects of the present disclosure. Referring to FIG. 16C, optical signal 1616A may be incident upon the TCM 1660. Optical signal 1616A may comprise a gaussian beam. The TCM 1660 may deflect the optical signal 1616 (e.g., reflect the optical signal 1616A in a different direction than the direction at which it approached TCM 1660). Additionally, as depicted in FIG. 16C, the signal may have one mode diameter before the TCM 1660 and a different mode diameter after the TCM 1660. FIG. 16D depicts a TCM 1660 substantially as described with respect to 16C reflecting and mode transforming a non-gaussian optical beam 1616B.

Figure 16E:
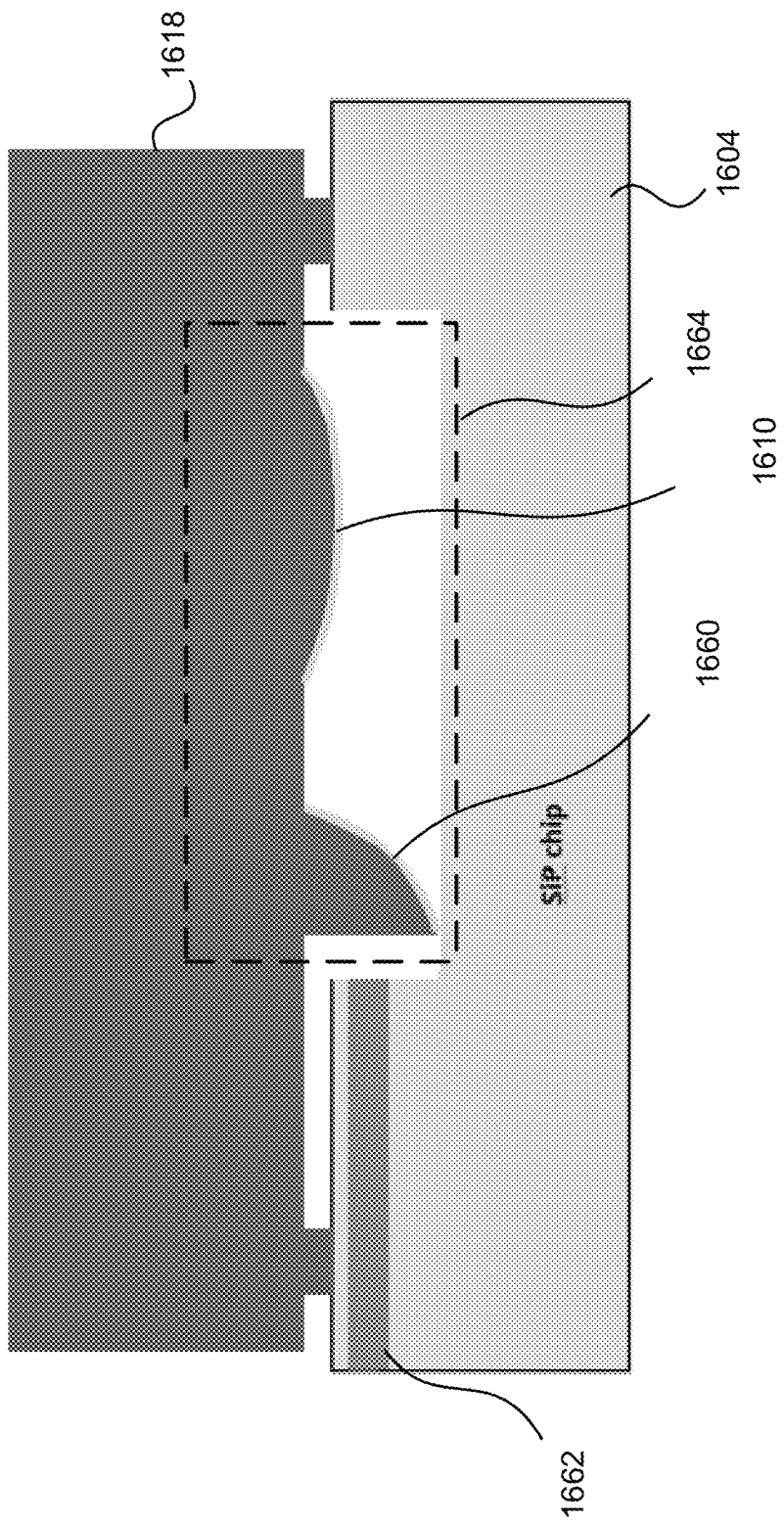
FIG. 16E depicts an example TCM photonic bump 1664 according to one or more aspects of the present disclosure.

FIG. 16A depicts an example TCM photonic bump 1664 on the PIC 1604 and/or the PIC substrate 1622. Additionally or alternatively, the TCM 1660 and/or the TCM photonic bump may be fabricated as a part of the spacer. FIG. 16E depicts an example TCM photonic bump 1664 according to one or more aspects of the present disclosure. Referring to FIG. 16E, the TCM 1660 may be fabricated as a part of the spacer 1618. Additionally or alternatively, the TCM curved mirror 1610 may be fabricated as a part of the spacer 1618. For example, the shape of the TCM 1660 and/or the TCM curved mirror 1610 may be fabricated in the spacer 1618. One or layers of dielectric may be deposited on the shapes of the TCM 1660 and/or the TCM curved mirror 1610. Alignment marks and/or mechanical alignment features may be included in either or both of the spacer 1618 and/or the PIC 1604. The spacer 1618 may assembled with the PIC 1604 (and additional components (e.g., a PhotonicPlug)) to effectuate an optical coupler using a TCM photonic bump 1664 as described herein.

Figure 17:
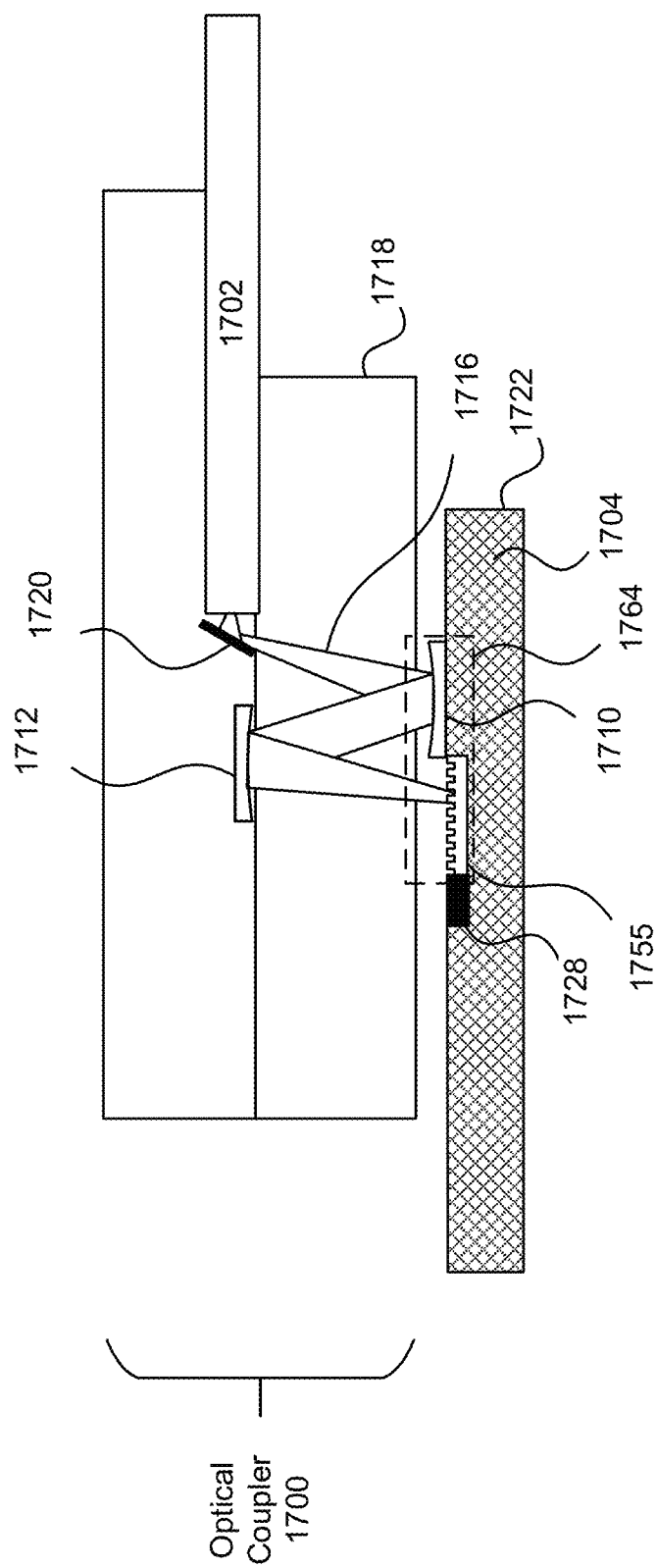
FIG. 17 depicts an example grating coupler photonic bump 1764 according to the present disclosure.

FIGS. 16A-16E show example TCM photonic bumps, other photonic bumps, for example, to facilitate optical connection of optical components are contemplated herein. FIG. 17 depicts an example grating coupler photonic bump 1764 according to the present disclosure. Referring to FIG. 17, the grating coupler photonic bump 1764 may be used to couple an optical signal 1716 between optical source and optical drain components (e.g., additional PIC I/O interface elements 1728 (e.g., PIC I/O waveguide and optical fiber 1702). The grating coupler photonic bump 1764 may comprise a grating coupler 1755. The grating coupler 1755 may be used to change the direction of an optical signal 1716. For example, the grating coupler 1755 may receive and optical signal from the PIC 1704 (e.g., additional PIC I/O interface elements 1728). The grating coupler 1755 may redirect the optical signal 1718 from the plane of the PIC 1704 at an angle to the plane of the PIC 1704 (e.g., in an example configuration at an angle in an example range of from 8° to 12°). Alternatively, in the reverse direction, the grating coupler 1755 may receive an optical signal at an angle to the PIC I/O waveguide 1762 and from an optical component (e.g., the second curved mirror 1712). The grating coupler may receive the optical signal 1716 at an angle to the PIC I/O waveguide 1762 and may redirect the optical signal 1716 into the plane of the PIC I/O waveguide 1762. Accordingly, the grating coupler 1755 may couple an optical signal with the PIC I/O waveguide 1755. The grating coupler 1755 may additionally comprise a mode converter that may convert the mode size of the optical signal 1716.

The grating coupler photonic bump 1764 may further comprise a GC curved mirror 1710. The GC curved mirror 1710 may comprise a curved mirror substantially as described herein (for example as described in relation to curved mirrors of FIG. 1). The GC curved mirror 1710 may facilitate optical connection between an optical source component and optical drain component, as would be understood from the present disclosure. The grating coupler 1755 and/or the grating coupler photonic bump 1764 may be fabricated on the PIC substrate 1722 using one or more fabrication methods described herein (e.g., NIL, CMOS, etc.). Additionally or alternatively, the grating coupler 1755 and/or the grating coupler photonic bump 1764 may be fabricated as a part of the spacer 1718. The spacer may be assembled with the PIC 1704 or other components. The spacer and/or the PIC may comprise alignment features to assist proper assembly alignment of the substrates and the optical elements. Additionally or alternatively, the spacer and/or the PIC may comprise mechanical alignment features to assist proper assembly alignment of the substrates.

Figure 18A:
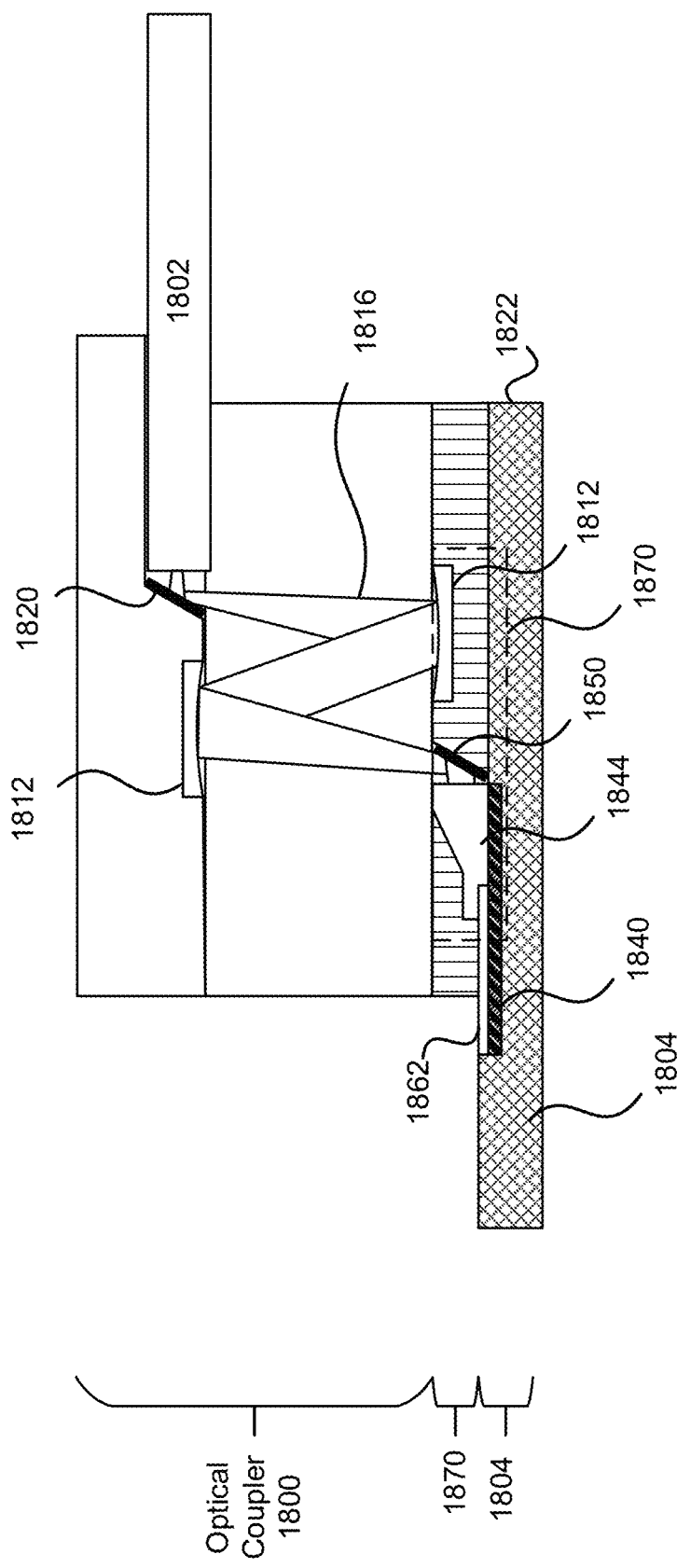
FIG. 18A depicts an example tapered waveguide photonic bump according to one or more aspects of the present disclosure.

FIG. 18A depicts an example tapered waveguide photonic bump 1870 according to one or more aspects of the present disclosure. The tapered waveguide photonic bump 1870 may facilitate wideband surface optical coupling between optical components (e.g., PIC, optical fiber, laser, etc.). The tapered waveguide photonic bump 1870 may provide such connection while assisting with signal coupling efficiency, mode-conversion, wide-band surface coupling, wafer level testing, low signal losses, thermal stability, and relaxed alignment between the PIC and the connected optical component. The tapered waveguide photonic bump 1870 may perform one or more of numerous functions. For example, the tapered waveguide photonic bump 1870 may transform (e.g., expand, contract etc.) the beam diameter of the optical signal being coupled (e.g., mode-conversion of the optical signal). Additionally or alternatively, the tapered waveguide photonic bump 1870 may turn or direct the signal being coupled. Additionally or alternatively, the tapered waveguide photonic bump 1870 may interface with an optical coupler 1800 to facilitate optical connection of optical components. Additional functions of the tapered waveguide photonic bump may be appreciated from the present disclosure.

Figure 18B:
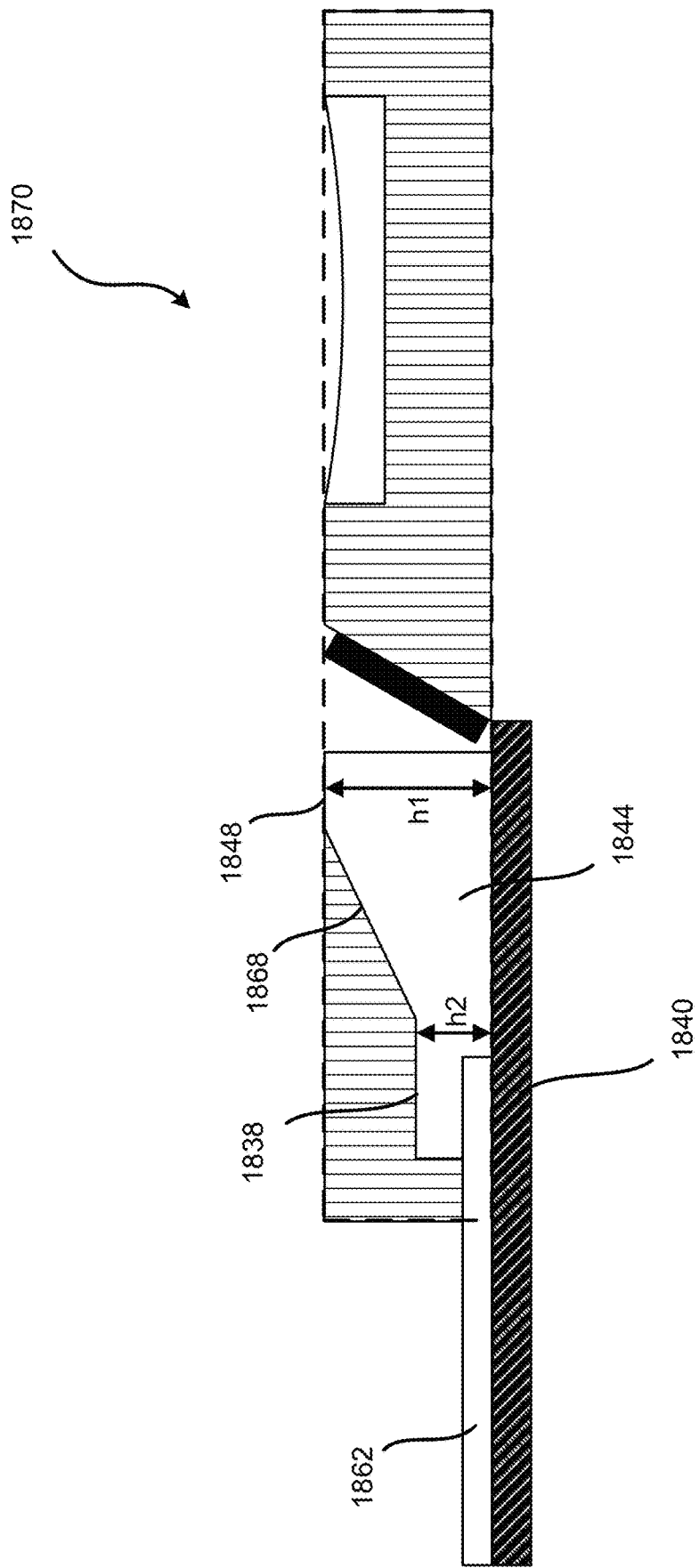
FIG. 18B depicts a cross-section of the example tapered waveguide photonic bump in a first dimension according to one or more aspects of the present disclosure.

Referring to FIG. 18A, optical coupler 1800 may be used to optically coupler an optical fiber 1802 to a PIC 1804. PIC 1804 may have a PIC I/O waveguide 1862 to accept/receive input optical signals and emit/transmit output optical signals. Thus, it may be desirous to efficiently interface optical signals with the PIC I/O waveguide 1862. PIC I/O waveguide 1862 may be inverse tapered (see FIGS. 18A-18C) to facilitate the expansion of optical signals and to facilitate the efficient coupling of optical signals to further elements (e.g., tapered waveguide 1844, optical fiber). Additionally, such PIC I/O waveguides 1862 may be of varying cross-sectional size. Such cross-sectional size may be different (e.g., smaller) than the mode diameter of the coupled optical fiber 1802. Accordingly, it may be advantageous to transform/convert the beam diameter of the optical signal 1816 to assist efficient coupling of the PIC I/O waveguide 1862 with the optical fiber 1802 that may have a mode diameter of a different size. Accordingly, tapered waveguide 1844 may be implemented to assist with the efficient coupling of the optical fiber 1802 to the PIC 1804. The tapered waveguide 1844 may be tapered in a first dimension. FIG. 18B depicts a cross-section of the example tapered waveguide photonic bump in a first dimension according to one or more aspects of the present disclosure. Referring to FIG. 18B, the tapered waveguide may be tapered from a larger first height h1 to a smaller second height h2. The tapered waveguide may comprise three portions, a first height portion 1848, a tapered portion 1868, and a second height portion 1838. Each portion may be of varying lengths. The tapered waveguide 1844 may be adiabatically tapered from first height h1 to second height h2. A cross-section of the tapered portion 1868 in a first dimension may form a first trapezoidal shape. The first trapezoidal shaped cross-section may form a substantially right trapezoidal shape or a substantially isosceles trapezoidal shape. According to aspects, the tapered waveguide 1868 may be fabricated and configured to expand the beam to a diameter that is substantially similar to the mode diameter of an optical fiber to which the PIC is being coupled. Thus, according to aspects, the first height h1 may be substantially similar to the size of the mode diameter of the optical fiber to which the PIC is being coupled. The second height portion may be configured to efficiently couple the tapered waveguide 1844 to a PIC I/O waveguide 1862. For example, the second height portion may expand the beam from, a PIC I/O waveguide mode size (e.g., less than one micron) to the second height portion mode size (e.g., 3-5 microns).

According to aspects, the tapered waveguide 1844 may be fabricated on an oxide layer 1840. The tapered waveguide 1844 may be fabricated of a polymer (e.g., polyimide) or nitrides such as silicon nitride, silicon oxynitride, or any material with a suitable refractive index. Such refractive index may be suitably low allowing the tapered waveguide, at the second height portion 1838, to readily expand the beam after it is received from the PIC I/O waveguide 1862. Thus, according to aspects, the index of refraction of the tapered waveguide 1844 or a portion of the tapered waveguide 1844, (e.g., the second height portion 1838) may be lower than the index of refraction of the PIC I/O waveguide 1862 and the underlying oxide layer 1840.

Figure 18C:
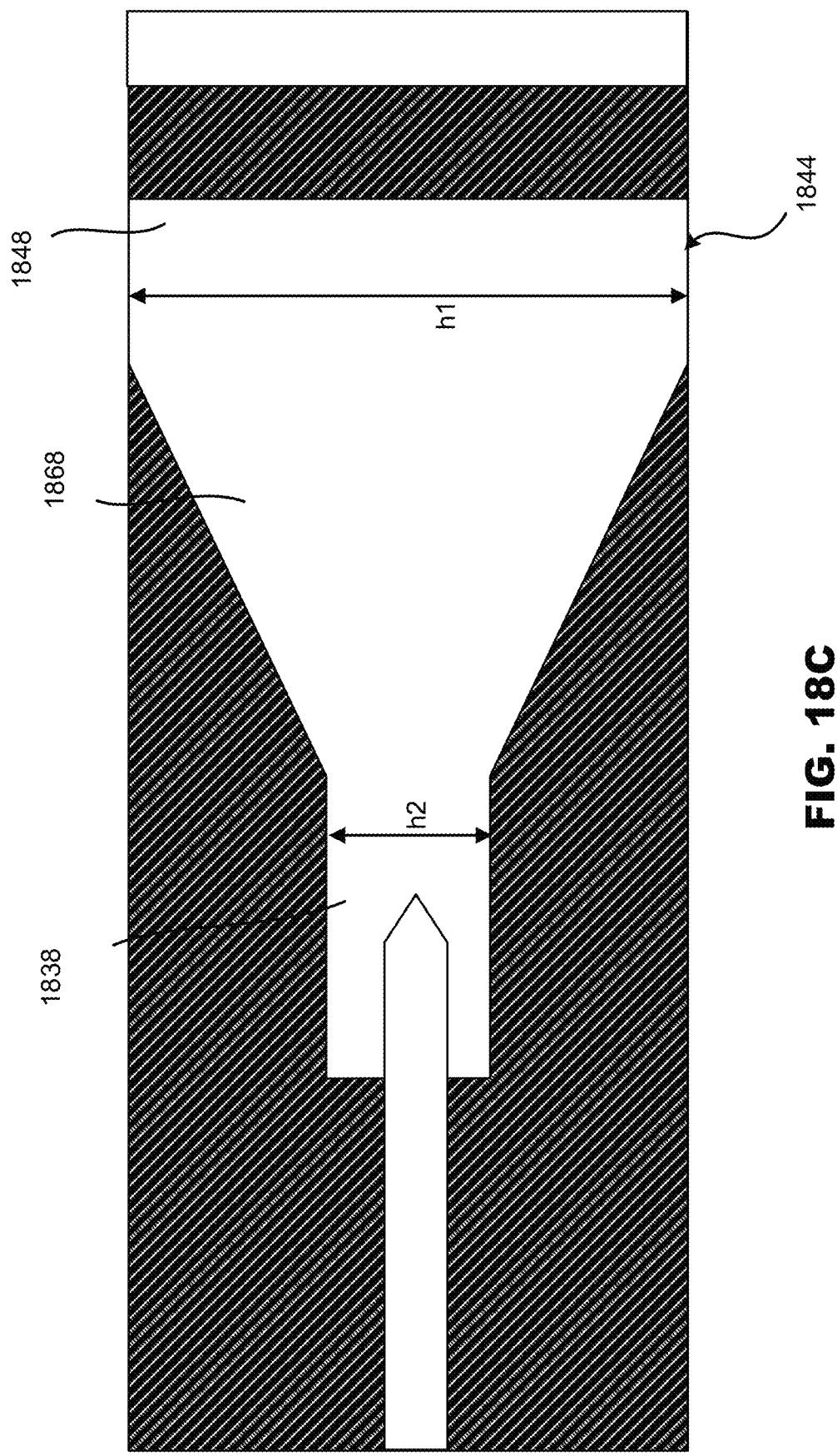
FIG. 18C depicts a cross-section of the example tapered waveguide photonic bump in a second dimension, substantially perpendicular to the first dimension of FIG. 18B, according to one or more aspects of the present disclosure.

FIG. 18C depicts a cross-section of the example tapered waveguide photonic bump in a second dimension, substantially perpendicular to the first dimension of FIG. 18B, according to one or more aspects of the present disclosure. Referring to FIG. 18C, the tapered portion of the tapered waveguide 1844 may be additionally tapered in a second dimension substantially perpendicular to the first dimension (as depicted in FIG. 18B). Like the first cross-section in the first dimension, the tapered waveguide 1844 may comprise three portions, a first height portion 1834, a tapered portion 1868, and a second height portion 1838. The tapered portion 1868 may taper the waveguide from the larger first height portion 1848 to the smaller second height portion 1838. The waveguide may be adiabatically tapered from the first height h1 to the second height h2. The taper in the second dimension may form a second trapezoidal cross-section. The second trapezoidal cross section may form a substantially isosceles trapezoidal shape or may form a substantially right trapezoidal shape. According to aspects, the tapered waveguide may be fabricated and configured to expand the beam to a diameter that is substantially similar to the mode diameter of an optical component (e.g., optical fiber) to which the PIC may be coupled. Thus, according to aspects, the first height, h 1, may be substantially similar to the size of the mode diameter of the optical component (e.g., optical fiber) to which the PIC is coupled. The second height may be similar to that which is described above in relation to the first cross-section in the first dimension.

Referring to FIG. 18A, The tapered waveguide photonic bump 1870 may be configured to interface the optical signal with one or more aspects of the optical couplers according to the present disclosure. Accordingly, tapered waveguide photonic bump 1870 may comprise one or more mirrors (or lenses) to facilitate such optical interfacing. Referring to FIG. 18A, the tapered waveguide photonic bump 1870 may comprise a tapered waveguide photonic bump turning mirror 1850 and a tapered waveguide photonic bump curved mirror 1810. The tapered waveguide photonic bump turning mirror 1850 may be substantially flat and may be configured and disposed at a predefined angle with respect to the tapered waveguide 1844 and/or the underlying substrate. The tapered waveguide photonic bump turning mirror 1850 may interface the optical signal 1816 with the tapered waveguide 1844. Additionally, the tapered waveguide photonic bump turning mirror 1850 may interface the optical signal 1816 with one or more additional optical elements (e.g., coupler curved mirror 1812) to facilitate the optical connection of PIC 1804 and a further optical component (e.g., optical fiber 1802). If the PIC 1804 acts as the optical source component, the light beam 1816 may enter the second height portion of the tapered waveguide from the PIC I/O waveguide 1862. The first height portion may expand the beam from the PIC I/O waveguide mode to the first height portion mode. The beam may continue to the tapered portion of the tapered waveguide. The tapered portion may further expand the beam adiabatically. According to aspects, the tapered portion may expand the signal beam to substantially match the size of the mode diameter of the optical fiber 1802 to which the PIC 1804 is being coupled. According to further aspects, the tapered portion may expand the beam to various sizes that may or may not match the size of the mode diameter of the optical fiber 1802 to which the PIC 1804 is being coupled. The beam may continue to the first height portion of the tapered waveguide and from the first height portion to the tapered waveguide photonic bump turning mirror 1850. The tapered waveguide photonic bump turning mirror 1850 may receive the beam from the first height portion of the tapered waveguide 1844 and may reflect and direct the signal to subsequent optical elements (e.g., coupler curved mirror 1812). The tapered waveguide photonic bump turning mirror 1850 may be disposed in the tapered waveguide photonic bump at a predefined angle to redirect the optical signal 1816 to subsequent optical elements (e.g., coupler curved mirror 1812).

If the PIC 1804 acts as the optical drain component, the tapered waveguide photonic bump turning mirror 1850 may receive the optical signal 1816 from additional optical components (e.g., coupler curved mirror 1812) and may reflect and direct the optical signal 1816 into the first height portion of the tapered waveguide 1844. According to aspects, the tapered waveguide photonic bump turning mirror 1850 may be disposed at a predefined angle to direct the received optical signal into the first portion of the tapered waveguide 1844. The first height portion may receive the optical signal 1816 from tapered waveguide photonic bump turning mirror 1850. The optical signal 1816 may continue to the tapered portion of the tapered waveguide 1844. The tapered portion may adiabatically contract the optical signal mode to the mode of the second height portion. The optical signal 1816 may continue to the second height portion where the optical signal may be coupled with PIC I/O waveguide 1862.

According to aspects, the tapered waveguide photonic bump 1870 may further comprise a tapered waveguide photonic bump curved mirror 1810. The tapered waveguide photonic bump curved mirror 1810 may perform the functions substantially as described with relation to the first curved mirror elsewhere herein. Accordingly, the tapered waveguide photonic bump curved mirror 1810 may perform optical signal manipulation and/or transformation and may interface the optical signal 1816 with the additional optical components (e.g., turning mirror (e.g., coupler turning mirror 1820), curved mirror (e.g., coupler curved mirror 1812), and optical fiber 1802). Thus, the tapered waveguide photonic bump 1870 may operate in tandem with an optical coupler 1800 to optically couple an optical source component to an optical drain component. According to aspects, a PIC may act as and/or be configured similarly to a source component. Accordingly, the optical signal 1816 may propagate from the PIC I/O waveguide 1862, to the tapered waveguide 1844. The tapered waveguide 1844 may manipulate the optical signal as described herein. The manipulated optical signal may be received and reflected by the tapered waveguide photonic bump turning mirror 1850 toward an optical coupler curved mirror 1812 (e.g., in the PhotonicPlug layer of the optical coupler). The optical coupler curved mirror 1812 may substantially collimate the optical signal and reflect the substantially collimated optical signal toward the tapered waveguide photonic bump curved mirror 1810. The tapered waveguide photonic bump curved mirror 1810 may receive the substantially collimated optical signal 1816 and substantially focus the optical signal 1816 toward an additional optical element or component (e.g., optical coupler tilted mirror 1820 or optical fiber 1802).

According to aspects, the PIC 1804 may act as and/or be configured similarly to the optical drain component. Accordingly, the optical signal 1816 may propagate substantially in the reverse of that which is described immediately above. According to such aspects, the tapered waveguide photonic bump curved mirror 1810 may receive a substantially divergent optical signal from an optical component or optical element (e.g., optical fiber 1802 or optical coupler turning mirror 1820). The tapered waveguide photonic bump curved mirror 1810 may substantially collimate and reflect the optical signal 1816 toward the optical coupler curved mirror 1812. The optical coupler curved mirror 1812 may receive the substantially collimated optical signal 1816, may substantially focus the optical signal 1816 and may reflect the substantially focused optical signal 1816 toward the tapered waveguide photonic bump turning mirror 1850. The tapered waveguide photonic bump turning mirror 1850 may receive the focusing optical signal 1816 and may reflect the focusing optical signal 1816 into the tapered waveguide 1844. The tapered waveguide may manipulate (e.g., contract) the optical signal 1816, and couple the optical signal 1816 with the PIC I/O waveguide 1862.

Figure 19:
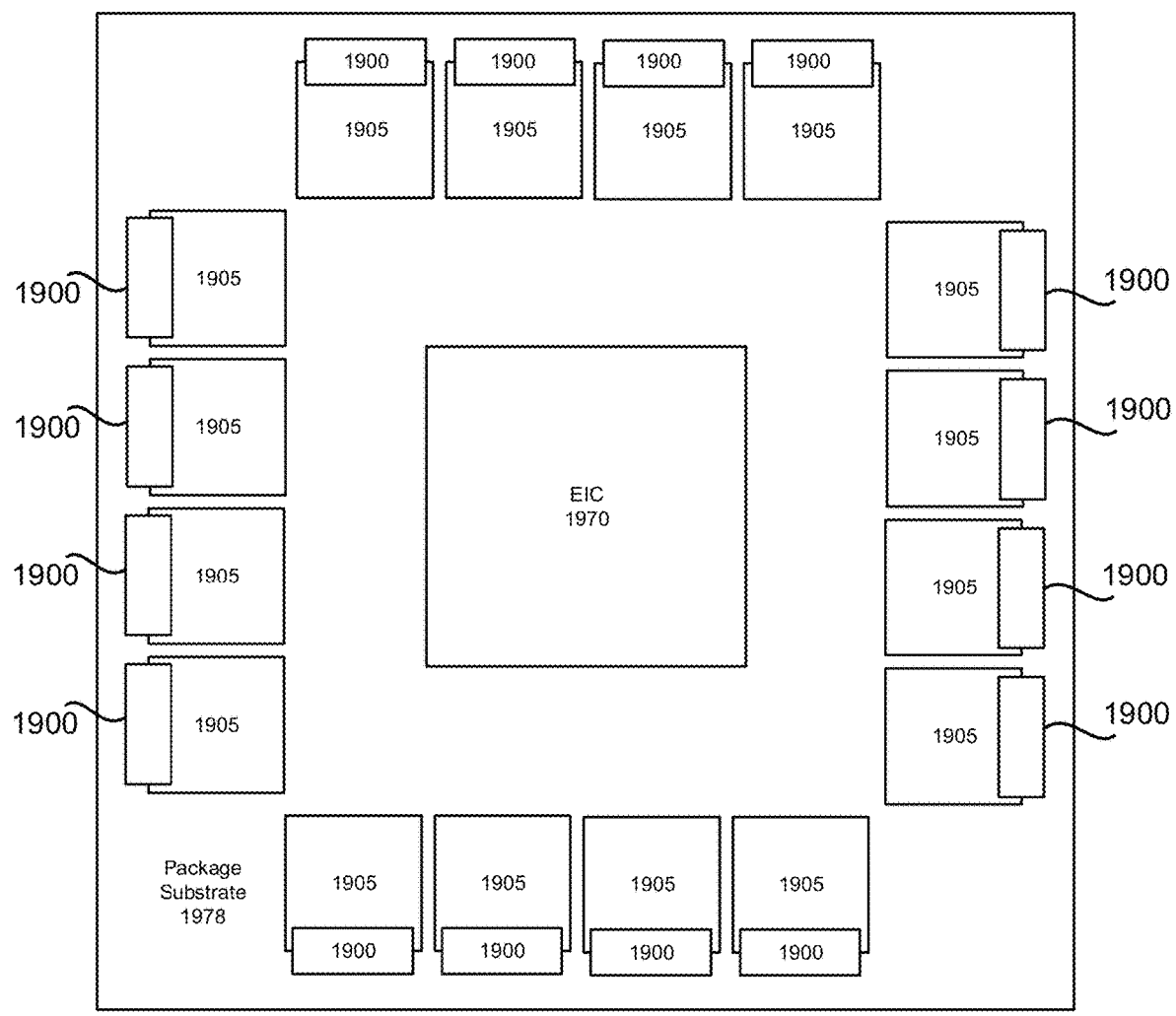
FIG. 19 depicts an example electro-optical package according to one or more aspects of the present disclosure.

Further aspects of the present disclosure relate to optoelectrical packaging and optical and electrical connection within a system level architecture. FIG. 19 depicts an example electro-optical package according to one or more aspects of the present disclosure. Referring to FIG. 19, the package may comprise one or more chiplets 1905. Chiplets 1905 may comprise, for example, optical engines and/or PICs (e.g., SiPh chip), additional package substrates, one or more interposers and/or one or more electrical components or chips (e.g., digital signal processor (DSP), transimpedance amplifier (TIA), and/or driver). The chiplets 1905 may be placed within close proximity (e.g., within a few millimeters or less distance) to an EIC 1970, for example a processor (e.g., GPU, DPU, CPU, etc.) and/or a switching unit. The proximity of the chiplets 1905 and the EIC 1970 may allow for high speed connectivity of the two elements. The chiplets 1905 and the EIC 1970 may be placed on, and variously packaged with, package substrate 1978, for example, a printed circuit board (PCB), a multi-chip module (MCM) substrate, an organic substrate, etc. The package substrate 1978 may provide electrical connectivity between the chiplets 1905 and the EIC 1970 as described in more detail herein. Chiplets 1905 may comprise components to convert and/or translate optical signals into electrical signals. Additionally, chiplets 1905 may comprise components to convert and/or translate electrical signals into optical signals. While FIG. 19 depicts 16 chiplets 1905 in communication with a single EIC 1970 it should be understood that the same principles may be applied to connect any number of chiplets 1905 (e.g., 1, 100, 5000, etc.) to any number of EICs 1970. Additionally, any number of electrical components may be connected to the chiplet(s) 1905 and/or the EIC(s) 1970 variously. For example, EIC 1970 may be additionally electrically connected to one or more high bandwidth memory (HBM) units on the same package substrate 1978. Optical couplers 1900 of the present disclosure (for example, one or more of the optical couplers described in relation to FIGS. 1-5C) may be used to optically connect optical components to the chiplets 1905.

Figure 20A:
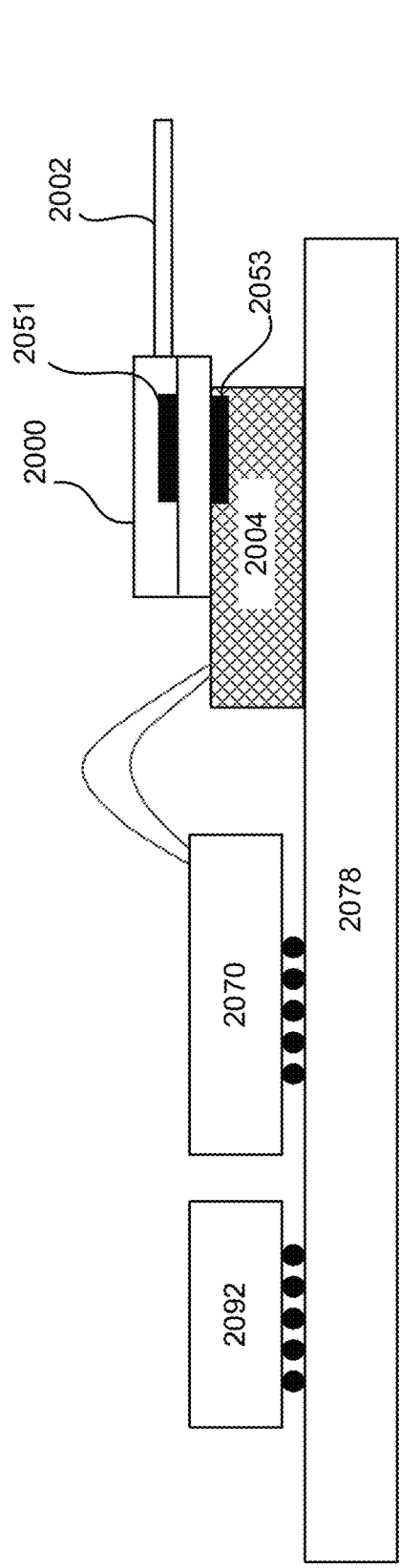
FIG. 20A depicts an example electro-optical system according to one or more aspects of the present disclosure.

Additional components may be used in such an optoelectrical packaging and connection system. FIG. 20A depicts an example electro-optical system according to one or more aspects of the present disclosure. Referring to FIG. 20A, the system may comprise a package substrate 2078 (e.g., PCB, MCM, organic substrate, interposer, etc.). EIC 2070 (e.g., CPU, GPU, ASIC, etc.) may be electrically connected to the package substrate 2078. Memory unit 2092, (e.g., high-bandwidth memory (HBM) unit) may additionally be electrically packaged with and/or on package substrate 2078. One or more additional computing components and/or circuits may be placed on the package substrate or alternatively connected to the package substrate. PIC 2004 may be packaged with the package substrate 2078 and may be electrically connected to package substrate 2078. PIC 2004 may be placed in proximity to one or more of the computing components (e.g., processor unit, memory unit, EIC 2070, etc.). Package substrate 2078 may electrically connect PIC 2004 to one or more of the co-packaged computing components (e.g., chips, EIC).

Electrical and optical components may be packaged and connected to each other variously. Electrical and optical interconnection between EICs may be achieved variously within an electro-optical package. Referring to FIG. 20A, PIC 2004 and EIC 2070 (e.g., ASIC 1554) may be placed on package substrate. PIC 2004 and EIC 2070 may be electrically connected to package substrate (e.g., with solder balls, reflow soldered, socket connection, etc.). Additionally or alternatively, PIC 2004 (e.g., optical engine) may be placed in proximity to EIC 2070. PIC 2004 and EIC 2070 may be additionally electrically connected to each other via wire bonding. Optical coupler 2000 (for example, optical coupler as described herein with respect to FIGS. 1-18) may be connected to PIC 2004. Though not fully depicted for clarity of illustration in FIG. 20A, it should be understood that optical coupler 2000 may comprise first optical elements 2051 (e.g., first turning mirror 120 and/or second curved mirror 112). Additionally, corresponding second optical elements 2053 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with PIC 2004. Additionally, optical coupler 2000 may comprise one or more of PhotonicPlug layer (e.g. PhotonicPlug layer 106) and spacer layer (e.g., spacer layer 108) to facilitate optical coupling of one or more optical components (e.g., optical fiber 2002, laser, PIC, and/or chiplet, etc.) to the PIC 2004.

Figure 20B:
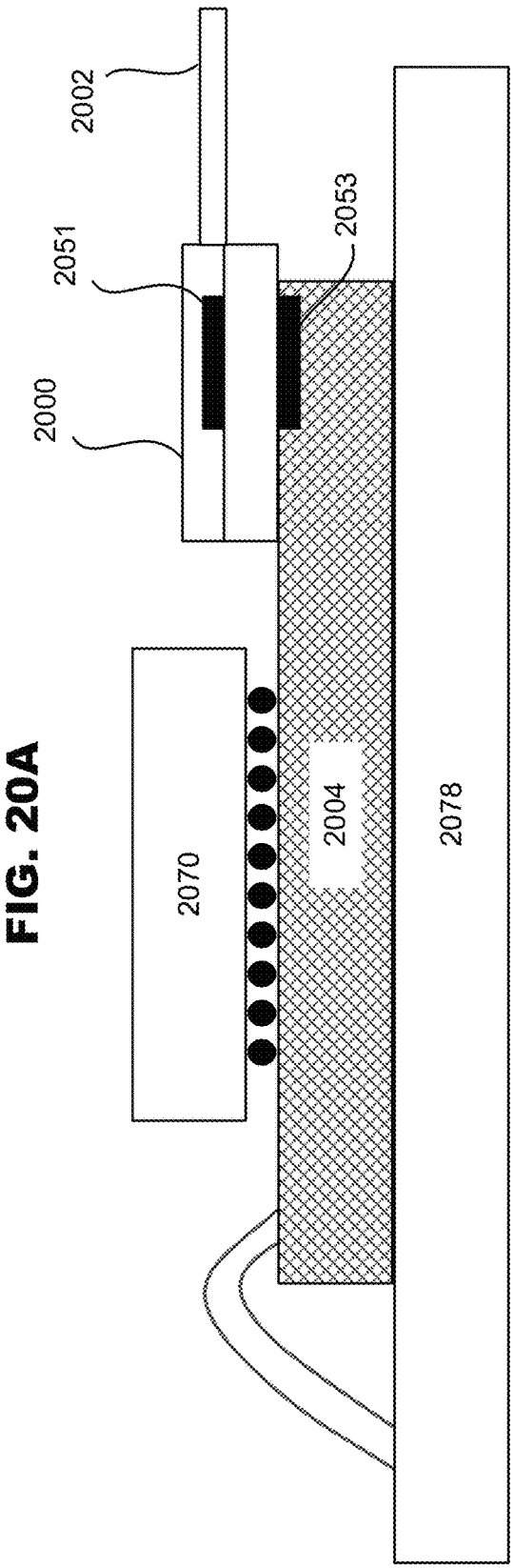
FIG. 20B depicts an example electro-optical package according to one or more aspects of the present disclosure.

FIG. 20B depicts an example electro-optical package according to one or more aspects of the present disclosure. Referring to FIG. 20B, PIC 2004 may be placed on package substrate. PIC 2004 may be electrically connected to package substrate via wire bonding. Additionally or alternatively, PIC 2004 may be electrically connected to package substrate variously, (e.g., surface reflow soldered, socket connection, solder bumps, etc.). PIC 2004 (e.g., optical engine) may host EIC 2070. EIC 2070 may be placed on the PIC 2004. EIC 2070 may be electrically connected to the PIC 2004. The EIC 2070 may be electrically connected to the PIC 2004 variously. For example, the EIC 2070 may be electrically connected, for example, using a flip-chip technique, solder bumps, reflow, and/or sockets. Alternatively, the EIC 2070 may be electrically connected to the PIC 2004 via wire bonding. The EIC 2070 may be additionally or alternatively electrically connected to the package substrate 2078 and/or one or more additional EICs. For example, the EIC may be wire bond connected to the package substrate 2078 and/or one or more additional EICs. Optical coupler 2000 (for example, optical coupler as described herein with respect to FIGS. 1-18) may be connected to PIC 2004. Though not fully depicted for clarity of illustration in FIG. 20B, it should be understood that optical coupler 2000 may comprise first optical elements 2051 (e.g., first turning mirror 120 and/or second curved mirror 112). Additionally, corresponding second optical elements 2053 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with PIC 2004. Additionally, optical coupler 2000 may comprise one or more of PhotonicPlug layer (e.g. PhotonicPlug layer 106) and spacer layer (e.g., spacer layer 108) to facilitate optical coupling of one or more optical components (e.g., optical fiber 2002, laser, PIC, and/or chiplet, etc.) to the PIC 2004.

Figure 21:
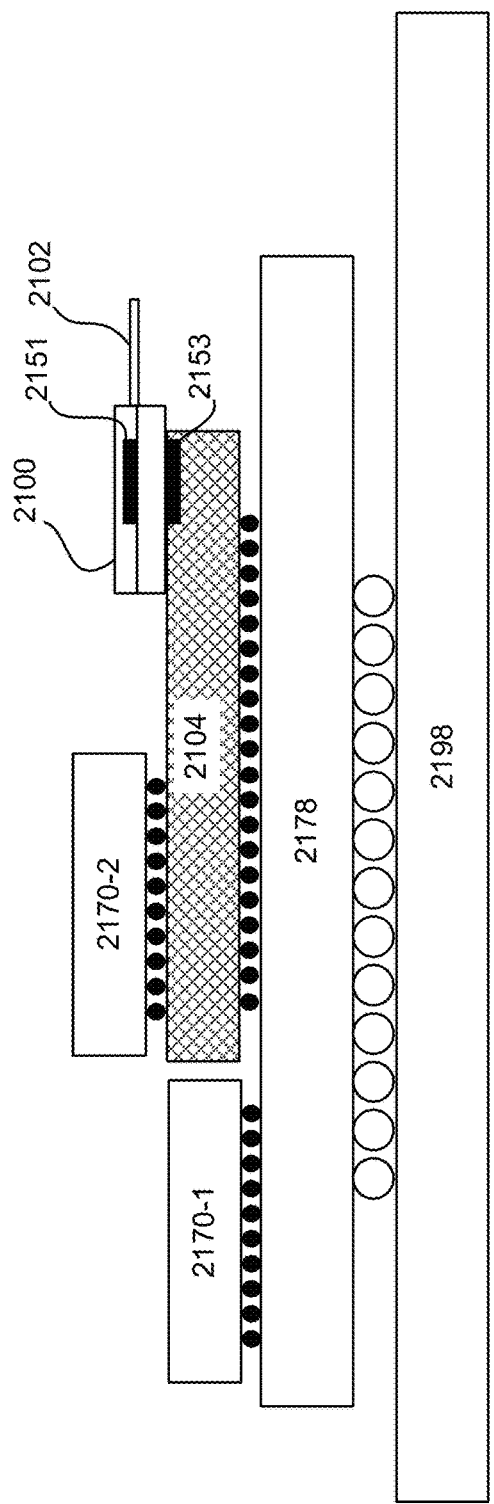
FIG. 21 depicts an example electro-optical package according to one or more aspects of the present disclosure.

FIG. 21 depicts an example electro-optical package according to one or more aspects of the present disclosure. Referring to FIG. 21, PIC 2104 may be placed on package substrate 2178 (e.g., organic substrate, MCM substrate). PIC 2104 may be electrically connected to package substrate 2178 via, for example, solder bumps (e.g., micro-bumps and solder reflow). Additionally, EIC 2170-1 may be packaged with package substrate 2178. EIC 2170 may similarly be electrically connected to package substrate via solder bumps. One or more additional EICs may be similarly electrically connected to the package substrate 2178. The package substrate 2178 may be electrically connected to another substrate, e.g., a board 2198 (e.g., PCB) via, for example a ball grid array (BGA).

Referring to FIG. 21, PIC 2104 may be packaged with package substrate 2178. PIC 2104 may be electrically connected to package substrate 2178 via solder bumps (e.g., micro-bumps and solder reflow). As described, PIC 2104 may host one or more EICs. EICs may be placed on, and electrically connected to PIC 2104. EIC 2170-2 may be electrically connected to PIC 2104 via, for example, solder bumps (e.g., micro-bumps). One or more additional EICs may be similarly packaged with PIC 2104. Additionally or alternatively, one or more additional EICs may be placed on and electrically connected to package substrate. Package substrate 2178 may be further electrically connected to another package/substrate. For example, package substrate may be connected to board 2198 via, for example BGA (and/or wire bonding). Optical coupler 2100 (for example, optical coupler as described herein with respect to FIGS. 1-18) may be connected to PIC 2104. Though not fully depicted for clarity of depiction and description in FIG. 21, it should be understood that optical coupler 2100 may comprise first optical elements 2151 (e.g., first turning mirror 120 and/or second curved mirror 112). Additionally, corresponding second optical elements 2153 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with PIC 2004. Additionally, optical coupler 2100 may comprise one or more of PhotonicPlug layer (e.g. PhotonicPlug layer 106) and spacer layer (e.g., spacer layer 108) to facilitate optical coupling of one or more optical components (e.g., optical fiber 2102, laser, PIC, and/or chiplet, etc.) to the PIC 2104.

Figure 22:
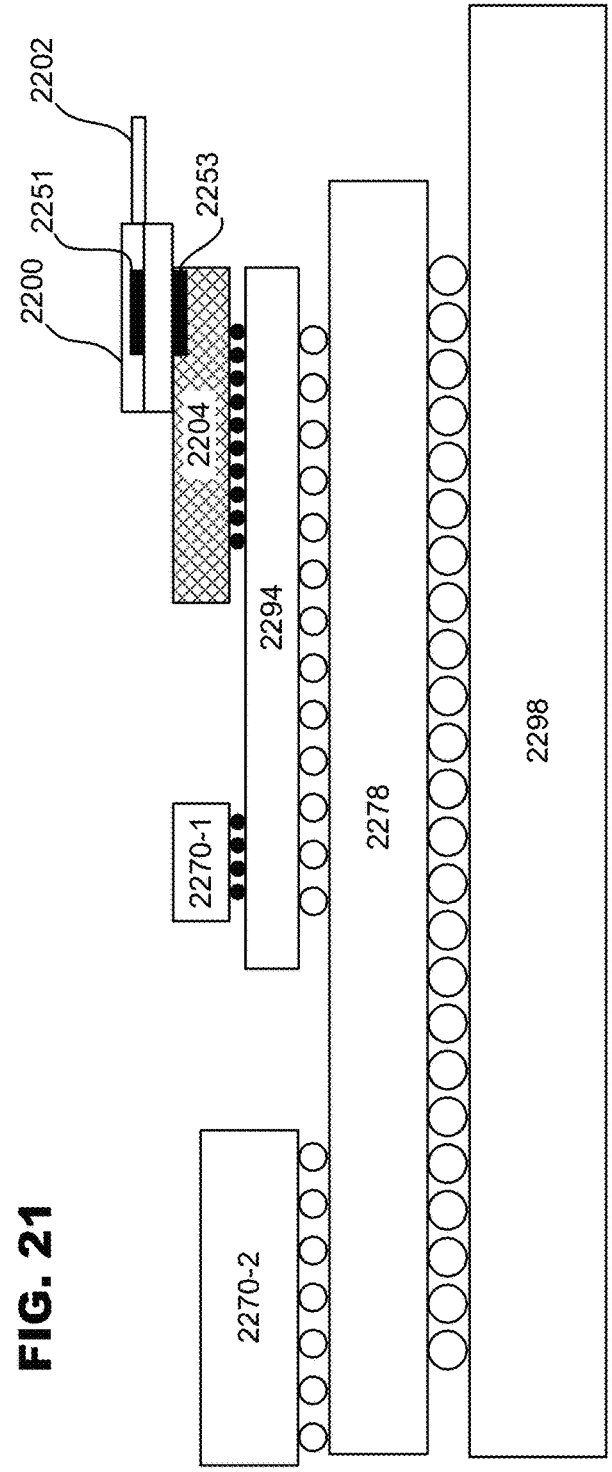
FIG. 22 depicts an example optical coupler integrated with 2.5D and 3D electronic packaging.

According to aspects of the present disclosure, optical couplers may be used and integrated with 2.5D and 3D packaging. In 2.5D two or more active chips (e.g., EICs) may be placed laterally on an interposer. The interposer may be, for example, silicon, and may contain circuitry to interconnect the two or more chips disposed thereon, and circuitry to connect the two or more chips to additional components. The interposer may, according to aspects, comprise through silicon vias (TSV) as will be described in more detail herein. 3D packaging active chips integrated by die stacking. FIG. 22 depicts an example optical coupler integrated with 2.5D and 3D electronic packaging. Referring to FIG. 22, PIC 2204 may be placed on and electrically connected to interposer 2294. One or more EICs 2204 (e.g., TIA, drivers, etc.) may be laterally disposed on, and electrically connected to, the interposer 2294. The interposer 2294 may comprise circuitry to interconnect the PIC 2204 and the EIC 2270-1. The interposer 2294 package (comprising, for example, the PIC 2204 and one or more EICs 2270) may be disposed on and electrically connected to a package substrate 2278 (e.g., MCM substrate). Additional components may be disposed on the package substrate 2278. Referring to FIG. 22, EIC 2270-2 (e.g., processor, GPU, DPU, CPU, switching unit) may be disposed on and electrically connected to package substrate 2278 (e.g., MCM substrate). Package substrate 2278 may comprise circuitry to interconnect the interposer 2294 and the EIC 2270-2. One or more additional EICs 2270 may similarly be integrated with the system. Package substrate 2278 may also comprise circuitry to connect the interposer (and its hosted components) and the EIC 2270-2 to one or more additional components. Referring to FIG. 21, package substrate 2278 may be packaged with (e.g., disposed on an electrically connected to) a PCB 2298. One or more package substrates 2278 and/or components (e.g., EIC 2270, PIC 2204) may be stacked and one or more additional components (e.g., EIC 2270, ASIC, PIC 2204) may be laterally included at each stack layer. FIG. 21 depicts the electro-optical package with a package substrate and a PCB. Alternatively, the PCB 2298 may take the place of the package substrate 2278.

The various components may be electrically connected variously. Referring to FIG. 21, PIC 2204 and EIC 2270-1 may be electrically packaged on interposer 2294 with micro bumps allowing for dense I/Os for connection of components hosted on interposer 2294. Interposer 2294 may be electrically packaged on package substrate 2278 with, for example, bumps (e.g., C4 bumps). Package substrate 2278 may be electrically packaged with PCB via, for example, solder balls (e.g., a BGA). Optical coupler 2200 (for example, optical coupler as described herein with respect to FIGS. 1-18) may be connected to PIC 2204. Though not fully depicted for clarity of depiction and description in FIG. 22, it should be understood that optical coupler 2200 may comprise first optical elements 2251 (e.g., first turning mirror 120 and/or second curved mirror 112). Additionally, corresponding second optical elements 2253 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with and/or variously added to PIC 2204. Additionally, optical coupler 2200 may comprise one or more of PhotonicPlug layer (e.g. PhotonicPlug layer 106) and spacer layer (e.g., spacer layer 108) to facilitate optical coupling of one or more optical components (e.g., optical fiber 2202, laser, PIC, and/or chiplet, etc.) to the PIC 2204.

Figure 23:
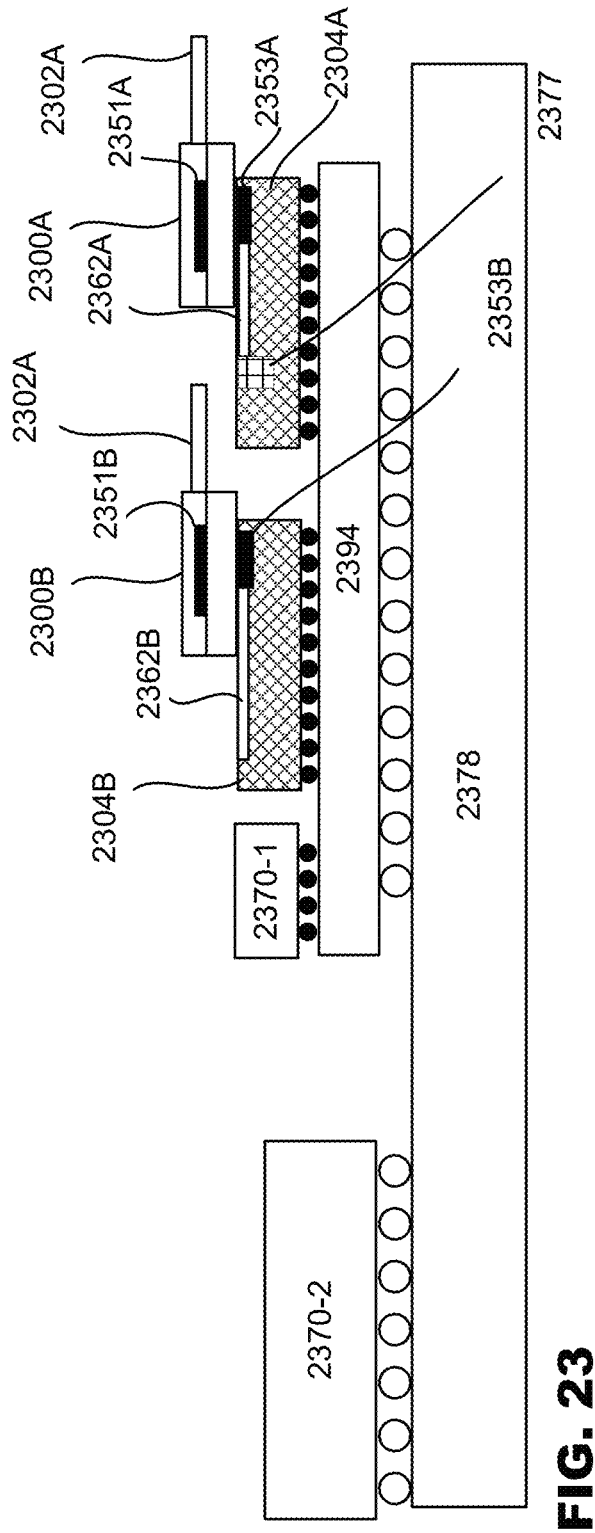
FIG. 23 depicts an example electro-optical package according to one or more aspects of the present disclosure.

FIG. 23 depicts an example electro-optical package according to one or more aspects of the present disclosure. Referring to FIG. 23, Tx PIC 2304A and Rx PIC 2304B (generally PIC 2304) may be packaged on interposer 2394. Alternatively, Tx and Rx PICs 2304A and 2304B may be packaged on any package substrate (e.g., PCB, MCM, etc.). Tx and Rx PICs 2304A and 2304B may be arranged and oriented on the underlying substrate (e.g., interposer) variously. Referring to FIG. 23, as described herein, each of PICs 2304A and 2304B may comprise PIC I/O waveguide 2362A and 2362B respectively (generally 2362). PICs 2304 may be oriented on interposer 2394 (e.g., underlying substrate) such that the PIC I/O waveguide 2362 is on the top side of the PIC 2304 (e.g., SiPh chip) (e.g. facing up geometry). As a consequence of the facing up geometry, optically connecting to the PIC 2304 with a facing up geometry may traditionally be associated with increased ease of connection. Such a connection, utilizing aspects of the optical couplers herein, are described herein.

Optical couplers 2300A and 2300B (for example, optical coupler as described herein with respect to FIGS. 1-18) may be connected to PICs 2304A and 2304B respectively. Though not fully depicted for clarity of illustration in FIG. 23, it should be understood that optical couplers 2300A and 2300B may each comprise first optical elements 2351A and 2351B respectively (e.g., first turning mirror 120 and/or second curved mirror 112). Additionally, corresponding second optical elements 2353A and 2353B (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with and/or variously added to PICs 2304A and 2304B respectively. Additionally, optical couplers 2300A and 3200B may each comprise one or more of PhotonicPlug layer (e.g. PhotonicPlug layer 106) and spacer layer (e.g., spacer layer 108) to facilitate optical coupling of one or more optical components (e.g., optical fibers 2202A and 2202B, lasers, PICs, and/or chiplets, etc.) to the PICs 2304A and 2304B.

Figure 24:
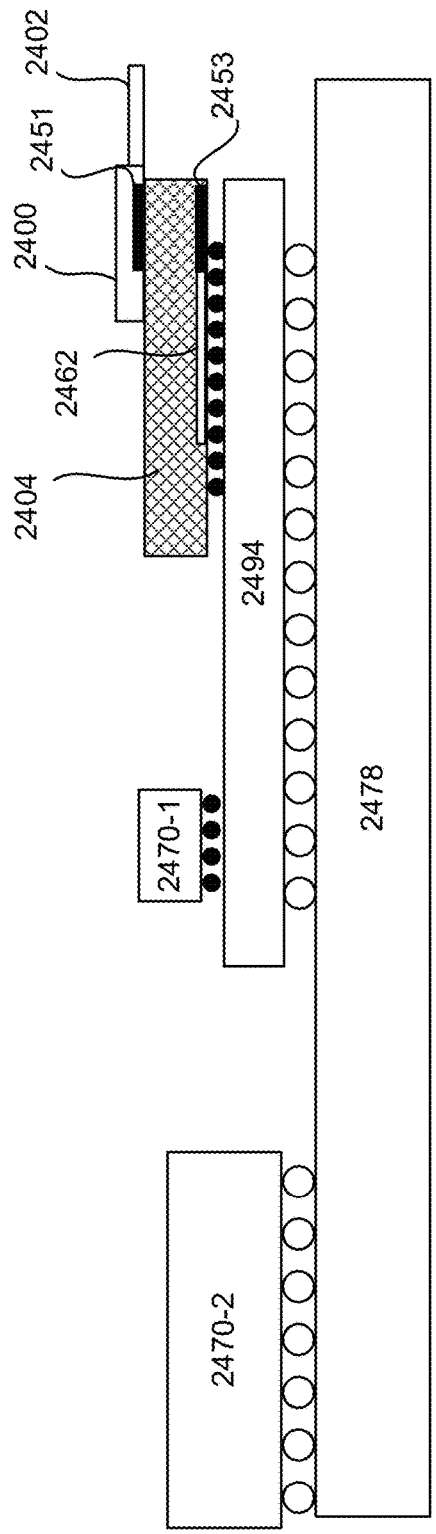
FIG. 24 depicts an example electro-optical package according to one or more aspects of the present disclosure.

FIG. 24 depicts an example electro-optical package according to one or more aspects of the present disclosure. Depending on configuration and optical connection method, as described, facing up geometry may, at times, be associated with optical connectivity advantages. Referring to FIG. 24, PIC 2404 may be packaged on interposer 2494 (and/or package substrate 2478 (e.g., organic substrate, MCM substrate, etc.) with the PIC I/O waveguide 2462 near the bottom side (e.g., closer to the side facing the underlying substrate (e.g., interposer 2494). Such an arrangement may be referred to as facing down geometry. Facing down geometry may allow for improved high-speed electrical connectivity of the PIC 2404 to the underlying substrate (e.g., interposer 2494), as such an arrangement may bring the components in closer proximity. However, traditionally, optically connecting to a PIC in face down geometry has posed a number of issues. For example, optically connecting to the PIC 2404 may be associated with increased challenges as the PIC I/O waveguide 2462 is face down (e.g., facing the surface of an underlying substrate). This challenge is especially apparent with side coupling methods. However, as described, aspects of the present disclosure relate to separating the plane of the PIC I/O interface (in this example, PIC I/O waveguide 2462) and the optical component (e.g., optical fibers) to which the PIC may be optically connected. Accordingly, optical connectors of the present disclosure (e.g., optical connectors as described in FIGS. 1-18) may be used to connect to face down PICs by backside coupling. Accordingly, referring to FIG. 24, the optical connector (e.g., PhotonicPlug layer and spacer layer) may be installed to the backside of the face down PIC 2404. Additionally aspects of backside coupling are described herein in more detail (for example with reference to FIGS. 37-45).

Optical coupler 2400 (for example, optical coupler as described herein with respect to FIGS. 1-18) may be connected to PIC 2404. Though not fully depicted in FIG. 24 for clarity of depiction and description, it should be understood that optical coupler 2400 may comprise first optical elements 2451 (e.g., first turning mirror 120 and/or second curved mirror 112). Additionally, corresponding second optical elements 2453 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with and/or variously added to PIC 2404. Additionally, optical coupler 2400 may comprise one or more of PhotonicPlug layer (e.g. PhotonicPlug layer 106) and spacer layer (e.g., spacer layer 108) to facilitate optical coupling of one or more optical components (e.g., optical fiber 2402, laser, PIC, and/or chiplet, etc.) to the PIC 2404. Additionally or alternatively, as depicted in FIG. 24, the substrate of PIC 2404 may act as and/or be configured similarly to the spacer layer (as described more fully herein).

Referring again to FIG. 23, electro-optical packages may comprise Tx PIC 2304A for transmitting optical signals. Tx PIC 2304A may be disposed on and electrically packaged with interposer 2394. Accordingly, outgoing (e.g., transmitted) optical signals may be transmitted from the electro-optical package at the Tx PIC 2304A. Tx optical fibers 2302A (and/or alternative optical components, e.g., waveguides, lasers, etc.) may be connected to Tx optical coupler 2300A as described herein with respect to optical couplers. Tx optical coupler 2300A may be connected to Tx PIC 2304A to optically coupler the Tx optical fibers 2302A to the Tx PIC 2304A according to aspects of optical couplers of the present disclosure (for example as described with respect to FIGS. 1-18). The electro-optical package may further comprise Rx PIC 2304B for receiving optical signals. Rx PIC 2304 may similarly be disposed on and electrically packaged with interposer 2394. Accordingly, incoming optical connections may be received by the package at the Rx PIC 2304B. Rx optical fibers 2302 (and/or alternative optical components, e.g., waveguides, lasers, etc.) may be connected to Rx optical coupler 2300B according to aspects described herein. Rx optical coupler 2300B may be coupled with Rx PIC 2304B according to aspects of the present disclosure. EIC 2370-1 (e.g., TIA, driver) may additionally be disposed on and electrically packaged with interposer 2394. Further, one or more EICs may additionally be disposed on and electrically packaged with interposer 2394. Interposer 2394 may comprise circuitry to electrically interconnect Rx PIC 2304B, Tx PIC 2304A and EIC 2370-1. Additionally, interposer 2394 may comprise circuitry and electrical connection infrastructure to electrically connect interposer hosted components (e.g., Rx PIC, Tx PIC, EIC, etc.) with one or more components.

According to other aspects of the present disclosure, signal reception and transmission may be accomplished with the same PIC. Alternatively, optical signal reception and transmission may be accomplished via different PICs (and/or different chiplets) on different interposers (e.g., Rx interposer and Tx interposer). The Rx and Tx interposers may in turn be electrically packaged or otherwise electrically connected. For example, the Rx and Tx interposers may be electrically packaged with an underlying substrate 2378 (e.g., MCM, organic substrate). The underlying substrate 2378 (e.g., MCM, organic substrate) may allow for electrical interconnection, and intraconnection, of the Rx and Tx interposers.

As described herein, lasers may be included in optical and/or electro-optical systems as optical components. Lasers may be used in optical and electro-optical systems to facilitate communication. Lasers may, for example, have a role in the conversion and/or translation of electrical signals to optical signals. Additionally or alternatively, lasers may be used to variously optically communicate. As described hereinbelow, lasers may be on-chip or off-chip. For example, referring to FIG. 23, PIC 2304 may comprise on-chip laser 3277 (e.g., a laser die). On-chip laser 3277 may for example produce optical signals in response to electrical signals (on-chip laser 3277 may produce such optical signals in conjunction with various other optical and electrical elements). On-chip laser 3277 may emit optical signals to PIC I/O waveguide 2362A. The signal, may propagate through the coupler, for example, via second optical elements 2353A and first optical elements 2351A, and may be coupled to an optical component, for example, optical fiber 2302A. While one configuration of an on-chip laser has been described with respect to FIG. 23, it would be appreciated by persons of ordinary skill in the art that various configurations of on-chip and off-chip lasers may be integrated with optical and electro-optical systems utilizing one or more aspects of the present disclosure. Off-chip lasers may be described in more detail below.

Figure 25:
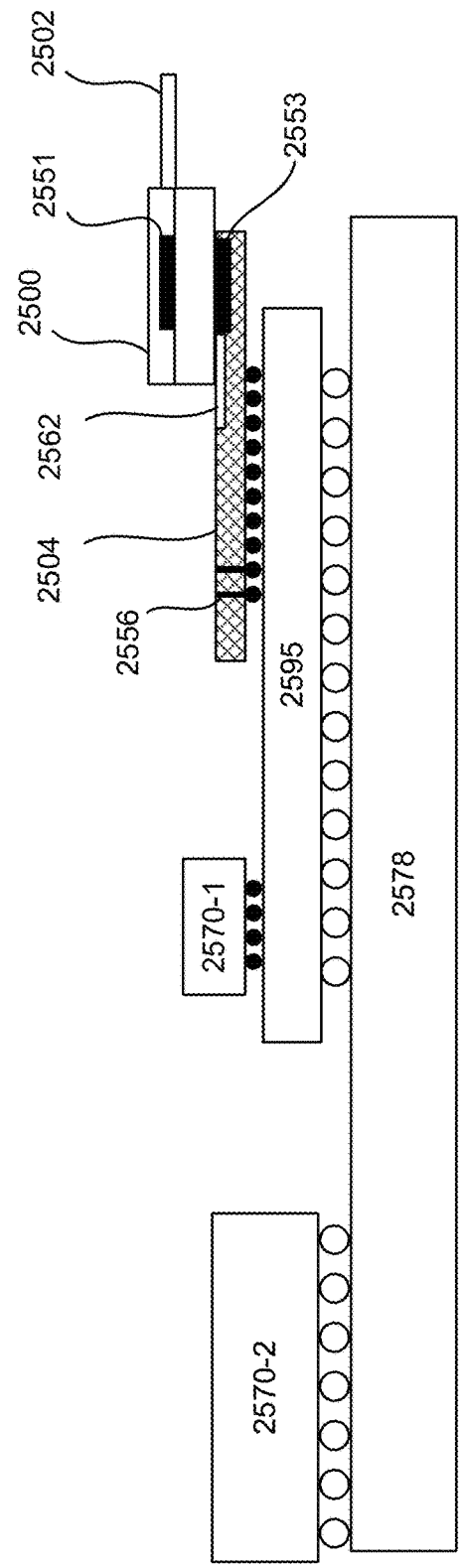
FIG. 25 depicts an example electro-optical package according to one or more aspects of the present disclosure.

FIG. 25 depicts an example electro-optical package according to one or more aspects of the present disclosure. As described, PICs having facing up geometry may be associated with advantages for optical coupling to the PIC (e.g., it may be simpler to optically couple optical fibers to facing up geometry PICs), and PICs having facing down geometry may be associated with electrical advantages (e.g., the electrical components may be closer to the underlying substrate (e.g., interposer) for faster electrical connection). Referring to FIG. 25, the present disclosure may be practiced with thinned PIC 2504. Thinned PIC 2504, may be, for example, from 100-200 micron thick. Thinned PIC 2504 may comprise the advantages of facing up and facing down geometries. For instance, thinned PIC 2504 may comprise PIC I/O waveguide 2562. PIC I/O waveguide 2562 may be near the top side of thinned PIC 2504. Accordingly, PIC I/O waveguide 2562 may be associated with the advantages of optically coupling to a PIC having facing up geometry. Additionally, due to the reduced thickness of thinned PIC 2504, optical elements of thinned PIC 2504 may be advantageously connected to other package components (e.g., interposer 2594). For example, thinned PIC 2504 may comprise TSVs 2556 to effectuate high speed electrical connection of the thinned PIC 2504 and the interposer 2594.

Optical coupler 2500 (for example, optical coupler as described herein with respect to FIGS. 1-18) may be connected to PIC 2504. Though not fully depicted in FIG. 25 for clarity of depiction and description, it should be understood that optical coupler 2500 may comprise first optical elements 2551 (e.g., first turning mirror 120 and/or second curved mirror 112). Additionally, corresponding second optical elements 2553 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with and/or variously added to PIC 2504. Additionally, optical coupler 2500 may comprise one or more of PhotonicPlug layer (e.g. PhotonicPlug layer 106) and spacer layer (e.g., spacer layer 108) to facilitate optical coupling of one or more optical components (e.g., optical fiber 2502, laser, PIC, and/or chiplet, etc.) to the PIC 2504.

The package substrates may be variously arranged to accommodate the optical coupler. FIGS. 26A-26B depict example electro-optical packages according to one or more aspects of the present disclosure. Referring to FIGS. 26A-26B, PIC 2604 may be arranged to overhang the underlying package substrate, here interposer 2694. Referring to FIG. 26A, whether the PIC 2604 is configured to be facing up, facing down (optically connected to, for example, via backside coupling), and/or thinned, the optical coupler 2600A may be coupled to the top-side of the PIC 2604, as described herein. Alternatively, referring to FIG. 26B, whether the PIC 2604 is configured to be facing up (and optically connected to, for example, via backside coupling), facing down, and/or thinned, the optical coupler 2600B may be coupled to the bottom side of the PIC 2604. Accordingly, utilizing aspects of the present disclosure, optical coupling may be advantageously achieved with various configurations.

Optical couplers 2600A and 2600B (for example, optical coupler as described herein with respect to FIGS. 1-18) may be connected to PIC 2604. Though not fully depicted in FIG. 26 for clarity of depiction and description, it should be understood that optical couplers 2600A and 2600B may comprise first optical elements 2651 (e.g., first turning mirror 120 and/or second curved mirror 112). Additionally, corresponding second optical elements 2653 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with and/or variously added to PIC 2604. Additionally, optical couplers 2600A and 2600B may comprise one or more of PhotonicPlug layer (e.g. PhotonicPlug layer 106) and spacer layer (e.g., spacer layer 108) to facilitate optical coupling of one or more optical components (e.g., optical fiber 2602, laser, PIC, and/or chiplet, etc.) to the PIC 2604.

Figure 27:
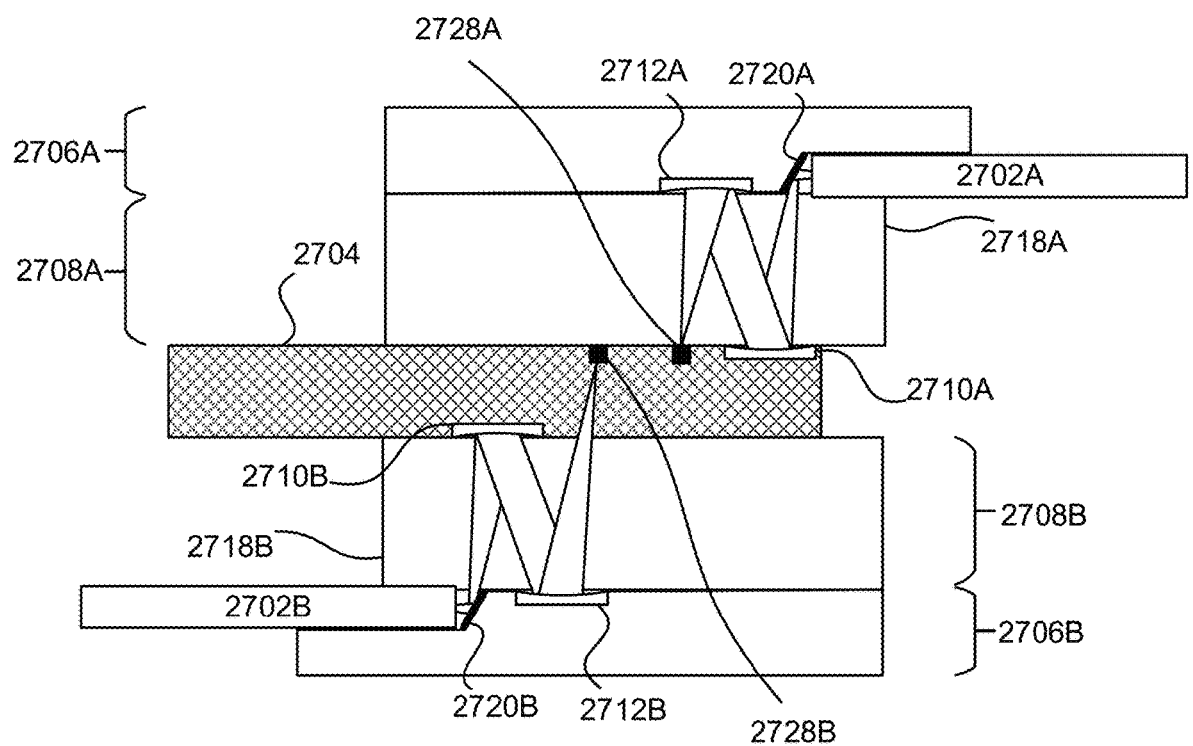
FIG. 27 depicts an example configuration of multiple optical couplers connected to a PIC according to one or more aspects of the present disclosure.

According to yet a further alternative, one or more optical couplers 2600 may be coupled to a PIC 2604 at both the top and bottom side of the PIC 2604. For example, FIG. 27 depicts an example configuration of multiple optical couplers connected to a PIC according to one or more aspects of the present disclosure. Referring to FIG. 27, first PhotonicPlug layer 2706A and first spacer layer 2708A may connect to the topside of PIC 2704. Accordingly, First PhotonicPlug layer 2706A and first spacer 2718A and first, first curved mirror 2710A may connect first optical fiber 2702A (e.g., first optical fiber ribbon in three dimensions) to the topside of PIC 2704 at first PIC I/O interface 2728A (e.g., comprising PIC I/O waveguide) (the optical coupler may alternatively connect the optical component (e.g., optical fiber 2702) to the second PIC I/O interface 2728B via, e.g., backside coupling). Additionally, second optical coupler, for example comprising, second PhotonicPlug layer 2706B and second spacer layer 2708B may attach to the bottom side of PIC 2704. Accordingly, second PhotonicPlug layer 2706B, second spacer layer 2708B, and second first curved mirror 2710B may connect second optical fiber 2702B (e.g., second optical fiber ribbon in three dimensions) to the bottom side of PIC 2704 at second PIC I/O interface 2728B (e.g., comprising PIC I/O waveguide) (the optical coupler may alternatively connect the optical component (e.g., optical fiber 2702) to the first PIC I/O interface 2728A via, e.g., backside coupling).

Figure 28B:
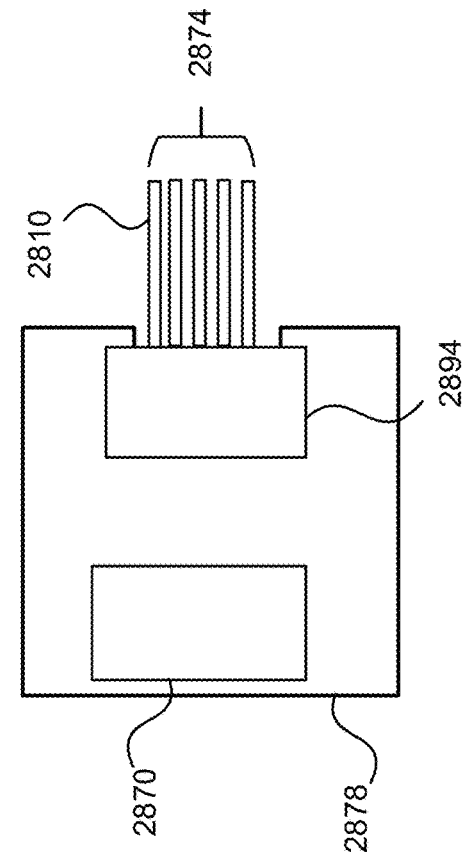
FIG. 28B depicts a top view of an example electro-optical package with a slotted package substrate according to one or more aspects of the present disclosure.
Figure 28A:
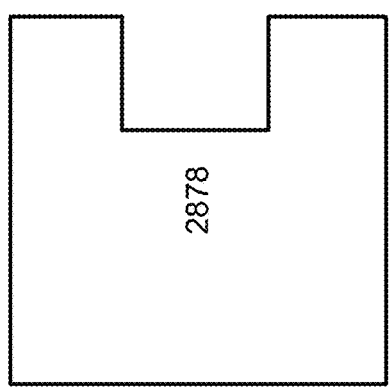
FIG. 28A depicts an example slotted package substrate according to one or more aspects of the present disclosure.
Figure 28C:
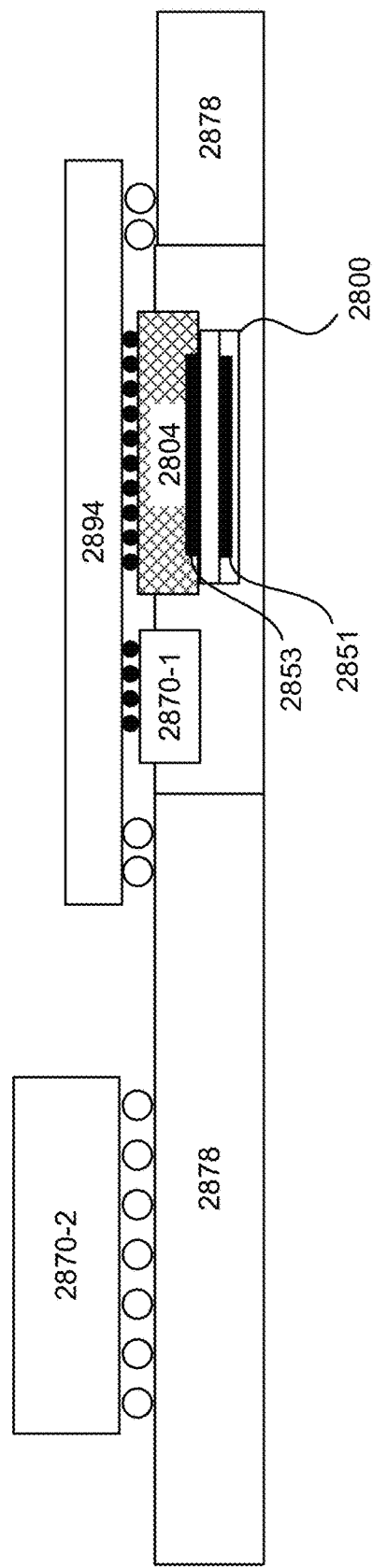
FIG. 28C depicts a side view of the example electro-optical package with a slotted package substrate of FIG. 28B.

FIG. 28A depicts an example slotted package substrate 2878. FIG. 28B depicts a top view of an example electro-optical package with a slotted package substrate 2878 according to one or more aspects of the present disclosure. FIG. 28C depicts a side view of the example electro-optical package with a slotted package substrate 2878 of FIG. 28B. Referring to FIGS. 28B-28C, PIC 2804 may be electrically packaged with interposer 2894 (e.g., package substrate, chiplet). EIC 2870-1 (e.g., TIA, drive, etc.) may similarly be electrically packaged on interposer 2894. PIC 2804 and EIC 2870-1 may be electrically packaged with interposer 2894 variously as described herein (e.g., micro-bumps). Electro-optical interconnection package may further comprise slotted package substrate 2878 (e.g., MCM substrate, PCB, organic substrate, etc.). Slotted package substrate 2878 may comprise a slot, or cut-out. Interposer 2894 may be electrically packaged with slotted package substrate 2878. Interposer 2894 may be packaged with slotted package substrate 2878 such that the interposer 2894 spans at least a portion of the slot of slotted package substrate 2878. One or more additional components may be electrically packaged with interposer 2894 and/or slotted package substrate 2878. EIC 2870-2 (e.g., AISC (e.g., processor, CPU, GPU, etc.)) may be electrically packaged with slotted package substrate 2878. One or more additional EICs may be packaged with slotted packaged substrate 2878. EIC 2870-2 may be variously electrically packaged with slotted package substrate 2878 as described herein (e.g., solder bumps (e.g., C4 bumps)). Optical coupler 2800 (for example, optical coupler as described herein with respect to FIGS. 1-18) may be connected to PIC 2804. Though not illustrated in FIGS. 28A-28C, it should be understood that optical coupler 2800 may comprise one or more optical components for optical coupling as described herein (e.g., first turning mirror, first curved mirror, second curved mirror, PhotonicPlug layer, and/or spacer layer, etc.). Optical coupler 2800 may optically couple one or more optical components (e.g., optical fibers 2810, laser, waveguide, etc.) to the PIC 2804.

FIGS. 28A-28C depict PIC 2804, EIC 2870-1, and optical coupler 2800 as being packaged to the bottom side of interposer 2894, it should be understood that one or more of PIC 2804, EIC 2870, and/or optical coupler 2800 may be packaged to the top side of interposer 2894.

Slotted package substrates may be associated with certain packaging advantages. For example, slotted package substrate 2878 and optical couplers of the present disclosure (e.g., optical coupler 2800) may allow flexibility in optically connecting to the interconnection package. Additionally, slotted package substrate 2878 may allow for more compact packaging and smaller package footprint. For example, one or more of PIC 2804 and/or EIC 2870-1 may be disposed within the slot of slotted package substrate 2878. As such, the space of the interconnection package may be reduced. FIGS. 28B-28C depict PIC 2804 and EIC 2870-1 as being disposed on the same side (the underside) of interposer 2894. According to aspects, however, PIC 2804 and EIC 2870-1 may be disposed on different sides of interposer 2894. For example, PIC 2804 may be disposed on the bottom side and EIC 2870-1 may be disposed on the top side of interposer 2894, or vice versa. Additionally, advantages of the optical coupler of the present disclosure may allow for great flexibility and increased tolerance when optically connecting to such electro-optical packages. For instance, FIG. 28C depicts optical coupler 2800 as being connected to the PIC 2804. Thus it may be understood that optical coupler 2800 may comprise a PhotonicPlug layer and a spacer layer installed to PIC 2804 (alternatively, optical coupler 2800 may be backside coupled to PIC 2804). However, leveraging advantages of the present disclosure, (for example that the PIC I/O interface and the optical component to which the PIC is connected may be in different planes), various arrangements and/or configurations of optical coupling may be realized.

Optical coupler 2800 (for example, optical coupler as described herein with respect to FIGS. 1-18) may be connected to PIC 2804. Though not fully depicted in FIG. 28 for clarity of depiction and description, it should be understood that optical coupler 2800 may comprise first optical elements 2851 (e.g., first turning mirror 120 and/or second curved mirror 112). Additionally, corresponding second optical elements 2853 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with and/or variously added to PIC 2804. Additionally, optical coupler 2800 may comprise one or more of PhotonicPlug layer (e.g. PhotonicPlug layer 106) and spacer layer (e.g., spacer layer 108) to facilitate optical coupling of one or more optical components (e.g., optical fiber 2810 (e.g., one fiber of optical fiber ribbon 2874), laser, PIC, and/or chiplet, etc.) to the PIC 2804.

For example, FIG. 29 depicts a side view of an example alternative configuration of an electro-optical package with a slotted package substrate 2978 according to one or more aspects of the present disclosure. Referring to FIG. 29, the optical coupler 2900 may be coupled to a first side of the interposer 2994 (e.g., package substrate) and the PIC 2904 may be packaged to a second side (e.g., substantially opposed to the first side) of the interposer 2994. Such an arrangement allows for increased flexibility of electrically and optically packaging the various co-packaged components. According to such an arrangement, the interposer, in addition to electrically interconnecting various components, may facilitate the optical coupler 2900. For example, the interposer 2994 may additionally act as and/or be configured similarly to the spacer layer (e.g., similar to, comprised by, and/or comprising, one or more of the spacer layers of the optical couplers as described with respect to FIGS. 1-18), for example, similar to an optical through die via (OTDV) as described below. Accordingly, the optical signal coupled by the optical coupler 2900 may propagate through the interposer 2994. Additionally, the optical coupler 2900 may be similar to, be comprised by, and/or comprise one or more example of PhotonicPlug layers as described herein. The interposer may comprise a portion of material that is substantially transparent to visible wavelengths of light and wavelengths of light being coupled (e.g., glass, epoxy, resin, etc.). Alternatively, interposer may be a material that is substantially transparent to wavelengths of light being coupled (e.g., infrared (e.g., at 1300 nm-1550 nm), for example, silicon, as described herein.

Optical coupler 2900 (for example, optical coupler as described herein with respect to FIGS. 1-18) may be connected to PIC 2904. Though not fully depicted in FIG. 29 for clarity of depiction and description, it should be understood that optical coupler 2900 may comprise first optical elements 2951 (e.g., first turning mirror 120 and/or second curved mirror 112). Additionally, corresponding second optical elements 2953 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with and/or variously added to PIC 2904. Additionally, optical coupler 2900 may comprise one or more of PhotonicPlug layer (e.g. PhotonicPlug layer 106) and spacer layer (e.g., spacer layer 108) to facilitate optical coupling of one or more optical components (e.g., optical fiber 2902, laser, PIC, and/or chiplet, etc.) to the PIC 2904. Additionally, as depicted in FIG. 29, the interposer 2994 may act as and/or be configured similarly to the spacer (e.g., spacer 1518) and/or spacer layer (e.g., spacer layer 1508). Accordingly, the configuration of FIG. 29 may further be understood to comprise OTDV 2988 (as described in more detail below).

FIG. 30 depicts an example electro-optical package with a partially slotted package substrate 3078 according to one or more aspects of the present disclosure. FIGS. 28A-29 depict example interconnection packages with slotted package substrate having a full slot (e.g., full cut-out). Aspects of the present disclosure may be practiced with partially slotted packaged substrates 3078. FIG. 30 depicts an electro-optical interconnection package substantially similar to the electro-optical interconnection package of FIG. 29, comprising a partially slotted package substrate 3078 in place of the slotted package substrate 2978. Partially slotted substrate 3078 may comprise a partial slot in the substrate that may not extend through the width of the entire substrate. The partially slotted substrate 3078 may be slotted with a shape to accommodate the components packaged to the underside of interposer 3094 (e.g., PIC 3004, EIC 3070-1). Advantageously, a partial slot may allow for a more compact package while additionally allowing for improved internal circuitry. Further, as the underside of partially slotted package substrate 3078 is fully intact (e.g., not slotted), the entire surface of the underside of partially slotted package substrate may be leveraged for electrical connection (e.g., to additional substrates and/or components).

Optical coupler 3000 (for example, optical coupler as described herein with respect to FIGS. 1-18) may be connected to PIC 3004. Though not fully depicted in FIG. 30 for clarity of depiction and description, it should be understood that optical coupler 3000 may comprise first optical elements 3051 (e.g., first turning mirror 120 and/or second curved mirror 112). Additionally, corresponding second optical elements 3053 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with and/or variously added to PIC 3004. Additionally, optical coupler 3000 may comprise one or more of PhotonicPlug layer (e.g. PhotonicPlug layer 106) and spacer layer (e.g., spacer layer 108) to facilitate optical coupling of one or more optical components (e.g., optical fiber 3002, laser, PIC, and/or chiplet, etc.) to the PIC 3004. Additionally, as depicted in FIG. 30, the interposer 3094 may act as and/or be configured similarly to the spacer (e.g., spacer 1518) and/or spacer layer (e.g., spacer layer 1508). Accordingly, the configuration of FIG. 30 may further be understood to comprise OTDV 3088 (as described in more detail below).

FIG. 31 depicts an example electro-optical package with a slotted package substrate 3178 according to one or more aspects of the present disclosure. Referring to FIG. 31, electro-optical package may be used with heat sinking device 3180. Advantageously, slotted package substrate 3178 may allow for the efficient inclusion of heat sinking device 3180. Referring to FIG. 31, PIC 3104 and EIC 3170-1 may be disposed on the underside of interposer 3194 (e.g., package substrate). Additionally, the substrates may be arranged such that PIC 3104 and EIC 3170-1 may be disposed within the slot of slotted package substrate 3178. Heat sinking device 3180 may be installed on the top side of interposer 3194 to assist in thermal management of the components packaged with the interposer 3194. Additionally, interposer 3194 may comprise TSVs 3156 from the topside of interposer 3194 to the underside of the interposer 3194. Heat sinking device 3180 may be placed on top of TSVs 3156 to further facilitate thermal management of the components packaged with the package substrate.

Optical coupler 3100 (for example, optical coupler as described herein with respect to FIGS. 1-18) may be connected to PIC 3104. Though not fully depicted in FIG. 31 for clarity of depiction and description, it should be understood that optical coupler 3100 may comprise first optical elements 3151 (e.g., first turning mirror 120 and/or second curved mirror 112). Additionally, corresponding second optical elements 3153 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with and/or variously added to PIC 3104. Additionally, optical coupler 3100 may comprise one or more of PhotonicPlug layer (e.g. PhotonicPlug layer 106) and spacer layer (e.g., spacer layer 108) to facilitate optical coupling of one or more optical components (e.g., optical fiber 3102, laser, PIC, and/or chiplet, etc.) to the PIC 3104. Additionally, as depicted in FIG. 31, the interposer 3194 may act as and/or be configured similarly to the spacer (e.g., spacer 1518) and/or spacer layer (e.g., spacer layer 1508). Accordingly, the configuration of FIG. 31 may further be understood to comprise OTDV 3188 (as described in more detail below).

FIG. 32 depicts an example electro-optical package with a slotted package substrate 3278 according to one or more aspects of the present disclosure. Components may be packaged with slotted package substrates 3278 variously. Referring to FIG. 32, interposer 3214 (e.g., package substrate) may be packaged to the underside of slotted package substrate 3278. PIC 3204 and EIC 3270-1 (e.g., TIA, driver) may be packaged to the top side of interposer 3214. Interposer 3214, slotted substrate 3204, PIC 3204 and EIC 3270-1, may be arranged such that PIC 3204 and EIC 3270-1 may be disposed within the slot of slotted substrate 3278. Heat sinking device 3280 may be installed on the topside of slotted substrate 3278. Further, heat sinking device 3280 may span at least a portion of the slot. Advantageously, such an arrangement may simultaneously benefit from improved package size and improved thermal management. Particularly, components PIC 3204 and EIC 3270-1 may be arranged in the slot of slotted package substrate 3278 to reduce the size of the package, and heat sinking device 3280 may assist with the thermal management of the slotted substrate 3278, the PIC 3204 and EIC 3270-1. Additional components may be included in the package. Referring to FIG. 31, EIC 3270-2 (e.g., ASIC (e.g., processor, CPU, GPU, etc.)) may be packaged with slotted package substrate 3278. EIC 3270-2 may be packaged with slotted substrate 3278 as described herein (e.g., solder bumps (e.g., C4 bumps)). One or more additional components (e.g., PICs, EICs, ASICs) may be packaged with slotted substrate 3278 and/or interposer 3214. Additionally, one or more components (e.g., PIC, EIC, ASIC, substrate) may be hosted by (e.g., stacked to) one or more components (e.g., PIC 3204, EIC 3270-1, EIC 3270-2, slotted substrate 3278, interposer 3214). The arrangement of the components may additionally be varied. For example, EIC 3270-2 is depicted as being packaged with the top side of slotted substrate 3278. According to aspects, EIC 3270-2 may be packaged with slotted substrate 3278 variously (e.g., to underside of slotted substrate 3278). According to aspects including multiple components packaged with slotted substrate 3278, components may be packaged in any combination to the topside and underside of the slotted substrate 3278.

Optical coupler 3200 (for example, optical coupler as described herein with respect to FIGS. 1-18) may be connected to PIC 3204. Though not fully depicted in FIG. 32 for clarity of depiction and description, it should be understood that optical coupler 3200 may comprise first optical elements 3251 (e.g., first turning mirror 120 and/or second curved mirror 112). Additionally, corresponding second optical elements 3253 (e.g., first curved mirror 110, TCM photonic bump 1664, tapered waveguide photonic bump 1870, grating coupler photonic bump 1764, and/or one or more PIC I/O interface elements (e.g., PIC I/O waveguide 1662) may be integrated with and/or variously added to PIC 3204. Additionally, optical coupler 3200 may comprise one or more of PhotonicPlug layer (e.g. PhotonicPlug layer 106) and spacer layer (e.g., spacer layer 108) to facilitate optical coupling of one or more optical components (e.g., optical fiber 3202, laser, PIC, and/or chiplet, etc.) to the PIC 3204. Additionally, as depicted in FIG. 32, the interposer 3294 may act as and/or be configured similarly to a spacer (e.g., spacer 1518) and/or spacer layer (e.g., spacer layer 1508). Accordingly, the configuration of FIG. 32 may further be understood to comprise OTDV 3288 (as described in more detail below).

Aspects of the present disclosure relate to the mechanical packaging of optical couplers, and mechanical packaging of optical couplers to PICs and other external components. Referring to FIG. 1, optical coupler may comprise PhotonicPlug layer 106 and spacer layer 108. PhotonicPlug layer may be mechanically packaged with spacer layer 108. As described herein, one or more bonding agent (e.g., adhesives, epoxies, resins and the like) may be used to secure optical fibers within receiving features of receiving substrate. Similarly, bonding agents (e.g., adhesives, epoxies, resins, and the like) may be used to mechanically package substrates of PhotonicPlug layer 106 to substrates of spacer layer 108. Any bonding agent incorporated at substrate interfaces of the optical coupler may be used for bonding as well as an optical medium (through which optical beam may propagate). As such, when selecting bonding agents to be used to bond substrates of the optical coupler, a bonding agent with an appropriate index of refraction may be selected.

Figure 33A:
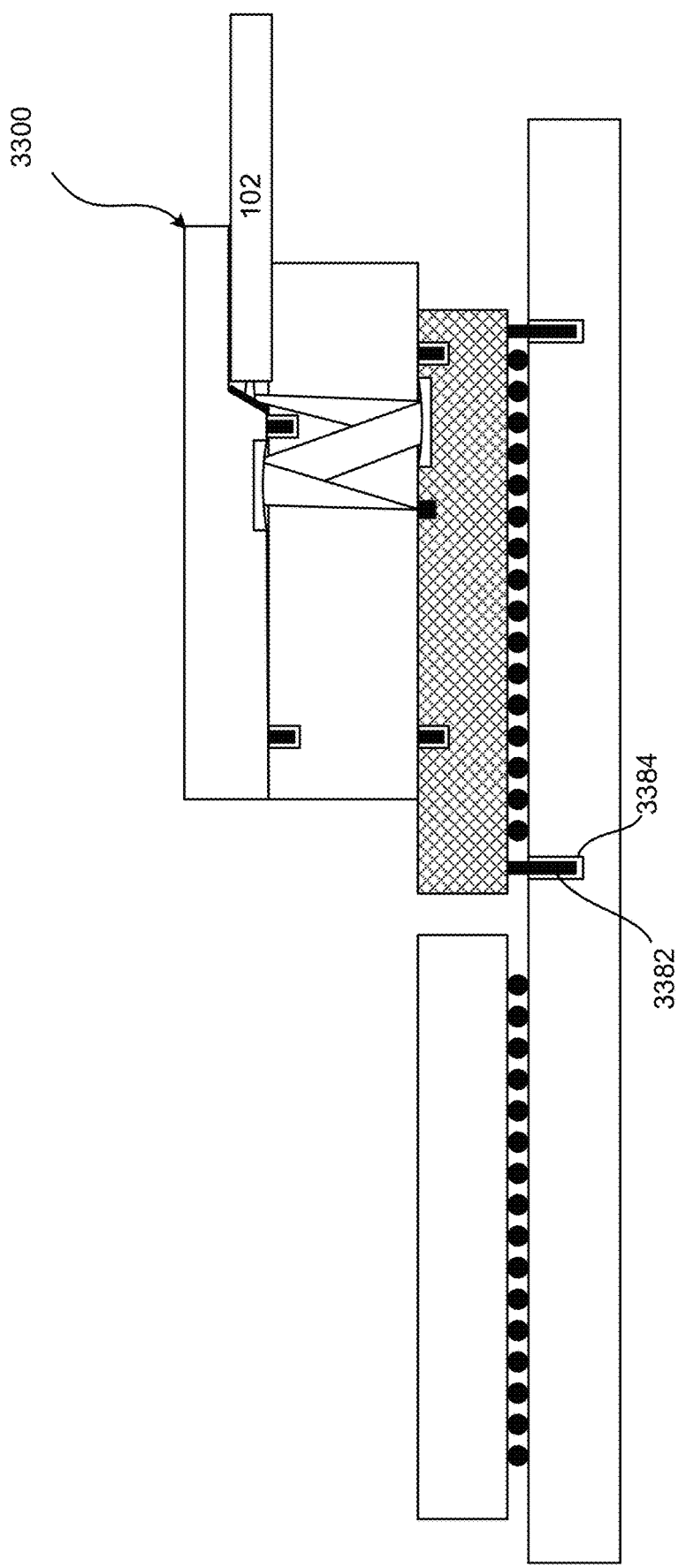
FIG. 33A depicts an example electro-optical package with mechanical aligners according to one or more aspects of the present disclosure.

FIG. 33A depicts an example electro-optical package with mechanical aligners according to one or more aspects of the present disclosure. Referring to FIG. 33A, optical coupler 3300 may comprise mechanical alignment structures to assist mechanical positioning upon optical coupler packaging. Such mechanical couplers may assist in positioning substrates in the X, Y, and Z directions, as well as the tilt of the substrates with respect to one another. Alignment structures may be in the form of one or more mechanical plugs 3382, and associated mechanical sockets 3384. The plug 3382 and socket 3384 may comprise complementary geometry to mechanically interface and engage one another. Any shape of plug 3382 and socket 3384 is contemplated herein. Additionally, any method of mechanical alignment known to those of ordinary skill in the art are contemplated herein.

Figure 33B:
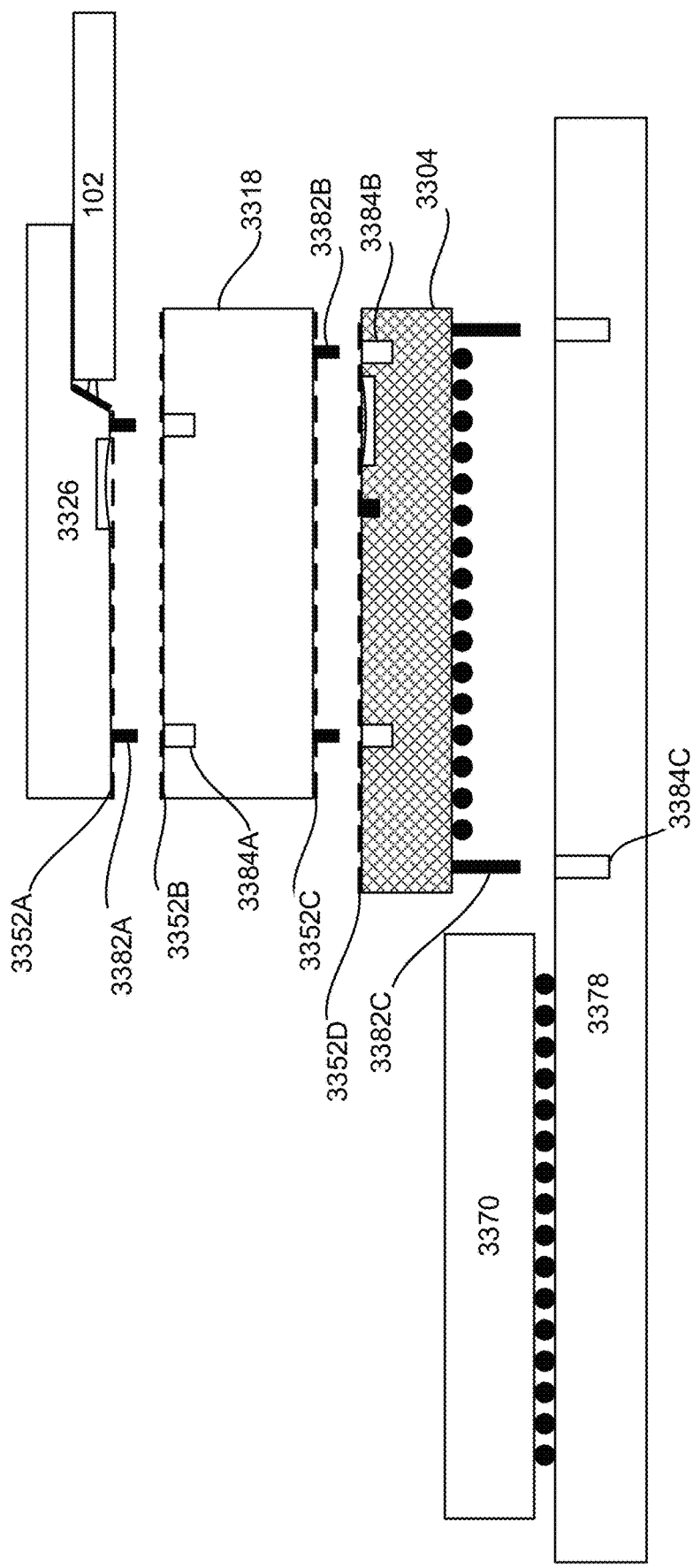
FIG. 33B depicts an exploded view of the example electro-optical package with mechanical aligners of FIG. 33A according to one or more aspects of the present disclosure.

FIG. 33B depicts an exploded view of the example electro-optical package with mechanical aligners of FIG. 33A. Referring to FIG. 33B, PhotonicPlug layer substrate 3326 (e.g., receiving substrate) may comprise PhotonicPlug plug structures 3382A. Spacer layer substrate (e.g., spacer 3318) may comprise spacer layer socket structures 3384A. Spacer layer socket structures 3384A may correspond to PhotonicPlug layer plug structures 3382A. PhotonicPlug layer plug structures 3382A and spacer layer socket structures 3384A may comprise complementary geometry to mechanically engage and interface each other. Upon assembly of the PhotonicPlug layer substrate 3326 with the spacer layer substrate 3318, PhotonicPlug layer plugs 3382A may engage spacer layer sockets 3384A to align PhotonicPlug layer substrate 3326 with spacer layer substrate 3318 as desired. Additionally, Spacer layer substrate (e.g., spacer 3318) may comprise spacer layer plug structures 3382B. PIC layer substrate (e.g., SiPh chip, or PIC 3304) may comprise PIC layer socket structures 3384B. PIC layer socket structures 3384B may correspond to spacer layer plug structures 3382B. Spacer layer plug structures 3382B and PIC layer socket structures 3384B may comprise complementary geometry to mechanically engage and interface each other. Upon assembly, spacer layer plug structures 3382B may engage with PIC layer socket structures 3384B to align spacer layer substrate (e.g., spacer 3318) with PIC layer substrate (e.g., PIC 3304) as desired.

Further, PIC 3304 may be packaged with further packaging substrates (e.g., package substrate 3378, e.g., interposer, PCB, MCM, etc.) Accordingly, it may be desirable to mechanically align PIC 3304 (e.g., SiPh chip) with the underlying package substrate 3378. Accordingly, PIC 3304 may comprise PIC plug structures 3382C and package substrate may comprise package substrate socket structures 3384C. PIC plug structures 3382C may correspond to package substrate socket structures 3384C. PIC plug structures 3382C and package substrate socket structures 3384C may comprise complementary geometry that may mechanically engage and interface with each other. Upon assembly of PIC 3304 on underlying package substrate 3378, PIC plug structures 3382C may engage package substrate socket structures 3384C to align PIC 3304 on package substrate 3378 as desired.

As would be understood by persons of ordinary skill in the art, all plug structures and socket structures are depicted and described as example structures for purposes of discussion. Accordingly, all plug structures may be replaced with socket structures and socket structures may be replaced with plug structures. Additionally, the same substrate may comprise any number of plug structures and any number of socket structures in any combination. Further, as would be understood by persons of ordinary skill in the art, plug structure and corresponding socket structures may be shaped variously. For example, plug structures may be, for example, spherical, rod shaped, square peg shaped, triangle peg shaped, etc. Socket structures may comprise any complimentary geometry to plug structures to allow the plug structure to engage the socket structures.

Plug structures and socket structures may be fabricated variously. For example, according to aspects, plug structures and socket structures may be fabricated through die level or wafer level processed, for example, NIL, grayscale lithography, CMOS, etc. Additionally or alternatively, plug structures and socket structures may be fabricated variously for example, plastic injection, hot embossing, metal stamping, or other accurate machining processes.

As will be appreciated, it may be desirable to retain an appropriate index of refraction at the interface of different substrates and mediums. Accordingly, the surfaces at the interfaces between some or all media may be treated with an anti-reflective layer (e.g., coating) as described above with reference to FIG. 7A. Referring to FIG. 33B, anti-reflective layers 3352A-3352D (generally 3352) may be illustrated as dotted lines at substrate and layer interfaces. Accordingly, a PhotonicPlug layer substrate 3326 (e.g., receiving substrate) may interface with a spacer substrate (e.g., spacer 3318). Accordingly, anti-reflective layer 3352A may be added to PhotonicPlug layer substrate 3326 at the PhotonicPlug layer-spacer layer interface. Additionally or alternatively, anti-reflective layer 3352B may be added to the spacer layer substrate 3318 at the PhotonicPlug layer-spacer layer interface. Further, spacer layer substrate 3318 may interface with PIC layer substrate (e.g., PIC 3304). Accordingly, anti-reflective layer 3352C may be added (e.g., deposited) to the spacer layer substrate 3318 at the spacer layer-PIC layer interface. Additionally or alternatively, anti-reflective coating 3352D may be added to the PIC layer substrate (e.g., PIC 3304) at the spacer layer-PIC layer substrate.

According to aspects, as described herein, a single layer, e.g., spacer layer, may comprise more than one substrate. As such, it may similarly be desirable to add an anti-reflective layer to the substrate interface within a single optical coupler layer. For example, referring to FIG. 7A, spacer layer may comprise first spacer substrate and second spacer substrate. It may be desirable to add anti-reflective layer to either the first spacer substrate or second spacer substrate, or to add anti-reflective layer to both first spacer substrate and second spacer substrate at the first spacer substrate-second spacer substrate interface.

Figure 52:
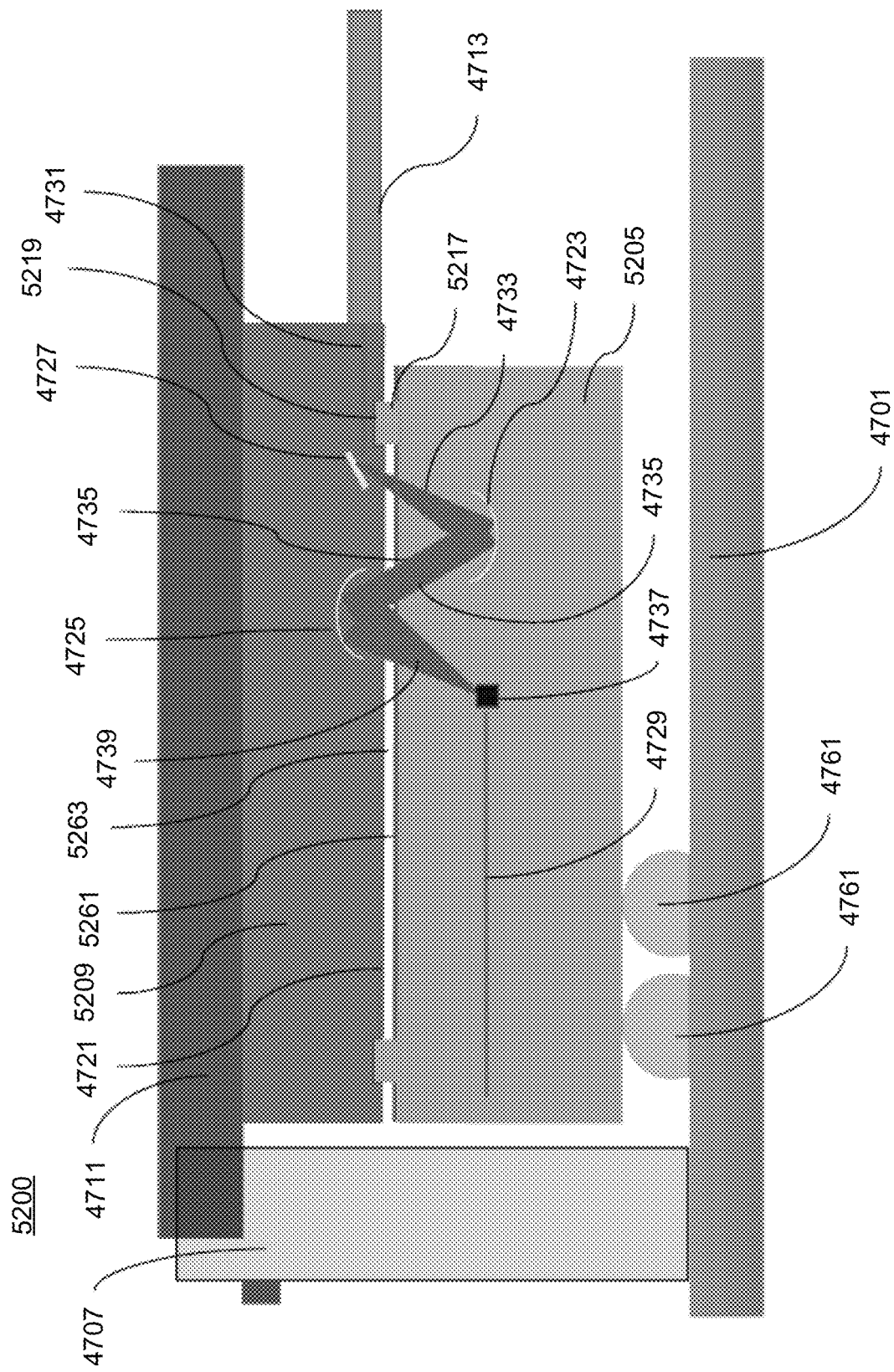
FIG. 52 shows a cross sectional view of an example detachable connector if assembled and an example optical path according to one or more aspects of the present disclosure.

Additionally, according to aspects, one or more air gaps may be present in the optical coupler package (see for example, FIG. 52). Accordingly, one or more anti-reflective layers may be deposited on one or more of the surfaces at such an air gap interface.

Many aspects of the present disclosure have been illustrated with respect to a fiber-to-chip connectivity. While all aspects illustrated as fiber-to-chip connectivity are contemplated as for chip-to-chip connectivity as well, some aspects of chip-to-chip connectivity may be illustrated and more easily understood. As discussed, advanced computing (e.g., distributed computing, accelerated computing, high performance computing) for applications such as, for example, cloud computing, machine learning computing, or other heavy workloads, may require and/or benefit from high bandwidth, low power consumption and low latency. Much of the power consumption in state-of-the-art computing systems is consumed on electrical I/Os. Optical I/Os consume less power, scale up bandwidth, and improves latency performance. Therefore, there is a demand to replace copper connectivity between processors (e.g., GPU to GPU) and other chips with optical connectivity.

Chip-to-chip connectivity may benefit from successful integration between optical and electrical packaging, e.g., die stacking geometry, passive assembly, large assembly tolerances, compatibility with 2.5D and 3D packaging platforms including flip-chip packaging and reflow processes. Optical couplers and photonic bumps of the present disclosure comply with the above advantageous opto-electrical packaging, and production processes. Further advantageously, aspects of the photonic bumps, as described herein may enable wafer optical bumping and flexible photonics packaging. Additionally, aspects of the photonic bumps may enable optical through die vias (OTDV), and optical electrical interposes for 2.5D and 3D packaging.

Figure 34A:
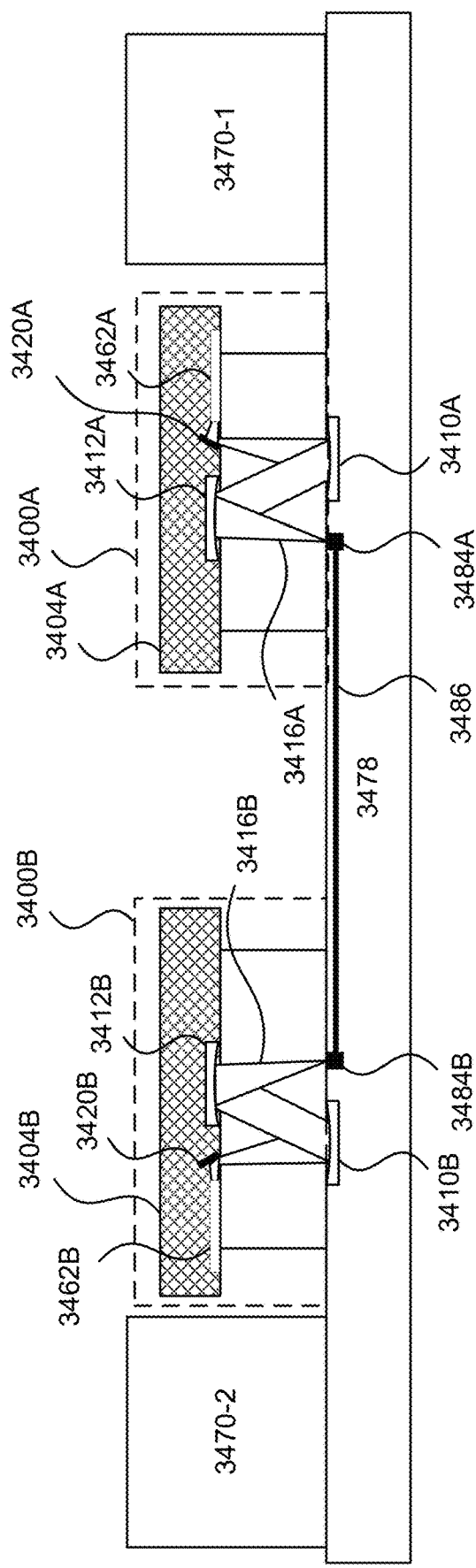
FIG. 34A depicts an example chip-to-chip optical connectivity scheme according to one or more aspects of the present disclosure.

FIG. 34A depicts an example chip-to-chip optical connectivity scheme according to one or more aspects of the present disclosure. Referring to FIG. 34A, EIC 3470-1 (e.g., ASIC (e.g., processor, GPU, etc.)) may be electrically packaged with package substrate 3478 (e.g., interposer). EIC 3402-2 (e.g., ASIC) may similarly be electrically packaged with package substrate 3478. The connectivity scheme may further comprise a first optical coupler 3400A and a second optical coupler 3400B. Each of the first and second optical couplers may comprise and couple first and second PICs 3404A and 3404B. First PIC 3404A may be electrically connected to first EIC 3470-1 (discussed in more detail below). The first EIC 3470-1 may be electrically connected to the first PIC 3404 (e.g., via wire bonding and/or solder bumps). The first EIC 3470-1 may send one or more electrical signal to the first PIC 3404A. The first PIC 3404A may translate, convert, or otherwise produce an optical signal in response to the electrical signal. The optical signal may propagate through the first optical coupler 3400A substantially as described herein with respect to optical couplers (for example with reference to FIGS. 1-18). Referring to FIG. 34A. Each optical coupler may comprise a first curved mirror 3410A and 3410B (generally 3410), and a second curved mirror 3412A and 3412B (generally 3412). First curved mirrors may be fabricated on and/or added to package substrate 3478. Additionally, each optical coupler 3400 may comprise a first turning mirror 3420A and 3420B (generally first turning mirror 3420). Each PIC 3404 may comprise a first PIC I/O waveguide 3462A and 3462B generally PIC I/O waveguide 3462). As such, optical signals 3416A and 3416B may propagate to/from first and second PIC I/O waveguides 3462A and 3462B respectively through the first and second optical couplers 3400A and 3400B respectively substantially as described herein. The optical signals 3416 may propagate from first PIC I/O waveguide 3462A to first turning mirror 3420A and be incident on first turning mirror 3420A. The optical signal 3416A may be expanding as it propagates from the first PIC I/O waveguide 3462A and first turning mirror 3420A. First turning mirror 3420A may direct the expanding optical signal 3416A at the first, first curved mirror 3410A. The first, first curved mirror 3410A may substantially collimate the optical signal 3416A and reflect and direct the substantially collimated optical signal 3416A at the first, second curved mirror 3412A. The first, second curved mirror 3412A may substantially focus the optical signal 3416A and reflect and direct the focusing optical signal 3416A toward first interconnect waveguide I/O 3484A.

As described with respect to optical couplers herein, first curved mirrors 3410 may be fabricated in, fabricated on, or otherwise integrated with package substrate 3478. Alternatively, first curved mirrors 3410 may be integrated with the spacer layer. Alternatively, first curved mirror 3410 may be integrated with the PIC substrate. Alternatively, first curved mirrors 3410 may be integrated with any additional substrate as would be understood from the present disclosure. Second curved mirrors 3412 may be fabricated in, fabricated on, or otherwise integrated with the substrate of the PIC 3404. Alternatively, second curved mirrors 3412 may be integrated with spacer layer. Alternatively, second curved mirrors 3412 may be integrated with package substrate 3478. Alternatively, second curved mirrors 3412 may be integrated with any additional substrate as would be understood from the present disclosure. Additionally, as would be understood from the present disclosure, for example, like aspects as described with respect to FIG. 8, the optical couplers may not include first turning mirrors 3420.

The connectivity scheme may comprise an interconnect waveguide 3486. The interconnect waveguide may be, for example, a polymer waveguide, a silicon waveguide (e.g., silicon-on-insulator), or any other suitable optical waveguide as would be understood by persons of ordinary skill in the art. The interconnect waveguide may be fabricated in and/or fabricated on the substrate package 3478 (e.g., interposer). The interconnect waveguide 3486 may route variously through the package substrate 3478 to optically connect various components thereon. The interconnect waveguide 3486 may optically connect the first optical coupler 3400A to the second optical coupler 3400B. Each optical coupler may comprise an interconnect waveguide I/O element 3484. The interconnect waveguide I/O elements 3484 may comprise, for example, TCM photonic bump elements as described with reference to FIGS. 16A-16E, and/or tapered waveguide photonic bump elements as described with reference to FIGS. 18A-18C. Additionally or alternatively, the interconnect waveguide I/O elements may comprise additional or alternative optical elements for example grating couplers.

Still with reference to FIG. 34A, the optical signal may propagate through the interconnect waveguide 3486 to second interconnect waveguide I/O element 3484B (e.g., TCM photonic bump, tapered waveguide photonic bump, grating coupler, etc.). The optical signal may propagate from the second interconnect waveguide I/O element 3484B and may be directed to the second, second curved mirror 3412B. The optical signal 3416B (which may be the same signal as 3416A at a different location) may be substantially divergent as it propagates from the interconnect waveguide 3486 and from the second interconnect waveguide I/O element 3484B. Second, second curved mirror 3412B may substantially collimate the diverging optical signal 3416B. Second, second curved mirror 3412B may also reflect the substantially collimated optical signal 3416B and direct the substantially collimated optical signal 3416B toward the second, first curved mirror 3410B of the second optical coupler. The second, first curved mirror 3410B may substantially focus the optical signal 3416B and reflect and direct the substantially focusing optical signal toward the second, first turning mirror 3420B, of the second optical coupler. The second, first turning mirror 3420B, of the second optical coupler may reflect the focusing optical signal 3416B and direct the focusing optical signal 3416B to the second PIC I/O waveguide 3462B. The second PIC 3404B may convert, transform, and/or translate the optical signal into one or more electrical signals. The second PIC 3404B may be electrically connected to the second EIC 3470-2 (described in more detail). As would be readily understood from the present disclosure, the signal propagation as depicted in FIG. 34A has been described as propagating from the first EIC 3470-1 (and the first optical coupler 3400) to the second EIC 3470-2 (and the second optical coupler 3400). As would be understood by persons of ordinary skill in the art, the scheme may operate in reverse (e.g., the second EIC 3470-2 and second optical coupler 3400B may transmit the optical signal and the first optical coupler 3400A and first EIC 3470-1 may receive the optical signal). Utilizing the aspects of such a scheme, the first EIC 3470-1 may be optically connected to the second EIC 3470-2. Accordingly, package substrate 3478 (e.g., interposer) may comprise elements for optical connection (e.g., optical channel, optical fiber, interconnect waveguide, etc.) and may comprise elements for electrical connection (e.g., electrical traces, pads, TSVs, etc.).

Figure 34B:
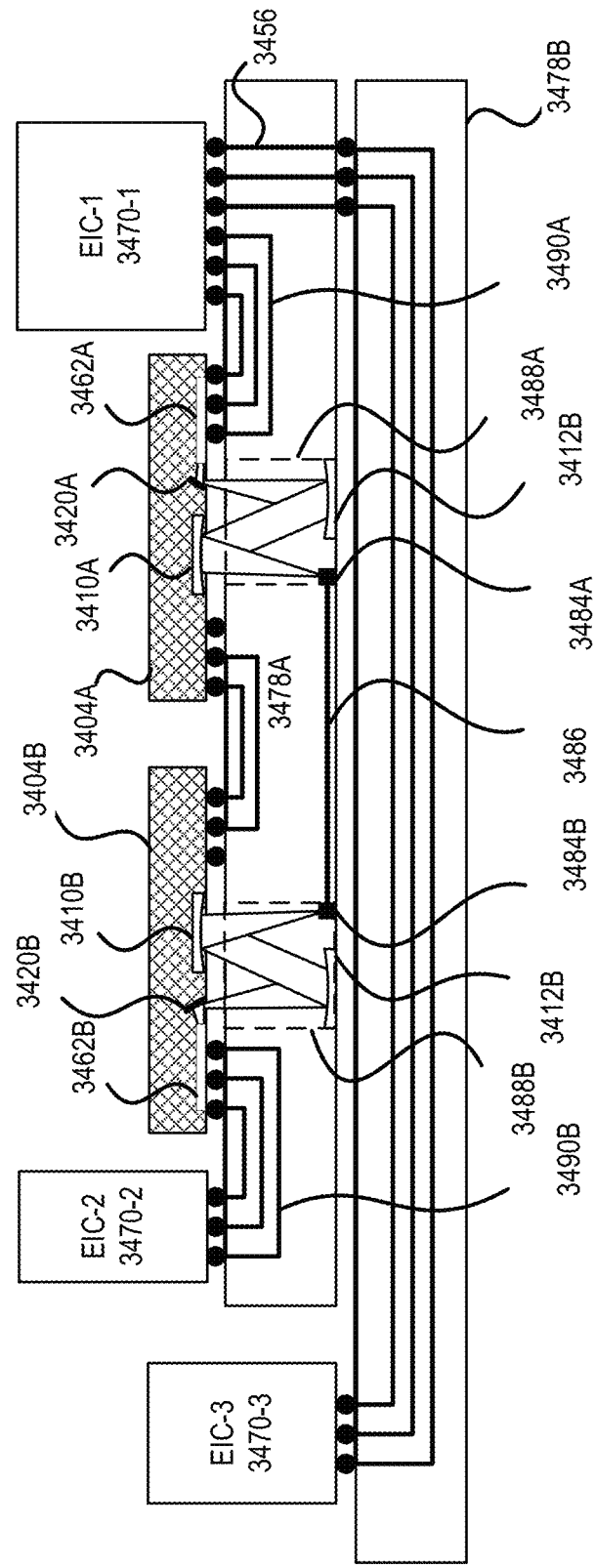
FIG. 34B depicts an example chip-to-chip optical connectivity scheme according to one or more aspects of the present disclosure.

FIG. 34B depicts an example chip-to-chip optical connectivity scheme according to one or more aspects of the present disclosure. FIG. 34A depicts chip-to-chip on substrate optical connectors having a separate spacer (e.g., glass, epoxy, silicon), for example, spacers as described herein with reference to FIG. 1. With reference to FIG. 34B, the package substrate 3478A (e.g., interposer) may additionally act as and/or be configured similarly to a spacer. Accordingly, the package substrate 3478A may comprise electrical through silicon vias (TSV) 3456 (e.g., where the package substrate is fabricated of silicon material) and/or electrical through glass vias (TGV) 3456 (e.g., where the package substrate is fabricated of silicon material). Additionally or alternatively, the package substrate may further comprise optical through die vias (OTDV) 3488. Electrical TSVs and/or TGVs may facilitate electrical connection of one component to another and OTDVs 3488 may facilitate optical connection of one component to another. Optical TDVs 3488 may comprise elements, for example elements described herein, to optically connect optical components according to the present disclosure. For example, Optical TDVs 3488 may each comprise a curved mirror 3410. Optical TDV curved mirror 3488 may operate substantially as described herein in relation to curved mirrors (for example as described in relation to first curved mirrors for example of FIGS. 1-18 and 34A. Optical TDV curved mirror 3488 may, for example, substantially reflect optical signals, and may be a focusing element that may substantially focus and/or substantially collimate optical signals depending on direction of propagation. Additionally, OTDVs 3488 may comprise one or more elements of a photonic bump as described herein. For example, the interconnect waveguide I/O elements 3484 may comprise for example, tapered waveguide and flat turning mirror (for example as described herein with respect to the tapered waveguide photonic bump of FIGS. 18A-18C), or a TCM photonic bump (for example, as described herein with respect to FIGS. 16A-16E). Additionally or alternatively, interconnect waveguide I/O elements may be included and/or fabricated substantially as described in relation to backside coupling of FIGS. 37-45. Additionally or alternatively, interconnect waveguide I/O elements may comprise additional or alternative optical elements, for example, grating couplers.

Referring to FIG. 34B, EIC-1 3470-1 may be electrically connected (via, e.g., electrical traces 3490A) to the first PIC 3404A. EIC-1 3470-1 may produce one or more electrical signals. The first PIC 3404A may receive the electrical signal. The first PIC 3404A may variously produce an optical signal in response to the electrical signal received from EIC-1 3470-1. The first PIC may transmit the optical signal, e.g., from first PIC I/O waveguide to first, first turning mirror 3420A. The optical signal may propagate from the first, first turning mirror, of the first PIC 3404A, into the first TDV 3488A. The optical signal may propagate through the first TDV 3488A substantially as described in relation to optical signal propagation in optical couplers herein. The optical signal may propagate from the first OTDV first curved mirror 3410A to the first, second curved mirror 3412A, and from the first, second curved mirror 3412A to the first interconnect waveguide I/O 3484A. The optical signal may propagate through the interconnect waveguide 3486 (e.g., polymer waveguide) and exit the waveguide at the second interconnect waveguide I/O 3484B at the second OTDV 3488B. The optical signal may propagate from the second interconnect waveguide I/O 3484B to the second, second curved mirror 3412B, of the second PIC 3404B. The optical signal may propagate from the second, second curved mirror 3412B to the second OTDV curved mirror 3410B. The optical signal may propagate from the second OTDV curved mirror 3410B to the second, first turning mirror 3420B, and from the second, first turning mirror into the second PIC I/O waveguide 3462B. The second PIC 3404B may, in response to receiving the optical signal, produce one or more electrical signals. The second PIC 3404B may be in electrical connection and/or communication (via, e.g., electrical traces 3490B) with EIC-2 3470-2. The PIC 3404B may communicate the one or more electrical signals, produced in response to the optical signal, to EIC-2 3470-2. Accordingly, EIC-1 3470-1 may be optically connected to EIC-2 3470-2 via the example configuration depicted in FIG. 34B.

One or more additional components and/or substrates may be packaged with the components of FIG. 34B. For example, the electro-optical package may further comprise a second substrate 3478B. The second substrate 3478B may host one or more other components (e.g., EIC-3 3460-3), and may facilitate electrical and/or optical connection of one or more components packaged on package substrate 3478A and/or second substrate 3478B.

Figure 35:
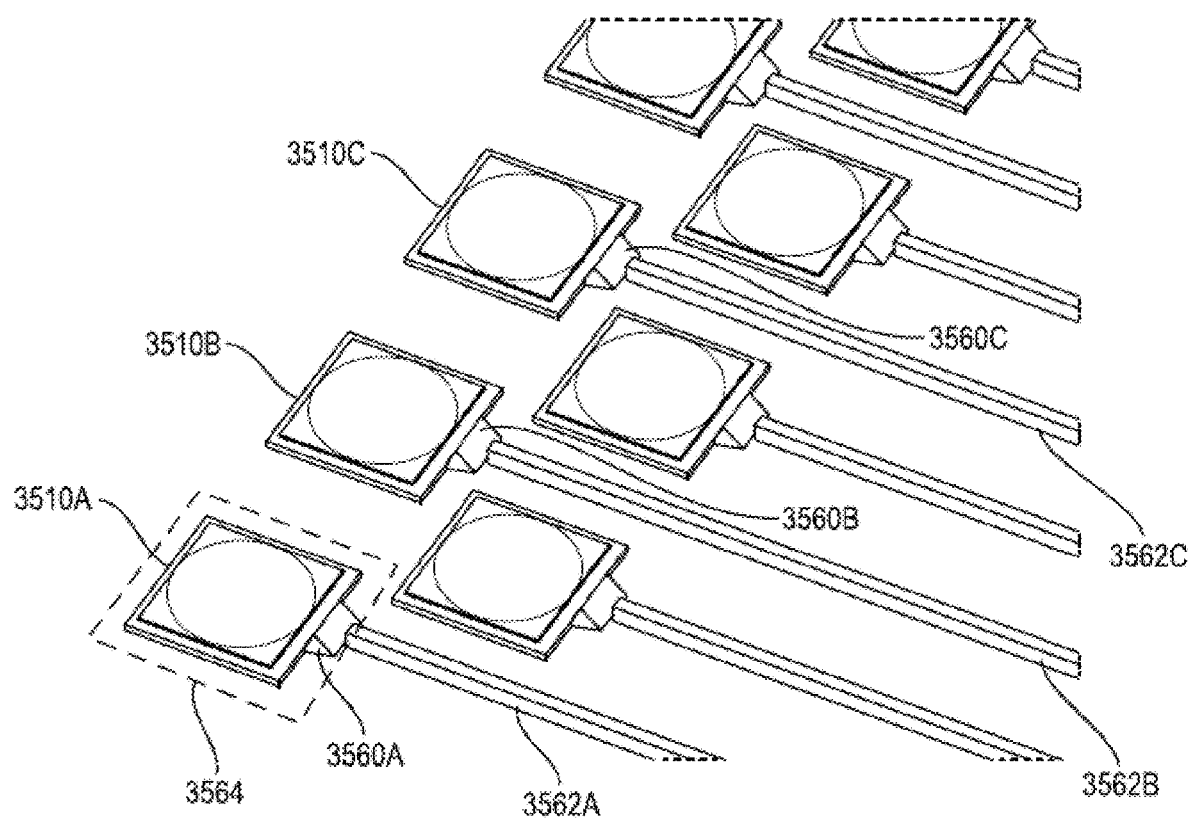
FIG. 35 depicts a plurality of example TCM photonic bumps and optical waveguides according one or more aspects of the present disclosure.

FIG. 35 depicts a plurality of example TCM photonic bumps 3564 (though FIG. 35 depicts a plurality of example TCM photonic bumps 3564, only one TCM photonic bump is referenced with numeral 3564 for clarity of illustration) and optical waveguides according one or more aspects of the present disclosure. Referring to FIG. 35, each TCM photonic bump 3564 may also be considered an optical via. Each TCM photonic bump 3564 may comprise a TCM 3560 and a TCM PB curved mirror 3512. Additionally, each TCM 3560 may correspond to waveguide 3562 (e.g., a polymer waveguide, silicon on insulator waveguide, etc.). The waveguides may be example of PIC I/O waveguides (e.g., PIC I/O waveguide 1662) and/or interconnect waveguide (e.g., interconnect waveguides 3486). As may be appreciated, one or more optical couplers may be disposed over the plurality of TCM photonic bumps 3564. The optical couplers may comprise optical elements (e.g., a curved mirror and a turning mirror) corresponding to each of the plurality of TCM photonic bumps 3564. The optical elements of the optical couplers may be connected to optical components (e.g., optical fibers, lasers, etc.). Accordingly, utilizing the TCM photonic bump configuration of FIG. 35, a dense package of optical connection may be realized where each of the plurality of TCM photonic bumps may be connected to a different optical component. Each waveguide 3562 may be connected to a PIC. Additionally or alternatively, each waveguide may terminate (not shown) at the waveguide's other side in an additional TCM photonic bump 3564.

Figure 36A:
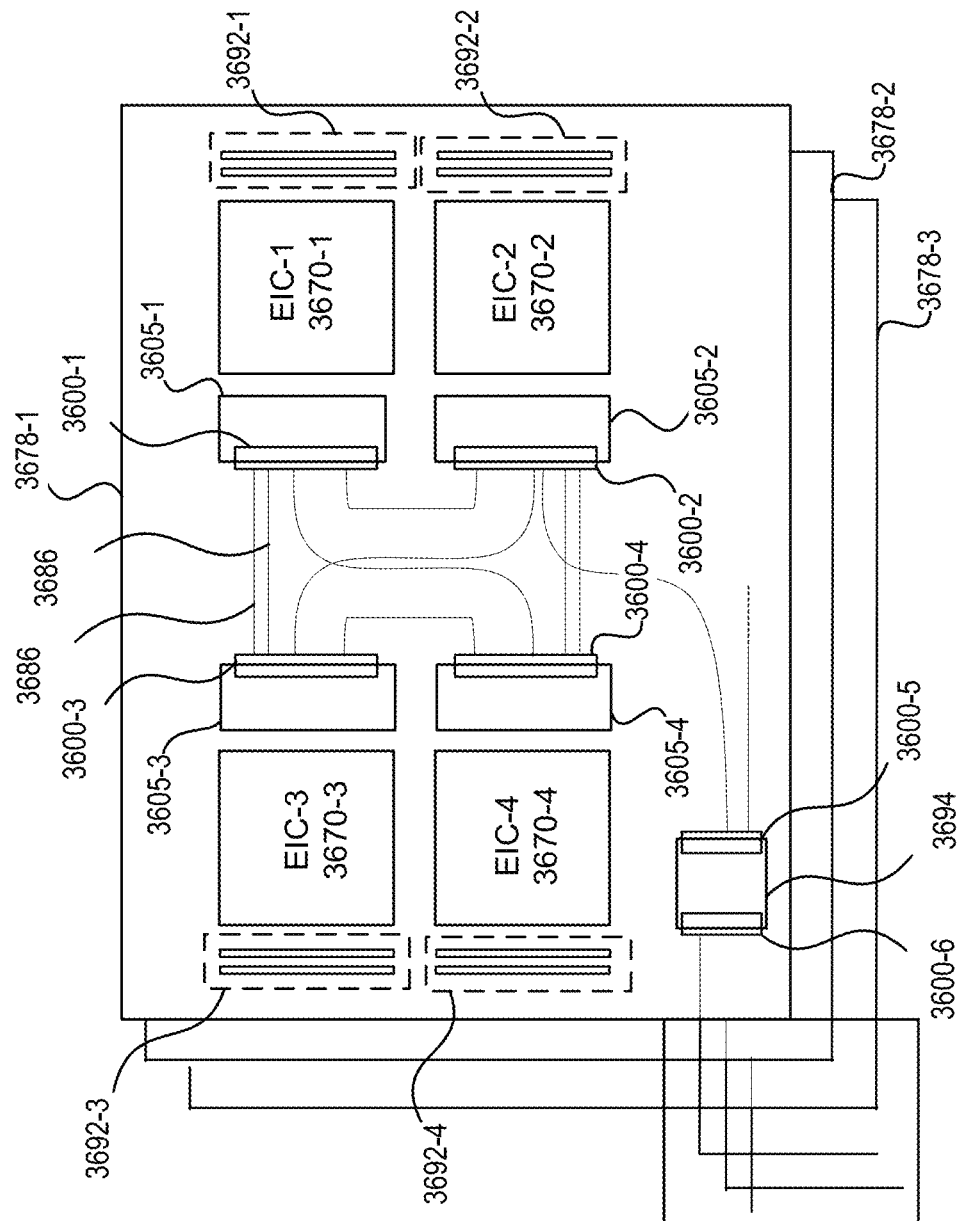
FIG. 36A depicts an example electro-optical package according to one or more aspects of the present disclosure.

With reference to FIGS. 34A and 34B it may be appreciated that a substrate may comprise a plurality of interconnect waveguides and a plurality of PICs and EICs to optically connect any number of EICs or other electrical components. FIG. 36A depicts an example electro-optical package according to one or more aspects of the present disclosure. Referring to FIG. 36A, an electro-optical package may comprise a package substrate 3678 (e.g., interposer). Package substrate 3678 may be electrically and optically packaged with various components. Referring to FIG. 36A, EIC-1 3470-1, EIC-2 3470-2, EIC-3 3470-3, and EIC-4 3470-4 (EIC-1-EIC-4 may be examples of ASICS (e.g., processors e.g., CPU, DPU, etc.) and may be packaged with and/or on package substrate 3678. Further components may be packaged. Referring to FIG. 36A, for example HBMs 3692 may be associated with each EIC. HBMs 3692 may be packaged in proximity to the EIC with which they are associated. Each EIC and associated HBM may be electrically connected to each other via package substrate 3678-1 (e.g., with package substrate circuitry, e.g., electrical traces). Additionally, each EIC 3670 may be associated with a chiplet 3605. chiplets 3605 may be electrically connected to their associated EIC. Thus, EIC-1 3670-1 may be electrically connected to chiplet-1 3605, EIC-2 3670-2 may be electrically connected to chiplet-2 3605-2, EIC-3 3670-3 may be electrically connected to chiplet-3 3605-3, and EIC-4 3670-4 may be electrically connected to chiplet-4 3605-4, etc. chiplets 3605 may comprise components to convert electrical signals to optical signals, and to convert optical signals to electrical signals.

Chiplets 3605 may be optically connected to one another. Referring to FIG. 36A, chiplets 3605 may be optically interconnected via optical interconnect waveguides 3686, for example, polymer waveguide 3686. FIG. 36A depicts a plurality of optical waveguide 3686 (as lines) connecting optical couplers 3600 (not all optical interconnect waveguides 3686 are referenced with numeral 3686 for clarity of illustration). The optical interconnect waveguides 3686 may be fabricated in and/or on the package substrate 3678. Alternatively, a separate waveguide interposer may be included and packaged on top of package substrate 3678. Accordingly, all EICs 3670 on the package substrate 3678 may be optically interconnected (for example as depicted in FIGS. 34A and 34B). The interconnect waveguides 3686 may be connected to the chiplets 3605 via optical couplers 3600 of the present disclosure. As will be appreciated, a single optical coupler 3600 may comprise the elements to connect a plurality of optical interconnect waveguides 3686. It should be appreciated that some or all of the optical interconnect waveguides 3686 may be replaced by optical fibers.

Referring to FIG. 36A, package substrate 3678 may comprise one or more additional groups of components. As such it may be advantageous to route optical signals from one group of components to another. Referring to FIG. 36A, optical terminal 3694 may be packaged with package substrate 3686. Optical terminal 3694 (e.g., laser, PIC), may receive and route optical signals from one group of optical engines (e.g., PICs) to other optical engines (e.g. PICs). Additionally, it may be advantageous to optically interconnect the package substrate 3678-1 itself (e.g., the package substrate), where the components on the package substrate, and the package substrate, may be optically connected with other optical components. Thus, the optical terminal may further comprise off-board optical connections. For example, one or more optical fibers may be connected to optical terminal 3694 via one or more optical couplers 3600 disclosed herein. The package substrate 3678-1 may comprise any number of optical terminals 3694. Each optical terminal 3694 may be optically connected to any number of off-board optical connections. For example, the optical terminal 3694 may facilitate connection to one or more of additional package substrates 3678-2 and/or 3678-3. Package substrates 3678-2 and 3678-3 may be substantially similar to package substrate 3678-1.

Figure 36B:
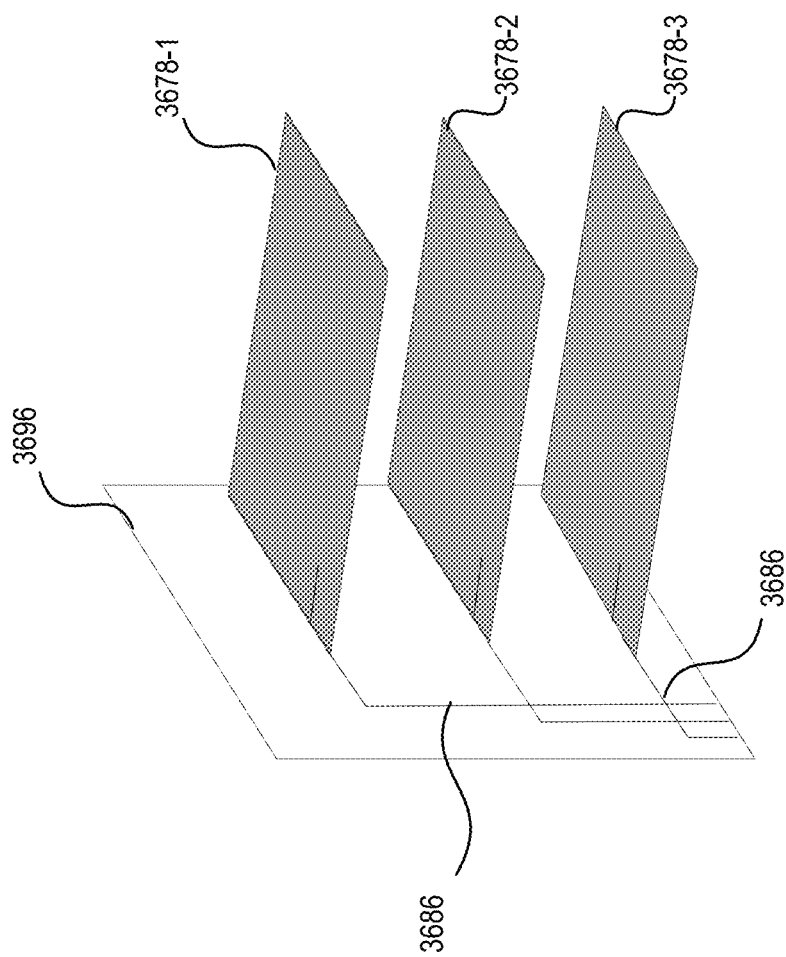
FIG. 36B depicts an example electro-optical package according to one or more aspects of the present disclosure.

As described above, aspects of the present disclosure relate to optically interconnecting substrates using the couplers of the present disclosure. FIG. 36B depicts an example electro-optical package according to one or more aspects of the present disclosure. For example, referring to FIG. 36B, multiple electro-optical (and/or optical) substrates 3678 may each be connected with an interconnect substrate 3696. Each package substrate 3678 may be an example of the package substrates 3678 of FIG. 36A. Interconnect substrate 3696 may, for example, operate as a server rack as well as an interconnect substrate. Interconnect substrate may additionally comprise interconnect waveguides 3686 to interconnect one or more package substrates 3678 and/or components that are optically connected to the interconnect substrate.

As described above, aspects of the present disclosure relate to backside coupling which may described herein in more detail. To provide for simplicity of description, the "bottom" of the SiPh chip may be referred to herein to the bottom surface of the SiPh chip prior to the SiPh chip being flipped. The bottom surface of the SiPh chip may be the surface of the SiPh chip opposite that on which the optical circuitry is developed. Similarly, for simplicity of description, the "top" of the SiPh chip may be referred to herein to the top surface of the SiPh chip prior to the SiPh chip being flipped. The top surface of the SiPh chip may be the surface of the SiPh chip on which the optical circuitry is developed.

The thickness of the optical chip may be turned from a disadvantage to an advantage for a flip-chip mounted SiPh chip by a unique structure and arrangement of optical components including a photonic plug so that light from an optical fiber (e.g., SMF) that is coupled to a SiPh chip may pass through a portion of the thickness of the SiPh chip's substrate. To this end, a cavity may be etched out of the top of the substrate of the SiPh chip. The area of the SiPh chip from which a cavity may be etched (and optical components may be formed, as described herein) may be referred to as an example of a photonic bump. A tilted flat mirror and a curved mirror may be formed by stamping and curing an imprint material placed in and possibly over the cavity forming the example photonic bump. A photonic plug comprising, for example, a tilted flat mirror and a curved mirror may be placed over a spacer which in turn may be placed over the bottom of the flipped SiPh chip in the area of the photonic bump. The one or more fibers for which light is to be coupled with the SiPh chip may be fixed to the photonic plug substantially as described herein. The resulting optical path may couple light between the optical fiber and the SiPh chip.

Note that the structures of the photonic bump portion of the SiPh chip need not be manufactured at the same time that the SiPh chip is manufactured. Therefore, the structures of such a photonic bump can be added by another party, e.g., a party who did not manufacture the rest of SiPh chip, possibly, at a later time.

The bottom of the SiPh chip and the photonic plug may be arranged such that the photonic plug is detachable from the SiPh chip which will be described in more detail below.

Figure 37:
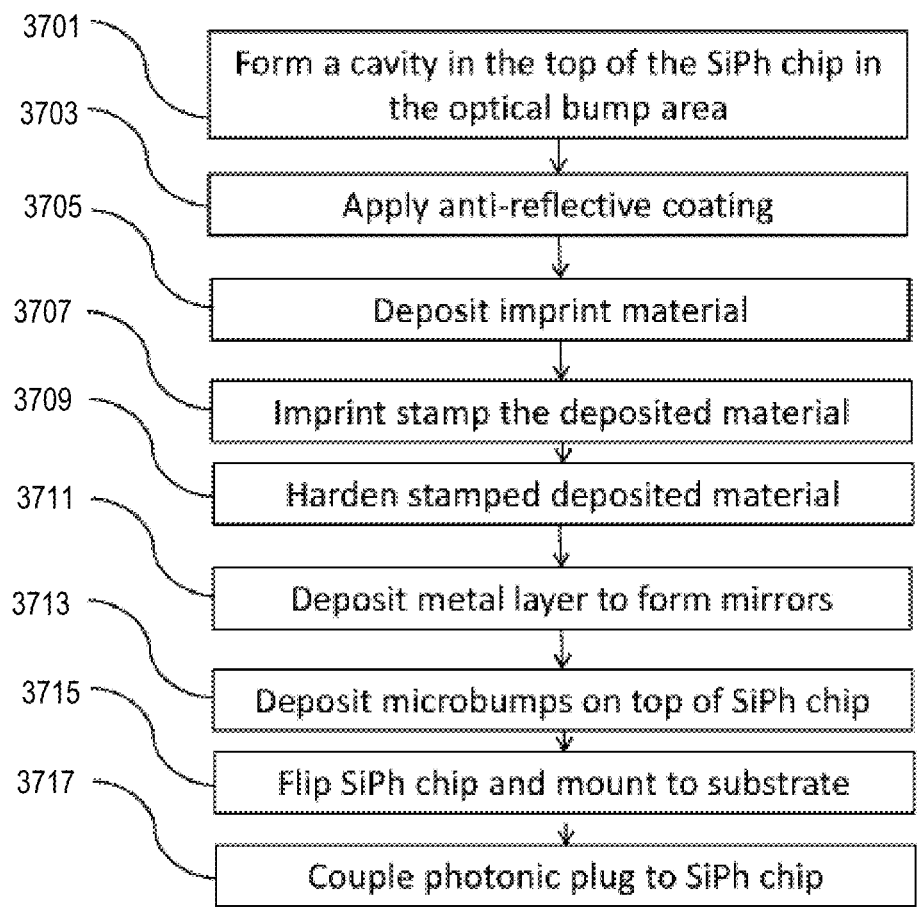
FIG. 37 shows an example method for making a structure and coupling of single-mode fiber to a silicon photonics chip that is flip-chip mounted using backside optical coupling according to one or more aspects of the present disclosure.

FIG. 37 shows an example method for making a structure and coupling of single-mode fiber to a silicon photonics chip that is flip-chip mounted using backside optical coupling.

Figure 38:
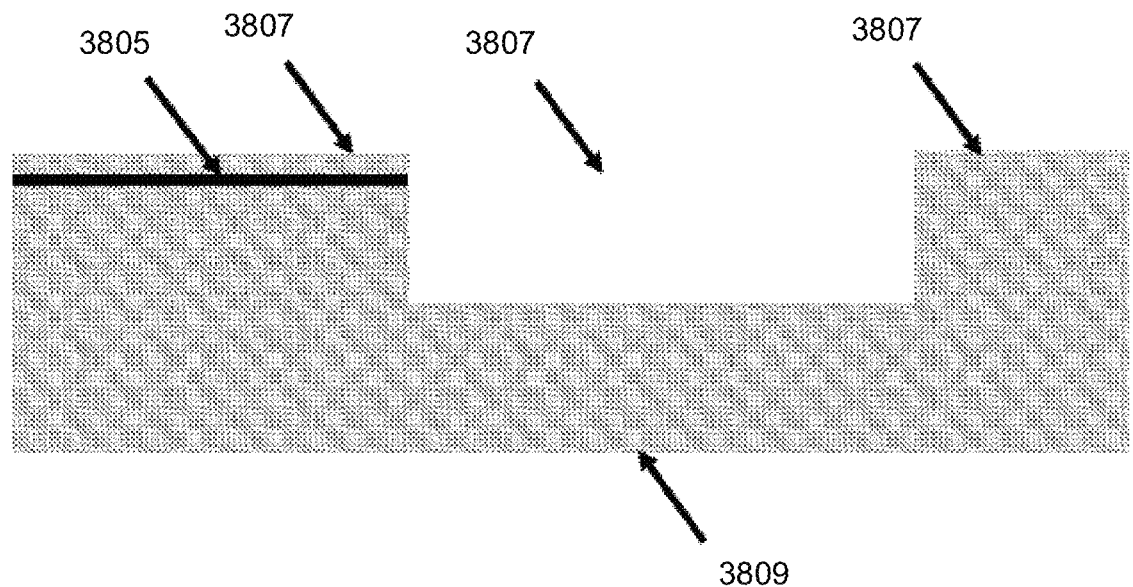
FIG. 38 shows an example cavity as having been formed in top of SiPh chip 3801.

In step 3701, a cavity may be formed in the top of a SiPh chip in the photonic bump area. The cavity may be formed by etching down from the top of the SiPh chip. FIG. 38 shows an example cavity 3803 as having been formed in top 3807 of SiPh chip 3801. SiPh chip 3801 already, e.g., prior to formation of the cavity, may have waveguide 3805 formed thereon. Cavity 3803 may have a depth in the range of 10 to 20 microns while it may have a width in a range from 150 microns to a few hundred microns. According to one or more aspects, the width may be, for example, 200 microns. Although only one cavity is shown, it will be appreciated by those of ordinary skill in the art that more than one cavity may be employed, e.g., one cavity per fiber to be coupled to the SiPh chip. Alternatively, one cavity may be employed for more than one waveguide to be coupled to corresponding fibers. Also shown in FIG. 38 is bottom 3809 of SiPh chip 3801. Note that the above references to "backside" optical coupling refer to coupling the light at least once through bottom 3809 of SiPh chip 3801

Figure 39:
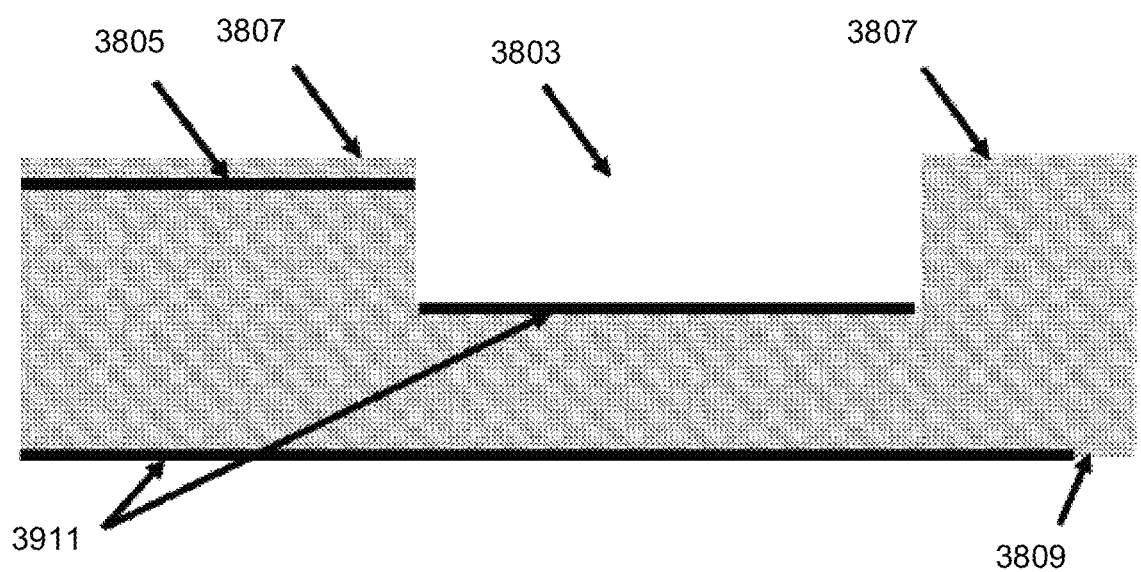
FIG. 39 depicts example antireflective coating layers applied along the bottom of cavity and along a portion of bottom of SiPh chip according to one or more aspects of the present disclosure.

Referring to FIG. 39, antireflective coating layers 3911 may be applied along the bottom of cavity 3803 and also along a portion of bottom 3809 of SiPh chip 3801, at least under the portion of bottom 3809 that is under cavity 3803, in step 3703. Such antireflective coating may be a dielectric material such as a layer of magnesium fluoride, although those of ordinary skill in the art will be able to select an antireflective coating suitable to the materials and structure employed which is described further hereinbelow. Advantageously, the antireflective coating layers may substantially overcome the difference, e.g., a mismatch, in the index of refraction as light propagates from one medium to another. Accordingly, antireflective coating layers may be used to reduce scattering. Note that the layer of antireflective coating 3911 along bottom 3809 of SiPh chip 3801 may be applied at a different time, e.g., a later time, than layer of antireflective coating 3911 along bottom of cavity.

In step 3705, an imprint material, e.g., a liquid, suitable to be formed by stamping may be deposited on SiPh chip 3801 and at least in cavity 3803 thereof. The deposited imprint material may also extend over at least a portion of top 3807 of SiPh chip 3801. One material that may be used as the imprint material may be a siloxane, which may be obtained from INKRON or other sources which may comprise a UV sensitive resin useful for nanoimprinting. The imprint material may be such that it is substantially transparent to light at the wavelength or wavelengths of interest after it hardens. Some imprint materials and stamping are well known in the art and may be selected at the discretion of the implementer for the particular application.

Figure 40:
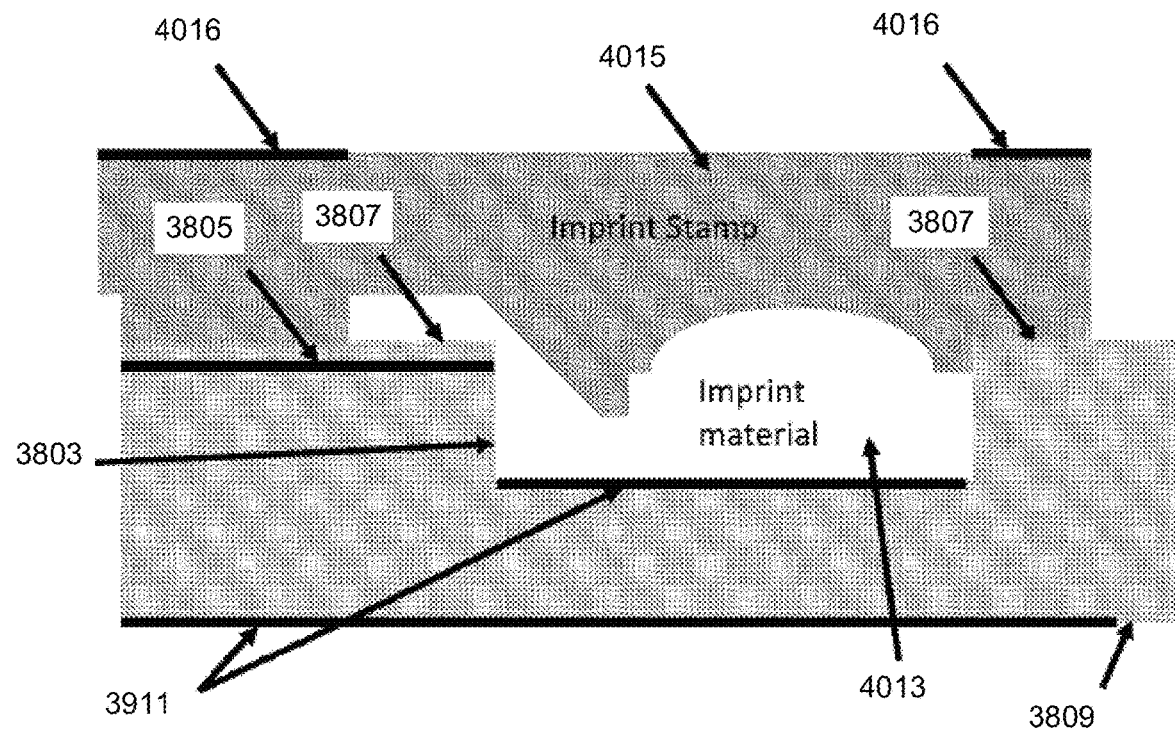
FIG. 40 shows an example imprint material in cavity and also some example imprint material on top of SiPh chip along with example imprint stamp according to one or more aspects of the present disclosure.

In step 3707, an imprint stamp may be employed to shape the imprint material to have a curved surface and a tilted flat surface suitable to be used as a base for a curved mirror and a tilted flat mirror respectively. FIG. 40 shows an example imprint material 4013 in cavity 3803 and also some example imprint material on top 3807 of SiPh chip 3801 along with example imprint stamp 4015 such as may be used in step 3707.

In step 3709, the imprint material may be hardened, such as, for example, by curing, which may be through the use of, for example, a catalyst, e.g., ultraviolet (UV) light, heat, and so forth as well as combinations of the forgoing, so as to retain the imprinted shape. To this end, if the catalyst employed is UV light, prior to exposing the imprint material to the UV light, mask 4016 of FIG. 40 may be employed to block UV light from reaching areas of SiPh chip 3801 on which the imprint material was deposited but which are not desired to be hardened. Mask 4016 should block the catalyst from reaching the imprint material, e.g., if the catalyst is UV light mask 4016 may be made of UV light blocking metal, e.g., bronze, as is well known in the art. Mask 4016 may be a part of imprint stamp 4015 or it may be separate therefrom and placed on top of imprint stamp 4015. After hardening of the desired portion of the imprint material, mask 4016 and imprint stamp 4015 may be removed and any non-hardened imprint material, e.g., that which was under mask 4016 may be cleaned away.

Figure 41:
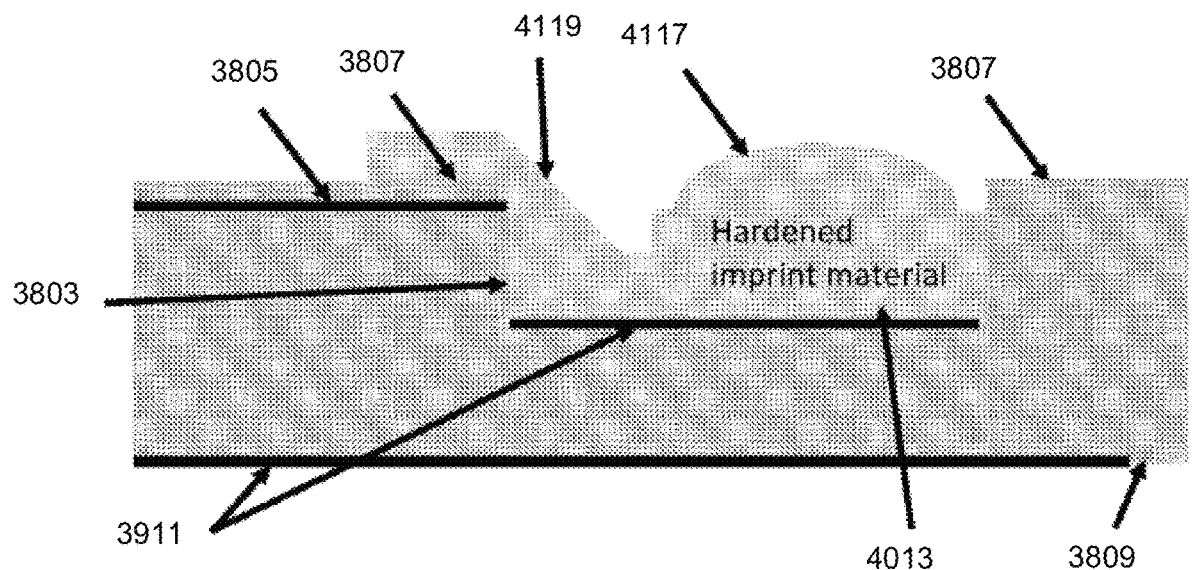
FIG. 41 shows an example shaped and hardened imprint material with curved surface and tilted flat surface following cleaning of any possible non-hardened imprint material according to one or more aspects of the present disclosure.

FIG. 41 shows an example shaped and hardened imprint material 4013 with curved surface 4117 and tilted flat surface 4119 following cleaning of any possible non-hardened imprint material.

In step 3711, a reflective material, e.g., metal (e.g., chromium, silver, gold, copper, etc.), may be deposited over at least a portion of curved surface 4117 and a portion of tilted flat surface 4119. The metal deposited may be selected so as to be substantially reflective to the wavelengths of light of interest and to thereby form curved mirror 4221 and tilted flat mirror 4223 shown in FIG. 42. For example, the wavelength of light may be in the 1200-1600 nm region, and the metal employed may be gold, copper, chromium, etc. Those of ordinary skill in the art will readily be able to select appropriate materials that correspond to the particular wavelengths of interest. The curve of imprint stamp 4015 that may be used to form curved surface 4117 may conform to the desired shape of curved mirror 4221 and the portion of imprint stamp 4015 that may be used to form tilted flat surface 4119 may conform to the desired shape and tilt (e.g., angle) of tilted flat mirror 4223. In the description hereinbelow, curved mirror 4221 may be referred to as first curved mirror 4221 and tilted flat mirror 4223 may be referred to as first tilted flat mirror 4223.

In step 3713, electrical microbumps may be deposited on top 3807 of SiPh chip 3801. The electrical microbumps may be employed at least to couple SiPh chip 3801 to a substrate when SiPh chip 3801 is flipped and placed against a substrate. The electrical microbumps may be a type of metal, e.g., solder, that may be placed on conductive pads, e.g., metallic pads, such as copper, or another conductive substance, on top 3807 of SiPh chip 3801 and then reflowed if SiPh chip 3801 is flipped and placed on the substrate to which it is being mounted. FIG. 43 shows the example structure of FIG. 42 with example electrical microbumps 4325 placed on top 3807 of SiPh chip 3801. Electrical microbumps 4325 may be high enough so that they may extend beyond top portion 4327 of the structure formed of hardened imprint material 4013. Additionally or alternatively, one or more of microbumps 4325 may consist of a downsized copper pillar and solder with height of, for example, around 30 μm. The pads on which microbumps 4325 may be placed are not shown but are well known in the art.

Figure 44:
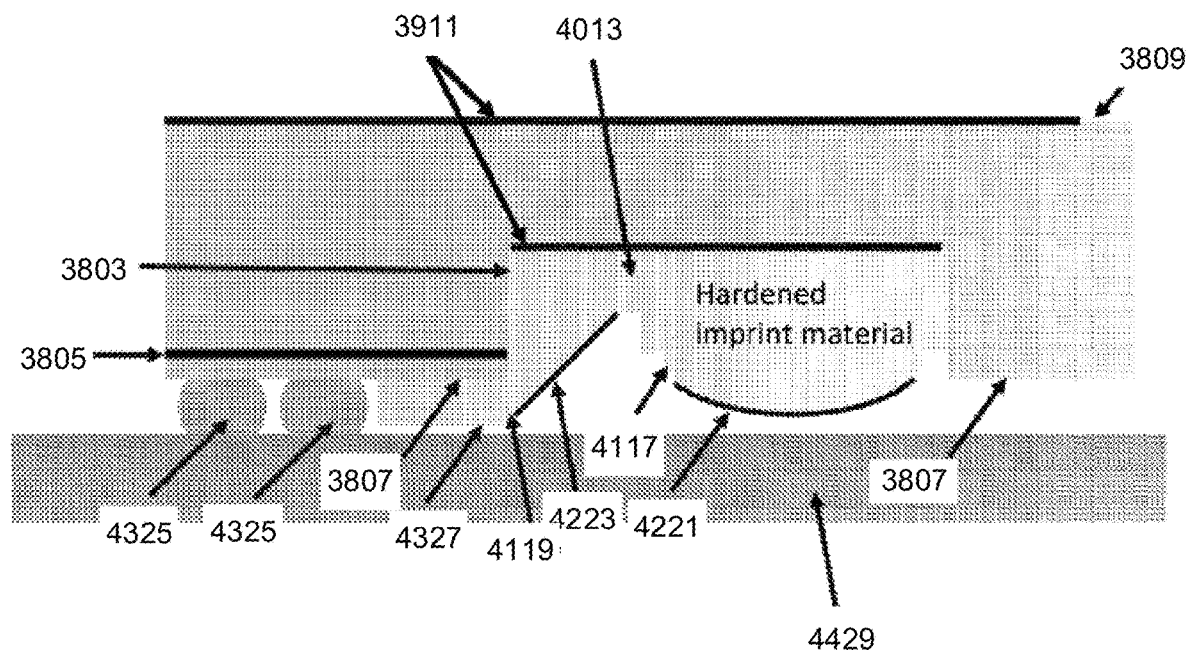
FIG. 44 shows example SiPh chip flipped and mounted to an example substrate after reflow of solder microbumps.

In step 3715, SiPh chip 3801 may be flipped and mounted to a substrate. The substrate may have additional devices, e.g., optical and/or electrical devices (e.g., one or more ASICs), mounted thereon as well. According to one or more aspects, the substrate may be an interposer that may be further mounted to a substrate (e.g., organic substrate, MCM substrate, etc.). SiPh chip may be attached to the substrate by, for example, reflowing the microbumps. FIG. 44 shows SiPh chip 3801 flipped and mounted to substrate 4429 after reflow of solder microbumps 4325. According to one or more aspects herein, there may be conductive pads, e.g., metallic pads, such as copper, or another conductive substance, on the substrate, e.g., substrate 4429. The pads of substrate 4429 are not shown but are well known in the art.

Substrate 4429 may be a multichip module (MCM) substrate that may provide for various electrical functions. For example, MCM substrate 4429 may provide the base for multiple chips to be mounted thereon that may perform various electrical and/or optical functions. For example, one or more silicon photonics chips may be mounted on MCM substrate 4429 although in FIG. 44 only SiPh chip 3801 is shown as a non-limiting example. One or more electronic circuits, e.g., switches and/or application specific integrated circuits (ASICs), may also be mounted on MCM substrate 4429. MCM substrate 4429 may itself be mounted on a board (e.g., a PCB), not shown but well known in the art. As noted, the substrate may be an interposer that may then further coupled to an MCM substrate.

Figure 45:
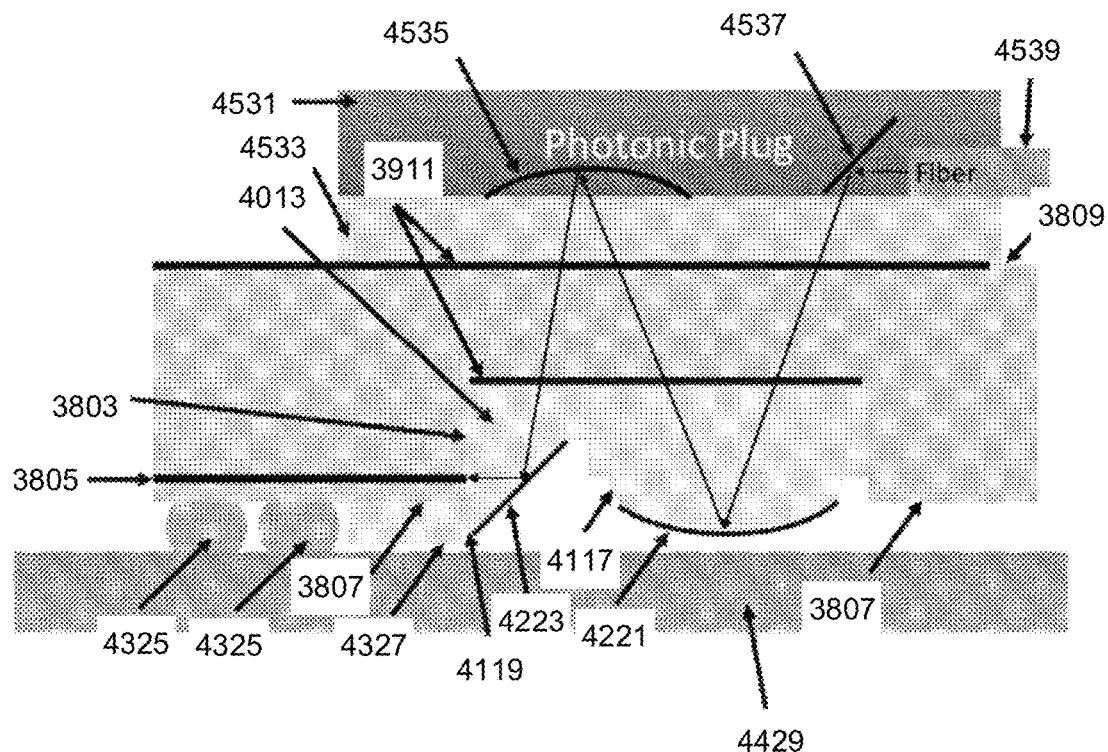
FIG. 45 depicts an example photonic plug coupled to a SiPh chip according to one or more aspects of the present disclosure.

In step 3717, a photonic plug may be coupled to bottom 3809 of SiPh chip 3801 with a spacer interposed between the photonic plug and bottom 3809. FIG. 45 shows photonic plug 4531 so coupled, and more specifically, photonic plug 4531 stacked on top of spacer 4533 which is on top of bottom 3809 of SiPh chip 3801. Photonic plug 4531 may comprise second curved mirror 4535 and second tilted flat mirror 4537. Optical fiber 4539 may be inserted into photonic plug 4531 so that light may be coupled between optical fiber 4539 and second tilted mirror 4537. Although only a single optical fiber 4539 is shown in FIG. 45, it is expected that generally there may be a plurality of fibers arranged in parallel in the photonic plug, as will be shown and described further hereinbelow. The optical fiber 4539 may be, for example, a single-mode fiber (SMF).

As described herein, spacer 4533 may be glued, e.g., using an adhesive, to photonic plug 4531. Additionally or alternatively, spacer 4533 may be glued, e.g., using an adhesive, to SiPh chip 3801. Spacer 4533 may be made of any transparent and non-conductive material, such as glass, polydimethylsiloxane, or any other index matching material.

The adhesive may have an appropriate index of refraction so as to minimize optical losses. For example, if optical fiber 4539 and spacer 4533 are each made from fused silica that has an index of refraction around 1.5, in order to minimize optical losses, the index of refraction of the adhesive may be around 1.5 as well. Those of ordinary skill in the art will readily be able to select an adhesive having an appropriate index of refraction based on the materials employed in their various applications. Spacer 4533 may be optically transparent to at least one wavelength of light being carried by optical fiber 113 and employed by SiPh chip 3801. Spacer 4533 may be made of any transparent and non-conductive material, such as glass, polydimethylsiloxane, or any other encapsulation material with appropriate refractive index.

Spacer 4533 may be used, at least in part, to control (e.g., set) the distance between photonic plug 4531 and SiPh chip 3801 so as to enable the proper optical operation of the system. Spacer 4533 may also be used to at least partially encapsulate and help hold in place optical fiber 4539. To this end, adhesive may be employed between at least a portion of spacer 4533 and at least a portion of photonic plug 4531 to keep spacer 4533 attached to photonic plug 4531.

At least one of first curved mirror 4221 and second curved mirror 4535 may be structured and configured to reflect substantially all wavelengths of light incident thereupon.

Figure 46:
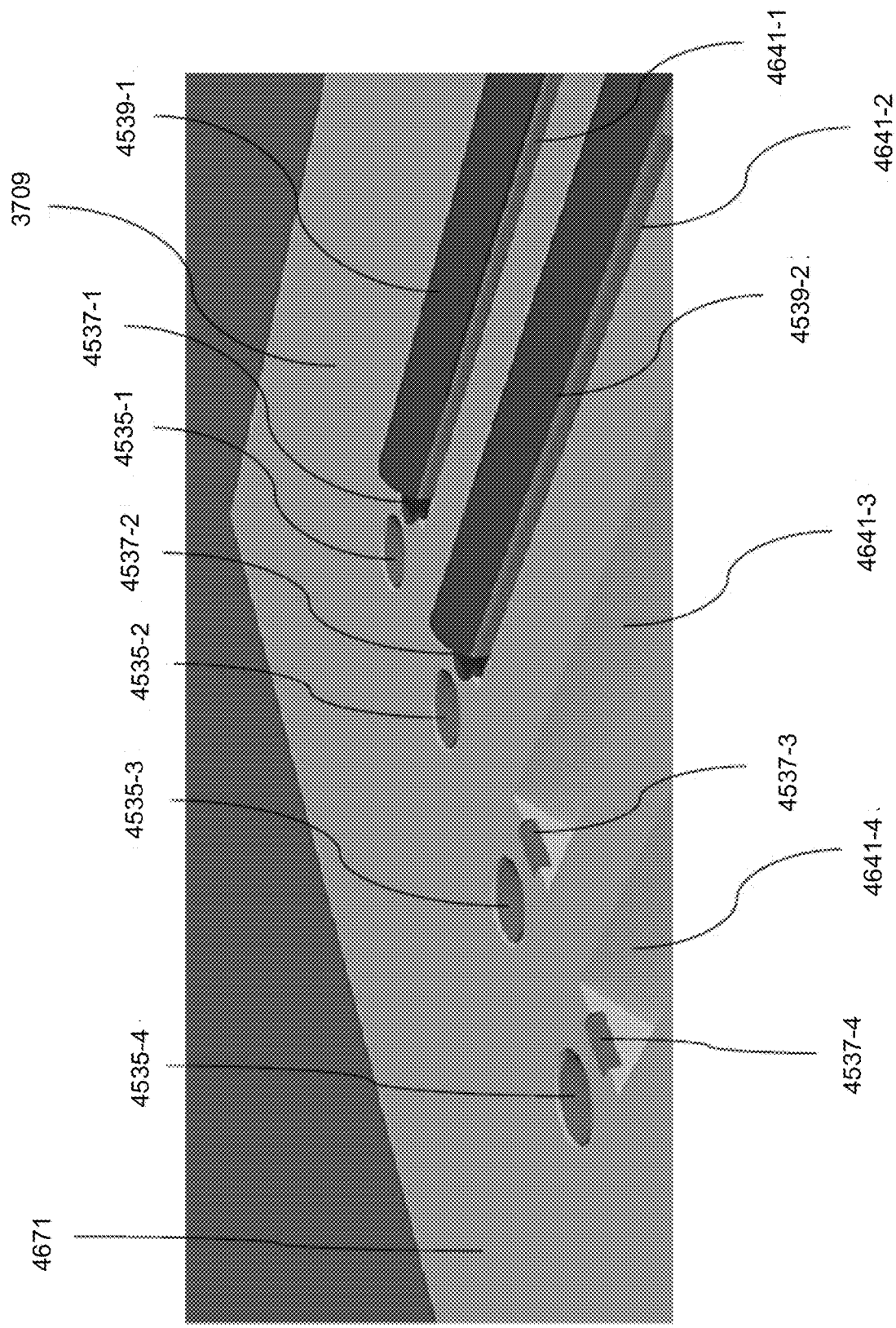
FIG. 46 depicts a portion of an example surface usable for a photonic plug according to one or more aspects of the present disclosure.

FIG. 46 shows a portion of an example surface 4671 usable for photonic plug 4531 in which second curved mirrors 4535 and tilted flat mirrors 4537 may be formed, each corresponding set of a one of curved mirror 4535 and a one of tilted flat mirrors 4537 being for a respective one of optical fibers 4539. Also, shown in FIG. 46 are trenches 4641, (e.g., retaining features/alignment features described herein) e.g., V-grooves, for guiding optical fibers 4539, retaining optical fiber, and/or aligning optical fibers (e.g., in the X, Y and/or Z directions). FIG. 46 shows four fiber trenches 4641-1 through 4641-4. Each fiber trench 4641 adjoining a corresponding one of second tilted flat mirrors 4537, e.g., second tilted flat mirrors 4537-1 through second tilted flat mirrors 4537-4. According to the example depicted in FIG. 46, each of fiber trenches 4641 are shaped as V-grooves formed in a substrate layer of photonic plug 4531 (alternative alignment features, as described herein, are contemplated). Each of fiber trenches 4641 may be formed, for example, by etching. Each of second tilted flat mirrors 4537-1 through 4537-4 may be oriented so as to be able to direct light between optical fiber 4539 and a corresponding respective first curved mirror 4221 formed on Si Ph chip 3801. FIG. 46 also shows four second curved mirrors 4535-1 through 4535-4. Each of second curved mirrors 4535 may be oriented so that if photonic plug 4531 is coupled to spacer 4533 which is in turn coupled to bottom 3809 of SiPh chip 3801, the interior of each of second curved mirror 4535 may be facing toward bottom 3809 of SiPh chip 3801.

It should be noted that only 2 optical fibers 4539-1 and 4539-2 and four fiber trenches 4641 are shown in FIG. 46 for example purposes only. Other numbers of optical fibers and trenches may be used without departing from the scope of the present disclosure. It should be further noted that trenches 4641 are described as V-grooves. However, any type of groove shape can be used, such as square, cylinder, diamond, and the like.

FIG. 46 shows optical fibers 4539-1 and 4539-2 placed in the fiber trenches 4641-1 and 4641-2, respectively. According to one or more aspects, the height of at least one of fiber trenches 4641 may be substantially the same as the diameter of a one of optical fibers 4539 that is placed therein. Doing so with all of fibers 4539 may enable spacer 4533 to have a flat surface that may be flush against photonic plug 4531. Alternatively, spacer 4533 may be shaped so as to accommodate other heights for fiber trenches 4641. Second tilted flat mirrors 4537 and second curved mirrors 4535 may be positioned to provide for a proper optical path with respect to the depth and orientation of fiber trenches 4641. The depths of trenches 4641 shown in FIG. 46 and the diameter of fibers 4539 shown in FIG. 46 are simply for pedagogical purposes to make it easy to facilitate explanation of the concept and do not reflect any particular preferred or real-world depth, diameter, or optical path.

Processes for creating a fiber trench may be well known in the art. Adhesive may also be placed within trenches 4641 or around optical fibers 4539 to secure optical fibers 4539 with photonic plug 4531.

Figure 42:
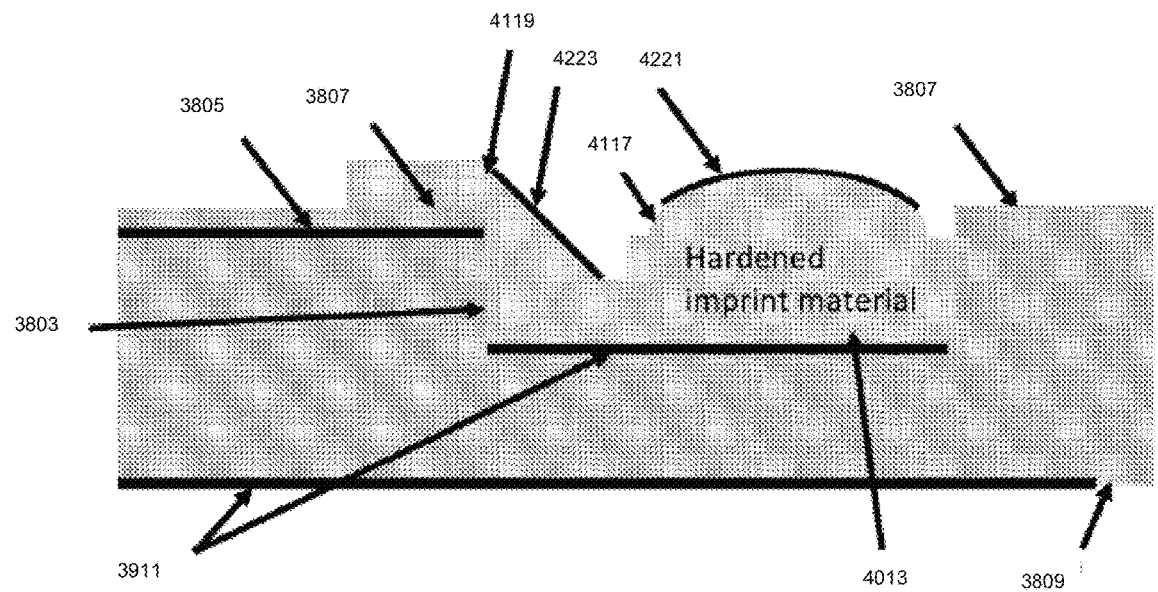
FIG. 42 depicts example reflective material deposited on the example imprint material according to one or more aspects of the present disclosure.
Figure 43:
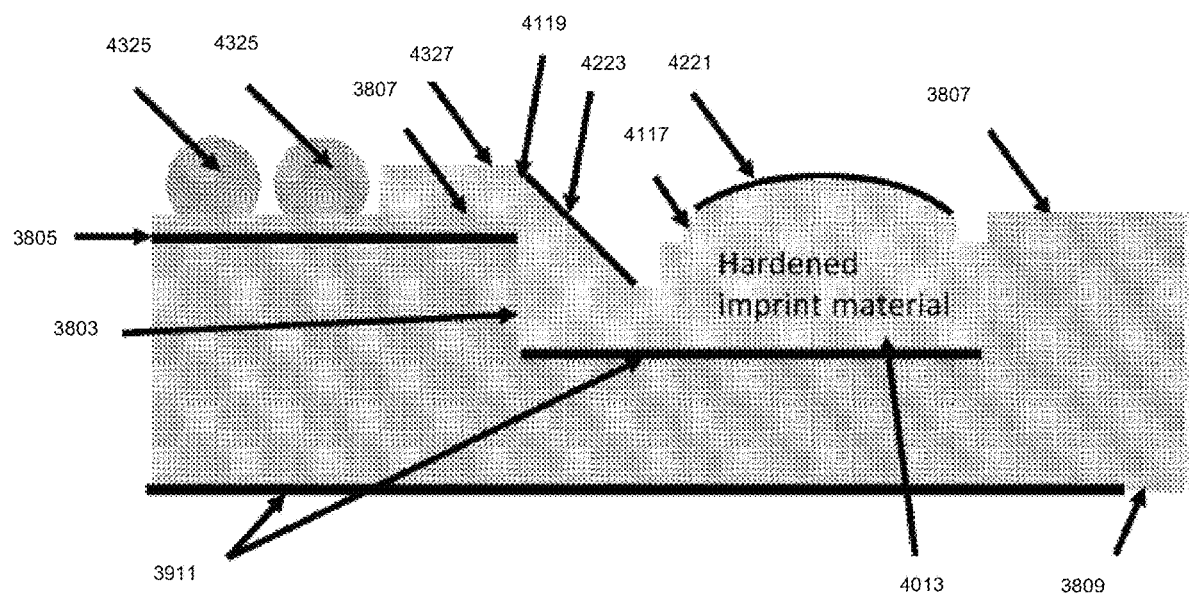
FIG. 43 depicts the example of FIG. 42 with example electrical bumps on the SiPh chip according to one or more aspects of the present disclosure.

According to one or more aspects herein and referring to FIG. 42, tilted flat mirror 4223 may be replaced by a tilted curved mirror (TCM). Such a titled curved mirror may act as and/or be configured similarly to a focusing element that can change the mode size of the light beam. For example, the tilted flat mirror may be used in an example configuration where the mode diameter of the waveguide is, for example, 9 um. Additionally, when the waveguide mode field diameter is different than 9 um the titled curved mirror may be employed as well. The tilted curved mirror may be shaped and oriented so that not only does it change the direction of the light, similar in this regard to titled flat mirror 4223 (and first turning mirrors herein, e.g., first turning mirror 120), but due to its curvature it may also converts the light's mode size. Such a tilted curved mirror may be formed by imprint stamping in the same manner as described above for tilted flat mirror 4223 and curved mirror 4221 but using an imprint stamp that may be shaped so as to form a tilted curved mirror surface in lieu of tilted flat surface 4119.

Additionally or alternatively, tilted flat mirror 4223 may be employed and mode conversion may be achieved by forming of the imprint material a mode converter between the end of waveguide 3805 and tilted flat mirror 4223. The mode converter may be made of an inverted taper and a linear taper (e.g., as described with respect to FIGS. 18A-18C) which may be formed of the imprint material at the same time as the formation curved surface 4117 and tilted flat surface 4119 takes place, e.g., as part of the same steps that are used to form curved surface 4117 and tilted flat surface 4119, by using an appropriately shape imprint stamp.

Additionally or alternatively, if a grating coupler has been incorporated into SiPh chip at the end of waveguide 3805, the grating coupler redirecting light between waveguide 3805 and second curved mirror 4535, tilted flat mirror 4223 may not be formed at all.

Additionally or alternatively, the imprinted structure could be formed as a separate part, e.g., formed on glass or other substrate that may be transparent to light at the wavelength of interest, and then installed, e.g., adhered, onto the SiPh chip, e.g., so as to extend at least partly within a cavity formed therein as disclosed above.

As may be appreciated, detachability of optical connectors may prove advantageous according to some uses and/or configurations. Accordingly, aspects of the present disclosure relate to detachable connectors (e.g., optical couplers).

Figure 47:
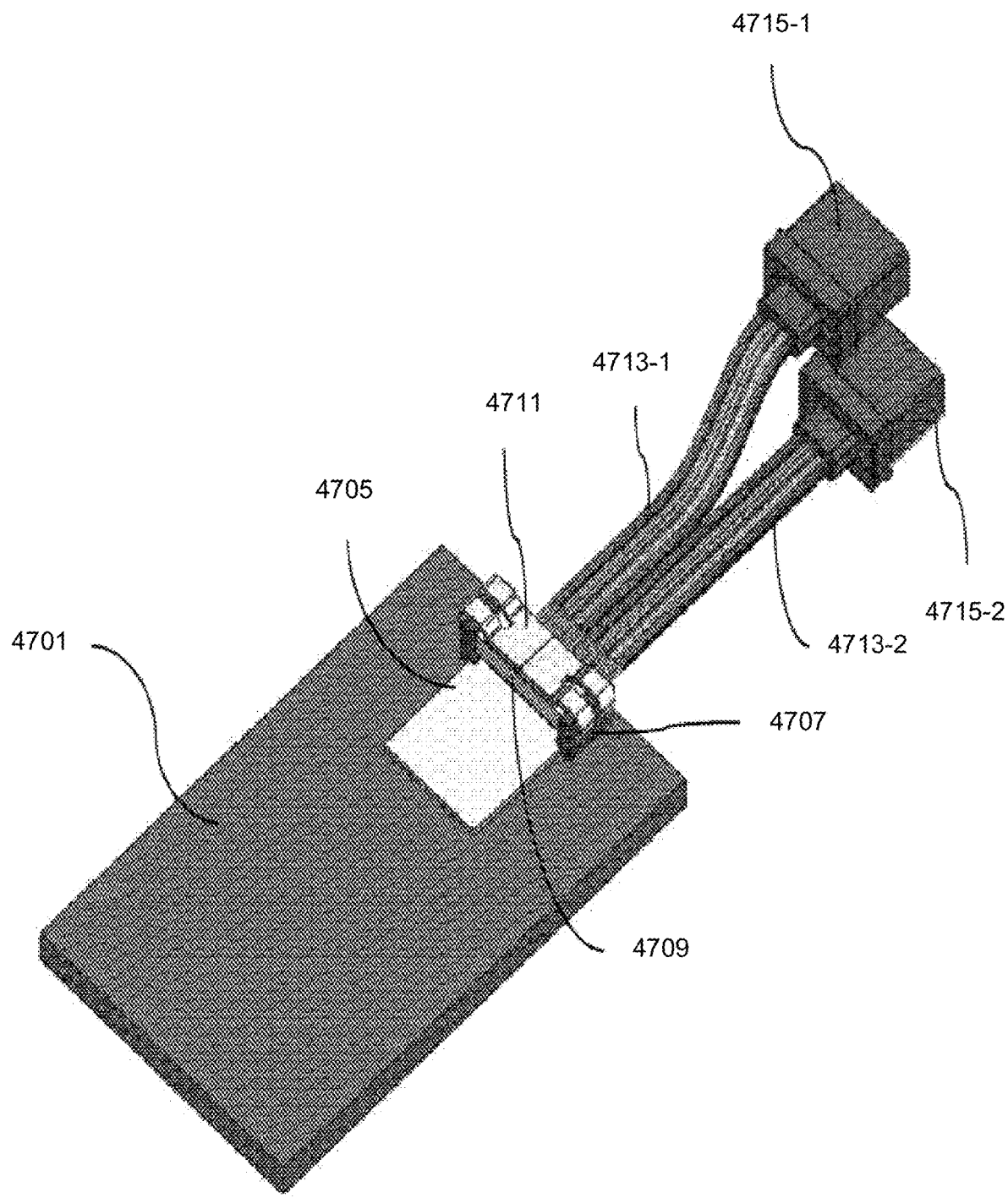
FIG. 47 shows an example of a fully assembled detachable connector for co-packaged optics coupled to a multi-chip module via a PIC according to one or more aspects of the present disclosure.

FIG. 47 shows an example of a fully assembled detachable connector for co-packaged optics coupled to a multi-chip module via a PIC. Shown in FIG. 47 are a) MCM substrate 4701, b) PIC 4705, c) receptacle 4707, d) detachable plug die 4709, e) removable clip 4711, f) optical fibers 4713 arranged into fiber ribbons 4713-1 and 4713-2, and g) fiber ribbon connector couplers 4715-1 and 4715-2.

Figure 48:
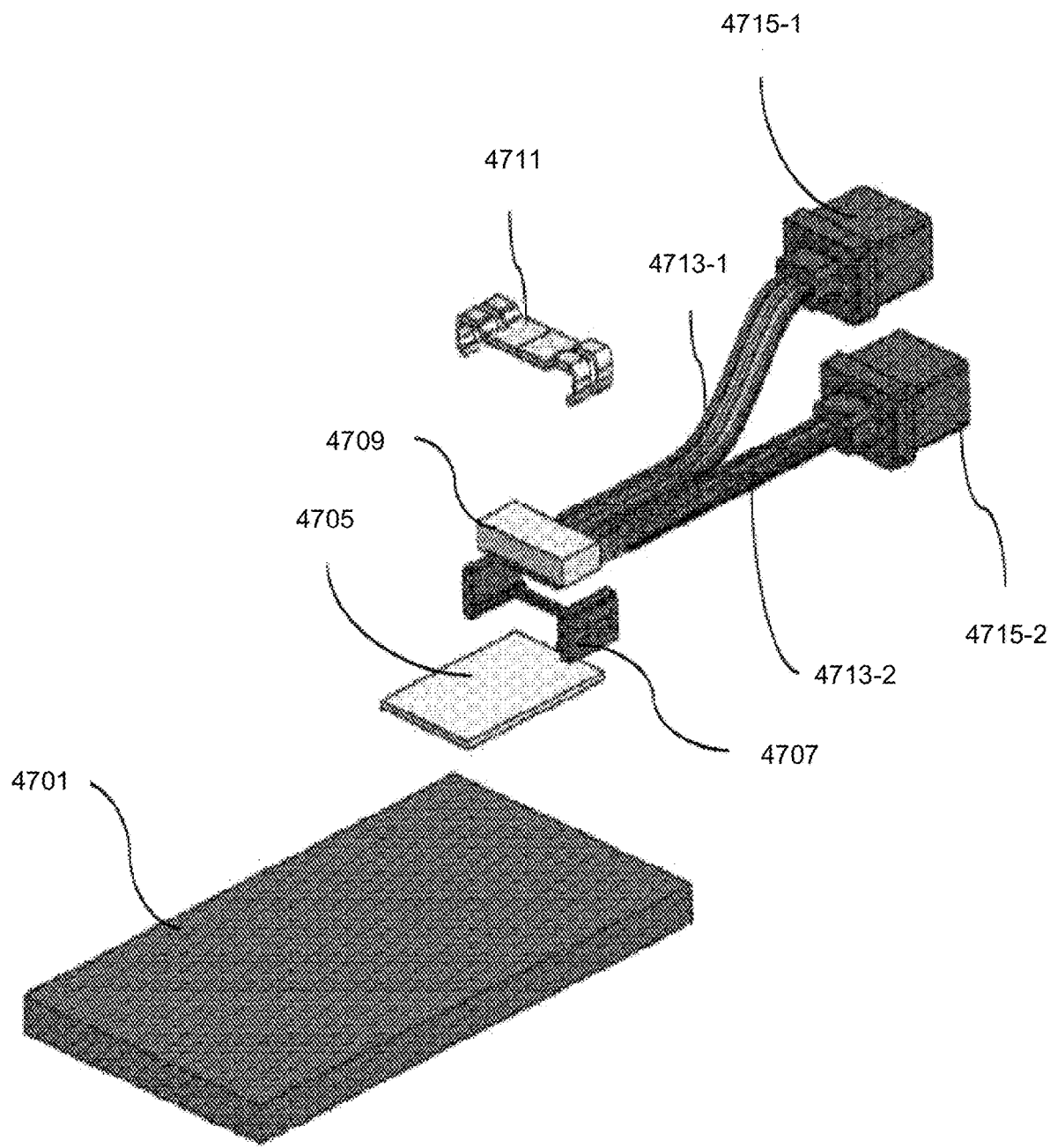
FIG. 48 shows an exploded view of the example that is shown in FIG. 47.

FIG. 48 shows an exploded view of the example that is shown in FIG. 47.

MCM substrate 4701 may provide for various electrical functions. MCM substrate 4701 may provide the base for multiple chips mounted thereon that may perform various electrical and optical functions. For example, one or more photonic integrated circuits (PICs) 4705, may be mounted on MCM substrate 4701 although in FIGS. 1 and 2 only a single PIC is shown as a non-limiting example any number of PICs may be mounted on MCM substrate 4701. One or more electronic circuits, e.g., switches and application specific integrated circuits (ASICs), may also be mounted on MCM substrate 4701. MCM substrate 4701 may itself be mounted on a board (e.g., a PCB) (not shown in FIG. 1 or 2). PIC 4705 may be reflow soldered to MCM substrate 4701.

Receptacle 4707 may be reflow soldered or glued, e.g., using an adhesive, to PIC 4705, MCM substrate 4701 or a combination thereof. This may be performed, advantageously, using a standard pick and place machine and as such, advantageously, it can be placed with high accuracy. It may be placed during the packaging process, e.g., during the placing of one or more chips, e.g., one or more ASICs on the MCM substrate 4701.

Figure 49:
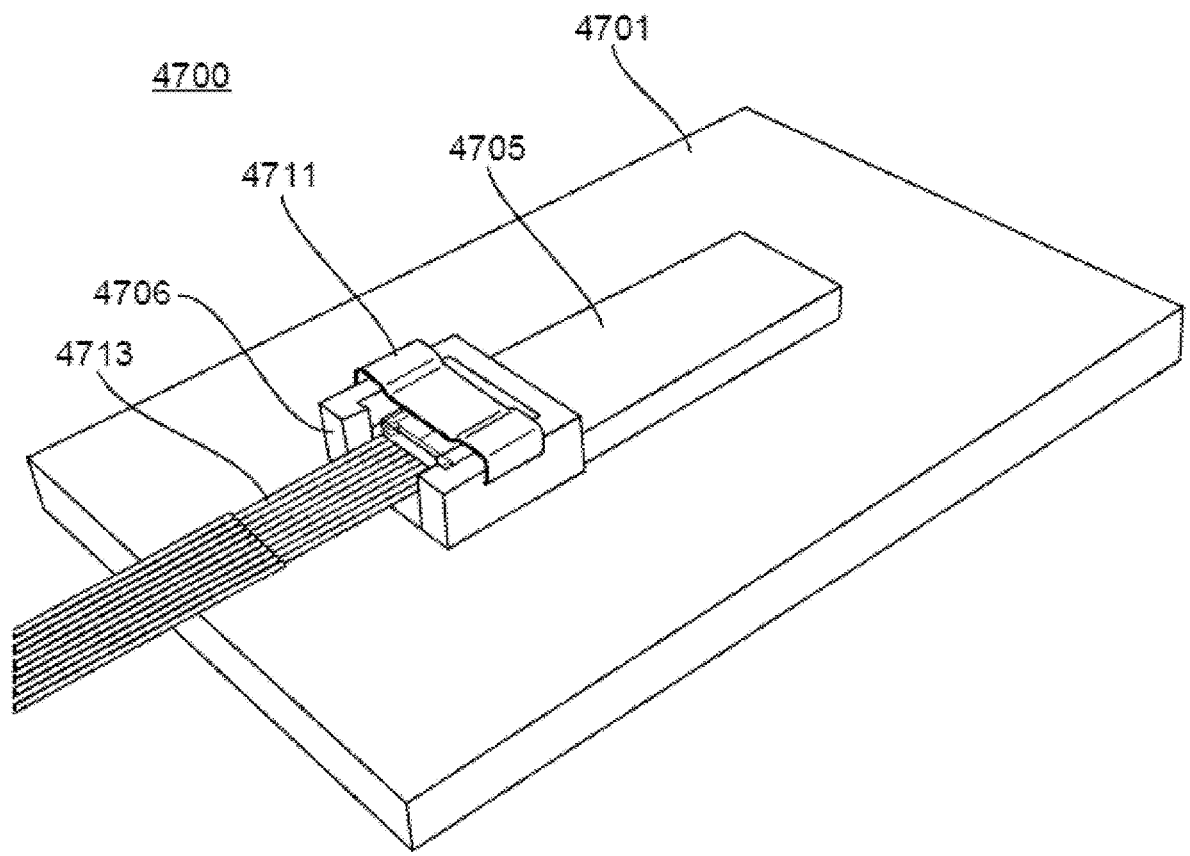
FIG. 49 shows another view of example detachable plug die inserted into example receptacle according to one or more aspects of the present disclosure.
Figure 50:
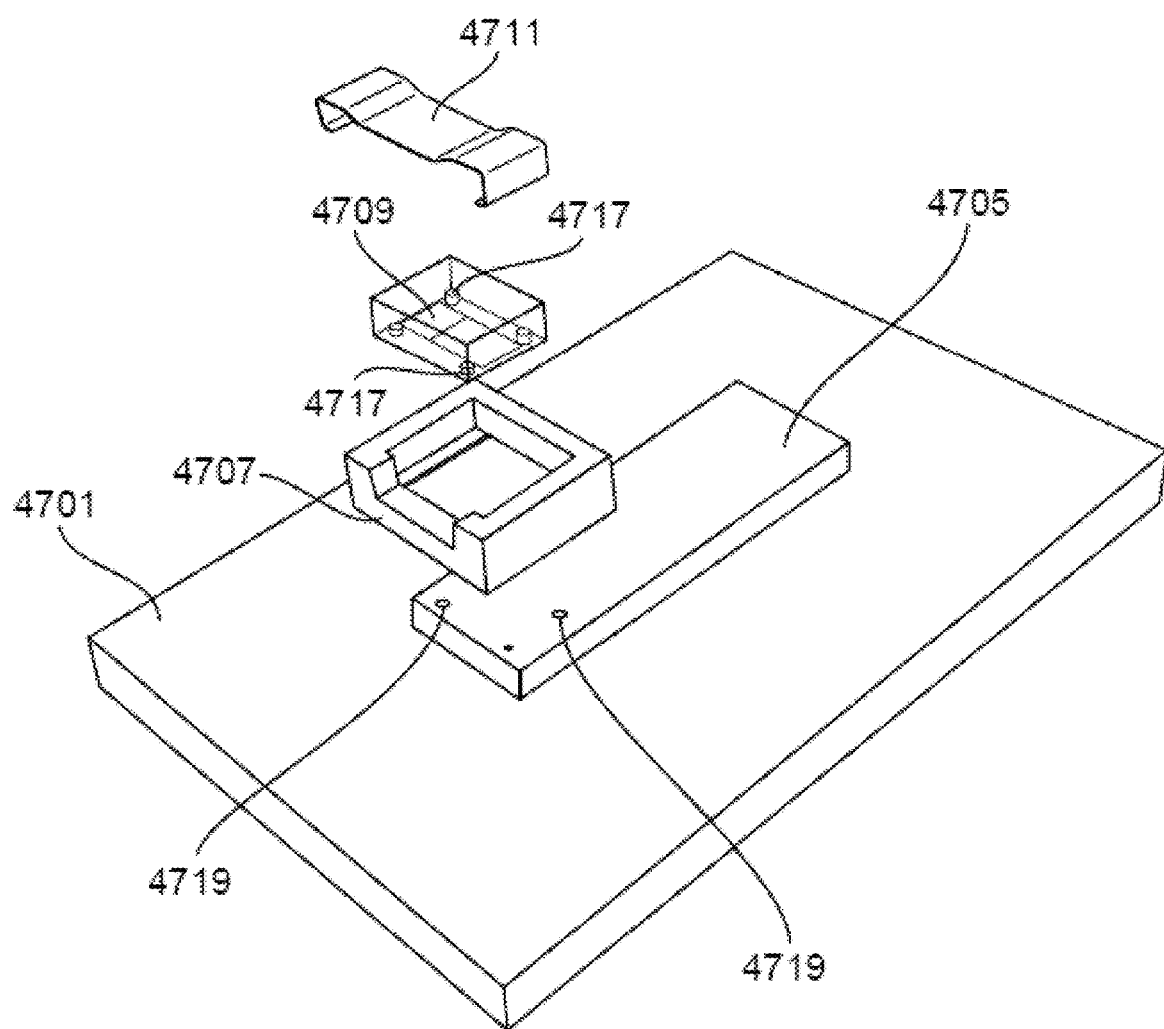
FIG. 50 shows an exploded view of the example of FIG. 49 but without optical fibers according to one or more aspects of the present disclosure.

FIG. 49 shows another view of example detachable plug die 4709 inserted into example receptacle 4707. FIG. 50 shows an exploded view of the example of FIG. 49 but without optical fibers 4713.

Detachable plug die 4709 is described further hereinbelow. Detachable plug die 4709 may be detachable due to its ability to be inserted into and correspondingly removed from receptacle 4707.

Removable clip 4711 may extend over the top of receptacle 4707 and may press down on detachable plug die 4709 in order to keep the components in place. The removable clip 4711 may extend over the top and around two opposing sides of receptacle 4707 which it may grip to stay in position. Receptacle 4707 may have one or more indentations (not shown) to aid clip 4711 to remain in place. Clip 4711 may be retained in place by friction. Additionally or alternatively, clip 4711 may be attached to PIC 4705 and/or MCM substrate 4701. After being placed, removable clip may be removed to allow detachable plug die 4709 and fibers 4713 to be separated from PIC 4705. Although depicted in examples herein as being fully detachable, those of ordinary skill in the art will readily recognize that at least one end of clip 4711 may be arranged to be permanently attached to receptacle 4707 and may be openable, e.g., using a hinge mechanism.

Figure 51:
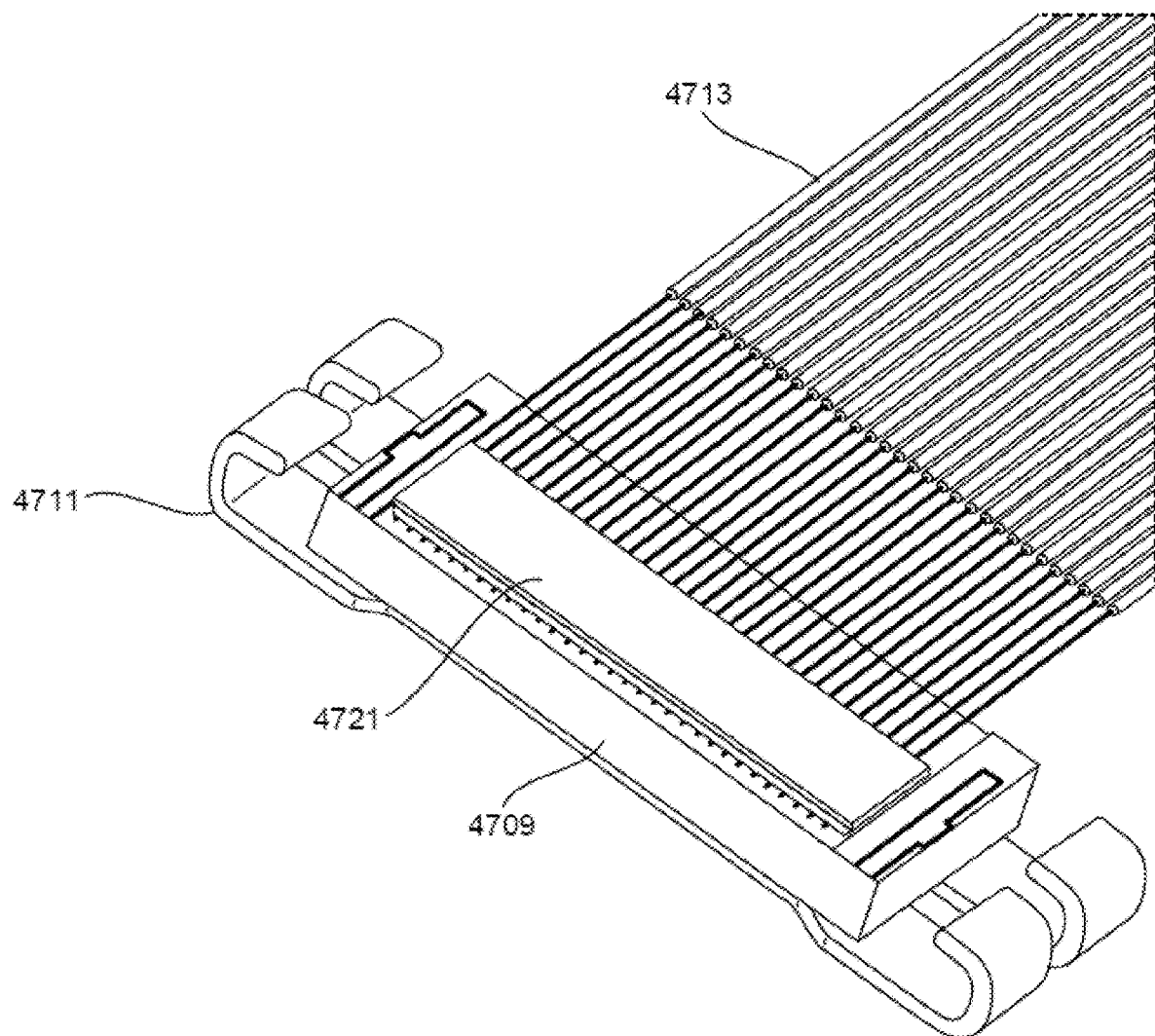
FIG. 51 shows example individual fibers of a fiber ribbon inserted into example trenches of a photonic plug die according to one or more aspects of the present disclosure.

Detachable plug die 4709, spacer 4721, and fiber 4713 taken together may be considered to be a detachable photonic plug that can be used to connect optical signals between PIC 4705 and the fibers to which fiber ribbon connector couplers 4715 are connected. The components of the detachable photonic plug, including detachable plug die 4709, fibers 4713, and spacer 4721 may be assembled, e.g., as shown in FIG. 51, prior to being inserted into receptacle 4707.

Spacer 4721 may be used at least in part to control the distance between detachable plug die 4709 and PIC 4705 so as to enable the proper optical design of the system (e.g., to effectively space mirrors of the system and/or apparatus). Spacer 4721 may also be used to at least partially encapsulate and help hold in place fibers 4713. To this end an adhesive may be employed between at least a portion of glass spacer 4721 and at least a portion of plug die 4709 to keep spacer 4721 attached to plug die 4709. Adhesive may also be placed within the trenches or around optical fibers 4713.

It may be advantageous for the adhesive to have an appropriate index of refraction so as to minimize optical losses. For example, when optical fibers 4713 and spacer 4721 is made from fused silica that may have an index of refraction around 1.4, in order to minimize optical losses, the index of refraction of the adhesive may be around 1.4 as well. Those of ordinary skill in the art will readily be able to select an adhesive having an appropriate index of refraction based on the materials employed in their various applications. Spacer 4721 may be optically transparent to at least one wavelength of light being carried by optical fibers 4713 and employed by PIC 4705. Spacer 4721 may be made of any transparent and non-conductive material, such as glass, polydimethylsiloxane, or any other encapsulation material with appropriate refractive index.

Initial insertion of the detachable photonic plug, by initial insertion of detachable plug die 4709 thereof, into receptacle 4707 may provide a rough positioning tolerance of +/−100 μm as a first step before fine alignment. In other words, receptacle 4707 may position detachable plug die 4709 between −100 μm to +100 μm on both the x and y axis, where 0 μm is the ideal position. If detachable plug die 4709 is fully pressed into receptacle 4707, fine alignment male features 117, e.g., small male protrusions, of detachable plug die 4709, e.g., as seen in FIG. 50, connect to corresponding fine alignment female features 119 of PIC 4705, e.g., small recesses, e.g., as seen in FIG. 50, that match the size and shape of fine alignment male features 117, which may provide +/−5 μm or better fine positioning tolerance for the location of detachable plug die 4709. Each of fine alignment male features 117 and fine alignment female features 119 may be produced by wafer level manufacturing processes on both PIC 4705 and the detachable plug die 4709. Advantageously, such a mechanical structure where the alignment is performed using such alignment features produced at the wafer level may provide for superior control of the alignment.

According to one or more aspects fine alignment features may be incorporated into spacer 4721 in addition to or in lieu of those of detachable plug die 4709. Additionally or alternatively, detachable plug die 4709 may comprise alignment features to help insure proper placement of spacer 4721.

FIG. 52 shows a cross sectional view of an example detachable connector if assembled and an example optical path. However, a difference between the FIG. 52 and that of FIG. 50 is that in FIG. 52 detachable plug die 5209 has female fine alignment features 5219 instead of male fine alignment features 119 while PIC 5205 has male fine alignment features 5217 instead of male fine alignment feature 117. However, from the point of view of light traversing from fiber 4713 to PIC 5205 via detachable plug die 5209, the same or similar path may be undertaken if using PIC 4705 and detachable plug die 4709.

The optical path may comprise, in part, a plurality of mirrors, and in particular, first curved mirror 4723, second curved mirror 4725 and tilted flat mirror 4727. Tilted flat mirror 4727 may be used to direct a light beam from optical fiber 4713 to first curved mirror 4723 and vice-versa. This optical fiber 4713 may be held in an orientation with respect to PIC 5205 so as to ensure that light from PIC 5205 goes into optical fiber 4713 and vice-versa. Tilted flat mirror 4727 may be formed by being etched using a CMOS etching process or in an imprint process. The particular angle employed may be based on the optical path between optical fiber 4713 and first curved mirror 4723 and may be selected so that light from tilted flat mirror 4727 may be reflected to substantially the center of first curved mirror 4723.

First and second curved mirrors 4723 and 4725 may be placed so that their respective reflective curved surfaces face in opposite directions to each other. Specifically, first curved mirror 4723 may be within on, and/or proximate to PIC 5205 with its curved reflective surface facing generally toward detachable plug die 5209 while second curved mirror 4725 may be within, on and/or proximate to detachable plug die 5209 with its curved reflective surface facing generally toward PIC 5205. As a result of the arrangement of the mirrors, light from fiber 4713 ultimately is directed into waveguide of PIC 4705 and vice-versa, depending on the application. Advantageously, the arrangement of the optical components may allow for separation of optical fiber 4713 from PIC 5205 which may facilitate detachability while still providing high and relaxed alignment tolerances in three-dimensions for the coupling of fibers 4713 using the detachable photonic plug. In addition, further advantageously, of the optical components may enable placement of the detachable plug as a one unit relative to the PIC.

According to one or more aspects herein, first and second first curved mirrors 4723 and 4725 may be created using a process such as, but not limited to, grayscale lithography or wafer level optics imprint techniques. Tilted flat mirror 4727, second curved mirror 4725, and the fiber trenches may be formed using the same wafer level manufacturing process with high alignment accuracy or other processes as described herein.

Further, each of first and second first curved mirrors 4723 and 4725 may be created during fabrication of PIC 5205 and detachable plug die 5209, respectively, which may ensure high accuracy positioning and accurate reflective mirrors. As a non-limiting example, the fabrication process used to create first curved mirrors 4723 and 4725 and tilted flat mirror 4727 may comprise a Silicon-On-Insulator (SOI), complementary metal-oxide semiconductor (CMOS), wafer level optics based imprint processes, and the like.

The disclosed arrangement of the optical coupler may achieve high signal efficiency with a relaxed alignment between PIC 5205 and the detachable photonic plug as a unit due to the specific locations, shape, and orientation of first and second first curved mirrors 4723 and 4725. Specifically, first and second first curved mirrors 4723 and 4725 may be shaped in such a way that a light beam from a source, which may be one of fibers 4713, may be reflected and collimated at a certain angle substantially at a center of first curved mirror 4723 and focused to a drain, e.g., waveguide 4729 of PIC 5205, after second curved mirror 4725. Likewise, first and second first curved mirrors 4723 and 4725 may also be shaped in such a way that any light beam from a source, e.g., waveguide 4729 of PIC 5205, may be reflected and collimated at a certain angle substantially at a center of second curved mirror 4725 and focused to a drain, e.g., which may be one of fibers 4713, after being reflected by first curved mirror 4723 via tilted flat mirror 4727.

More specifically, as shown in FIG. 52, a light beam 4731 that was received from optical fiber 4713 may be reflected by tilted flat mirror 4727 as diverging light beam 4733 toward first curved mirror 4723. Light beam 4733 may be reflected by first curved mirror 4723 as light beam 4735 and reach second curved mirror 4725. Second curved mirror 4725 in turn may reflect light beam 4735 as focused light beam 4739 to back vertical to horizontal propagation converter 4737 (e.g., PIC I/O interface, e.g., TCM, TCM photonic bump, turning mirror, tapered waveguide photonic bump, and/or grating coupler). Vertical to horizontal propagation converter 4737 may convert received focused light beam 4733 to a horizontal propagation for light insertion into waveguide 4729 of PIC 5205. The optical path may be the same but in reverse for a light beam transmitted by the waveguide 4729.

Vertical to horizontal propagation converter 4737 may be a grating coupler. Additionally or alternatively, a tilted-curved mirror or positive tapered structure may be employed individually or in combination as vertical to horizontal propagation converter 4737. Further, vertical to horizontal propagation converter 4737 may be a butt waveguide coupler, e.g., an out-of-plane butt coupler. Vertical to horizontal propagation converter 4737 may also have additional components that allow it to function as a mode converter in order to adapt the light between the mode size of, for example, waveguide 4729 and the single mode fiber mode diameter if fiber 4713 is a single mode fiber.

According to one or more aspects herein, first curved mirror 4723 and vertical to horizontal propagation converter 4737 may be referred to as part of a so-called "photonic bump" which may be added to PIC 4705 in a wafer level process or one or more other processes. These components may be fabricated at the same wafer level process to guarantee high alignment accuracy. However, note that such a bump need not be manufactured at the same time that PIC 4705 is manufactured. Therefore, such a photonic bump can be added by another party, e.g., a party who did not manufacture the rest of PIC 4705.

Spacer 4721 may be glued, e.g., using an adhesive, to detachable plug die 5209 as described above with regard to detachable plug die 4709. According to one or more aspects, additional spacer portion 5261 may be glued, e.g., using an adhesive, to PIC 5205. Additional spacer portion 5261 may be made of, for example, any transparent and nonconductive material, such as glass, polydimethylsiloxane, or any other index matching material. While the alignment features are shown in FIG. 52 as being on the PIC, they may, additionally or alternatively, be made on additional spacer portion 5261 or a combination thereof.

Fine alignment features may be incorporated into additional spacer portion 5261 in addition to or in lieu of those of PIC 4705. Additionally or alternatively, PIC 4705 may comprise alignment features to help insure proper placement of additional spacer portion 5261.

Due to the detachability of plug die 4709 from PIC 4705, there may be a gap, e.g., air gap 5263, between spacer 4721 and additional spacer portion 5261. Such a gap may cause mismatches and/or scattering at the boundaries with spacer 4721 and additional spacer portion 5261 resulting in signal loss. To ameliorate such loss, a layer of antireflective coating may be applied to one or more portions of one or both of the surfaces of spacer 4721 and additional spacer portion. More specifically, an antireflective coating layer may be applied to at least a portion of the surface of spacer 4721 that faces PIC 5205. Additionally or alternatively, an antireflective coating layer may be applied to at least a portion of the surface of additional spacer portion 5261 that may face detachable plug die 5209. Such antireflective coating may be a dielectric material and may, for example, be a layer of magnesium fluoride, although those of ordinary skill in the art will be able to select an antireflective coating suitable to the materials and gap employed. Advantageously, the antireflective coating layers may substantially overcome the difference, e.g., a mismatch, in the index of refraction as light propagates from one medium to another.

The total spacing height between PIC 5205 and plug die 5209, and in particular the height between the mirrors, which may be determined by the total height of spacer 4721 which may comprise any antireflective coating if present, spacer portion 5261 which may comprise any antireflective coating if present, and any gap between them, e.g., gap 5263, determines, in part, the efficiency of the transference of a light beam, e.g., optical signal, that is propagating along the optical path. Specifically, the greater the total height is, the less the efficient the transference may be. Those of ordinary skill in the art will readily be able to determine an appropriate height for the total spacing and each of its component elements. In an exemplary and non-limiting example, the total height may be set to 300-µm.

Although the optical path was described regarding a connection between a single fiber and PIC 5205, it will be clear to those of ordinary skill in that the example path may be applied to a plurality of fibers, e.g., all fibers 4713 in fiber ribbon 4713 as well as any other optical components (e.g., lasers, waveguides, etc.).

Also shown in FIG. 52 is MCM substrate 4701 to which PIC 5205 may be attached by microbumps 4761. Microbumps 4761 may each be a ball of solder that may provide contact between PIC 5205 package and MCM substrate 4701. One or more of microbumps 4761 may consist of a downsized copper pillar and solder with, for example, height of less than 20 µm. Microbumps 4761 may electronically connect MCM substrate 4701 and PIC 5205. Microbumps 4761 may connect copper pads on MCM substrate 4701 and PIC 5205 and soldering may be performed by reflow soldering.

FIG. 52 further shows the section of example receptacle 4707 that is visible in the view of FIG. 52

Detachable plug die 4709 may have trenches, e.g., V-grooves, to hold each corresponding fiber 4713 so as to properly space and distance them as described herein.

As discussed above, aspects of the present disclosure relate to a scalable fiber to chip assembling and/or packaging methodology in applications where, for example, fiber high density or large port count is desired, for example, co-packaged optical Switch connectivity (for example, the configuration as depicted in FIG. 19). Co-packaged optical connectivity brings multiple fibers closer to Switch die which may be packaged on an expensive packaging platform such as a Multi-Chip Module (MCM). Therefore, if may be advantageous for co-packaged optical connectivity to be compatible with standard chip packaging methodologies and equipment. Separating the fiber from the MCM packaging steps, and keeping the fiber and MCM packaging to the last stage in a pluggable way is not only unique, but also makes the process a scalable technology.

Furthermore, fiberless detachable connections are suitable not only in switches, but also in transceivers and other applications such as connections between memory and processors and chip-to-chip connectivity in general.

An electro-optical interconnection platform for co-packaging a high-speed switch to high-density optical engine is disclosed. The platform may comprise a fiberless optical coupler that may cover various geometries. The coupler may comprise a plurality of mirrors, one or more mechanical aligners for fiber mount connector, for example, rods located in V-grooves, which may be accurately placed relative to the optics, and a waveguide (e.g., a polymeric waveguide or other types of mirror with different optical arrangements). In an example, the chip may comprise a plurality of mirrors, and a positive tapered waveguide, an interface medium, (e.g., MCM), and a high-speed switch die. In an additional or alternative example, a laser can be part of the platform.

Additionally aspects of the present disclosure relate to a fiberless optical coupler for interfacing with an optical fiber connector and a Photonic Integrated Circuit (PIC). The coupler may comprise a plurality of mirrors, one or more mechanical alignment features, and a waveguide, (e.g., a polymeric or Si waveguide).

Figure 53:
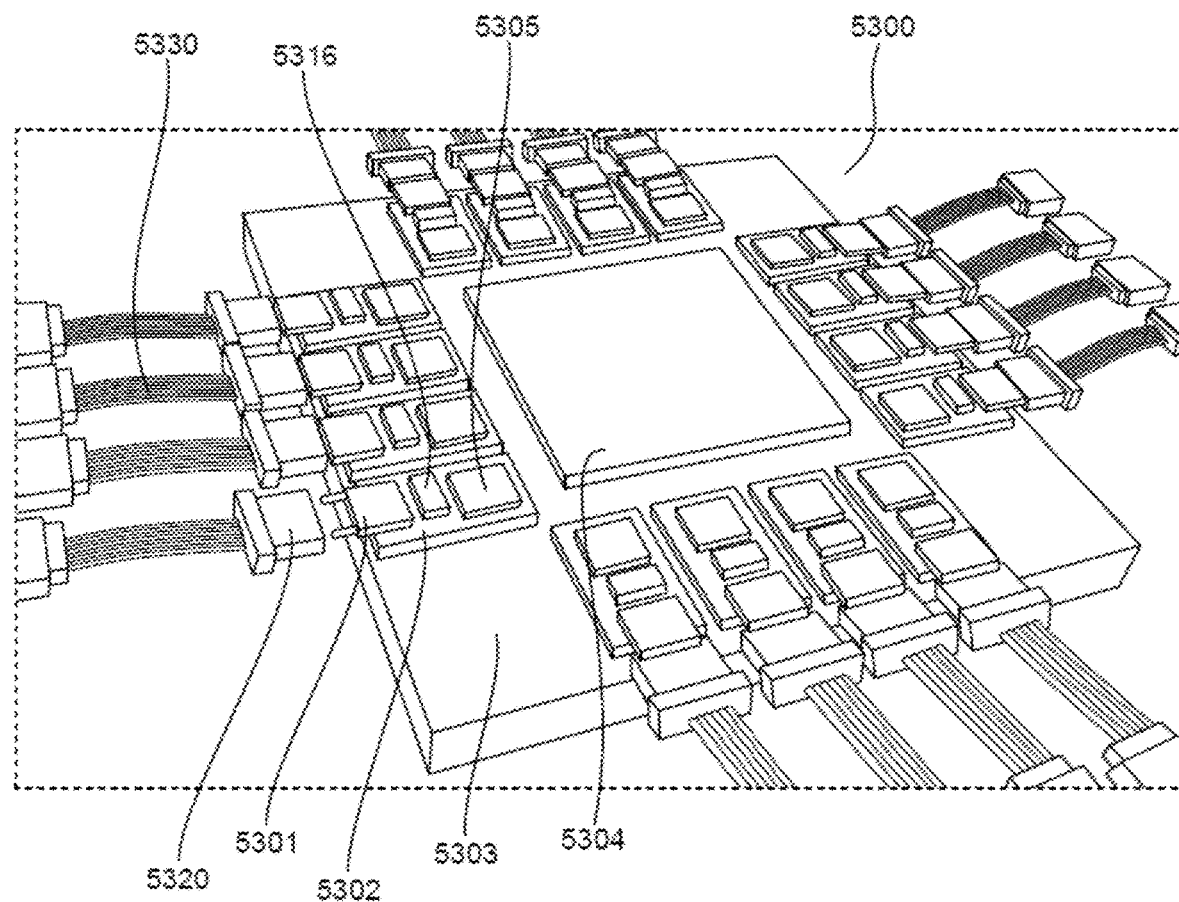
FIG. 53 is a top view of an example electro-optical interconnection platform 5300 according to the present disclosure.

FIG. 53 is a top view of an example electro-optical interconnection platform 5300 according to the present disclosure. The example platform 5300 may comprise one or more of a fiberless optical coupler 5301 (also known as fiberless Photonic Plug (PhotonicPlug) coupler), an Integrated Circuit (IC) 5305, and a laser source 5316 packaged on a PIC 5302 (also known as a photonic chip or high-density optical engine), and a high-speed switch die 5304 co-packaged with the PIC 5302 as a set of electronic components on an MCM 5303.

The fiberless optical coupler 5301 may be designed and/or configured with an optical arrangement that may provide high tolerance alignment and a passive positioning of the fiberless optical coupler, thus, for example, aligning the optical fiber with respect to the PIC. The fiberless optical coupler 5301 may be similar to, and/or comprise, and/or be comprised by the optical couplers of, for example, one or more of the optical couplers described herein (for example, with reference to FIGS. 1-18C. The fiberless optical coupler 5301 can be mass-produced and its design may further allow for compact and secured packaging of PICs.

One or Multiple sets of the fiberless optical coupler 5301, the PIC 5302, the IC 5305 and the laser source 5316 may be assembled surrounding the high-speed switch die 5304 on the MCM 5303.

Each of the fiberless optical coupler 5301 may be connected to electrical-optical connectors 5320 and the fiber array 5330 to transmit power or data to the components mounted on the MCM 5303, the details of which will be further discussed below. Also, the fiberless optical coupler 5301 may be assembled on the PIC 5302 through a flip-chip machine (not shown) and/or process with passive alignment and large tolerances using "self-aligning optics" as described herein. Such alignment may not require additional adjustments or alignment of the optical components, and accurate placement of mechanical aligners with reference to optics at wafer level sizes may be enabled.

It should be appreciated that by using a flip-chip machine and/or process, and using the self-aligning optics, surface coupling may be achieved, and issues with complicated edge geometry (e.g., associated with edge coupling of optical fiber to PIC) may be relieved.

Figure 54:
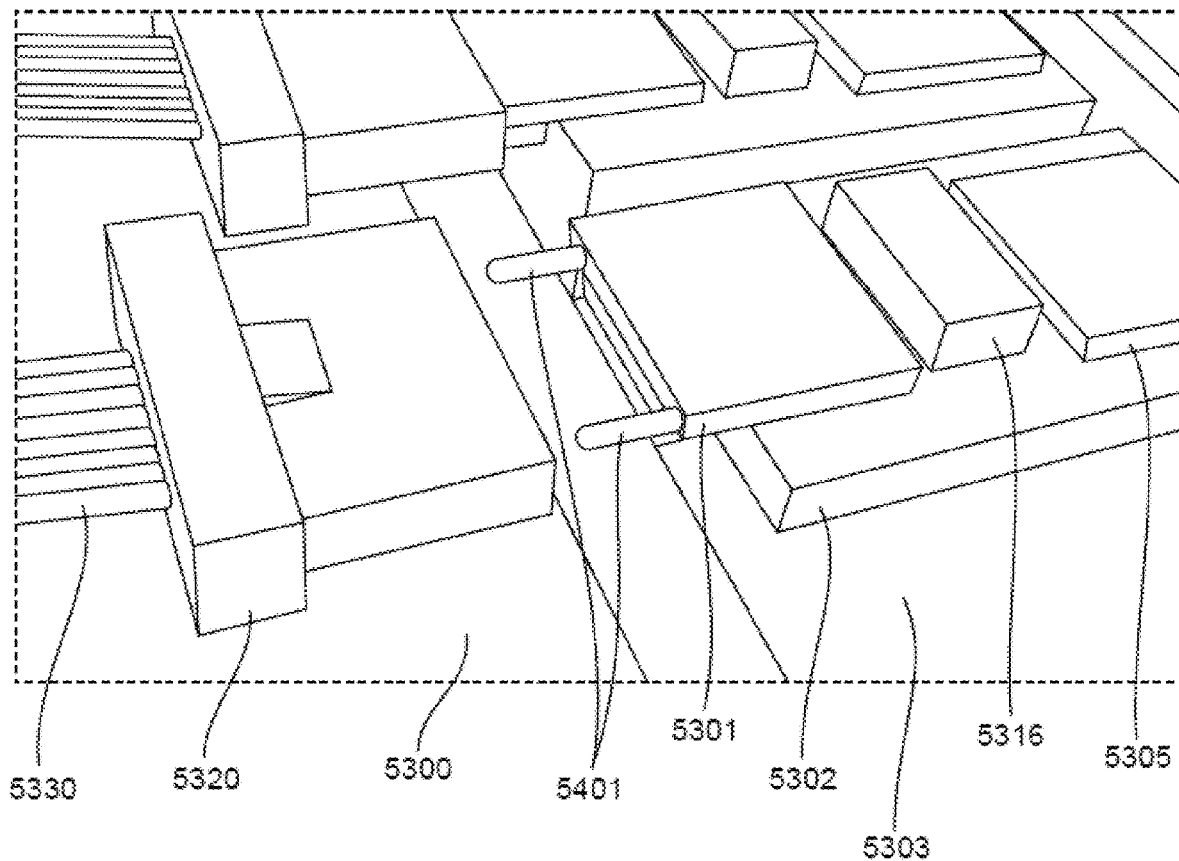
FIG. 54 is an example magnified view of the example electro-optical interconnection platform according to present disclosure.

FIG. 54 is an example magnified view of the example electro-optical interconnection platform 5300 according to present disclosure. The fiberless optical coupler 5301 may comprise a mechanical aligner 5401 that may be compatible with various types of electrical optical connectors 5320 that may ensure mechanical alignment of, for example, a fiber ribbon relative to the optics on the fiberless optical coupler 5301.

According to further aspects, the mechanical aligner 5401 may be a pair of cylindrical rods arranged on opposite sides of the fiberless optical coupler 5301 at a distal end, both of which may be connectible to the electrical optical connectors 5320. The pair of cylindrical rods may be substantially parallel to each other and may be of a similar length. The assembly of the electro-optical interconnection platform 5300 can be performed by, for example, connecting the fiberless optical coupler 5301 on the MCM module 5303 to a switch board (not shown).

Figure 55:
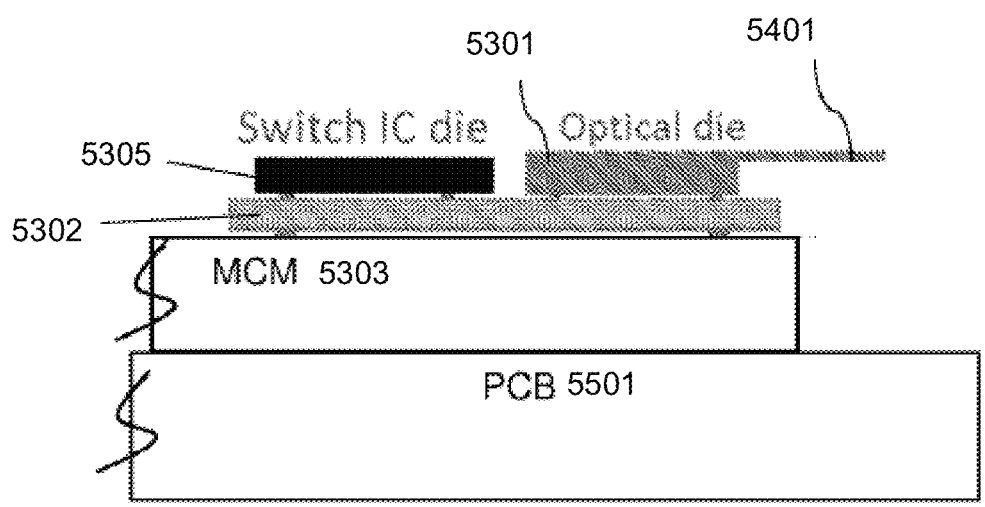
FIG. 55 is an example schematic side view of the example electro-optical interconnection platform according to the present disclosure.

FIG. 55 is an example schematic side view of the example electro-optical interconnection platform 5300 according to the present disclosure. The fiberless optical coupler 5301, which may also be referred to as an optical die and may also comprise the mechanical aligner 5401, may be mounted on the PIC 5302 adjacent to the IC 5305, which may also be referred to as the switch IC die. The PIC 5302 may in turn be mounted on the MCM module 5303, and the entire assembly including the fiberless optical coupler 5301, the mechanical aligner 5401, IC 5305, PIC 5302, and the MCM module 5303 may be mounted on (e.g., packaged with) a printed circuit board (PCB) 5501.

As shown in the example FIG. 55, the co-packaged components may reduce power consumption, as this arrangement brings the components closer to the IC 5305, thereby reducing the electrical port's length to, in an example, about 2-3 millimeters, compared to the 10-15 centimeters electrical link seen in typical pluggable transceiver optics connectivity. According to aspects, herein, any electrical port length is contemplated herein (e.g., where additional length is desired for physical configuration considerations).

Figure 56:
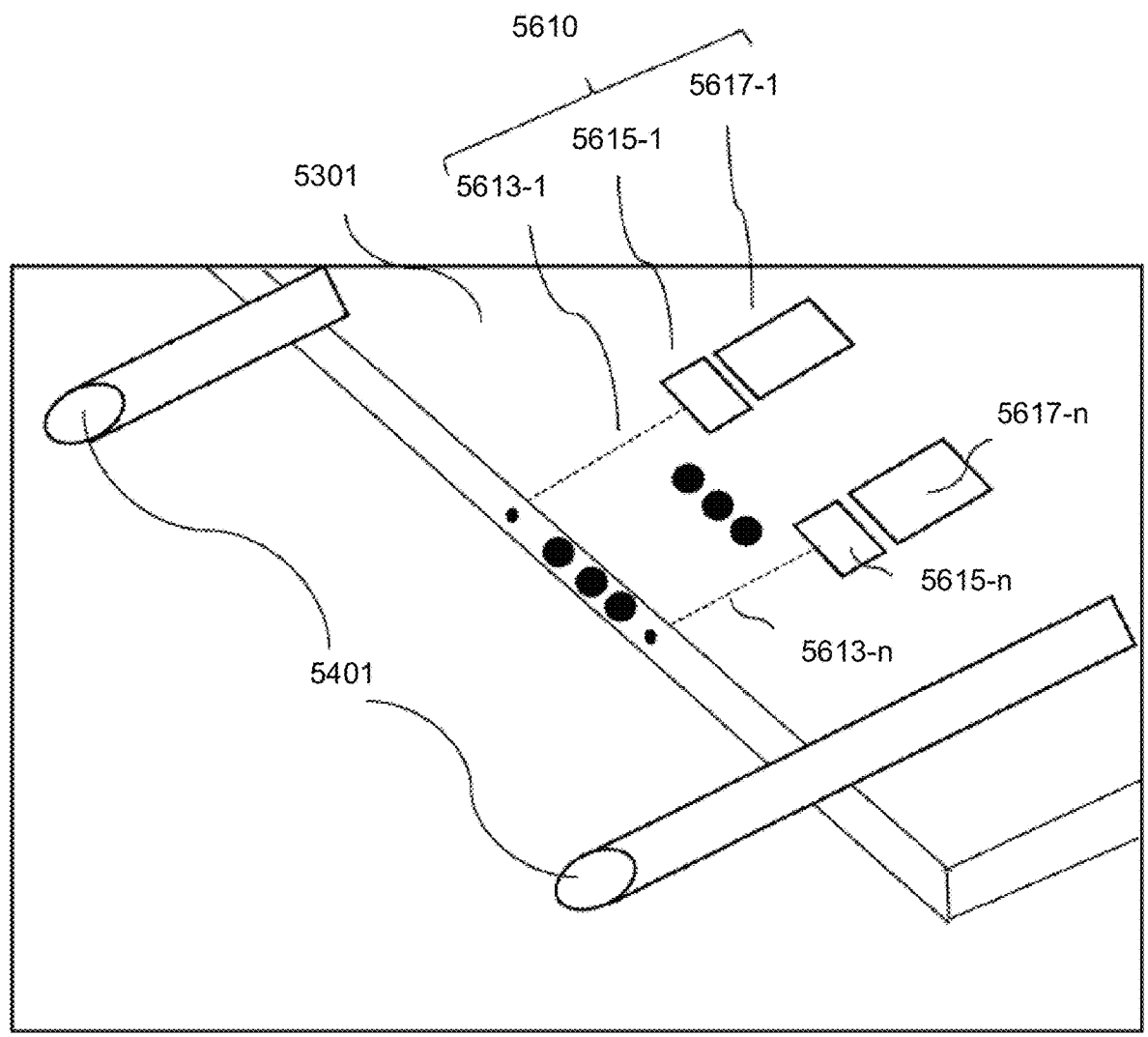
FIG. 56 is an example diagram of a high magnification of the example fiberless optical coupler according to one or more aspects of the present disclosure.

FIG. 56 is an example diagram of a high magnification of the example fiberless optical coupler 5301 according to one or more aspects of the present disclosure. The mechanical aligner 5401, illustratively described as a pair of mechanical alignment rods may be included on the fiberless optical coupler 5301. The fiberless optical coupler 5301 may also comprise wafer-level optical elements 5610, for example optical elements as described herein. Based on the description below, these optical elements 5610 may be "self-aligning."

According to one or more aspects herein, the optical elements 5610 may comprise a plurality of waveguides 5613-1 through 5613-*n* (collectively referred to as a waveguide 5613 or waveguides), deflectors 5615-1 through 5615-*n* (collectively referred to as a deflector 5615 or deflectors 5615) and curved mirrors 5617-1 through 5617-*n* (collectively referred to as a curved mirror 5617 or curved mirrors 5617). The optical elements 5610 may be arranged between the mechanical alignment rods within the fiberless optical coupler 5301, and may be arranged to guide light waves to and from the fiber array (not shown) and elements, the details of which will be further described in FIG. 57.

It is noted that other types of mechanisms besides mechanical alignment rods may be used to ensure alignment. An example of such an alternative arrangements will be discussed with respect to FIG. 59.

Figure 57:
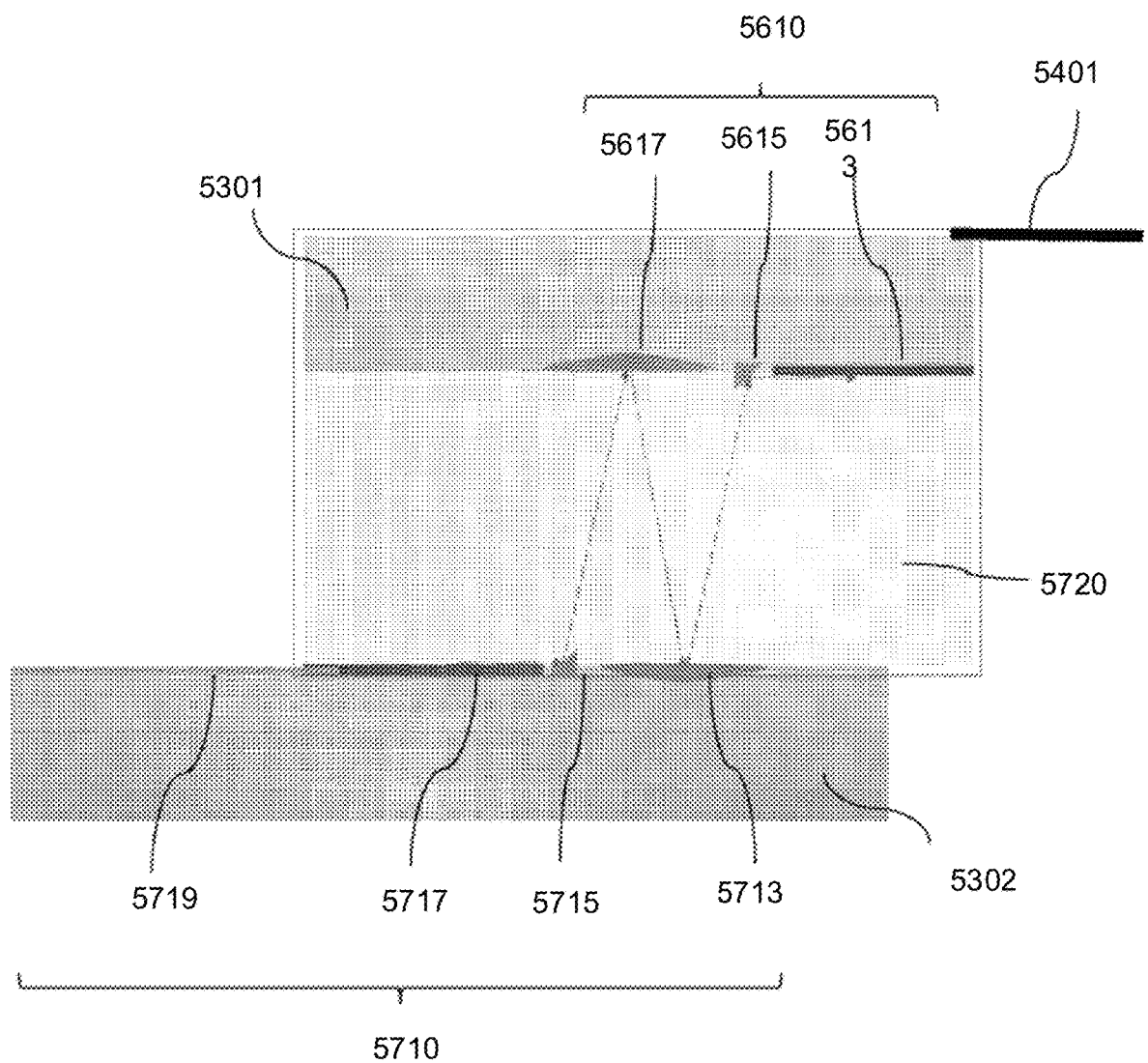
FIG. 57 is a schematic side view of an example fiberless optical coupler on the PIC according to the present disclosure.

FIG. 57 is a schematic side view of an example fiberless optical coupler 5301 on the PIC 5302 according to the present disclosure. The fiberless optical coupler 5301 may comprise the optical elements 5610, which may comprise the waveguide 5613, the deflector 5615 (e.g., first turning mirror), and the curved mirror 5617.

The waveguide 5613 may be a polymeric or a silicon (Si) waveguide. If polymer is used for the waveguide 5613, the polymer may be designed to match the single-mode fiber optics in terms of mode diameter. Also, the deflector 5615 may be a reflective surface, for example a tilted reflective surface.

The PIC 5302 may comprise a second plurality of optical elements 5710 for coupling with the wafer-level optics elements 5610 of the fiberless optical coupler 5301. The second plurality of optical elements 5710 may comprise a curved mirror 5713, a deflector 5715, and a tapered polymer waveguide 5715. It will be appreciated that the deflector 5715 and tapered polymer waveguide 5715 may be replaced by alternative components, for example, a TCM or one or more elements of a photonic bump as described herein. The PIC 5302 may also comprise an additional polymeric or a silicon waveguide 5719 (e.g., PIC I/O waveguide).

Additionally, a spacer 5720 may be included in between the fiberless optical coupler 5301 and the PIC 5302, for light from the waveguides 5401, 5715 to travel through after being reflected by the corresponding deflectors 5615, 5715 and curved mirrors 5617, 5713. The spacer 5720 may be made of a transparent and non-conductive material, such as glass, polydimethylsiloxane, air, or any other index matching materials. Additionally or alternatively, the spacer may be a material that is not transparent to visible light but substantially transparent to the wavelength of the light beam (e.g., infrared), for example, a silicon-based material. The height of the spacer 5720 may determine, in part, the efficiency of the light beam (optical signal) that propagates through the spacer 5720. In one example, the height of the spacer 5720 may be about 300 microns, though other heights are contemplated herein.

Figure 58:
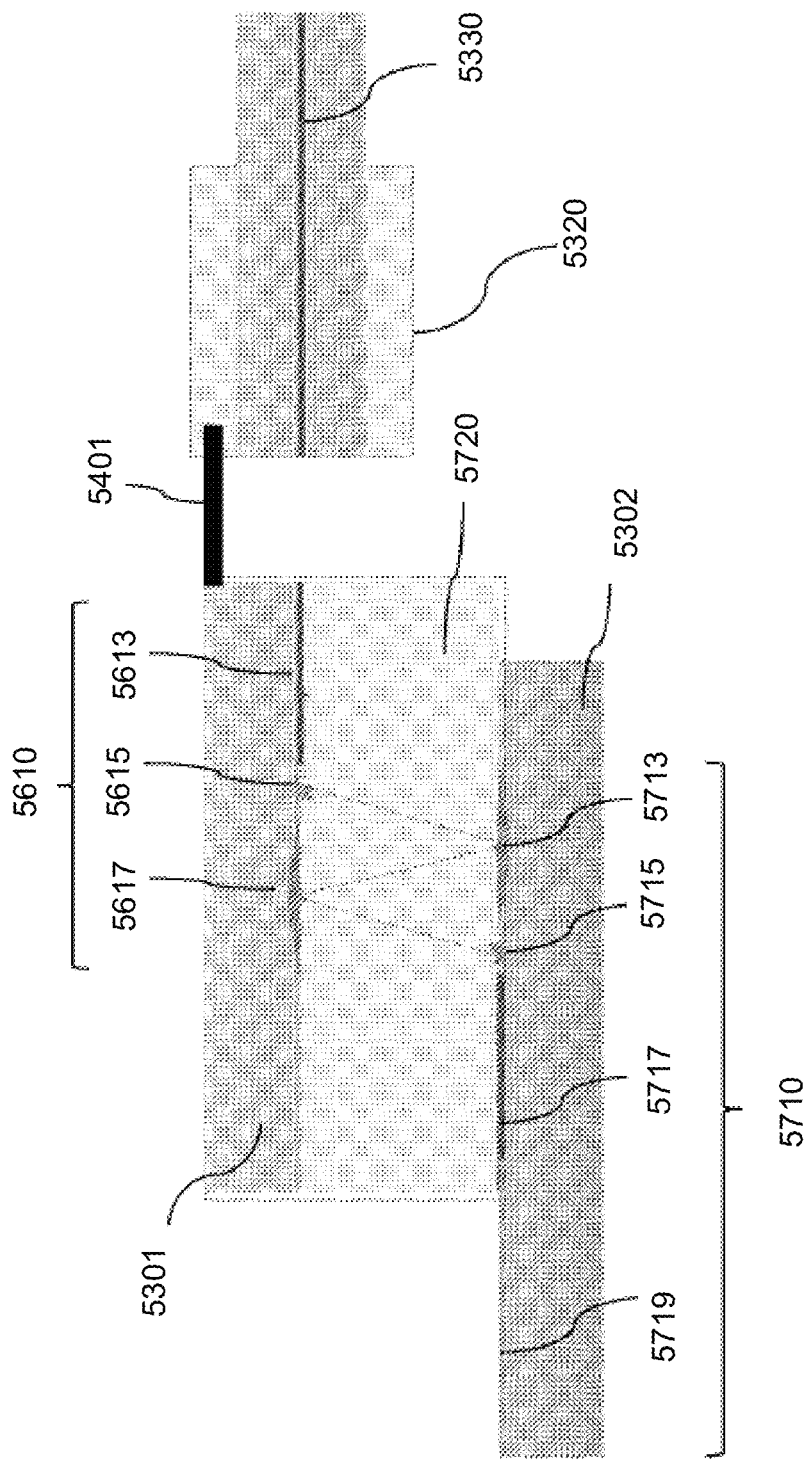
FIG. 58 is a schematic side view of the example fiberless optical coupler on the PIC that is attached to the fiber array, according to one or more aspects of the present disclosure.

FIG. 58 is a schematic side view of the example fiberless optical coupler 5301 on the PIC that is attached to the fiber array 5330, according to one or more aspects of the present disclosure. Here, the various components of the fiberless optical coupler 5301, PIC, 5302, and the spacer 5720 are substantially the same as that shown in FIG. 57. The fiberless optical coupler 5301 may be coupled to the optical connector 5320 via the mechanical aligner 5401, which may house the end tips of the fiber array 5330.

The mechanical aligner 5401 may be arranged so that if the aligner 5401 is inserted into the optical connector 5320, the fiber array 5330 may be accurately aligned to the polymeric waveguide 5613 with the same beam mode size within the fiberless optical coupler 5301, with a space defined by the length of the mechanical aligner 5401 in between the fiberless optical coupler 5301 and the optical connector 5320.

As described herein, according to one or more aspects, the positioning of the mirrors 5617, 5713, and the deflectors, 5615, 5715 can be performed using a wafer level process such as, but not limited to, grayscale lithography or other processes described herein. The mirrors 5617 and 5713, may be placed and created during fabrication, which may ensure high accuracy positioning and accurate reflective mirrors. For example, the curved mirror 5617, deflector 5615, and waveguide 5613 may all be placed by wafer level process with high accuracy. Alternatively, as described herein, the elements may be added at the same or later time to the time of fabrication by one or more of various processes. On the PIC 5302 side, waveguide 5715, deflector 5715, and curved mirror 5713 may similarly be placed.

As a non-limiting example, the fabrication process used to create the mirrors may comprise wafer level imprint lithography, and may comprise the use of a Silicon-On-Insulator (SOI), and Complementary Metal-Oxide Semiconductor (CMOS).

Figure 59:
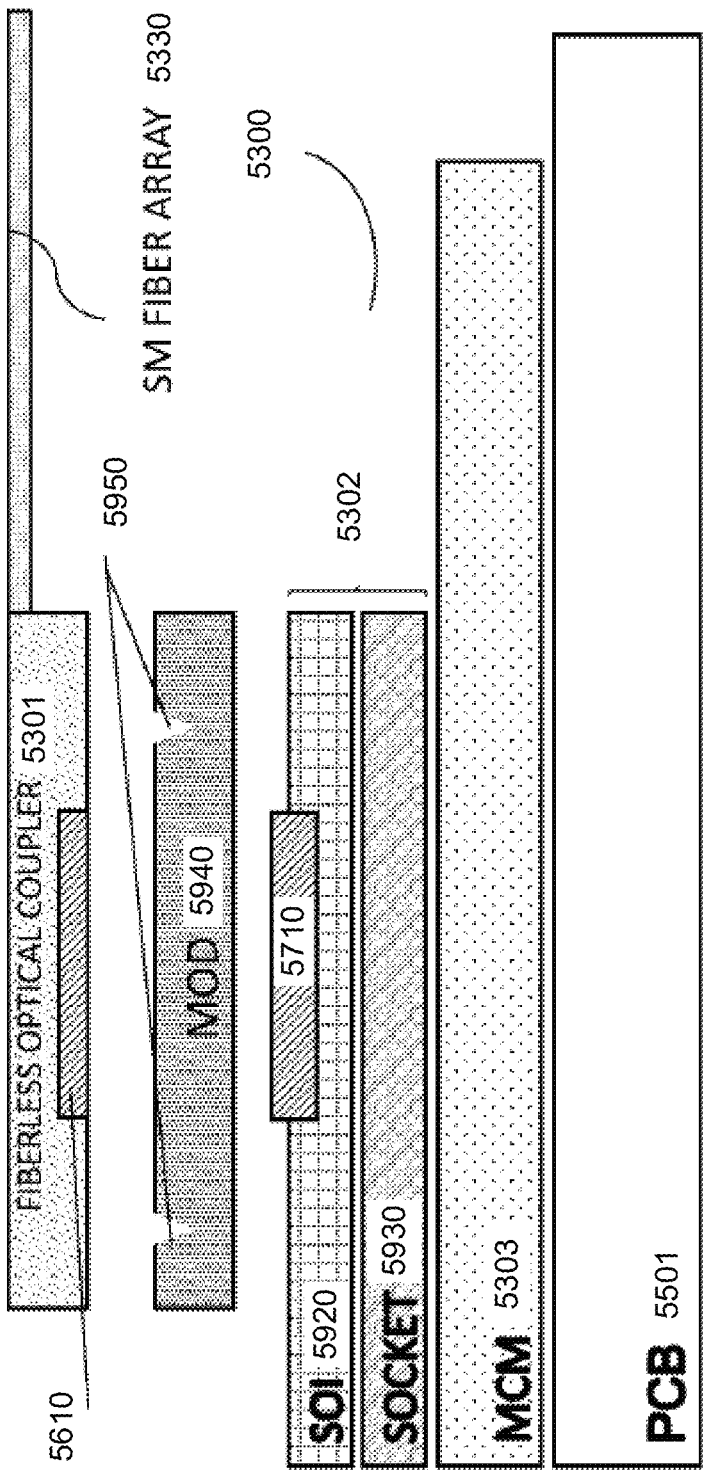
FIG. 59 is a schematic side view of an example electro-optical interconnection platform according to one or more aspects of the present disclosure.

FIG. 59 is a schematic side view of an example electro-optical interconnection platform 5300 according to one or more aspects of the present disclosure. An MCM 5303 is shown along with the PIC 5302 including an SOI wafer 56020 mounted on a socket 5930, the socket 5930 being coupled to the MCM 5303. The fiberless optical coupler 5301 may be located on the PIC 5302, with the fiberless optical coupler 5301 coupled to the fiber array 5330. The fiberless optical coupler 5301 may comprise a first set of optical elements 5610, and the SOI wafer 56020 may comprise a second set of optical elements 5710. Each of the first and second sets of the optical elements 5610, 450 may have similar components as described in FIGS. 4 and 5 and 1-18C.

The mechanical aligner 5401 previously described in FIG. 53 may be configured as a Mechanical Optical Device (MOD) 5940 located between the fiberless optical coupler 5301 and the PIC 5302. The first set of optical elements 5610 and the second set of optical elements 5710 may be aligned with the fiber array 5330, via the MOD 5940, in order for light to transmit in between the fiber array 5330 and the PIC 5302 through the sets of the optical elements 5610,5710.

The MOD 5940 may allow light to pass through between the sets of the optical elements 5610, 5710 within the fiberless optical coupler 5301 and the PIC 5302. Also, the MOD 5940 may further comprise V-shaped grooves 5950 that may receive the fiberless optical coupler 5301, so that the optical elements 5610, 5710 may be in alignment with the fiber array 5330 when receiving light transmitted to and from the fiber array 5330. That is, the V-shaped grooves 5950 may ensure a later aligned placement of additional optical elements 5610 included in the fiberless optical coupler 5301.

Figure 60:
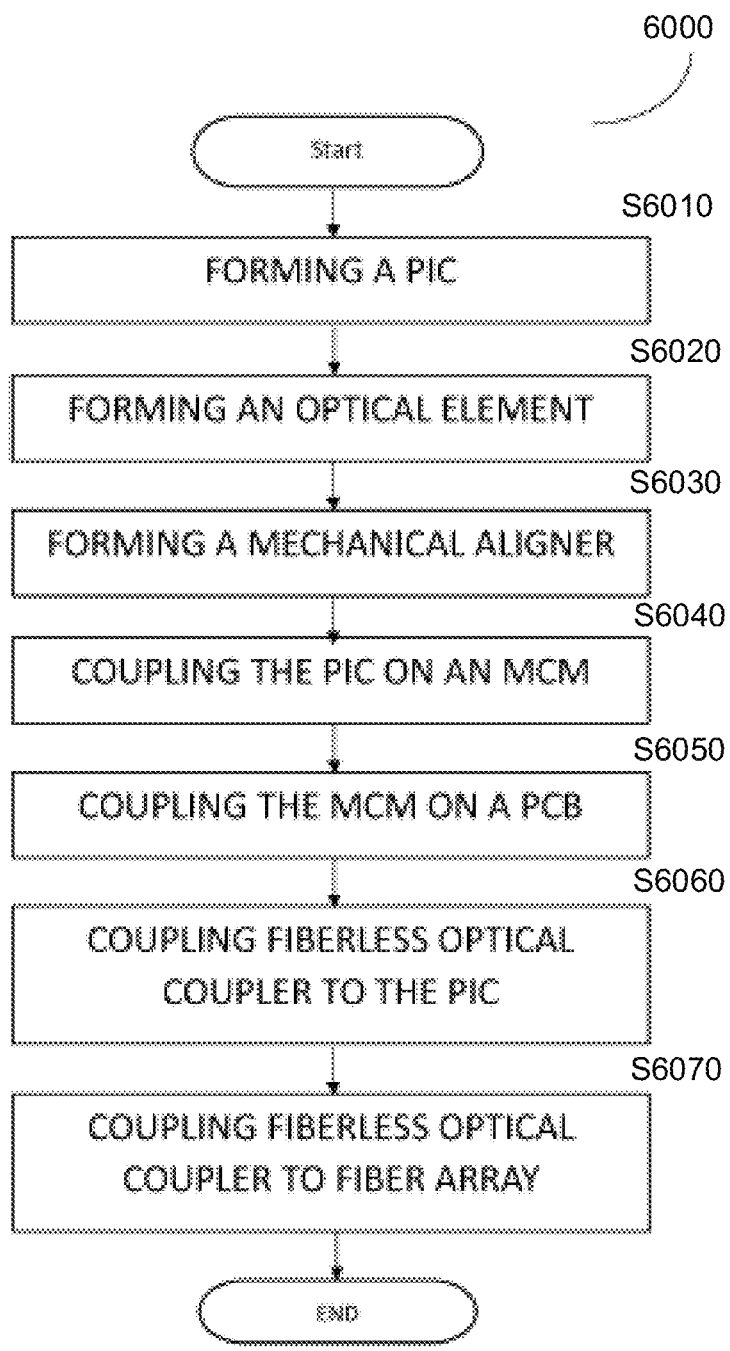
FIG. 60 is an example method of manufacturing an electro-optical interconnection platform, according to one or more aspects of the present disclosure.

FIG. 60 is an example method of manufacturing an electro-optical interconnection platform 5300, according to one or more aspects of the present disclosure. At S6010, the PIC 5302 may be formed, in which the laser source 5316 may also be formed on the PIC 5302. Next, at S6020, the second optical elements 5710 may be formed on the PIC 5302, while the optical elements 5610 may be separately formed on the fiberless optical coupler 5301. Further, at S6040, a mechanical aligner 5401 may be formed.

Additionally, at S6040, the PIC 5302 may be coupled on the MCM 5303, and at S6050, the MCM 5303 may be coupled on the PCB 5501. Next, at S6060, the fiberless optical coupler 5301 may be coupled to the PIC 5302, and at S6070, the fiberless optical coupler 5301 may be coupled to the fiber array 5330.

With the method 6000 above, a flip-chip assembly process may be used to employed to couple components of the PIC 5302 together (e.g., coupling SOI wafer with the socket) and with other elements, and coupling the mechanical aligner 5401 to the PIC 5302 or the fiberless optical coupler 5301. This may ensure accurate placement of the optics on the PIC 5302. Also, if the MOD 5940 is used, additional accuracy in aligning optical elements 5610,5710, along with added optical functionality of the MOD 5940 may be achieved.

Figure 61:
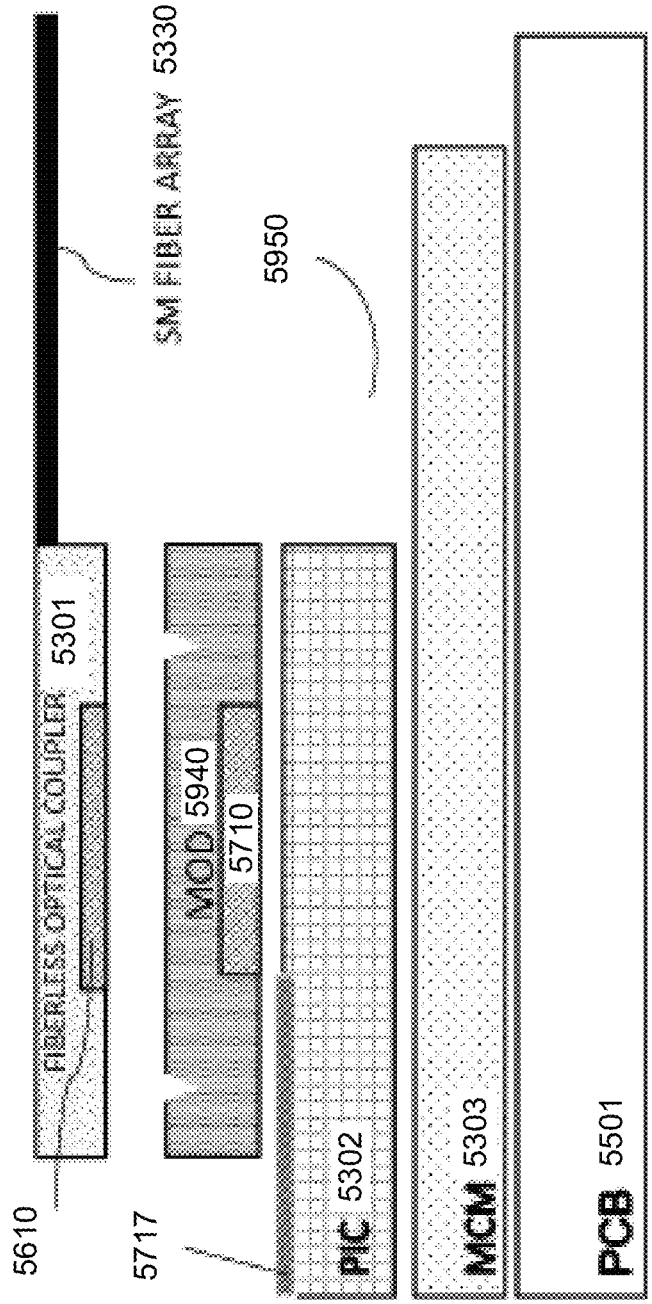
FIG. 61 is a schematic side view of an example electro-optical interconnection platform according to the present disclosure.

FIG. 61 is a schematic side view of an example electro-optical interconnection platform 5300 according to the present disclosure. Here, the components of the platform 5300 may be arranged in substantially the same way as depicted in FIG. 59. However, the optical elements 5710 that were previously located within the PIC 5302 may instead be formed within the MOD 5940. By having the optical elements 5710 formed in the MOD 5940, further alignment of the optical components may be assured, and the MOD 5940 may be given additional optical functionality besides being just a medium or spacer that provides merely mechanical alignment between the various optical elements 5610, 5710 and the fiber array 5330.

It may be appreciated that lasers are often used in the communication chain in optical and electro-optical systems. As disclosed herein, it is contemplated herein the optical couplers of the present disclosure may variously couple lasers as an optical component (e.g., optical source and/or drain). Accordingly, advantages of the present disclosure (e.g., "self-aligning optics") may be used with lasers. Lasers may be used variously in optical and electro-optical systems. For example, lasers may be on-chip or off-chip. On-chip lasers may refer to a laser die that is directly integrated with (e.g., connected) to a SiPh chip (e.g., a PIC). Where lasers are on-chip, the couplers of the present disclosure may be used substantially as described. For example, the on-chip laser may be a part of any of the PIC I/O interfaces and/or connected to and/or instead of a PIC I/O waveguide.

Figure 62:
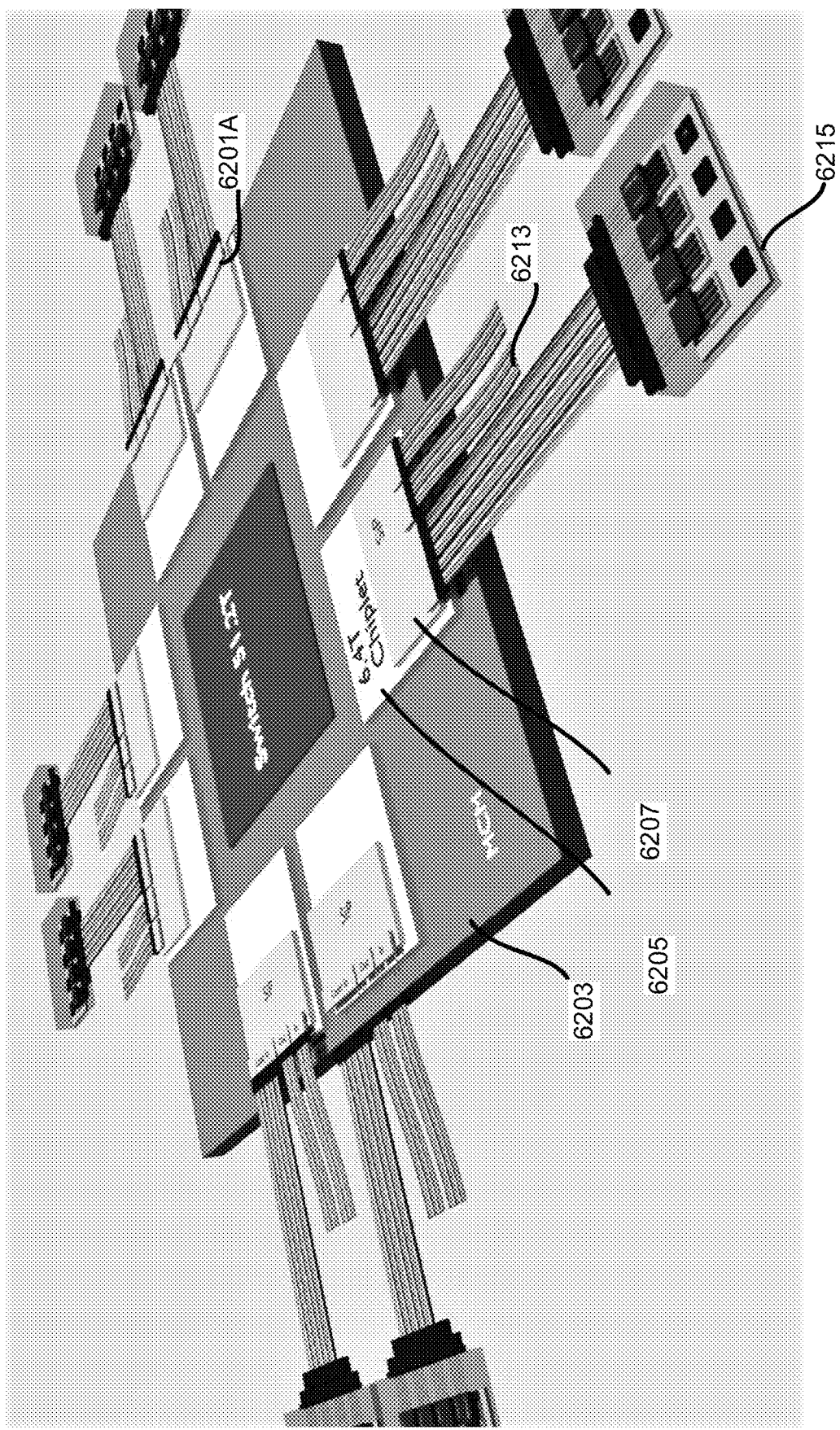
FIG. 62 shows an example co-packaged optics with a plurality of laser modules according to one or more aspects of the present disclosure.

The optical couplers of the present disclosure may also prove advantageous for coupling off-chip lasers to other optical components (e.g., PIC, chips, optical fibers, etc.). FIG. 62 shows an example co-packaged optics with a plurality of laser modules. The package of FIG. 62 may be similar to and/or comprise and/or be comprised by the packages of, for example, FIGS. 19 and/or 53. The package may comprise an MCM substrate 6203. One or more chiplets 6205 (e.g., optical engines) may be packaged with (e.g., on) MCM substrate 6203. Chiplets 6205 may be electrically and/or optically packaged with MCM substrate, and the packaged chiplets 6205 may be electrically and/or optically connected to each other via MCM substrate 6203. Each chiplet 6205 may comprise a SiPh chip 6207 (e.g. PIC) for optical connection and/or communication to off package components. According to the example of FIG. 62, optical fiber ribbon 6213 may be connected to each SiPh chip 6207 for optical communication to and from the SiPh chip 6207. Each optical fiber and fiber ribbon 6213 may be connected to the SiPh chip via an optical coupler 6201A of the present disclosure (e.g., having a photonic plug layer, spacer, first and second curved mirror, turning mirror, etc.).

In addition, the package may comprise off-chip laser modules 6215. One or more of the chiplets 6205 and/or SiPh chips 6207 may be connected to a laser module 6215. Laser module 6215 may be used for communication in the electro-optical package.

Figure 63:
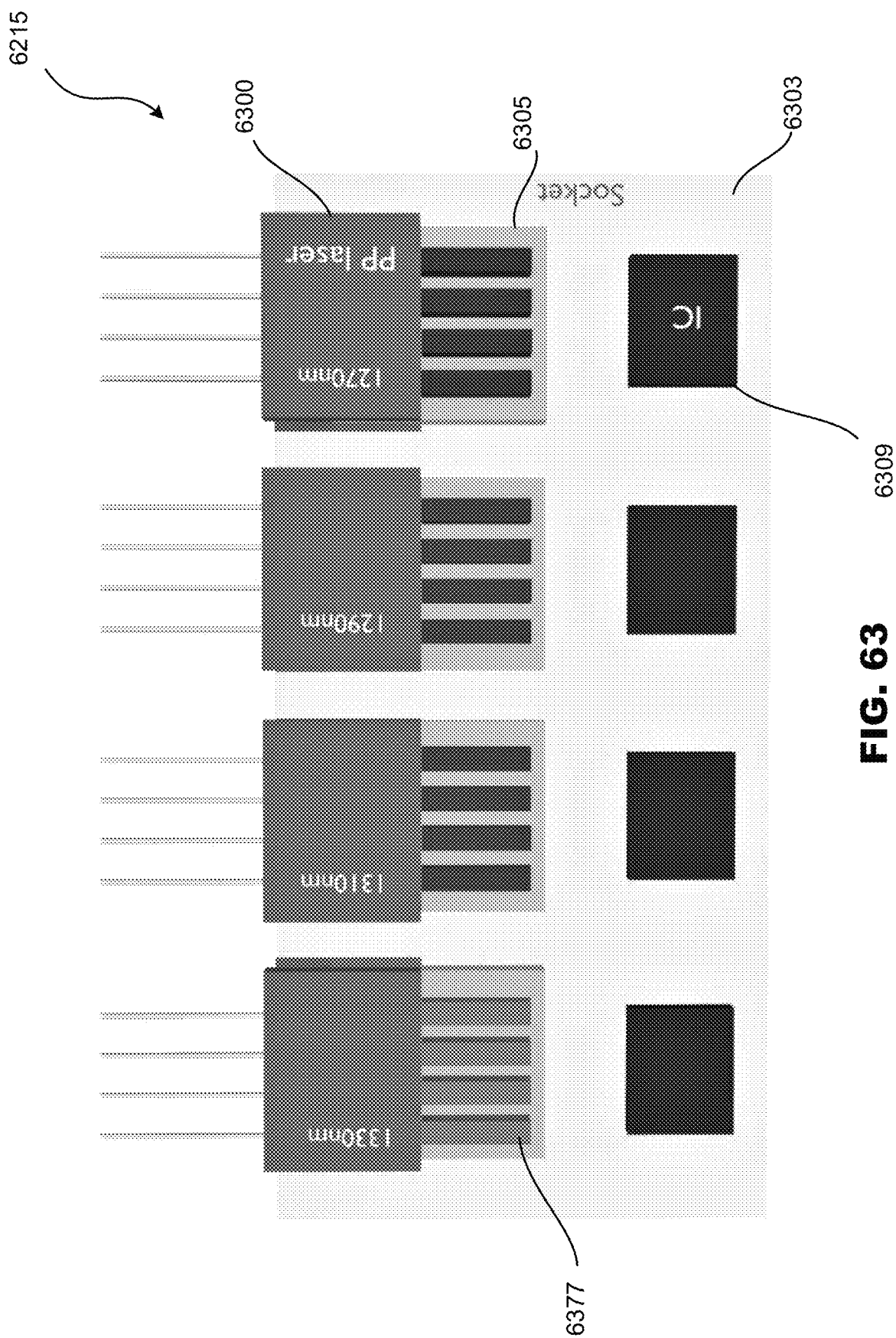
FIG. 63 depicts an example laser module according to one or more aspects of the present disclosure.

FIG. 63 depicts an example laser module 6215 according to one or more aspects of the present disclosure. Referring to FIG. 63, each laser module 6215 may comprise a substrate 6303 which may be referred to herein as a socket. The substrate 6303 may be host one or more carriers 6305 which may be packaged with the substrate 6303. Each carrier 6305 may comprise one laser 6377 or an array of lasers 6377. The lasers 6377 may be, for example, diced from a laser wafer. Each laser array and/or carrier may have an associated IC 6309 for controlling and/or communicating with the carrier 6305 or other carriers 6305. The Lasers 6377 may be connected to other optical components via optical connector 6300. The optical connector 6300 may comprise optical elements as described herein, and described below in more detail.

Figure 64:
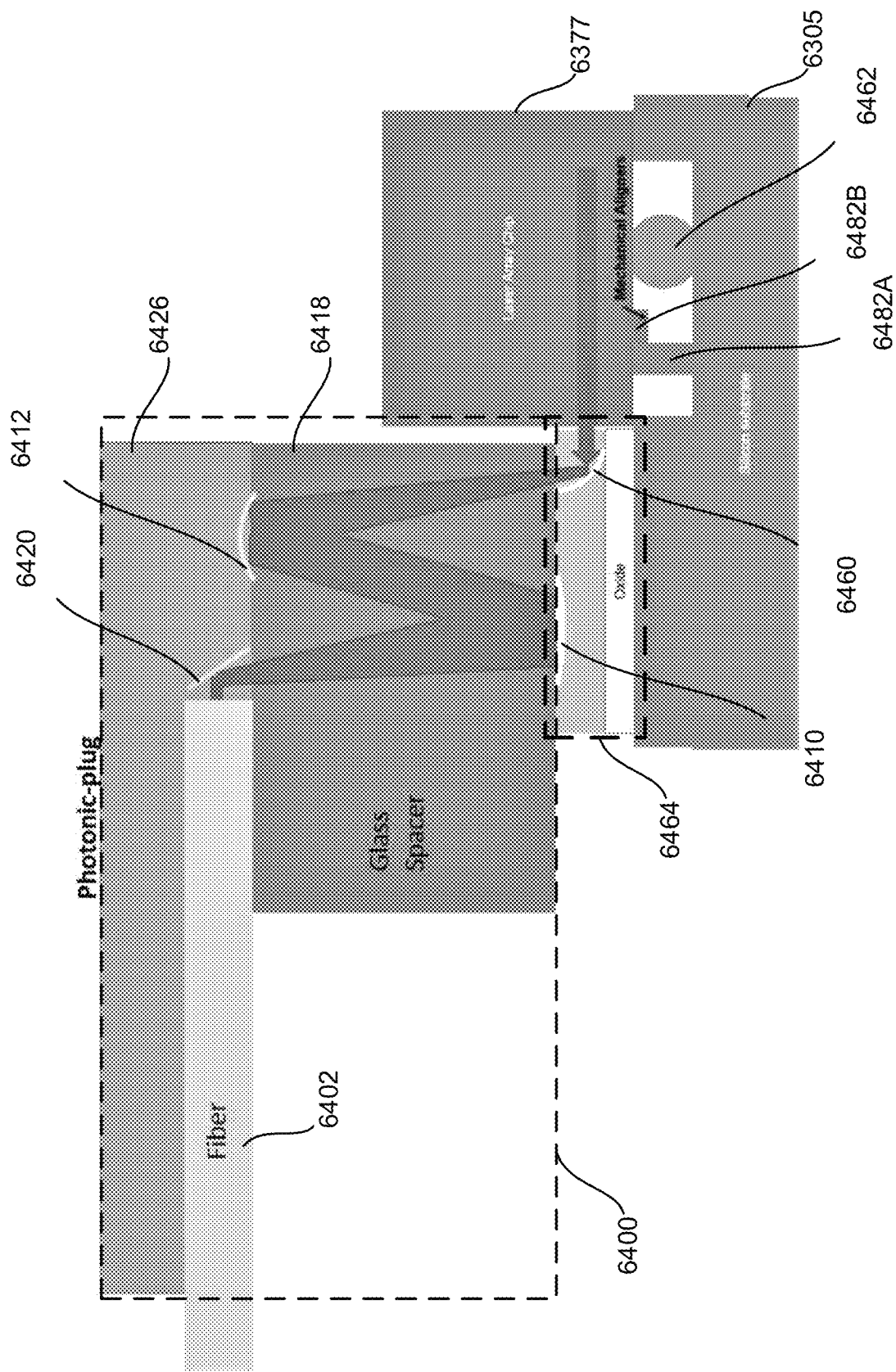
FIG. 64 show an example laser coupled to a fiber utilizing one or more aspects of an example optical coupler of the present disclosure.

FIG. 64 show an example laser coupled to a fiber utilizing one or more aspects of an example optical coupler of the present disclosure. Referring to FIG. 64, the laser may be packaged with the carrier 6305. The carrier 6305 may be, for example a silicon substrate. The laser 6377 chip and/or the carrier 6305 may comprise alignment features 6482A and 6482B, to align the laser 6377 die on the carrier 6305. Additionally, electrical connection features 6462 (e.g., solder bumps) may be included between the laser die 6307 and the carrier 6305 to electrically connect the laser 6377 and the carrier 6305. Additionally, laser photonic bump 6464 may be fabricated on and/or variously added to the carrier. Laser photonic bump 6464 may be similar to and/or comprise, and/or be comprised by TCM photonic bump and tapered waveguide photonic bump or other photonic bumps of the present disclosure.

Spacer 6418 may be placed on and/or connected to the substrate 6303 and/or the laser photonic bump 6464. PhotonicPlug substrate 6426 may be attached to the spacer 6418. PhotonicPlug substrate 6426 may be similar to, and/or comprise, and/or be comprised by PhotonicPlug substrates and/or PhotonicPlug layers of the present disclosure. Optical fiber 6402 (e.g., a Polarization Maintaining (PM) fiber) may be attached to the PhotonicPlug substrate 6426 (e.g., in receiving features, e.g., V-grooves). PhotonicPlug substrate may comprise the optical elements described herein. For example, PhotonicPlug substrate 6426 may comprise first turning mirror 6420 and second curved mirror 6412.

Laser photonic bump 6464 may be similar to and/or comprise, and/or be comprised by TCM photonic bump and tapered waveguide photonic bump or other photonic bumps of the present disclosure. Laser photonic bump 6464 may comprise TCM 6460 and TCM photonic bump curved mirror 6410 (e.g., first curved mirror). Accordingly it may be appreciated that an optical signal (e.g., a laser emission) may propagate through the optical coupler 6400 substantially as described herein.

While some aspects of the above have been illustrated and described with respect to single mode optical fiber, it should be appreciated that aspects of the present disclosure should not be limited to such single mode fiber. It may be appreciated that aspects of the present disclosure may be practiced with any type of optical fiber and/or any kind of optical components as optical sources and/or optical drains (e.g., PIC, chiplets, optical engines, lasers, waveguides, etc.). Accordingly, it is contemplated that the same principles may be applied to couple PM fiber, multimode fiber and/or few mode fiber. In such applications it may be appreciated by persons of ordinary skill in the art that additional elements may be used variously without changing the principles disclosed herein. For example, it may be appreciated that multiplexers and/or de-multiplexers may be used in such applications. However, principles as described herein may similarly be applied in such applications.

Unless otherwise explicitly specified herein, the drawings may not be drawn to scale. Additionally, identically numbered components or similarly numbered components (e.g., components with identical last two digits) within different ones of the FIGS., and/or identically or similarly named components within different FIGS. may refer to components that are substantially similar and/or different aspects of components that may achieve a similar result and/or may be similarly configured.

It may be appreciated, with reference to the present disclosure, that utilizing one or more aspects of the present disclosure, optical connection may be brought into buildings (e.g., homes) and connected directly to devices. For example, many modern homes already receive optical fiber connection. Utilizing aspects of the present disclosure, the optical fiber connection may be brought into the home and directly connected to devices, for example, utilizing optical couplers of the present disclosure. Additionally, utilizing fiber-to-chip, and chip-to-chip connection of the present disclosure, optical fiber connection may be achieved up to and into devices (e.g., personal computing devices, access points, servers, etc.). Thereby, bandwidth may be increased and energy consumption may be decreased.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    configuring a semiconductor to:
        transmit, via a transmitting element of the semiconductor, an optical beam, wherein the optical beam is expanding;
        receive, by an optical element of the semiconductor and from a reflective surface of a substrate associated with a connector, the expanded optical beam;
        transform, via the optical element of the semiconductor, the expanded optical beam; and
        reflect, via the optical element of the semiconductor, the expanded and transformed optical beam,
    wherein the optical element of the semiconductor comprises an optical focusing element.

2. The method of claim 1, wherein the optical element of the semiconductor comprises a curved mirror.

3. The method of claim 1, further comprising:
    disposing, on a surface of the semiconductor and in fixed spacing to the transmitting element, the optical element.

4. The method of claim 1, wherein the optical focusing element is configured to one or more of:
substantially collimate or focus optical beams.

5. The method of claim 1, wherein the transforming comprises focusing the expanded optical beam.

6. The method of claim 1, further comprising:
configuring the connector in association with the semiconductor to:
receive, via a second optical element, the expanded optical beam; and
second transform, via the second optical element, the expanded optical beam.

7. The method of claim 1, wherein the reflecting, via the optical element of the semiconductor, the expanded optical beam, further comprises:
reflecting, in a direction that is away from the optical element of the semiconductor in two coordinate axes, the expanded optical beam.

8. The method of claim 1, wherein the reflective surface of the substrate associated with the connector comprises a mirror disposed on the substrate, wherein the connector is configured to facilitate coupling the optical beam between the semiconductor and an optical fiber.

9. A method comprising:
transmitting, via a transmitting element of a semiconductor, an optical beam, wherein the optical beam is expanding;
receiving, by an optical element of the semiconductor and from a reflective surface of a substrate associated with a connector, the expanded optical beam;
transforming, via the optical element of the semiconductor, the expanded optical beam; and
reflecting, via the optical element of the semiconductor, the expanded and transformed optical beam,
wherein, the optical element of the semiconductor comprises an optical focusing element.

10. The method of claim 9, wherein the transmitting element of the semiconductor and the optical element of the semiconductor are disposed on the semiconductor with fixed spacing.

11. The method of claim 9, wherein the optical element of the semiconductor comprises a curved mirror.

12. The method of claim 9, wherein the optical focusing element of the semiconductor is configured to one or more of substantially collimate or focus optical beams.

13. The method of claim 9, wherein the transforming the expanded optical beam comprises focusing the expanded optical beam.

14. The method of claim 9, further comprising:
receiving, via a second optical element, the expanded optical beam; and
second transforming, via the second optical element, the expanded optical beam.

15. The method of claim 9, wherein the reflecting, via the optical element of the semiconductor, the expanded optical beam, further comprises:
reflecting, in a direction that is away from the optical element of the semiconductor in two coordinate axes, the expanded optical beam.

16. The method of claim 9, wherein the reflective surface of the substrate associated with the connector comprises a mirror disposed on the substrate, wherein the connector is configured to facilitate coupling the optical beam between the semiconductor and an optical fiber.

17. A method comprising:
configuring a connector in association with a semiconductor, such that the connector and semiconductor operate to:
transmit, via a transmitting element of the semiconductor, an optical beam, wherein the optical beam is expanding;
reflect, via a reflective surface of a substrate associated with the connector, the expanded optical beam;
receive, via an optical element of the semiconductor and from the reflective surface of the substrate, the expanded optical beam;
transform, via the optical element of the semiconductor, the expanded optical beam; and
reflect, via the optical element of the semiconductor, the expanded and transformed optical beam,
wherein, the optical element of the semiconductor comprises an optical focusing element.

18. The method of claim 17, wherein the optical element of the semiconductor comprises a curved mirror.

19. The method of claim 17, wherein the optical element of the semiconductor is disposed on a surface of the semiconductor in fixed spacing to the transmitting element of the semiconductor.

20. The method of claim 17, wherein the optical element of the semiconductor is configured to one or more of substantially collimate or focus optical beams.

21. The method of claim 17, wherein the transforming the expanded optical beam comprises focusing the optical beam.

22. The method of claim 17, further comprising:
further configuring the connector in association with the semiconductor, such that the connector and the semiconductor further operate to:
second transform the expanded optical beam.

23. The method of claim 17, wherein the reflecting, via the optical element of the semiconductor, the expanded optical beam, comprises:
reflecting, in a direction that is away from the optical element in two coordinate axes, the expanded optical beam.

24. The method of claim 17, wherein the reflective surface of the substrate associated with the connector comprises a mirror disposed on the substrate, wherein the connector is configured to facilitate coupling the optical beam between the semiconductor and an optical fiber.

25. An apparatus comprising:
a semiconductor in association with a connector, the semiconductor comprising:
a transmitting element configured to transmit an optical beam, wherein the optical beam is expanding; and
an optical element, comprising an optical focusing element, configured to:
receive the expanded optical beam from a reflective surface of a substrate associated with the connector;
transform the expanded optical beam; and
reflect the expanded and transformed optical beam.

26. The apparatus of claim 25, wherein the transmitting element and the optical element are disposed in fixed spacing.

27. The apparatus of claim 25, wherein the optical element comprises a curved mirror.

28. The apparatus of claim 25, wherein the connector comprises:
a second optical element configured to:
receive the expanded optical beam; and
second transform the expanded optical beam.

29. The apparatus of claim 25, wherein the reflecting the optical beam, further comprises:
  reflecting, in a direction that is away from the optical element in two coordinate axes, the expanded optical beam.

30. The apparatus of claim 25, wherein the optical element comprises a curved mirror disposed, via lithography, on the semiconductor and at a predefined lateral distance from the transmitting element.

31. The apparatus of claim 25, wherein the optical element is configured to one or more of substantially collimate or focus optical beams.

32. The apparatus of claim 25, wherein the transforming the expanded optical beam comprises focusing the expanded optical beam.

33. The apparatus of claim 25, wherein the reflecting the expanded optical beam further comprises:
  reflecting the expanded and transformed optical beam, having originated from the transmitting element, toward a waveguide, to couple the expanded optical beam between the transmitting element and the waveguide.

34. The apparatus of claim 25, wherein the reflecting the expanded optical beam further comprises:
  reflecting the expanded optical beam, having originated from a waveguide, toward a second optical element.

35. The apparatus of claim 25, wherein the optical element is further configured to:
  reflect a second expanded optical beam, having originated from a waveguide in optical communication with the semiconductor, toward the reflective surface of the substrate associated with the connector.

36. The apparatus of claim 35, wherein the optical element is further configured to:
  direct the second expanded optical beam toward an optical focusing element of the connector to couple the expanded optical beam between the transmitting element and a waveguide.

37. The apparatus of claim 25, wherein the reflective surface of the substrate associated with the connector comprises a mirror disposed on the substrate, wherein the connector is configured to facilitate coupling the optical beam between the semiconductor and an optical fiber.

* * * * *